US011781291B2

(12) United States Patent
Nishigori et al.

(10) Patent No.: US 11,781,291 B2
(45) Date of Patent: Oct. 10, 2023

(54) WORKING MACHINE AND MANUFACTURING METHOD OF THE SAME

(71) Applicant: KUBOTA CORPORATION, Osaka (JP)

(72) Inventors: Yoichi Nishigori, Sakai (JP); Ryo Masuda, Sakai (JP); Kenta Kamakura, Sakai (JP)

(73) Assignee: KUBOTA CORPORATION, Osaka (JP)

(*) Notice: Subject to any disclaimer, the term of this patent is extended or adjusted under 35 U.S.C. 154(b) by 619 days.

(21) Appl. No.: 16/803,531

(22) Filed: Feb. 27, 2020

(65) Prior Publication Data

US 2020/0190774 A1 Jun. 18, 2020

Related U.S. Application Data

(63) Continuation of application No. PCT/JP2018/047751, filed on Dec. 26, 2018.

(30) Foreign Application Priority Data

Dec. 27, 2017 (JP) ................................ 2017-250807
Dec. 27, 2017 (JP) ................................ 2017-250808
(Continued)

(51) Int. Cl.
*E02F 9/26* (2006.01)
*E02F 9/16* (2006.01)
(Continued)

(52) U.S. Cl.
CPC .................. *E02F 9/26* (2013.01); *E02F 9/16* (2013.01); *E02F 9/2004* (2013.01); *B60K 2370/128* (2019.05); *E02F 3/325* (2013.01)

(58) Field of Classification Search
CPC ... E02F 9/26; E02F 9/16; E02F 9/2004; E02F 3/325; B60K 2370/128; G05G 1/04; G05G 1/08; G05G 1/62; B60N 2/75
See application file for complete search history.

(56) References Cited

U.S. PATENT DOCUMENTS 3,011,739 A * 12/1961 Boyce ................ B64C 13/0421 244/237
3,223,193 A * 12/1965 Reynolds .......... B62D 49/0685 180/329
(Continued)

FOREIGN PATENT DOCUMENTS

EP 2 987 672 A1 2/2016
EP 3 032 371 A1 6/2016
(Continued)

OTHER PUBLICATIONS

Japanese Office Action for Japanese Application No. 2021-150105, dated Oct. 11, 2022, with English translation.
(Continued)

*Primary Examiner* — Paul N Dickson
*Assistant Examiner* — Timothy Wilhelm
(74) *Attorney, Agent, or Firm* — BIRCH, STEWART, KOLASCH & BIRCH, LLP

(57) ABSTRACT

The working machine includes an operator seat, an armrest arranged adjacent to the operator seat, an operation lever arranged in front of the armrest, and a jug dial arranged adjacent to the operation lever. The jog dial is arranged on a position allowing an operator seated on the operator seat to operate the operation lever and the jog dial with an arm placed on the armrest.

18 Claims, 91 Drawing Sheets

(30) Foreign Application Priority Data

| | | |
|---|---|---|
| Dec. 27, 2017 | (JP) | 2017-250809 |
| Dec. 27, 2017 | (JP) | 2017-250810 |
| Dec. 27, 2017 | (JP) | 2017-250811 |
| Dec. 27, 2017 | (JP) | 2017-250812 |
| Dec. 27, 2017 | (JP) | 2017-250813 |
| Dec. 27, 2017 | (JP) | 2017-250815 |
| Dec. 27, 2017 | (JP) | 2017-250816 |
| Dec. 27, 2017 | (JP) | 2017-250817 |
| Dec. 27, 2017 | (JP) | 2017-250818 |
| Dec. 27, 2017 | (JP) | 2017-250819 |
| Dec. 27, 2017 | (JP) | 2017-250820 |
| Dec. 27, 2017 | (JP) | 2017-250821 |

(51) Int. Cl.
*E02F 9/20* (2006.01)
*E02F 3/32* (2006.01)

(56) References Cited

U.S. PATENT DOCUMENTS 3,369,682 A * 2/1968 Breault ..... B60P 1/6445 414/559
3,893,728 A * 7/1975 Holopainen ..... B60N 2/143 297/344.24
4,012,014 A * 3/1977 Marshall ..... B64C 13/0421 244/234
4,026,379 A * 5/1977 Dunn ..... B60N 2/143 105/342
4,091,889 A * 5/1978 Brown ..... B60K 28/00 180/336
4,478,308 A * 10/1984 Klaassen ..... E02F 9/2004 180/326
4,496,190 A * 1/1985 Barley ..... B60N 2/77 297/411.32
4,674,798 A * 6/1987 Oeth ..... B60N 2/77 297/115
4,702,520 A * 10/1987 Whisler ..... B60N 2/77 297/115
4,730,691 A * 3/1988 Grigg ..... B62D 1/22 180/326
4,869,337 A * 9/1989 Wagner ..... E02F 3/964 180/335
4,895,040 A * 1/1990 Soederberg ..... G05G 1/52 180/315
4,934,462 A * 6/1990 Tatara ..... E02F 9/2012 37/348
5,052,512 A * 10/1991 Pakosh ..... B62D 1/22 180/326
5,086,869 A * 2/1992 Newbery ..... B62D 1/22 180/329
5,092,408 A * 3/1992 Tatara ..... F15B 21/08 37/348
5,120,187 A * 6/1992 Weber ..... G05G 11/00 180/324
5,379,663 A * 1/1995 Hara ..... G05G 9/04 345/161
5,409,079 A * 4/1995 Strong ..... B60K 37/00 180/326
5,542,493 A * 8/1996 Jacobson ..... G01B 7/003 180/272
5,566,778 A * 10/1996 Valier ..... B60N 2/767 180/336
5,567,004 A * 10/1996 Pietzsch ..... B60R 11/0264 180/326
5,678,469 A * 10/1997 Lech ..... F16H 61/40 903/902
5,860,488 A * 1/1999 Kim ..... B60N 2/797 192/220.3
5,924,515 A * 7/1999 Stauffer ..... A01D 67/04 180/326
6,039,141 A * 3/2000 Denny ..... B60N 2/14 296/190.01
6,164,285 A * 12/2000 Garberg ..... B60K 26/00 180/326
6,202,501 B1 * 3/2001 Ikari ..... B62D 1/12 180/332
6,226,902 B1 * 5/2001 Heyne ..... E02F 9/2004 37/348
6,283,504 B1 * 9/2001 Stanley ..... B60R 21/01532 297/217.2
6,450,284 B1 * 9/2002 Sakyo ..... E02F 9/2004 340/684
6,540,300 B2 * 4/2003 Piretti ..... A47C 1/03 297/411.36
6,577,909 B1 * 6/2003 McGowan ..... G05B 9/02 700/79
6,585,073 B2 * 7/2003 Lorenz ..... B60R 21/09 180/335
6,634,453 B2 * 10/2003 Arthur ..... G05G 1/62 180/315
6,643,577 B1 * 11/2003 Padgett ..... E02F 9/2012 318/568.18
6,715,269 B2 * 4/2004 Nanlawala ..... A01D 75/00 296/190.01
6,851,495 B2 * 2/2005 Sprinkle ..... F16H 61/47 180/338
6,971,194 B2 * 12/2005 McClelland ..... E02F 9/2004 180/326
6,971,471 B2 * 12/2005 Baker ..... B60T 1/065 296/190.04
7,032,703 B2 * 4/2006 Wulfert ..... B60R 11/0235 297/344.13
7,036,248 B2 * 5/2006 Meyeres ..... E02F 9/2025 37/234
7,059,680 B2 * 6/2006 Billger ..... B60N 2/919 297/344.21
7,178,623 B2 * 2/2007 Ginzel ..... B60K 20/02 180/315
7,210,552 B2 * 5/2007 Priepke ..... B62D 1/10 280/771
7,283,903 B2 * 10/2007 Merten ..... E02F 9/166 307/10.6
7,347,299 B2 * 3/2008 Billger ..... B66F 9/07545 180/326
7,389,845 B2 * 6/2008 Longueville ..... B60N 2/753 180/326
7,438,318 B2 * 10/2008 Sano ..... B60N 2/753 180/326
7,438,517 B2 * 10/2008 Tanaka ..... A01B 63/1013 180/315
7,458,439 B2 * 12/2008 Catton ..... B60N 2/767 248/125.8
7,484,587 B2 * 2/2009 Portscheller ..... B60N 2/143 180/89.12
7,520,567 B2 * 4/2009 Billger ..... B60N 2/797 180/331
7,635,045 B2 * 12/2009 Shearer ..... E02F 9/2004 180/315
7,681,686 B1 * 3/2010 Klas ..... B60K 26/00 180/329
7,712,571 B2 * 5/2010 Proud ..... B60K 26/02 74/491
7,721,830 B2 * 5/2010 Dunn ..... B62D 11/001 180/6.48
7,721,840 B2 * 5/2010 McCord ..... B62D 1/12 180/402
7,748,785 B2 * 7/2010 Lucas ..... B60N 2/797 297/411.35
7,757,806 B2 * 7/2010 Bower ..... B60N 2/06 180/326
7,784,581 B1 * 8/2010 Klas ..... G05G 9/047 297/344.21
7,806,470 B2 * 10/2010 Steege ..... B60N 2/797 297/188.17
7,828,107 B2 * 11/2010 Yoshikawa ..... F16H 59/02 180/323

(56) References Cited

U.S. PATENT DOCUMENTS

| | | | | |
|---|---|---|---|---|
| 7,857,090 | B2 * | 12/2010 | Ruhter | E02F 9/2004 172/781 |
| 7,878,288 | B2 * | 2/2011 | Kostak | B60N 2/777 180/329 |
| 7,899,597 | B2 * | 3/2011 | Vitale | E02F 9/2095 701/50 |
| 7,954,592 | B2 * | 6/2011 | Miyazaki | E02F 9/2004 180/321 |
| 8,041,485 | B2 * | 10/2011 | Prasetiawan | E02F 9/2004 701/50 |
| 8,052,097 | B2 * | 11/2011 | Rollet | B64C 27/56 244/221 |
| 8,104,566 | B2 * | 1/2012 | Harber | E02F 9/16 180/326 |
| 8,157,042 | B2 * | 4/2012 | Fujiki | B62D 49/02 296/190.04 |
| 8,335,618 | B2 * | 12/2012 | Knapp | F02N 11/0803 701/84 |
| 8,434,562 | B2 * | 5/2013 | Miyasaka | E02F 9/2004 74/491 |
| 8,483,914 | B2 * | 7/2013 | Copeland | E02F 9/2004 701/50 |
| 8,579,070 | B2 * | 11/2013 | Nishi | B60N 2/24 180/336 |
| 8,763,747 | B2 * | 7/2014 | Jones | E02F 9/2004 180/326 |
| 8,820,700 | B2 * | 9/2014 | Roach | G05G 23/00 248/560 |
| 8,851,225 | B2 * | 10/2014 | Braun | B60K 26/02 180/324 |
| 8,931,586 | B2 * | 1/2015 | Wakino | B62D 33/0617 180/315 |
| 8,979,175 | B2 * | 3/2015 | Kim | B62D 33/0617 296/190.04 |
| 9,217,240 | B2 * | 12/2015 | Shibata | E02F 9/166 |
| 9,579,800 | B2 * | 2/2017 | Som | G06F 3/04886 |
| 9,592,758 | B2 * | 3/2017 | Mahler | B60N 2/797 |
| 9,671,879 | B2 * | 6/2017 | Hisatsugu | G06F 3/0227 |
| 9,707,865 | B1 * | 7/2017 | Buerkle | B60N 2/38 |
| 9,751,572 | B2 * | 9/2017 | Higashiguchi | A01B 63/10 |
| 9,777,460 | B2 * | 10/2017 | Wuisan | E02F 9/2004 |
| 9,797,113 | B2 * | 10/2017 | Tolkacz | B62D 33/06 |
| 9,797,114 | B2 * | 10/2017 | Maifield | E02F 9/2012 |
| 9,840,826 | B2 * | 12/2017 | Huber | B60K 37/06 |
| 9,878,733 | B2 * | 1/2018 | Enomoto | B62D 1/12 |
| 9,885,170 | B2 * | 2/2018 | Katayanagi | E02F 9/163 |
| 10,094,094 | B2 | 10/2018 | Tsukamoto | |
| 10,144,316 | B2 * | 12/2018 | Peterson | B60N 2/14 |
| 10,196,795 | B2 * | 2/2019 | Kato | G05G 9/047 |
| 10,227,083 | B2 * | 3/2019 | Teranishi | E02F 9/2004 |
| 10,253,477 | B2 * | 4/2019 | Kato | E02F 9/0841 |
| 10,370,821 | B2 * | 8/2019 | Muramoto | B62D 1/18 |
| 10,391,983 | B2 * | 8/2019 | Klein | B60T 7/04 |
| 10,427,617 | B2 * | 10/2019 | Gomez | B60N 2/79 |
| 10,434,914 | B2 * | 10/2019 | Bittner | B60N 2/79 |
| 10,471,923 | B2 * | 11/2019 | Jimenez | B60R 21/23138 |
| 10,597,851 | B2 * | 3/2020 | Isaka | E02F 9/16 |
| 10,702,069 | B2 * | 7/2020 | Pelka | B60N 2/797 |
| 10,744,919 | B2 * | 8/2020 | Brooks | B60N 2/797 |
| 10,754,466 | B2 * | 8/2020 | Ochenas | G06F 3/0483 |
| 10,779,457 | B2 * | 9/2020 | Barzen | B60K 35/00 |
| 10,794,043 | B2 * | 10/2020 | Takenaka | B62D 5/24 |
| 10,814,746 | B2 * | 10/2020 | Sailer | B62D 63/04 |
| 10,820,473 | B2 * | 11/2020 | Salzman | A01B 76/00 |
| 10,994,778 | B2 * | 5/2021 | Benck | E02F 9/225 |
| 2002/0145325 | A1 * | 10/2002 | Clevenger | G05G 1/62 297/411.32 |
| 2003/0184123 | A1 * | 10/2003 | Amamiya | B60N 2/797 296/190.01 |
| 2006/0000656 | A1 * | 1/2006 | Bisick | B60N 2/797 180/272 |
| 2006/0226680 | A1 | 10/2006 | Matsumoto et al. | |
| 2006/0232116 | A1 * | 10/2006 | Jang | E02F 9/24 297/354.1 |
| 2007/0295551 | A1 * | 12/2007 | Proud | B60K 26/02 180/333 |
| 2008/0277190 | A1 * | 11/2008 | McCord | B62D 1/22 180/443 |
| 2012/0229394 | A1 * | 9/2012 | Ehrl | G06F 1/1607 345/173 |
| 2015/0130712 | A1 * | 5/2015 | Hirai | G06F 3/04883 345/157 |
| 2015/0360593 | A1 * | 12/2015 | Mahler | B60N 2/77 297/411.32 |
| 2016/0053779 | A1 | 2/2016 | Komatsu et al. | |
| 2018/0230675 | A1 * | 8/2018 | Kato | B60P 1/04 |
| 2021/0261205 | A1 * | 8/2021 | McConoughey | B60N 2/77 |
| 2021/0261206 | A1 * | 8/2021 | McConoughey | B60N 2/38 |
| 2022/0009564 | A1 * | 1/2022 | Hatta | B62D 33/0617 |

FOREIGN PATENT DOCUMENTS

| | | | |
|---|---|---|---|
| JP | 61-59819 | U | 4/1986 |
| JP | 4-41561 | U | 4/1992 |
| JP | 8-121162 | A | 5/1996 |
| JP | 8-144735 | A | 6/1996 |
| JP | 9-41426 | A | 2/1997 |
| JP | 9-101056 | A | 4/1997 |
| JP | 10-88609 | A | 4/1998 |
| JP | 11-280117 | A | 10/1999 |
| JP | 2000-186563 | A | 7/2000 |
| JP | 2000-303499 | A | 10/2000 |
| JP | 2001-81811 | A | 3/2001 |
| JP | 2002-146834 | A | 5/2002 |
| JP | 2002-322678 | A | 11/2002 |
| JP | 2002-339742 | A | 11/2002 |
| JP | 2003-202149 | A | 7/2003 |
| JP | 2004-268801 | A | 9/2004 |
| JP | 2005-88639 | A | 4/2005 |
| JP | 2005-112049 | A | 4/2005 |
| JP | 2005-280477 | A | 10/2005 |
| JP | 2005-330771 | A | 12/2005 |
| JP | 2006-274594 | A | 10/2006 |
| JP | 2007-120391 | A | 5/2007 |
| JP | 2007-245893 | A | 9/2007 |
| JP | 2008-171595 | A | 7/2008 |
| JP | 2008-254534 | A | 10/2008 |
| JP | 2009-234365 | A | 10/2009 |
| JP | 2009-243118 | A | 10/2009 |
| JP | 2010-18958 | A | 1/2010 |
| JP | 2010-84329 | A | 4/2010 |
| JP | 2010-168839 | A | 8/2010 |
| JP | 4516009 | B2 | 8/2010 |
| JP | 2012-136832 | A | 7/2012 |
| JP | 2013-83214 | A | 5/2013 |
| JP | 2013-112104 | A | 6/2013 |
| JP | 5386473 | B2 | 1/2014 |
| JP | 2014-31686 | A | 2/2014 |
| JP | 2014-58831 | A | 4/2014 |
| JP | 2014-136943 | A | 7/2014 |
| JP | 2014-194114 | A | 10/2014 |
| JP | 2014-205974 | A | 10/2014 |
| JP | 2016-41565 | A | 3/2016 |
| JP | 2016-125432 | A | 7/2016 |
| JP | 2016-188063 | A | 11/2016 |
| JP | 2017-65569 | A | 4/2017 |
| JP | 2017-66789 | A | 4/2017 |
| JP | 2017-67212 | A | 4/2017 |
| JP | 2017-75529 | A | 4/2017 |
| JP | 2017-133355 | A | 8/2017 |
| JP | 2017-180066 | A | 10/2017 |

OTHER PUBLICATIONS

European Communication pursuant to Article 94(3) EPC for European Application No. 18894413.6, dated Jun. 27, 2023.

* cited by examiner

WORKING MACHINE AND MANUFACTURING METHOD OF THE SAME

CROSS-REFERENCE TO RELATED APPLICATIONS

The present application is a continuation application of International Application No. PCT/JP2018/047751, filed Dec. 26, 2018, which claims priority to Japanese Patent Application No. 2017/250807, filed Dec. 27, 2017, to Japanese Patent Application No. 2017/250808, filed Dec. 27, 2017, to Japanese Patent Application No. 2017/250809, filed Dec. 27, 2017, to Japanese Patent Application No. 2017/250810, filed Dec. 27, 2017, to Japanese Patent Application No. 2017/250811, filed Dec. 27, 2017, to Japanese Patent Application No. 2017/250812, filed Dec. 27, 2017, to Japanese Patent Application No. 2017/250813, filed Dec. 27, 2017, to Japanese Patent Application No. 2017/250815, filed Dec. 27, 2017, to Japanese Patent Application No. 2017/250816, filed Dec. 27, 2017, to Japanese Patent Application No. 2017/250817, filed Dec. 27, 2017, to Japanese Patent Application No. 2017/250818, filed Dec. 27, 2017, to Japanese Patent Application No. 2017/250819, filed Dec. 27, 2017, to Japanese Patent Application No. 2017/250820, filed Dec. 27, 2017, and to Japanese Patent Application No. 2017/250821, filed Dec. 27, 2017. The contents of these applications are incorporated herein by reference in their entirety.

BACKGROUND OF THE INVENTION

Field of the Invention

The present invention relates to a working machine such as a backhoe and to a manufacturing method of the working machine.

Description of Related Art

A working machines disclosed in patent documents are previously known.

The working machine disclosed in Japanese Unexamined Patent Application Publication No. 2009-234365 has an armrest disposed to the side of the operator seat and an operation lever provided in front of the armrest. In addition, the working machine is provided with a display device is provided in front of the operation lever.

In addition, the working machine disclosed in Japanese Unexamined Patent Application Publication No. 2017-180066 has an operator seat arranged in a cabin mounted on a machine body, and has a console provided with levers and switches to the side of the operator seat.

In addition, the working machine disclosed in Japanese Unexamined Patent Application Publication No. 2009-234365 includes an operator seat and a display device provided obliquely in front of the operator seat.

In addition, the working machine disclosed in Japanese Unexamined Patent Application Publication No. 2016-188063 is provided with an air conditioner main body and a duct connected to the air conditioner main body in the room of the cabin mounted on the machine body. The duct has a blower portion that blows out, into the cabin, the mixed air sent from the air conditioner main body.

In addition, the working machine disclosed in Japanese Unexamined Patent Application Publication No. 2009-243118 is provided with a partition plate extending in the machine width direction on a turn base plate constituting the bottom of the machine body. The machine body has a fuel tank mounted in front of the partition plate, and has a prime mover mounted behind the partition plate. The fuel-supplying portion for supplying fuel to the fuel tank is arranged behind the partition plate, and the fuel-supplying portion and the fuel tank are connected by a connector pipe.

In addition, the working machine disclosed in Japanese Unexamined Patent Application Publication No. 2014-31686 has a machine body on which a cabin is mounted. A control device is provided in the cabin.

In addition, the working machine disclosed in Japanese Unexamined Patent Application Publication No. 2004-268801 has a turn base plate on which a prime mover is mounted to the rear end side. On the turn base plate, reinforcing ribs for reinforcing the turn base plate are provided extending from the front portion to the rear portion of the turn base plate. The working machine has the turn base plate on which a prime mover is mounted. On the turn base plate, reinforcing ribs for reinforcing the turn base plate are provided extending from one end side toward the prime mover.

In addition, the working machine disclosed in Japanese Unexamined Patent Application Publication No. 2017-65569 has an exhaust pipe for exhausting, to the atmosphere, the exhaust gas from the prime mover.

In addition, the working machine disclosed in Japanese Unexamined Patent Application Publication No. 2017-67212 includes a prime mover and a cabin mounted on the machine body. The room of cabin and the prime mover room that houses the prime mover are separated by a shield wall member. A partition plate that partitions the lower front portion of the prime mover room is disposed below the shield wall member. An air conditioner main body is provided in the cabin.

In addition, the working machine disclosed in Japanese Unexamined Patent Application Publication No. 2010-168839 has an machine body on which a prime mover is mounted. A support frame is erected on the machine body, and a bonnet that forms a prime mover room is supported by the support frame.

In addition, the working machine disclosed in Japanese Unexamined Patent Application Publication No. 2014-31686 has a cabin mounted on the machine body. The cabin has an opening portion on the lower end side, the opening portion being communicated with the cabin. The front portion of the opening portion is closed by the step constituting the floor portion, and the rear portion of the opening portion is closed by the front wall portion of the engine cover.

In addition, the working machine disclosed in Japanese Unexamined Patent Application Publication No. 2005-112049 includes a cabin and a step (an operating floor) that forms a floor surface of the cabin.

In addition, the working machine disclosed in Japanese Unexamined Patent Application Publication No. 2005-330771 is provided with an air conditioner main body below the operator seat in the cabin. An outside air inlet portion for introducing the outside air into the air conditioner main body is provided on the right side of the front portion of the cabin. The outside air is introduced from the outside air inlet portion into the air conditioner main body through a duct provided to the lower surface side of the step.

In addition, the working machine disclosed in Japanese Unexamined Patent Application Publication No. H11-280117 is provided with a movable body that is supported by a seat-supporting base attached to the machine body so that the movable body can be adjust the position in the front-rear direction. The movable body is provided with an operation lever, and the operator seat is supported by the movable body such that the position of the operator seat is adjusted in the front-rear direction.

SUMMARY OF THE INVENTION

A working machine according to one aspect of the present invention, includes: an operator seat; an armrest arranged adjacent to the operator seat; an operation lever arranged in front of the arm rest; and a jug dial arranged adjacent to the operation lever.

A working machine according to one aspect of the present invention, includes: a cabin; an operator seat arranged in the cabin; and a console arranged between the operator seat and a side wall portion of the cabin, the console including: a console cover having a protruding portion protruding toward the side wall portion of the cabin; and a console supporting portion to which the console cover is attached. The protruding portion is attached to the console supporting portion and is overlapped with at least a part of the side wall portion of the cabin below the protruding portion in a planar view.

A manufacturing method of the above-mentioned working machine according to one aspect of the present invention, includes: a first step for hanging a portion including the side wall portion of the cabin from above and housing the operator seat and the console supporting portion in the cabin; and a second step for attaching a portion including the protruding portion of the console cover to the console supporting portion.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

Hereinafter, an embodiment of the present invention will be described with reference to the drawings as appropriate.

Figure 1:
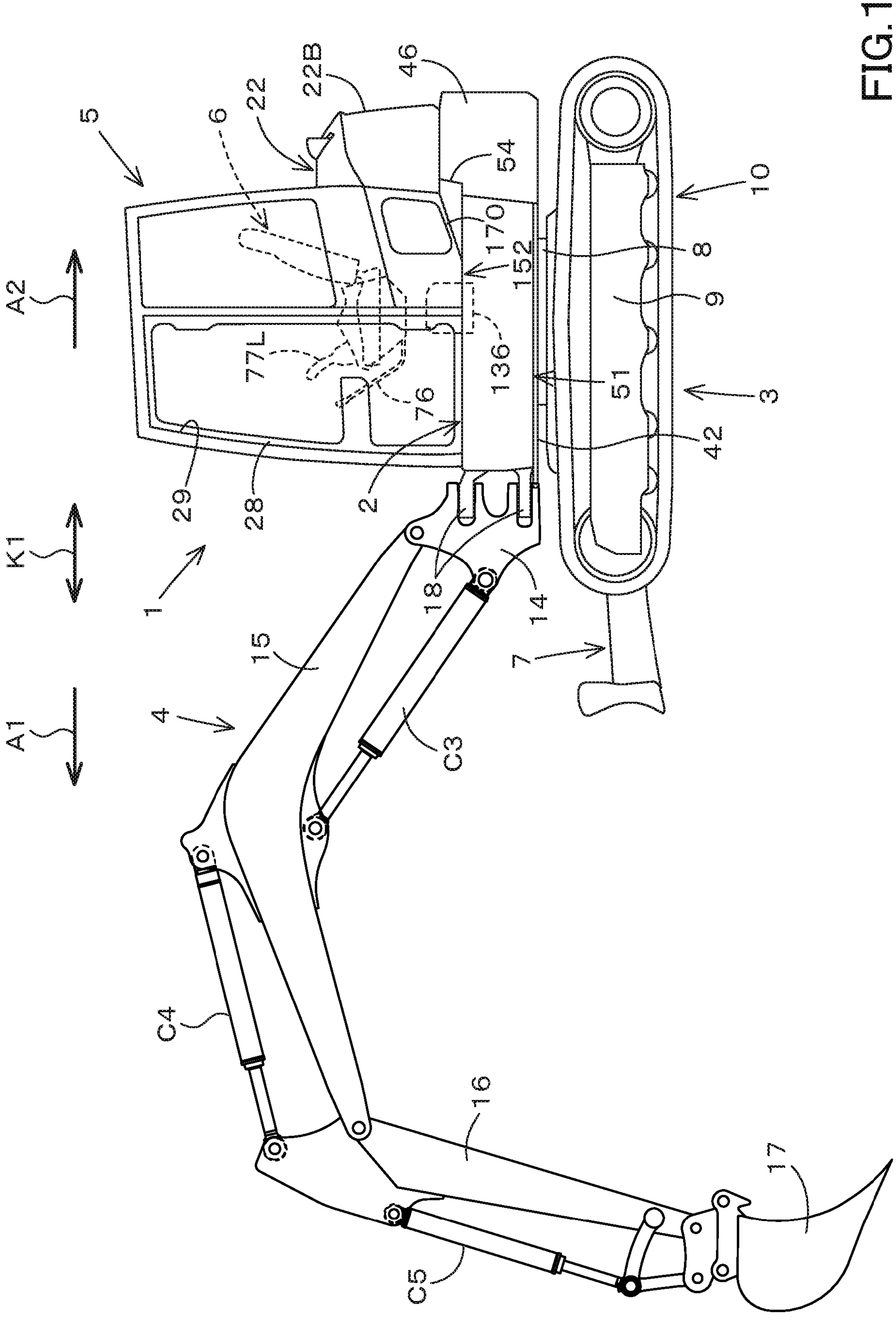
FIG. 1 is a side view of a working machine according to an embodiment of the present invention.
Figure 2:
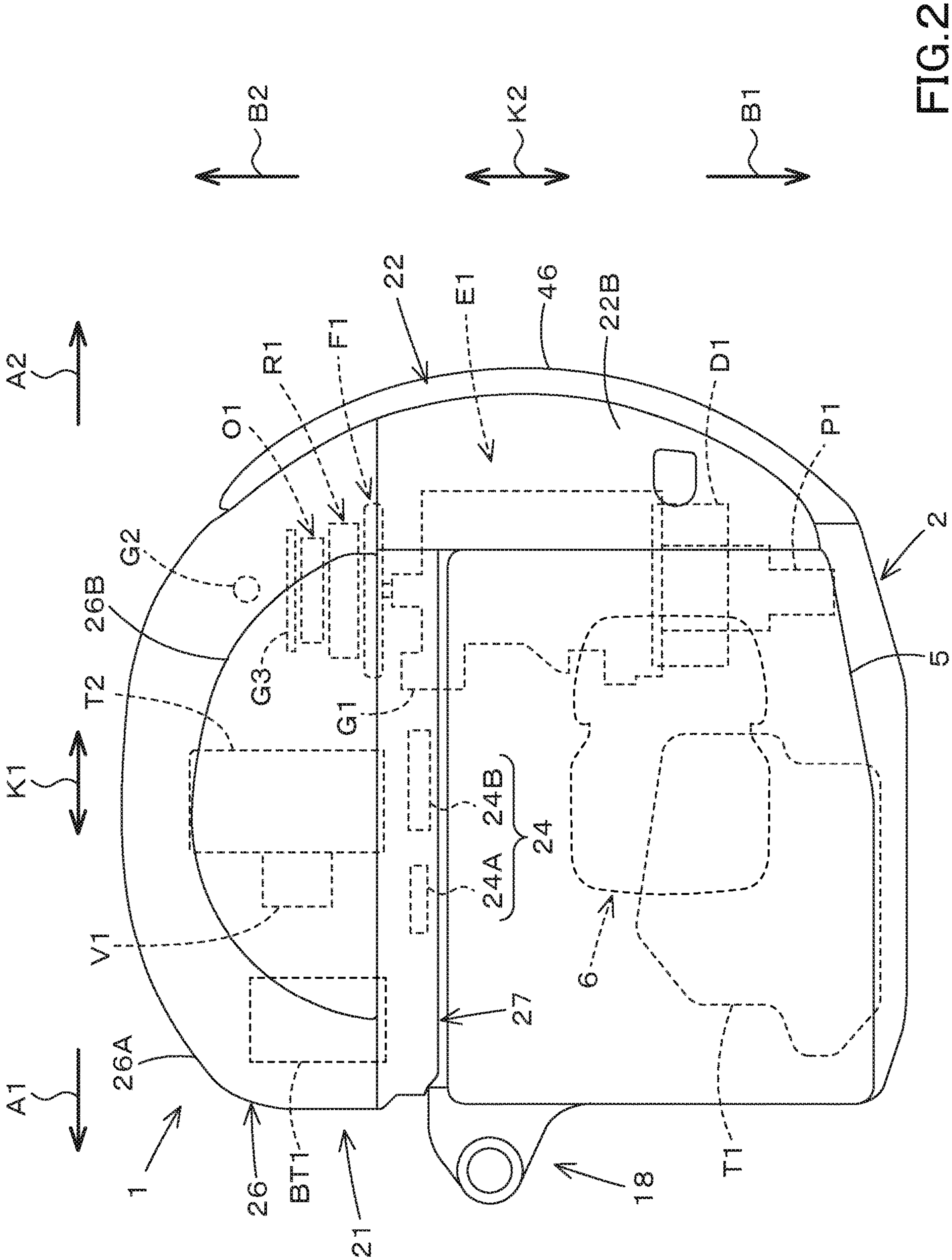
FIG. 2 is a planar view of the working machine according to the embodiment.

FIG. 1 is a schematic side view showing an overall configuration of a working machine 1 according to the embodiment of the present embodiment. FIG. 2 is a schematic plan view in which the working device of the working machine 1 is omitted. In the present embodiment, a backhoe that is a swiveling working machine is illustrated as the working machine 1.

As shown in FIG. 1 and FIG. 2, the working machine 1 includes a machine body (a swivel base) 2, a traveling device 3, and a working device 4. A cabin 5 is mounted on the machine body 2. An operator seat (seat) 6 on which an operator (a driver) is seated is provided in the cabin 5. The operator seat 6 is surrounded by the cabin 5.

In the embodiment of the present invention, the front side of the operator seated on the operator seat 6 of the working machine 1 (a direction indicated by an arrowed line A1 in FIG. 1 and FIG. 2) is referred to as the front, the rear side of the operator (a direction indicated by an arrowed line A2 in FIG. 1 and FIG. 2) is referred to as the rear, the left side of the operator (a front surface side of FIG. 1, a direction indicated by an arrowed line B1 in FIG. 2) is referred to as the left, and the right side of the operator (a back surface side of FIG. 1, a direction indicated by an arrowed line B2 in FIG. 2) is referred to as the right.

In addition, the horizontal direction, which is a direction orthogonal to the front-rear direction K1, will be described as the machine width direction K2 (see FIG. 2). The direction extending from the center portion of the machine body 2 toward the right portion or the left portion will be described as the machine outward direction. In other words, the machine outward direction is the machine width direction K2, that is, a direction separating away the center of the machine body 2 in the width direction. The direction opposite to the machine outward direction will be described as the machine inward direction. In other words, the machine inward direction is the machine width direction K2, that is, a direction approaching the center of the machine body 2 in the width direction.

As shown in FIG. 1, the traveling device 3 includes a traveling frame 9 and a traveling mechanism 10. The traveling mechanism 10 is constituted of a crawler traveling mechanism configured to be driven by a hydraulic motor. In the present embodiment, the traveling device 3 is the crawler traveling device. The traveling mechanism 10 is provided to the left of the traveling frame 9 and to the right of the traveling frame 9. A dozer device 7 is attached to the front portion of the traveling device 3. The dozer device 7 is configured to be moved upward and downward by a hydraulic cylinder.

As shown in FIG. 1, the working device 4 includes a boom 15, an arm 16, and a bucket (a working tool) 17. The base portion of the boom 15 is pivotally attached to the swing bracket 14 so as to be rotatable (swingable up and down) about a horizontal axis (an axial center extending in the machine width direction K2). The swing bracket 14 is supported by a support bracket 18 provided at the front portion of the machine body 2 so as to be rotatable about a vertical axis (an axis extending in the vertical direction). The arm 16 is pivotally attached to the tip end side of the boom 15 so as to be rotatable around the horizontal axis (to be movable back and forth or vertically). The bucket 17 is provided on the distal end side of the arm 16, and is configured to perform the shoveling operation and the dumping operation. The working machine 1 is configured to mount another working tool (the hydraulic attachment) configured to be driven by the hydraulic actuator instead of or in addition to the bucket 17. Examples of other working tools include a hydraulic breaker, a hydraulic crusher, an angle broom, an earth auger, a pallet fork, a sweeper, a mower, and a snow blower.

The swing bracket 14 swings around the vertical axis by the stretching and the shortening of the hydraulic cylinder. The boom 15 swings by the stretching and the shortening of the boom cylinder C3. The arm 16 swings due to the stretching and the shortening of the arm cylinder C4. The bucket 17 performs the shoveling operation and the dumping operation by the stretching and the shortening of the bucket cylinder (the working tool cylinder) C5. The boom cylinder C3, the arm cylinder C4, and the bucket cylinder C5 are constituted of the hydraulic cylinders (the hydraulic actuators).

As shown in FIG. 1, the machine body 2 is supported on a traveling frame 9 by the turn bearing 8 so as to be rotatable about the vertical axis (to be turnable left and right). As shown in FIG. 3 to FIG. 6, the machine body 2 has a turn frame 41 serving as a framework. The turn frame 41 has a turn base plate 42 that constitutes the bottom portion of the machine body 2. A prime mover E1 is mounted on the rear portion of the turn base plate 42 (see FIG. 6). The turn base plate 42 is formed of a thick plate, and the lower surface side is bolted to the outer race 8A of the swivel bearing 8 as shown in FIG. 4. The inner race 8B of the turn bearing 8 is bolted to the traveling frame 9. The outer race 8A and the inner race 8B are coupled so as to be relatively rotatable with balls.

Figure 3:
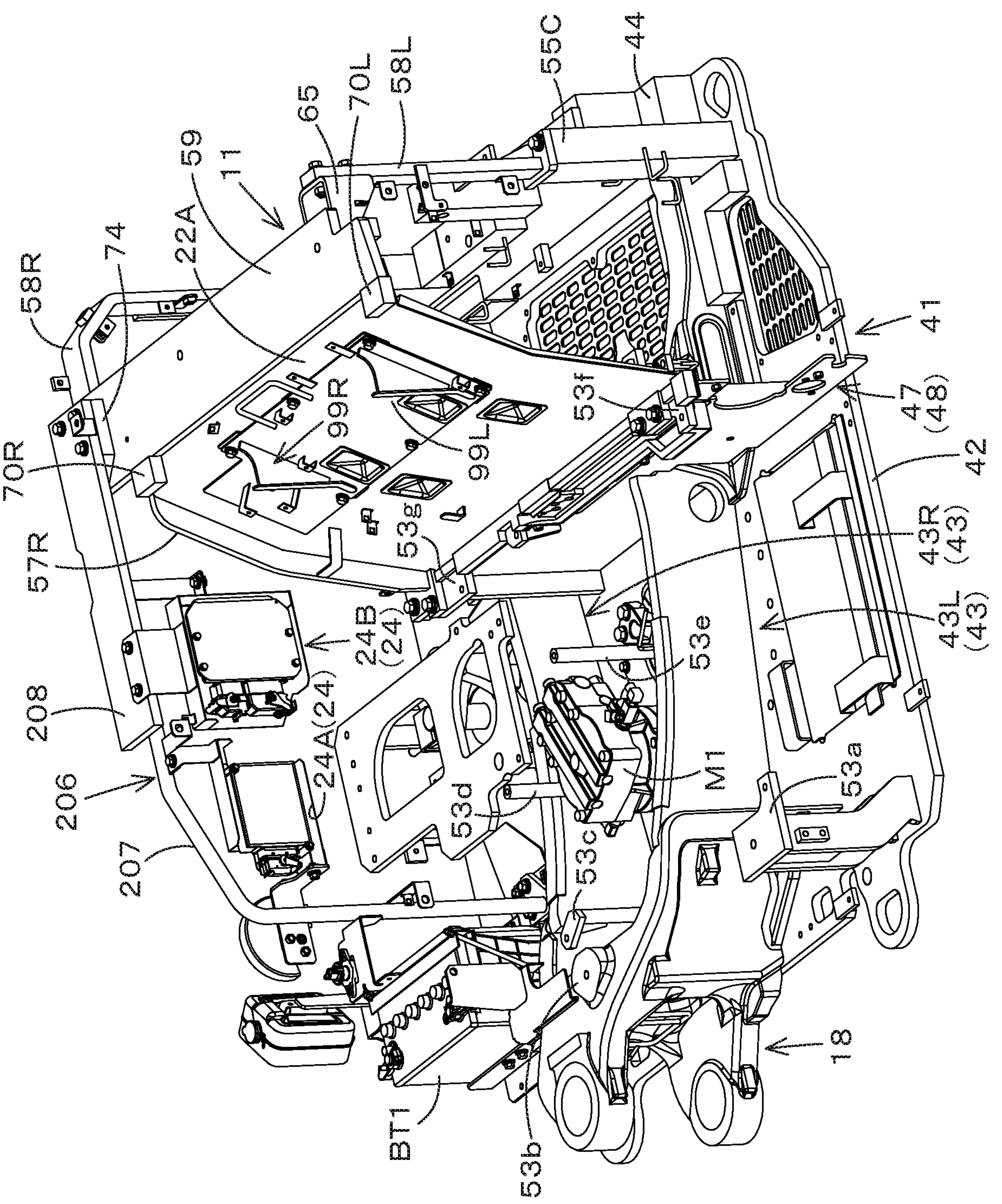
FIG. 3 is a perspective view of a turn frame to which a support frame, a shield wall member, and the like according to the embodiment.
Figure 4:
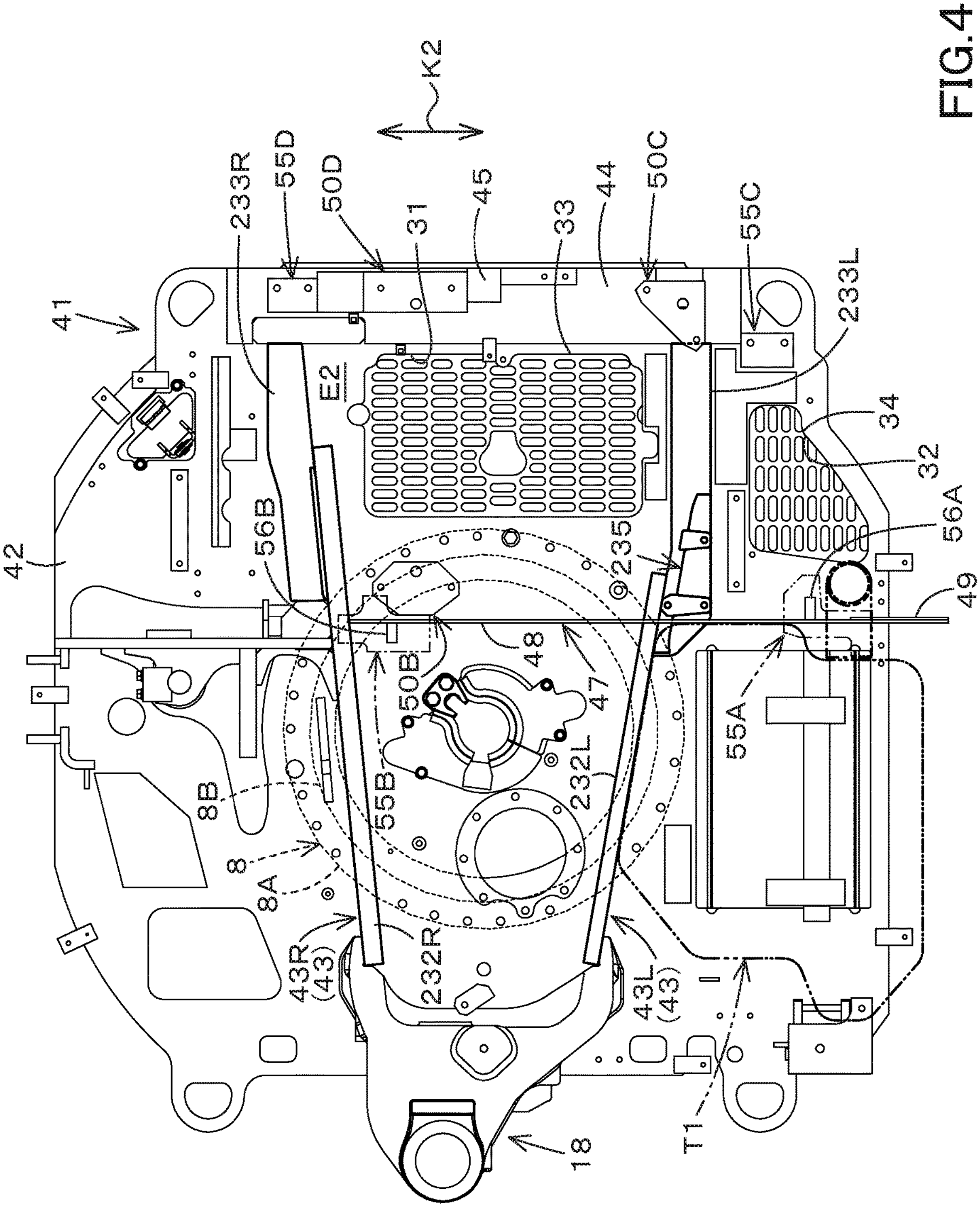
FIG. 4 is a planer view of the turn frame according to the embodiment.

As shown in FIG. 3, a turn motor M1 configured to rotationally drives the turn base plate 42 is attached to the front portion of the turn base plate 42 at the center portion in the machine width direction K2. The support bracket 18 is fixed to the front portion of the turn base plate 42 so as to protrude forward. The support bracket 18 is arranged in front of the turn motor M1.

Figure 5:
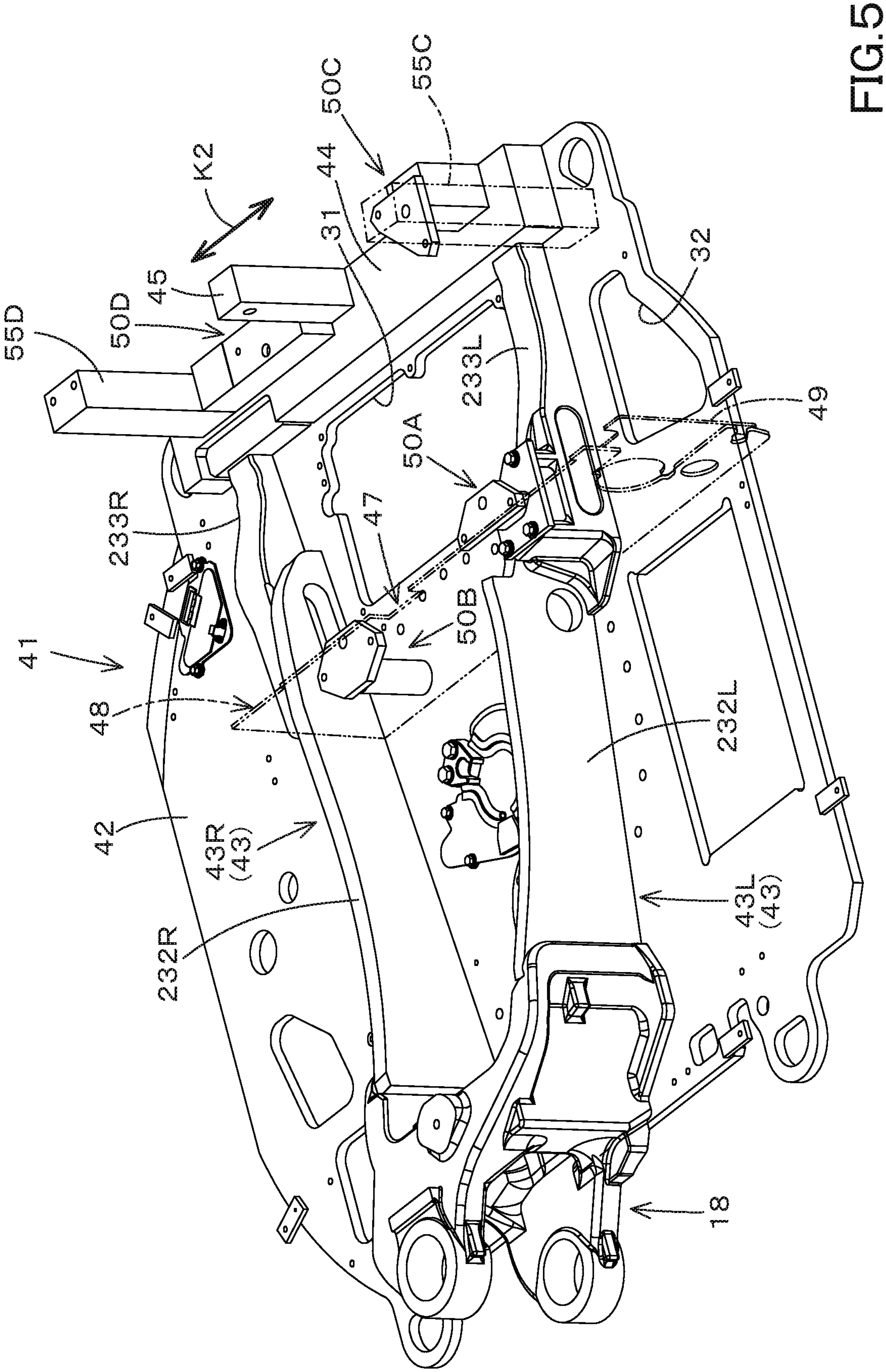
FIG. 5 is a perspective view of the turn frame according to the embodiment.

As shown in FIG. 4 and FIG. 5, a reinforcing rib 43 is provided on the turn base plate 42 from the front portion (one end side) to the rear portion (toward the prime mover E1) of the turn base plate 42. The reinforcing rib 43 is fixed to the turn base plate 42 by welding, and thus reinforces the turn base plate 42. The reinforcing rib 43 includes a first rib 43L provided on the left side of the turn base plate 42 and includes a second rib 43R provided on the right side of the turn base plate 42. A first weight attachment portion 44 has a block shape that is long in the machine width direction K2, and the first weight attachment portion 44 is fixed to the rear portion of the turn base plate 42. The first rib 43L (the reinforcing rib 43) has a front rib 232L and a rear rib 233L, and is provided from the left portion of the rear portion of the support bracket 18 to the left portion of the first weight attachment portion 44. The second rib 43R (the reinforcing rib 43) has a front rib 232R and a rear rib 233R, and is provided from the right portion of the rear portion of the support bracket 18 to the right portion of the first weight attachment portion 44.

A second weight attachment portion 45 has a rectangular column shape, and the second weight attachment portion 45 is provided standing at the center portion of the first weight attachment portion 44 in the machine width direction K2. A weight 46 is attached to the first weight attachment portion 44 and the second weight attachment portion 45 (see FIG. 6). The weight 46 is provided at the rear portion of the machine body 2.

As shown in FIG. 4 and FIG. 5, a partition plate 47 is provided closer to the rear portion from the center portion of the turn base plate 42 in the front-rear portion. The partition plate 47 includes a main partition plate 48 and a sub partition plate 49. The main partition plate 48 extends from the left side surface of the second rib 43R to the left end portion of the turn base plate 42 across the first rib 43L in the machine width direction K2. The main partition plate 48 is provided standing on and being fixed to the turn base plate 42 by welding. The sub partition plate 49 is attached to be overlapped with the back surface of the main partition plate 48 at the left portion of the turn base plate 42.

A first opening 31 and a second opening 32 are formed at the rear portion of the turn base plate 42. The first opening 31 and the second opening 32 are formed of substantially rectangular edge portions which are formed through the turn base plate 42. The first opening 31 and the second opening 32 discharge the cooling air after cooling the prime mover E1. The first opening 31 is formed behind the main partition plate 48 and between the first rib 431, and the second rib 43R. A first lid plate 33 formed of a perforated plate having a large number of holes is arranged in the first opening 31 so as to cover the opening. The second opening 32 is formed to the left of the first opening 31 and to the left of the first rib 43L. The second opening 32 is provided with a second lid plate 34 formed of a perforated plate having a large number of holes so as to cover the opening.

Figure 6:
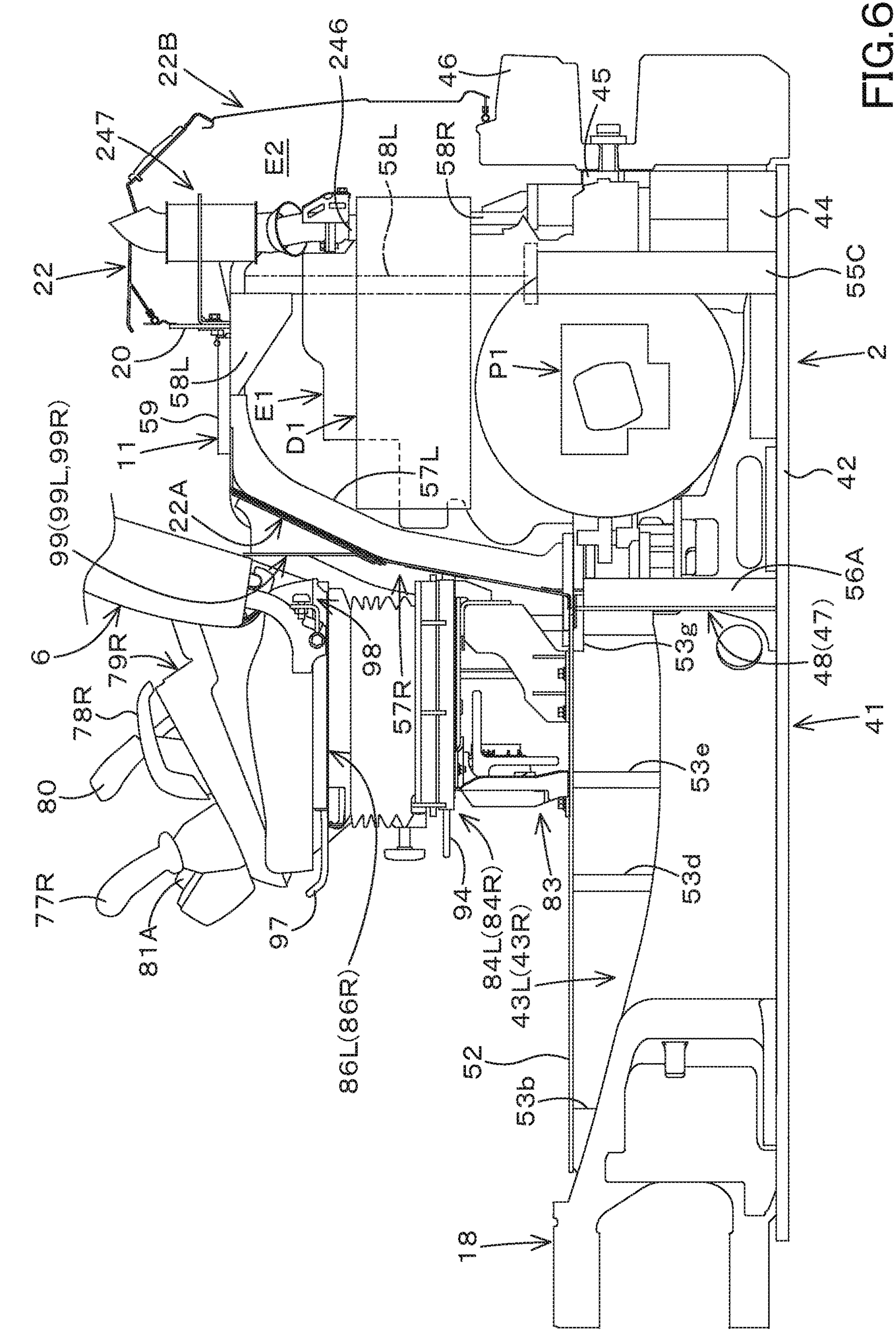
FIG. 6 is a side view of assembly of a machine body, an operator seat, and a prime mover according to the embodiment.
Figure 7:
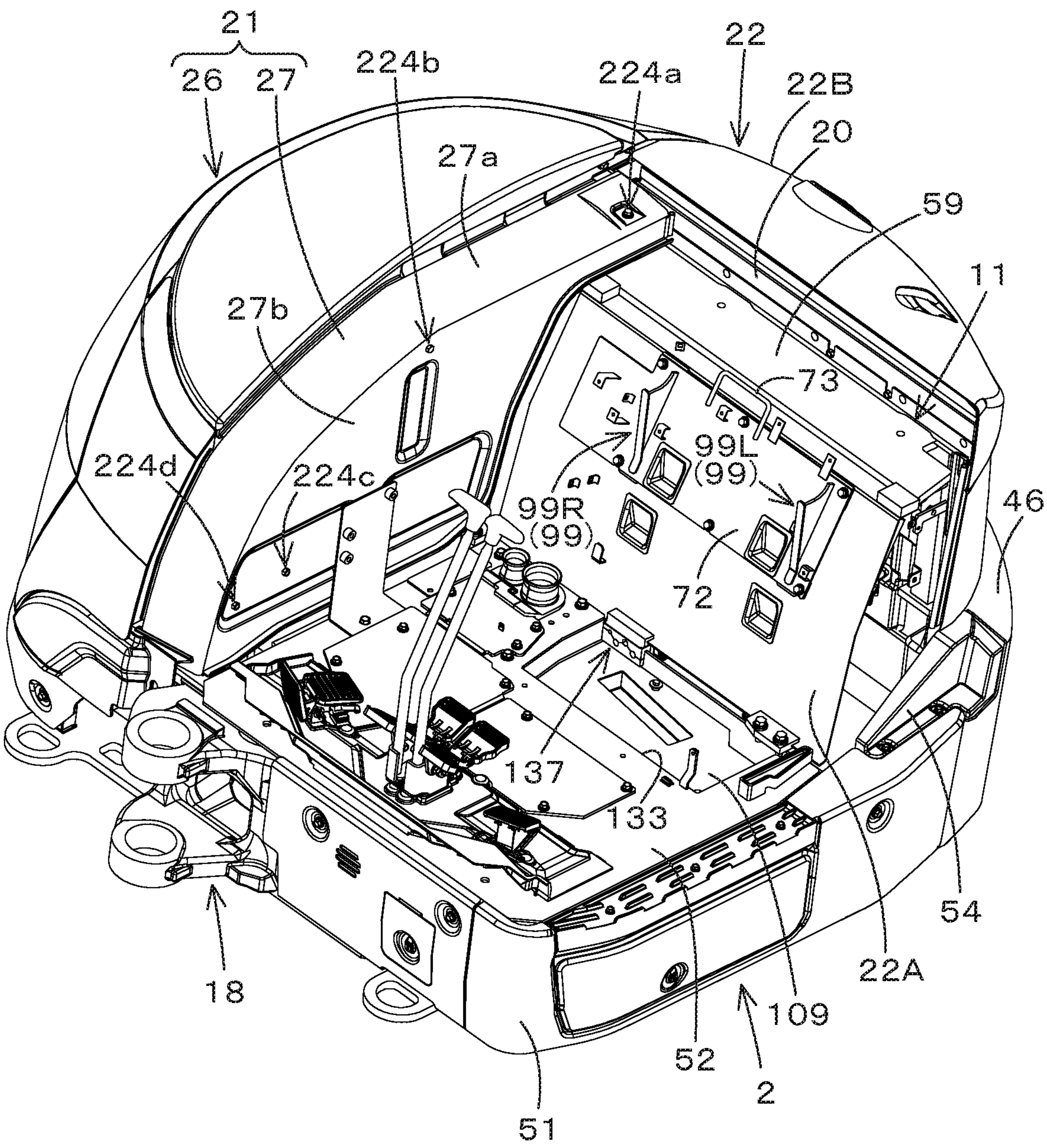
FIG. 7 is a perspective view of the machine body to which a bonnet and a side cover are attached according to the embodiment.

As shown in FIG. 6, the rear side of the turn frame 41 is covered with the weight 46. As shown in FIG. 7, the left side, the right side, and the front side of the turn frame 41 are covered with a turn cover (an exterior member) 51 attached to the turn frame 41. An auxiliary cover (the exterior member) 54 is provided on the left rear portion of the turn frame 41. The assist cover 54 covers the turn frame 41 from above the rear portion of the left portion of the turn cover 51 to the upper portion of the left portion of the weight 46. A cutout from which the support bracket 18 is protruded is formed on the front surface portion of the turn cover 51. The left side of the front portion of the turn frame 41 is covered with a step 52 from above. The step 52 is attached to a plurality of step attachment portions 53*a* to 53*g* provided on the turn frame 41 (see FIG. 3 and FIG. 6).

As shown in FIG. 2, the cabin 5 is mounted to the front-left of the machine body 2. The lower surface side of the front portion of the cabin 5 is covered with the step 52. That is, the step 52 constitutes the floor surface of the cabin 5 (see FIG. 28 and FIG. 29). As shown in FIG. 6, the operator seat 6 is mounted on the rear portion of the step 52 in front of the prime mover E1.

As shown in FIG. 2, the prime mover E1 is mounted on the rear portion of the machine body 2. The prime mover E1 is a diesel engine. The prime mover E1 may be a gasoline engine, an LPG engine or an electric motor, or may be a hybrid type having an engine and an electric motor. The prime mover E1 is arranged on the rear portion side of the cabin 5.

On the left side of the prime mover E1, the hydraulic pump P1 and the exhaust gas purifier device D1 are provided. The hydraulic pump P1 is driven by the power of the prime mover E1. The hydraulic pump P1 is configured to output the operation fluid (a hydraulic pressure) for driving the hydraulic actuators such as the hydraulic motor and the hydraulic cylinder installed in the working machine 1. In addition, the hydraulic pump P1 is configured to output the pilot pressure for activating the hydraulic valve and output a hydraulic pressure for signal. In addition, the hydraulic pump P1 is constituted of a plurality of pumps, for example.

The exhaust gas purifier device D1 is a device configured to purify the exhaust gas discharged from the prime mover E1, and is a DPF (Diesel Particulate Filter), for example.

The prime mover E1 is supported by a plurality of support mounts (the first support base 50A, the second support base 50B, the third support base 50C, and the fourth support base 50D). The first support base 50A is provided on the left portion of the turn base plate 42 and behind the main partition plate 48, and supports the left front portion of the prime mover E1. The second support base 50B is provided at the center portion of the turn base plate 42 in the machine width direction K2, and behind the main partition plate 48, and supports the right front portion of the prime mover E1. The third support base 50C is fixed to the left portion on the first weight attachment portion 44 and supports the left rear side of the prime mover E1. The fourth support base 50D is arranged on the right side of the second weight attachment portion 45 and fixed on the first weight attachment portion 44, and supports the right rear side of the prime mover E1.

As shown in FIG. 6, the prime mover E1 is covered with a bonnet 22. The bonnet 22 forms a prime mover room E2 that houses the prime mover E1. The prime mover room E2 is formed on the turn base plate 42. The exhaust gas purifier device D1 is provided in the prime mover room E2. The bonnet 22 has a shield wall member (a partition plate) 22A that covers the front (the upper front) of the prime mover E1, and has a bonnet rear portion 22B that covers the rear of the prime mover E1. A support frame 11 that supports the bonnet 22 is provided in the bonnet 22. The support frame 11 is provided standing on the machine body 2. The shield wall member 22A is a member that separates the prime mover room E2 from the arrangement side of the operator seat 6 (the area closer to the operator seat 6 than the prime mover room E2). In other words, the shield wall member 22A is a member that separates the prime mover room E2 from a room of the cabin 5. The shield wall member 22A is made of sheet metal, for example. By forming the shield wall member 22A with the sheet metal, the noise insulation is improved as compared to the resin shield wall member. In addition, a support bracket configured to support an arranging component such as a harness can be easily attached to the shield wall member 22A by the welding, the screwing, or the like. In addition, the strength of the machine body 2 can be improved by the shield wall member 22A. The shield wall member 22A is fixed to the support frame 11. A partition plate 47 is provided below the shield wall member 22A. The partition plate 47 partitions the lower front portion of the prime mover room E2. The bonnet rear portion 22B is supported by the support frame 11 so as to be swingable up and down, and is configured to open and close the prime mover room E2 by swinging up and down.

As shown in FIG. 6, a weight 46 is arranged below the bonnet rear portion 22B, and the rear of the lower portion of the prime mover E1 is covered with the weight 46. As shown in FIG. 7, the space between the left end portion of the shield wall member 22A and the left end portion of the bonnet rear portion 22B is open toward the machine outward direction, and this open portion is closed by the rear lower portion of the left side portion of the cabin 5 as shown in FIG. 1. As shown in FIG. 7, the left side of the lower portion of the prime mover E1 is covered with the left side portion of the turn cover 51 and the assist cover 54.

Figure 8:
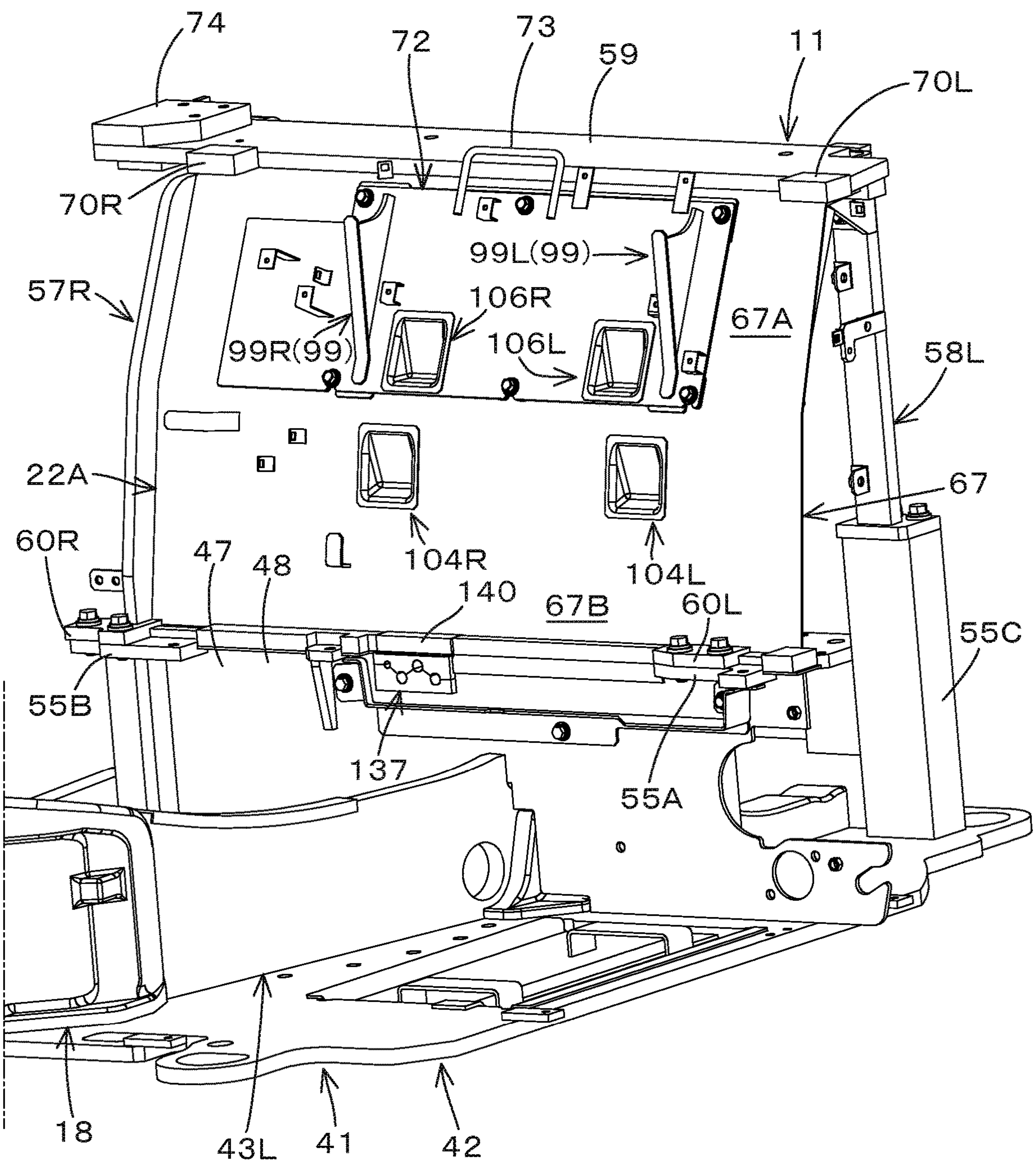
FIG. 8 is a perspective view illustrating a state where the support frame is mounted on a turn base plate according to the embodiment.
Figure 9:
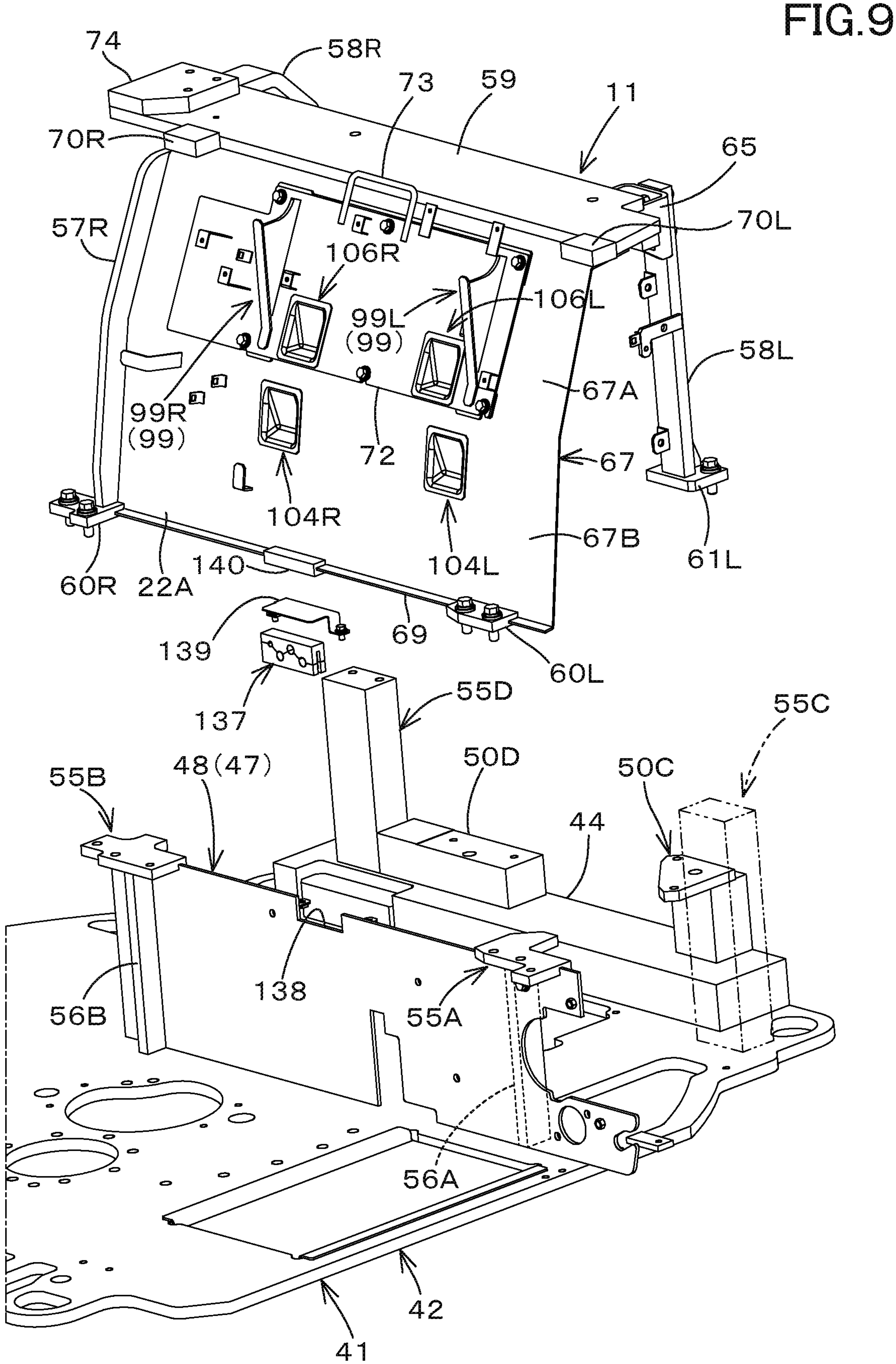
FIG. 9 is an exploded perspective view of the turn base plate and the support frame according to the embodiment.

As shown in FIG. 8 and FIG. 9, the support frame 11 is attached to a plurality of frame attachment portions (the first frame attachment portion 55A, the second frame attachment portion 55B, the third frame attachment portion 55C, the fourth frame attachment portion 55D) provided on the turn base plate 42. The first frame attachment portion 55A is fixed to the left portion at the upper end of the main partition plate 48 and to the upper end of the reinforcing plate 56A provided standing on the turn base plate 42. The second frame attachment portion 55B is fixed to the right portion of the upper end of the main partition plate 48 and to the upper end of the reinforcing plate 56B provided standing on the turn base plate 42. The third frame attachment portion 55C is arranged on the left side of the first weight attachment portion 44, and is provided standing on the turn base plate 42. The fourth frame attachment portion 55D is provided standing on the right portion on the first weight attachment portion 44.

As shown in FIG. 10 to FIG. 13, the support frame 11 has a plurality of legs (the first front leg 57L, the second front leg 57R, the first rear leg 58L, the second rear leg 58R) and has an upper plate 59. The plurality of legs and the upper plate 59 are formed of plate materials.

Figure 10:
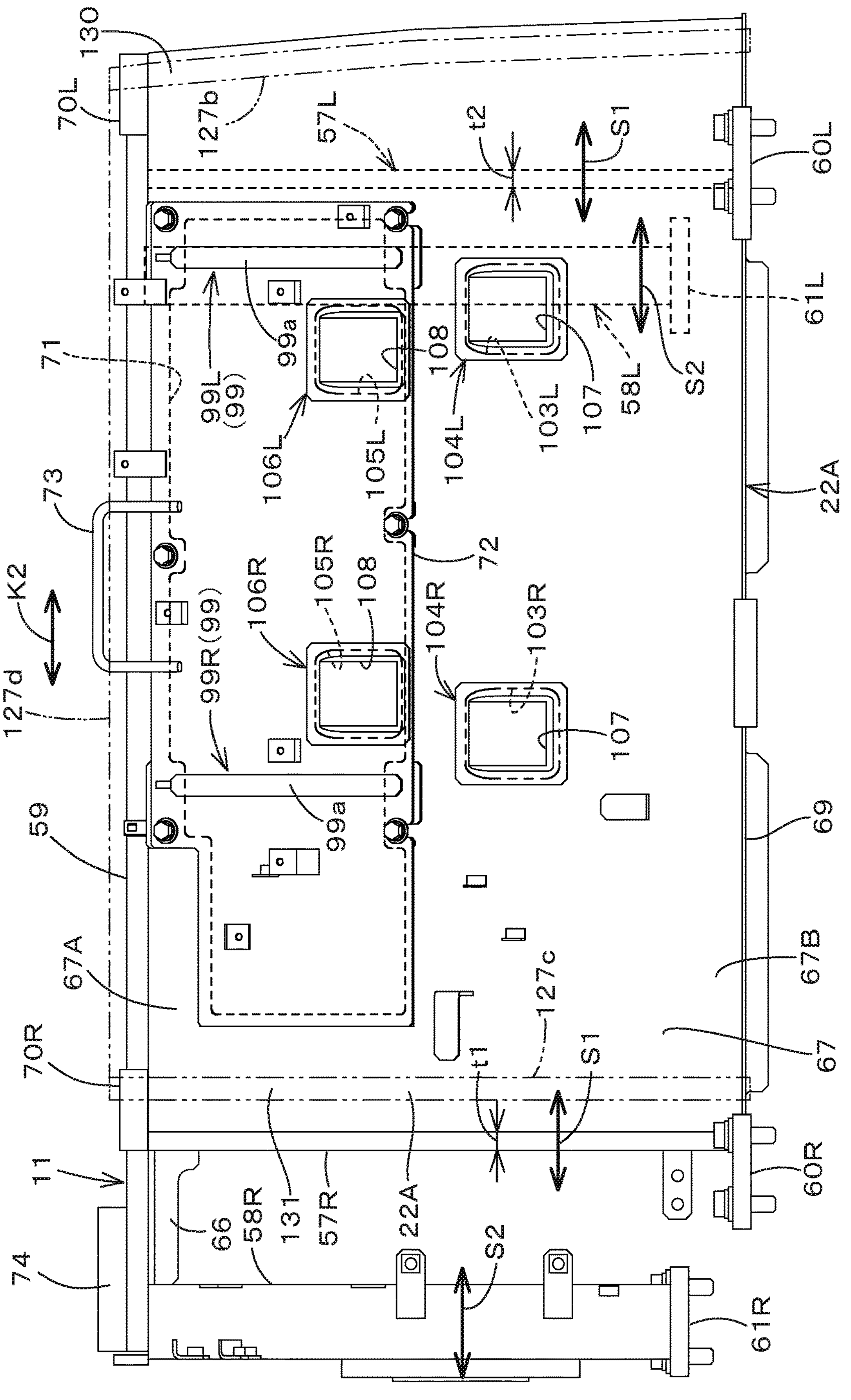
FIG. 10 is a front view of the support frame and the shield wall member according to the embodiment.

As shown in FIG. 6, the first front leg 57L and the second front leg 57R are arranged on the front portion side of the prime mover E1. As shown in FIG. 10, the first front leg 57L and the second front leg 57R are arranged with a space in the machine width direction K2. In addition, the first front leg 57L and the second front leg 57R are arranged such that the plate thickness direction S1 coincides with the machine width direction K2.

Figure 11:
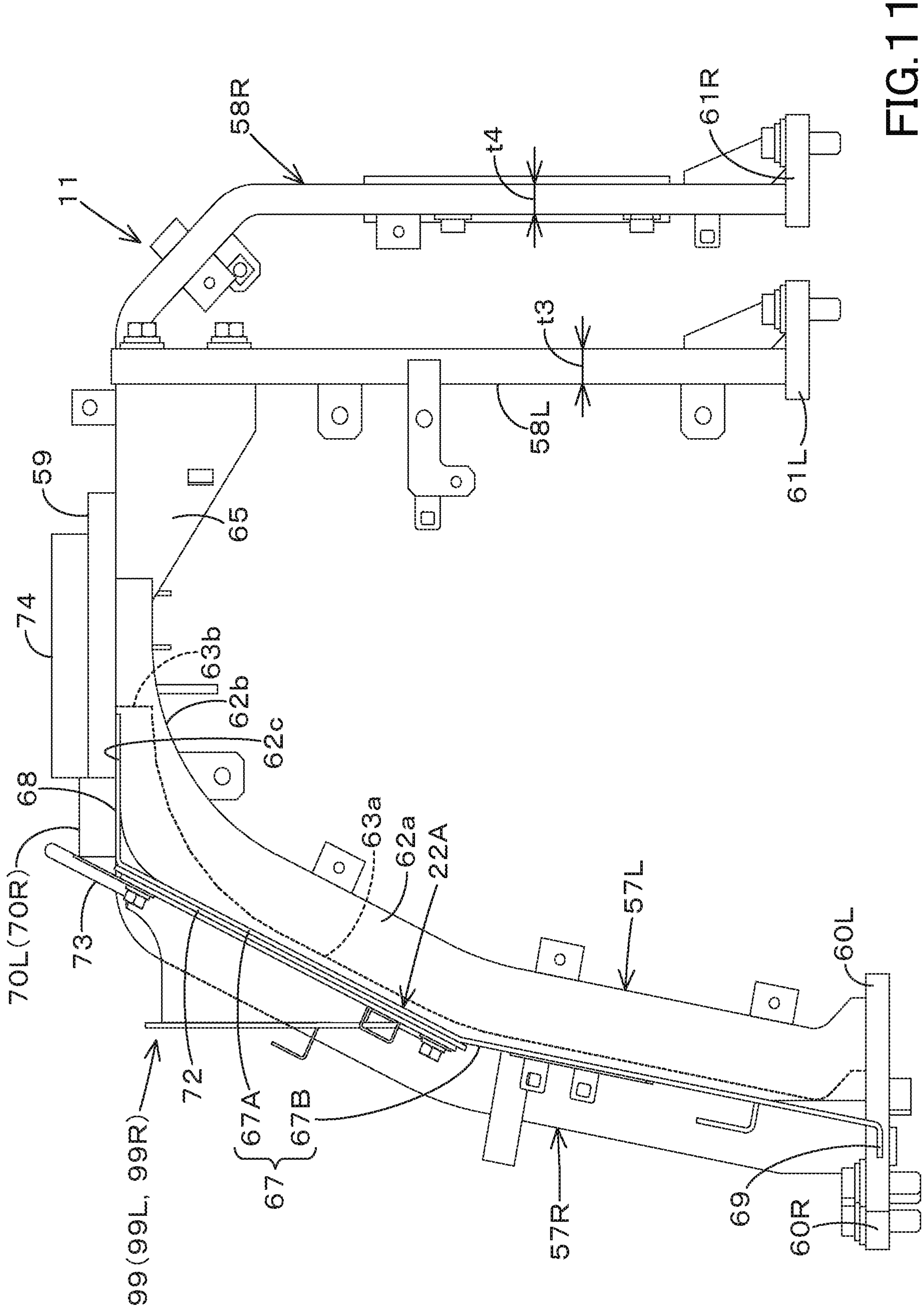
FIG. 11 is a side view of the support frame and the shield wall member according to the embodiment.

As shown in FIG. 10 and FIG. 11, the first front leg 57L has its front surface in contact with the back surface of the left portion of the shield wall member 22A, and is fixed by the welding or the like. The left portion of the shield wall member 22A protrudes leftward from the first front leg 57L. The first front leg 57L has a main body 62*a* and an upper portion 62*b*. The main body 62*a* extends in the vertical direction, and a first front attachment plate 60L is fixed to the lower end of the main body 62*a*. The first front attachment plate 60L is fixed by a bolt to the first frame attachment portion 55A. The upper portion 62*b* extends backward from the upper portion of the main body portion 62*a*. A cut-out portion 62*c* is formed in the front portion of the upper portion 62*b*. The cut-out portion 62*c* is formed on the upper surface side of the upper portion 62*b*.

The second front leg 57R is arranged on the right side of the shield wall member 22A. The second front leg 57R is arranged closer to the front than the first front leg 57L. The right end of the shield wall member 22A is fixed to the left side surface of the second front leg 57R by the welding. The second front leg 57R has a main body portion 63*a* and an upper portion 63*b*. The main body portion 63*a* extends in the vertical direction, and a second front attachment plate 60R is fixed to the lower end of the main body portion 63*a*. The second front attachment plate 60R is fixed by a bolt to the second frame attachment portion 55B. The upper portion 63*b* extends backward from the upper portion of the main body portion 63*a*.

Figure 12:
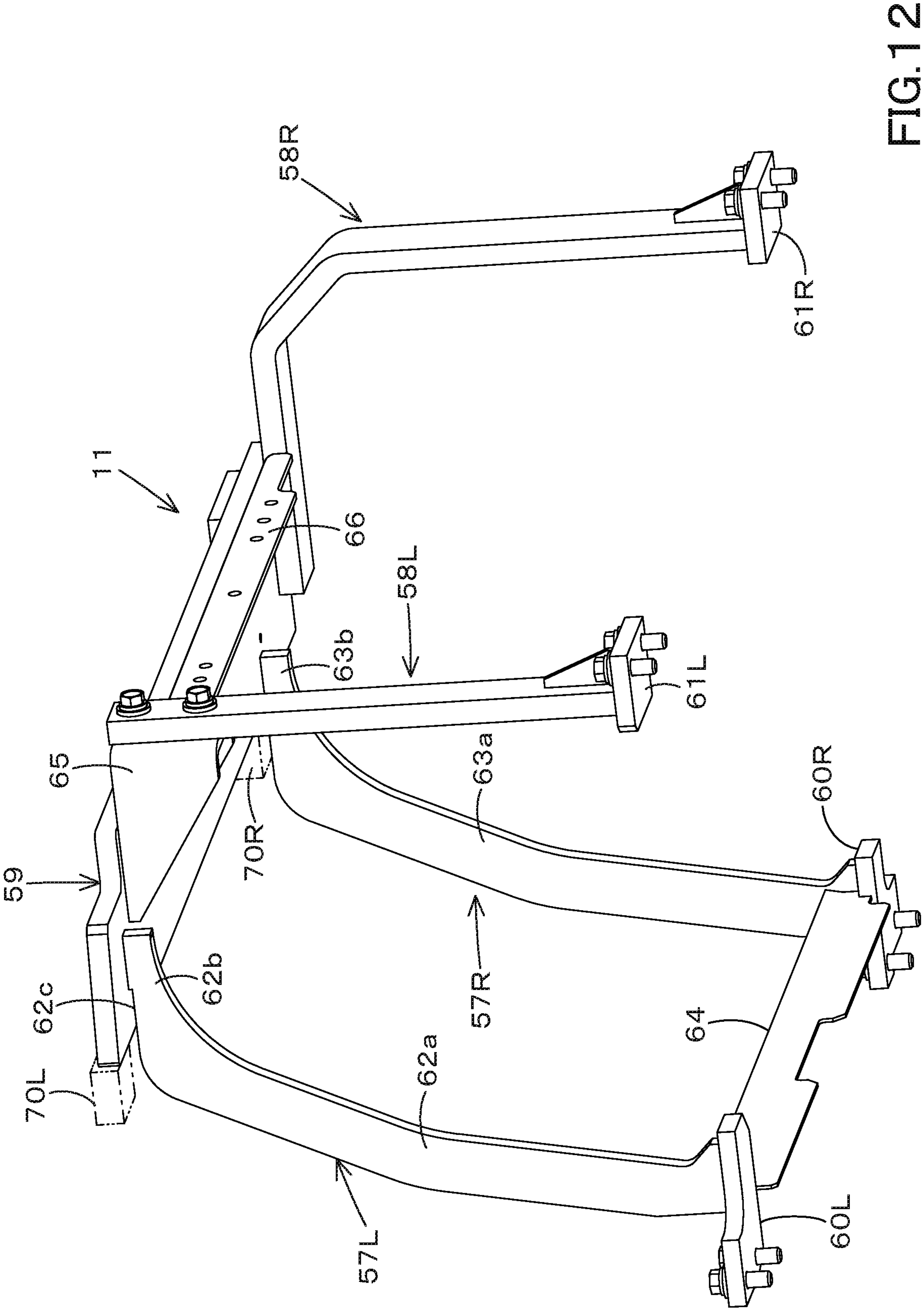
FIG. 12 is a perspective view of the support frame seen from below according to the embodiment.

As shown in FIG. 12, the first front attachment plate 60L and the second front attachment plate 60R are coupled by a coupling plate 64.

Figure 13:
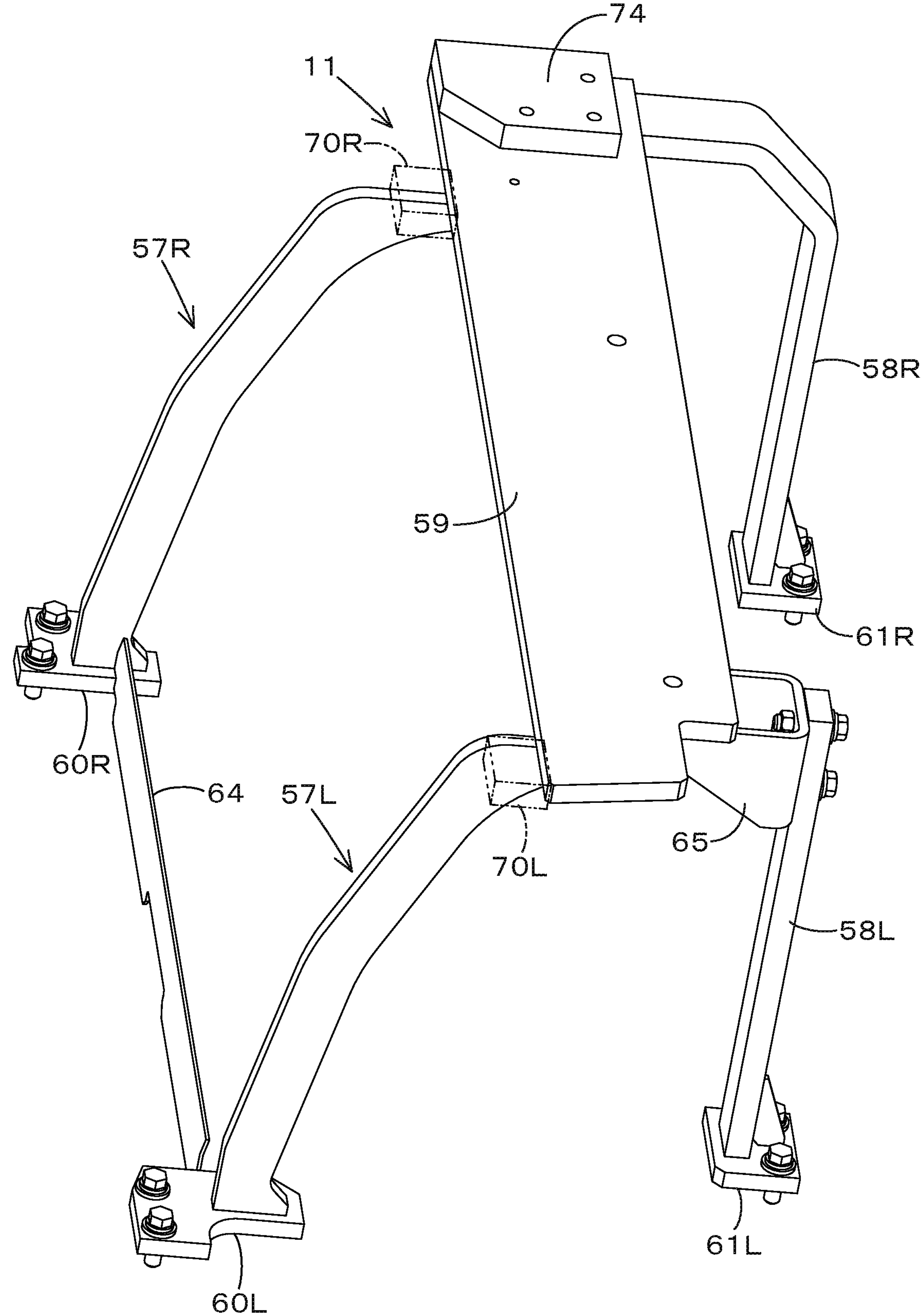
FIG. 13 is a perspective view of the support frame seen from above according to the embodiment.

As shown in FIG. 13, the upper plate 59 is fixed to the upper portion 62*b* of the first front leg 57L and to the upper portion 63*b* of the second front leg 57R. As shown in FIG. 6, the upper portion between the shield wall member 22A and the bonnet rear portion 22B is closed by the upper plate 59 and the cover plate 20 provided protruding upward from the rear end side of the upper plate 59. An attachment plate 74 is fixed to the right side of the upper portion of the upper plate 59.

As shown in FIG. 6, the first rear leg 58L and the second rear leg 58R are arranged on the rear portion side of the prime mover E1. As shown in FIG. 10, the first rear leg 58L and the second rear leg 58R are arranged with a space provided in the machine width direction K2. The first rear leg 58L and the second rear leg 57R are arranged with the plate width direction S2 aligned with the machine width direction K2.

As shown in FIG. 12, the upper portion of the first rear leg 58L is attached to an attachment member 65 fixed to the left side of the upper plate 59. A first rear attachment plate 61L is fixed to the lower end of the first rear leg 58L. The first rear attachment plate 61L is fixed by a bolt to the third frame attachment portion 55C. As shown in FIG. 10, the first rear leg 58L is arranged closer in the machine inward direction from the first front leg 57L.

As shown in FIG. 12, the upper portion of the second rear leg 58R is fixed to the lower surface of the upper plate 59. A second rear attachment plate 61R is fixed to the lower end of the second rear leg 58R. The second rear attachment plate 61R is bolted to the fourth frame attachment portion 55D. As shown in FIG. 10, the second rear leg 58R is positioned closer in the machine outward direction from the second front leg 57R.

As shown in FIG. 12, the upper portion of the second rear leg 58R and the attachment member 65 are coupled by a coupling plate 66.

Note that at least one leg is provided on the rear side of the support frame 11.

As shown in FIG. 10 and FIG. 11, the plate thickness t1 of the first front leg 57L and the plate thickness t2 of the second front leg 57R are smaller than the plate thickness t3 of the first rear leg 58L and the plate thickness t4 of the second rear leg 58R. In this manner, weight reduction of the support frame 11 is achieved. The weight reduction of the support frame 11 is achieved by fixing the shield wall member 22A formed of the sheet metal across the first front leg 57L and the second front leg 57R to increase the strength in the machine width direction K2 and by making the plate thickness direction S1 of the first front leg 57L and the second front leg 57R coincide with the machine width direction K2 to increase the strength in the front-rear direction K1.

The plate thickness t1 of the first front leg 57L and the plate thickness t2 of the second front leg 57R may be the same or may be different.

As shown in FIG. 11, the shield wall member 22A includes a shield wall body 67 that substantially partitions between the prime mover room E2 and the room of the cabin 5, an upper extending portion 68 that extends backward from the upper end of the shield wall body 67, and a lower extending portion 69 that extends forward from the lower end of the shield wall body 67. The partition wall body 67 has a first portion 67A arranged on the upper portion side and a second portion 67B arranged on the lower side. The first portion 67A and the second portion 67B are formed to be inclined shifting backward as it extends upwards. As for the inclination angles of the first portion 67A and the second portion 67B with respect to the vertical direction, the inclination angle of the first portion 67A is larger than that of the second portion 67B. Thus, the shield wall member 22A is bent in the middle.

The left portion of the upper extending portion 68 is inserted into the cut-out portion 62*c*, and is fixed by the welding onto the upper portion 62*b* of the first front leg 57L. A seal block 70L arranged to the left is provided on the left portion of the upper extending portion 68, and a seal block 70R arranged to the right is provided on the right portion of the upper extending portion 68. The seal blocks 70L and 70R are formed of an elastic member, and can be deformed.

The first front leg 57L and the second front leg 57R are processed products formed by cutting a plate material with the laser cutting or the like. By forming the first front leg 571, with the laser cutting or the like, the shape of the front surface (the cut surface) of the first front leg 57L can be accurately matched to the shape of the back surface of the shield wall member 22A. The front surface of the first front leg 57L can be brought into contact with the back surface of the shield wall member 22A with high accuracy.

In the present embodiment, the end portion of the shield wall member 22A is fixed by the welding to the side surface of the second front leg 57R. However, the present invention is not limited to that. For example, the second front leg 57R may be fixed by the welding to the rear surface of the shield wall member 22A.

As shown in FIG. 10, the shield wall member 22A has an inspection opening 71 for accessing the prime mover room E2, and has a closing plate 72 that closes the inspection opening 71. The inspection opening 71 is formed through the first portion 67A. The closing plate 72 is fixed to the first portion 67A with a bolt from the front side. The closing plate 72 is in contact with the shield wall member 22A through a sealing material provided around the inspection opening 71. The closing plate 72 is provided with a handle member 73. The handle member 73 is provided in the middle of an upper portion of the closing plate 72 in the machine width direction K2, and protrudes upward from the closing plate 72.

Figure 14:
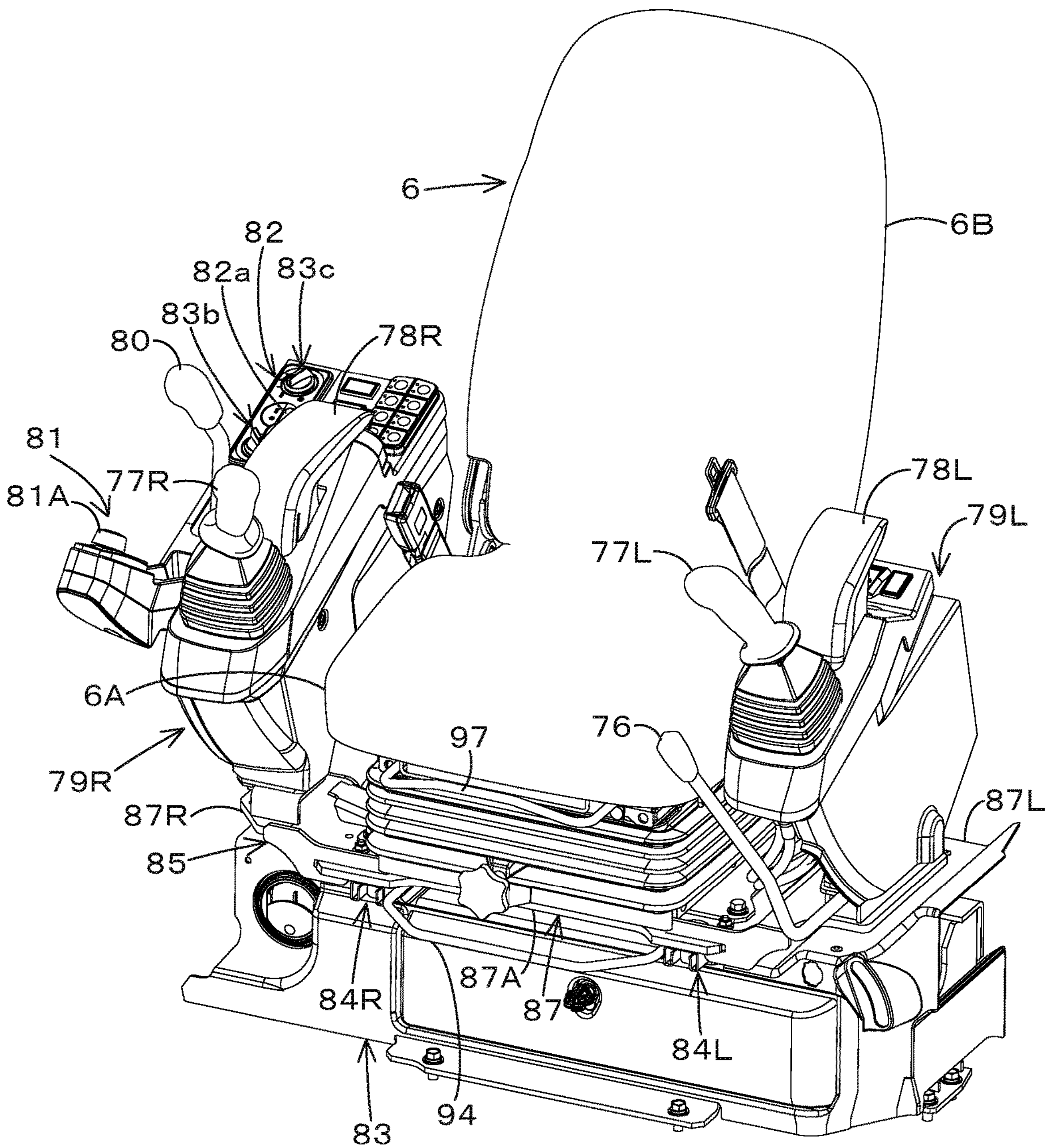
FIG. 14 is a perspective view illustrating an area around the operator seat according to the embodiment.

As shown in FIG. 14, a console 79L provided to the left is arranged on the left side of the operator seat 6. The console 79L is provided with an unload lever 76, an operation lever 77L provided to the left, an armrest 78L provided to the left, and the like. A console 79R provided to the right is arranged on the right side of the operator seat 6. The console 79R is provided with an operation lever 77R provided to the right, an armrest 78R provided to the right, a dozer lever (a lever) 80, a first operation tool 81R including a jog dial 81A, a second operation tool 82, and the like.

The operator seat 6 includes a seat portion 6A that supports the operator's buttocks and a backrest portion 6B that supports the operator's back.

Under the state shown in FIG. 1 and FIG. 14, the unload lever 76 is allowed to supply the operation fluid to the hydraulic devices (for example, a hydraulic cylinder configured to move the working device 4, a turn motor M1 configured to turn the machine body 2, and the like). The unload lever 76 is configured to swing upward from the state shown in FIG. 1 and FIG. 14. Under the state where the unload lever 76 is swung upward, the operation fluid cannot be supplied to the hydraulic device. In addition, when the unload lever 76 is swung upward, the console 79L swings upward with the lower portion of the rear portion as a fulcrum. In this manner, the operation lever 77L and the console 79L can be prevented from interfering the operator getting on and off the working machine, and the operator can easily get on and off the working machine. As shown in FIG. 1, the cabin 5 has a boarding opening 29 on the left side, the boarding opening 29 being provided for the operator getting on and off the working machine, and the boarding opening 29 can be opened and closed by a door 28.

The operation lever 77L is configured to operate two operation objects, for example, a turning operation of the machine body 2 and a swinging operation of the arm 16 are possible. The operation lever 77L is arranged in front of the armrest 78L.

The armrest 78L is arranged on the left side of the operator seat 6, and the left arm of the operator (a part of or all of the forearm (a portion from the elbow to the wrist)) can be placed on the armrest 78L. For example, the operator can operate the operation lever 77L under the state where the forearm is placed on the armrest 78L.

The operation lever 77R is also configured to operate two operation objects, for example, a swinging operation of the boom 15 and a swinging operation of the bucket 17 are possible. The operation lever 77R is arranged between the console 79R and the operator seat 6 and in front of the armrest 78R. The operation lever 77R is located on the side of the jog dial 81A on the operator seat 6 side.

The armrest 78R is arranged to the right side of the operator seat 6, and the right arm of the operator (the forearm) can be placed on the armrest 78R. For example, the operator can operate the operation lever 77R under the state where the forearm is placed on the armrest 78R.

The dozer lever 80 is a lever configured to operate the dozer device 7. The dozer lever 80 is arranged on the side of the armrest 78R and on a side (the right side) opposite to the operator seat 6 side. The jog dial 81A is arranged in front of the dozer lever 80. That is, the dozer lever 80 is arranged behind the jog dial 81A and on the side of the armrest 78R.

The jog dial (a first operation tool) 81A is an operation tool to be operated by an operator to operate a display device 191 (see FIG. 56) described later.

The second operating tool 82 is an operating tool for operating the air conditioner installed in the working machine 1, and includes a power switch 82*a* for turning on/off the power source, a temperature dial 82*b* for adjusting the temperature, and an air flow dial 83*c* for adjusting the air flow.

Figure 15:
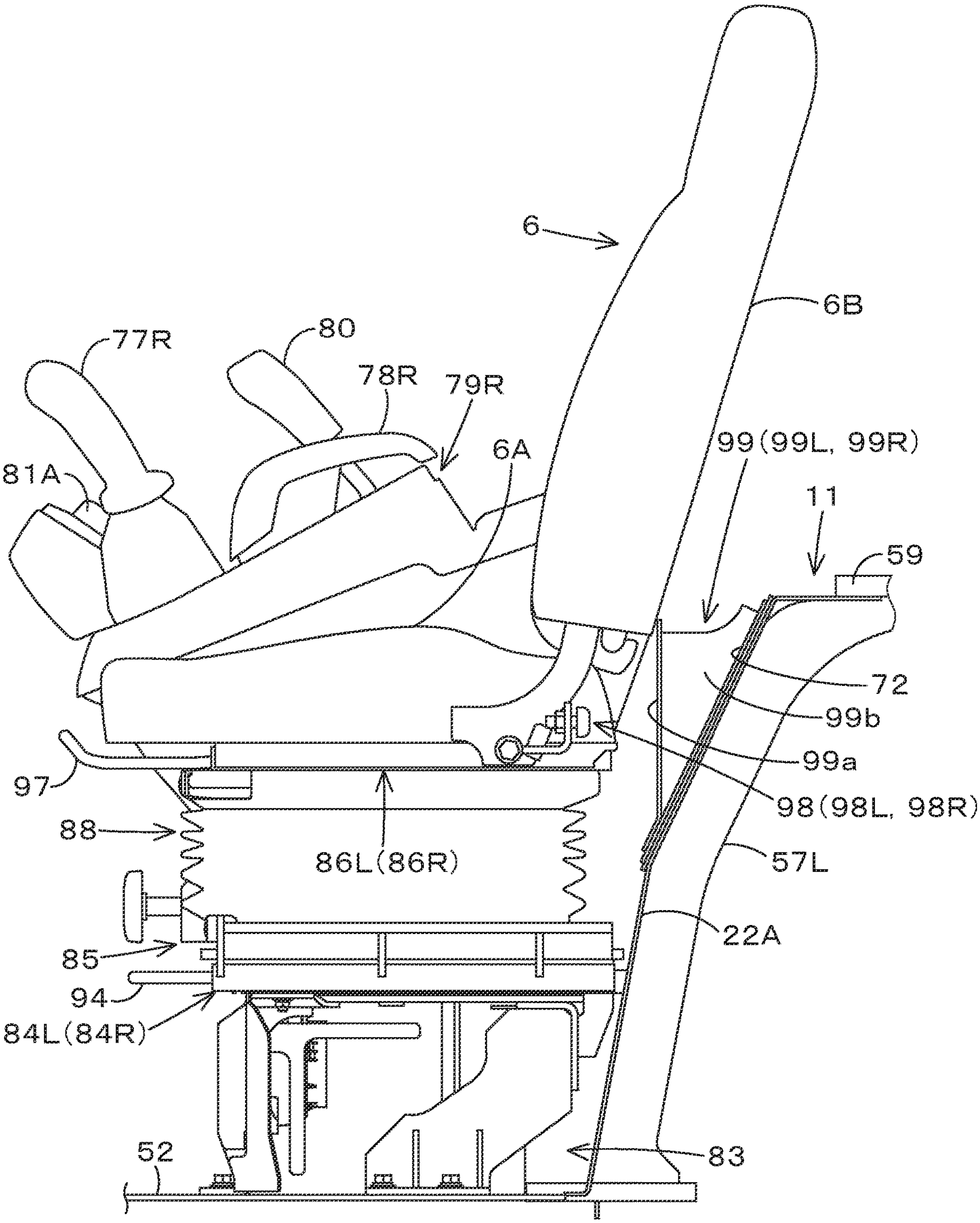
FIG. 15 is a side view illustrating the area around the operator seat according to the embodiment.
Figure 16:
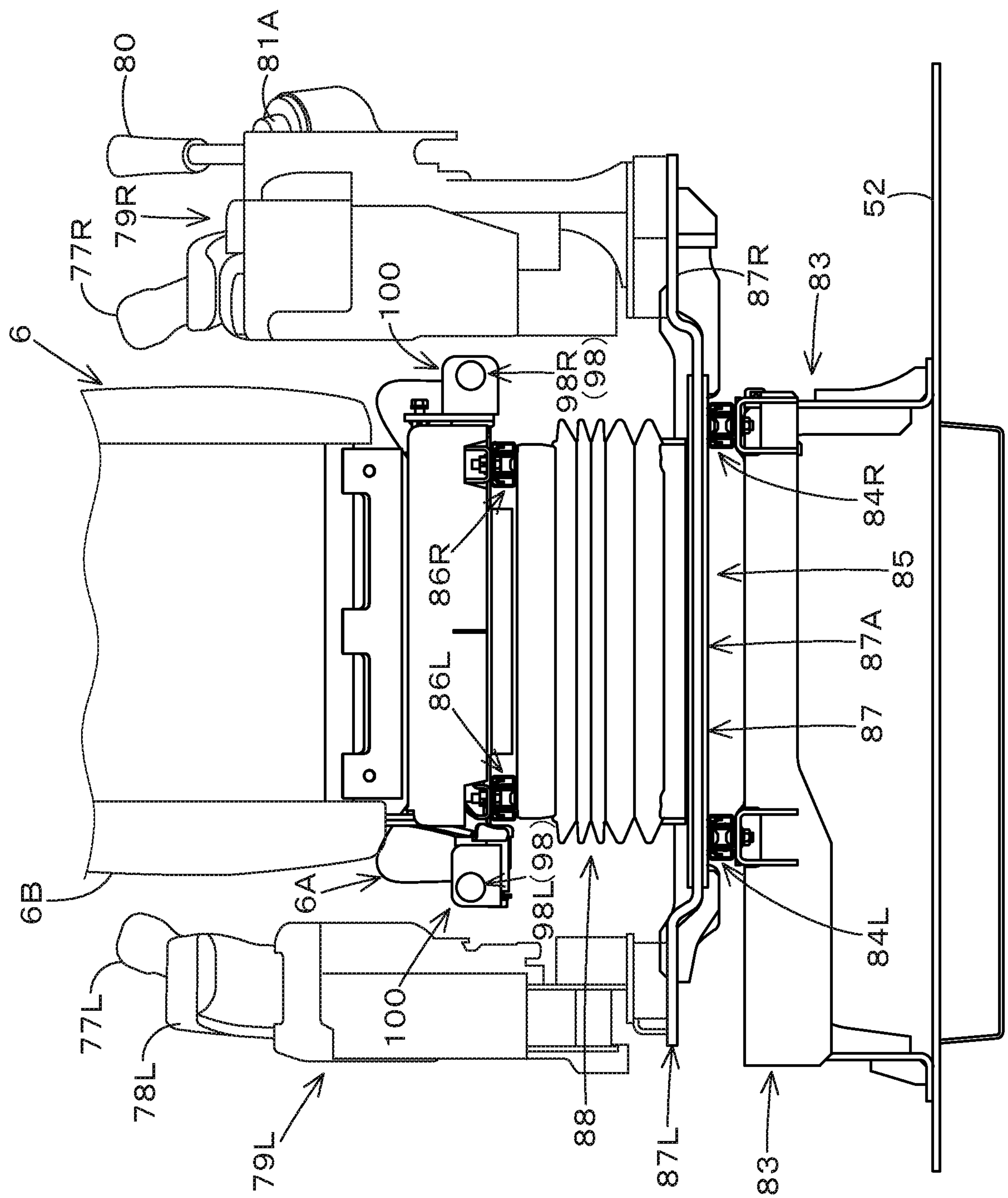
FIG. 16 is a back view illustrating the area around the operator seat according to the embodiment.

As shown in FIG. 15 and FIG. 16, a support base 83 is provided below the operator seat 6. The support base 83 is attached to the step 52 (the machine body 2). A movable body 85 is supported on the support base 83 by a first rail device (including a first slide rail 84L arranged to the left and a first slide rail 84R arranged to the right) so that the position of the movable body 85 can be adjusted in the front-rear direction. The operator seat 6 is supported on the movable body 85 by a second rail device (including a second slide rail 86L arranged to the left and a second slide rail 86R arranged to the right) so that the position of the operator seat 6 can be adjusted in the front-rear direction.

The movable body 85 includes a slide frame 87 attached to the support base 83 by the first slide rails 84L and 84R, and includes a suspension 88 attached to the slide frame 87. The slide frame 87 includes a first attachment portion 87A to which the suspension 88 is attached, a second attachment portion 87L extending from the first attachment portion 87A to the left, and a third attachment portions 87R extending from the first attachment portion 87A to the right. The console 791, is attached to the second attachment portion 87L, and the console 79R is attached to the third attachment portion 87R.

The operator seat 6 is attached to the suspension 88 by the second slide rails 86L and 86R. The suspension 88 is a shock absorber device configured to support an operator's load acting on the operator seat 6 and reduces, to the operator seat 6, the transmission of vibration and impact from below. In addition, the suspension 88 may have a height adjuster mechanism configured to adjust the height of the operator seat 6.

Figure 17:
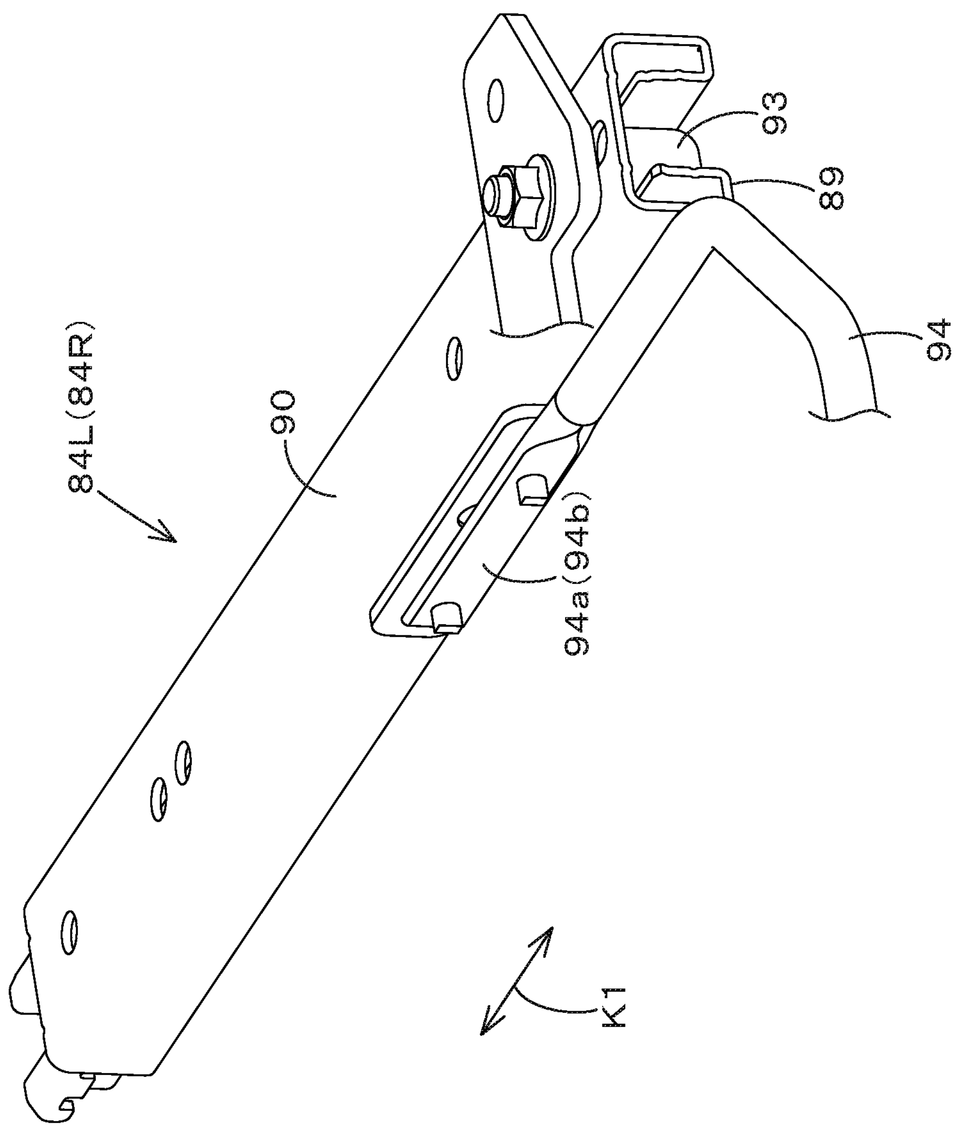
FIG. 17 is a perspective view of a first sliding rail according to the embodiment.
Figure 18:
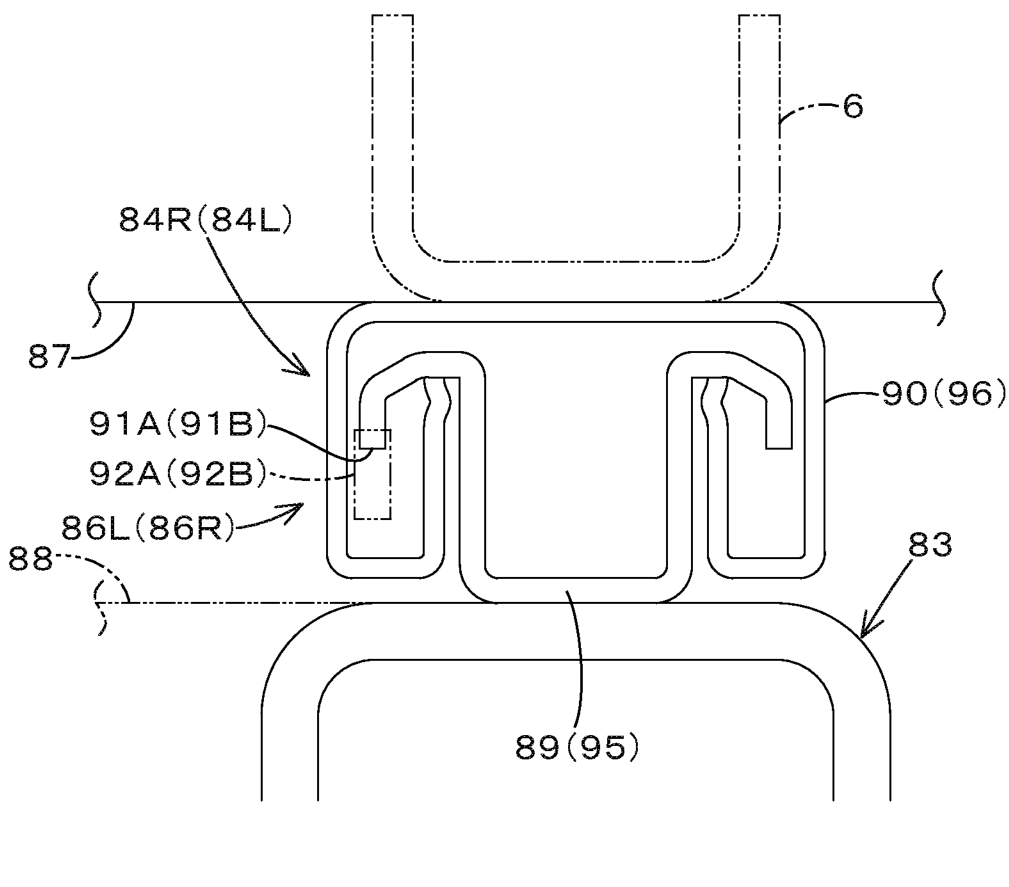
FIG. 18 is a back view of the first sliding rail and a second sliding rail according to the embodiment.

As shown in FIG. 17, the first slide rails 84L and 84R are formed long in the front-rear direction K1, and each of the first slide rails 84L and 84R has a lower rail 89 and an upper rail 90. As shown in FIG. 18, the lower rail 89 is attached to the support base 83. The upper rail 90 is fitted to the lower rail 89 so as to be movable in the front-rear direction K1, and is attached to the slide frame 87. In this manner, the movable body 85 is capable of moving in the front-rear direction K1 with respect to the support base 83.

Figure 19:
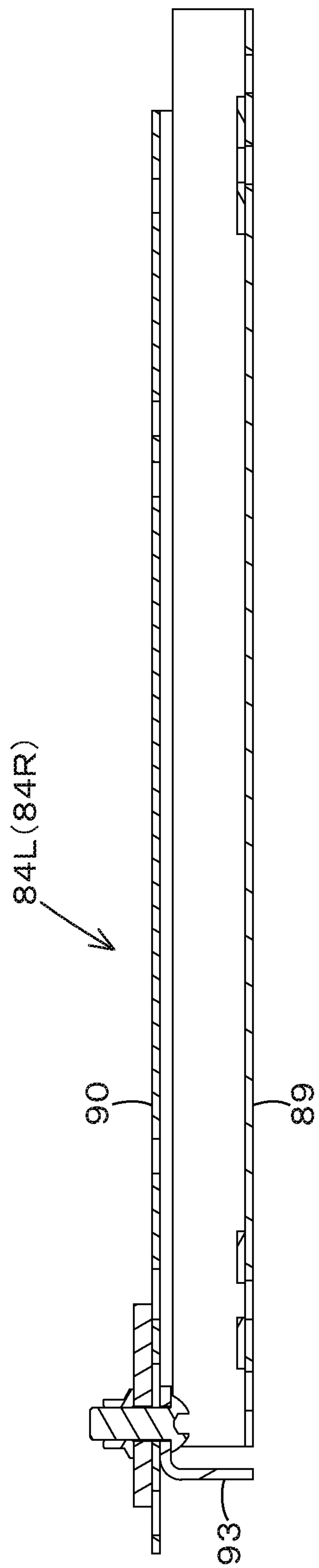
FIG. 19 is a side cross-section view of the first sliding rail according to the embodiment.

As shown in FIG. 19, a restricting member 93 is attached to the front portion of the upper rail 90, and is configured to contact to the front end of the lower rail 89 to restrict the rearward movement of the upper rail 90 relative to the lower rail 89.

Figure 20:
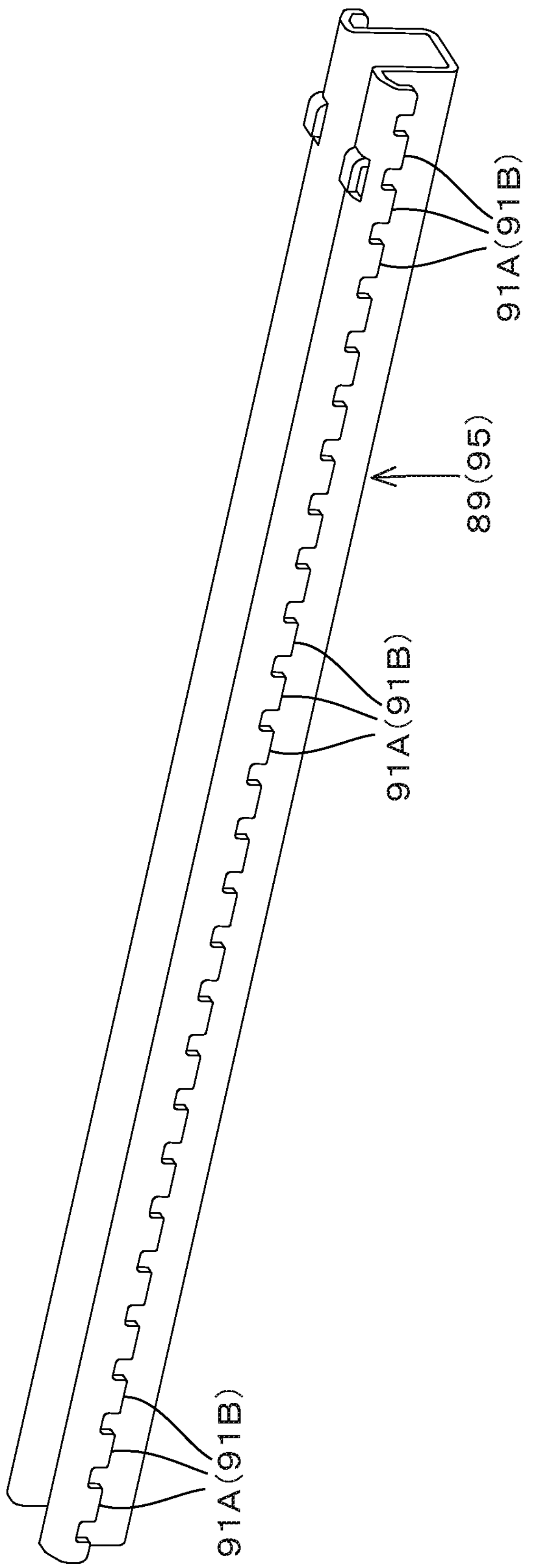
FIG. 20 is a perspective view of a lower rail according to the embodiment.

As shown in FIG. 20, the lower rail 89 has a large number of engaging portions 91A provided at intervals in the front-rear direction K1 and formed from the front portion to the rear portion. As shown in FIG. 18, an engaging member 92A that is engaged with the engaging portions 91A is provided in the upper rail 90. Under the state where the engaging member 92A is engaged with the engaging portions 91A, the back-and-forth movement of the upper rail 90 relative to the lower rail 89 is restricted (the first slide rails 84L and 84R are locked).

As shown in FIG. 17, an operation rod 94 is attached to the upper rail 90. The operation rod 94 has one end 94*a* attached to the upper rail 90 of the first slide rail 84L arranged to the left and has the other end 94*b* attached to the upper rail 90 of the first slide rail 84L arranged to the right. The operation rod 94 is interlocked with the engaging member 92A. When the operation rod 94 is pulled up, the engaging member 92A is separated from the engaging portion 91A. In this manner, the back-and-forth movement of the upper rail 90 with respect to the lower rail 89 is allowed. When the operating force of the operation rod 94 is released, the operation rod 94 is pulled downward by the biasing force of the spring, and the engaging member 92A is engaged with the engaging portion 91A.

Figure 21:
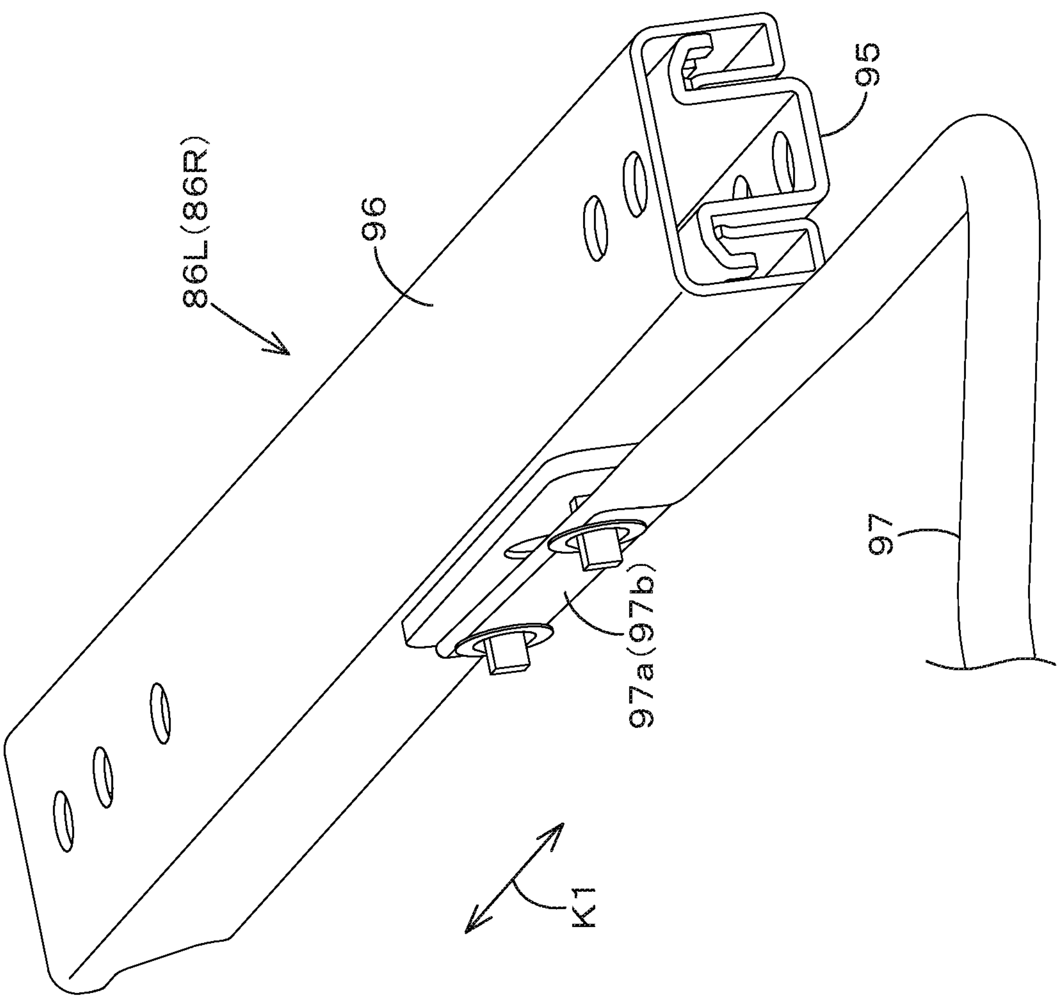
FIG. 21 is a perspective view of the second sliding rail according to the embodiment.

As shown in FIG. 21, the second slide rails 86L and 86R are formed long in the front-rear direction K1, and each of the second slide rails 86L and 86R has a lower rail 95 and an upper rail 96. As shown in FIG. 18, the lower rail 95 is attached to the suspension 88. The upper rail 96 is fitted to the lower rail 95 so as to be movable in the front-rear direction K1, and is attached to the operator seat 6. In this manner, the operator seat 6 is capable of moving in the front-rear direction K1 with respect to the movable body 85.

As shown in FIG. 20, the lower rail 95 includes a large number of engaging portions 91B that are provided at intervals in the front-rear direction K1 and are formed from the front portion to the rear portion. As shown in FIG. 18, an engaging member 92B that is engaged with the engagement portions 91B is provided in the upper rail 96. Under the state where the engaging member 92B is engaged with the engaging portion 91B, the back-and-forth movement of the upper rail 96 with respect to the lower rail 95 is restricted (the second slide rails 86L and 86R are locked).

As shown in FIG. 21, an operation rod 97 is attached to the upper rail 96. The operation rod 97 has one end 97*a* attached to the upper rail 96 of the first slide rail 84L arranged to the left and has the other end 97*b* attached to the upper rail 96 of the first slide rail 84L arranged to the right. The operation rod 97 is interlocked with the engaging member 92B. When the operation rod 97 is pulled up, the engaging member 92B is separated from the engaging portion 91B. In this manner, the back-and-forth movement of the upper rail 96 with respect to the lower rail 95 is allowed. When the operating force of the operation rod 97 is released, the operation rod 97 is pulled downward by the biasing force of the spring, and the engaging member 92B is engaged with the engaging portion 91B.

By adjusting the position of the operator seat 6 in the front-rear direction K1 with respect to the movable body 85, the positional relation between the operator and the operation levers 77L and 77R can be adjusted in the front-rear direction K1. In this manner, the position of the operator seat 6 can be set to achieve a state where the operator can operate the operation levers 77L and 77R with a posture easily bending the elbow. In addition, by adjusting the position of the movable body 85 in the front-rear direction, the front-rear position of the operator seat 6 can be adjusted while maintaining the positional relation between the operator and the operation levers 77L and 77R in the front-rear direction K1.

As shown in FIG. 15, the rear portion of the operator seat 6 is provided with at least one stopper 98. At least one contacting member 99 to which the stopper 98 can contact is provided behind the stopper 98. It is possible to restrict the backward movement of the operator seat 6 by the stopper 98 coming into contact with the contacting member 99. In addition, the stopper 98 contacts to the contacting member 99 before the operator seat 6 interferes with the shield wall member 22A. In this manner, the operator seat 6 can be prevented from interfering with the shield wall member 22A.

In this embodiment, the stoppers 98 are provided to the left of the rear portion of the seat portion 6A and to the right of the rear portion of the seat portion 6A as shown in FIG. 16. The number of the stopper 98 may be one, or the number of the stopper 98 may be three. The number of contacting members may correspond to the number of stoppers, or one contact member may be provided for a plurality of stoppers.

Figure 22:
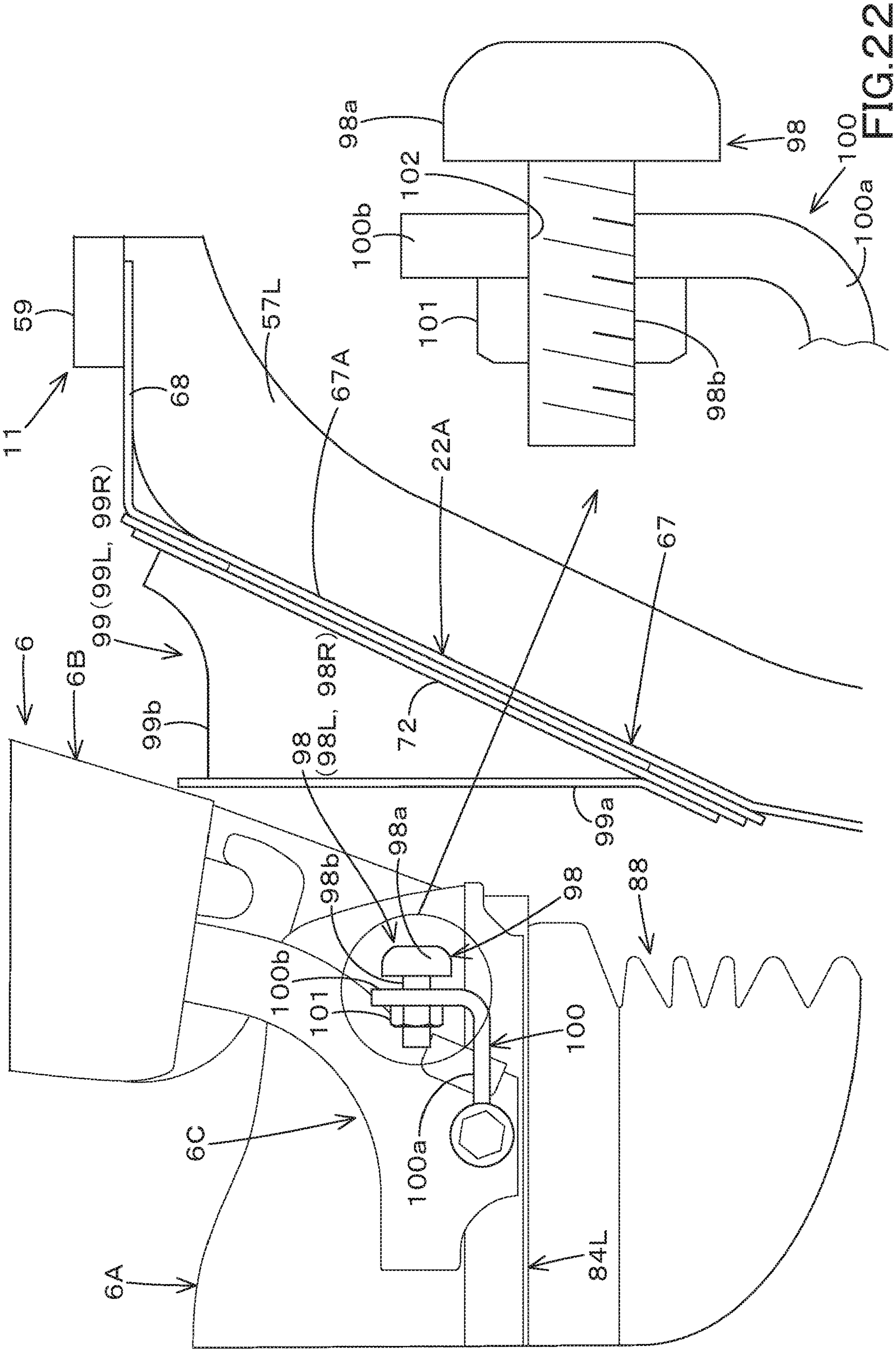
FIG. 22 is an enlarged side view of a rear portion of the operator seat according to the embodiment.

As shown in FIG. 22, the stopper 98 is attached to the support bracket 100 attached to the seat frame 6C forming the skeleton of the operator seat 6 so that the position of the stopper 98 can be adjusted in the front-rear direction K1. The stopper 98 includes a contacting portion 98*a* that contacts to the contacting member 99, and includes a screw shaft 98*b* that protrudes forward from the contacting portion 98*a*. The screw shaft 98*b* is a member that is a bar having a male screw on the outer circumferential surface. In particular, the screw shaft 98*b* is constituted of a bolt, and the head portion of the bolt is embedded in the contacting portion 98*a*.

As shown in FIG. 22, the support bracket 100 has a first portion 100*a* attached to the seat frame 6C, and has a second portion 100*b* extending upward from the rear end of the first portion 100*a*. The second portion 100*b* has a screw hole 102 having an axial center extending in the front-rear direction K1. The screw hole 102 is a through hole penetrating the support bracket 100 and forming a female screw on the inner circumferential surface. A screw shaft 98*b* is screwed into the screw hole 102. By screwing forward (screwing in) or screwing backward (loosening) the screw shaft 98*b*, the position of the stopper 98 with respect to the contacting member 99 can be adjusted in the front-rear direction K1. A lock nut 101 that fixes the position of the stopper 98 is screwed into the screw shaft 98*b*.

As shown in FIG. 8 and FIG. 10, the contacting member 99 is attached to the front surface side of the shield wall member 22A. The contacting members 99 are provided at the upper left portion of the shield wall member 22A and at the upper right portion of the shield wall member 22A. The stopper 98L arranged to the left contacts to the contacting member 99L arranged to the left, and the stopper 98R arranged to the right contacts to the contacting member 99R arranged to the right.

As shown in FIG. 22, the contacting member 99 has a contacting plate 99*a* and an attachment piece 99*b* fixed to the back surface of the contacting plate 99*a*. The attachment piece 99*b* is fixed by the welding to the closing plate 72. As shown in FIG. 10, the contacting plate 99*a* is formed vertically long from the upper portion to the lower portion. "Vertically long" means that the length in the vertical direction is longer than the width in the machine width direction K2. The front surface of the contacting plate 99*a* is a contact surface to which the stopper 98 contacts, and is a vertical surface (a surface along the vertical direction).

Figure 23:
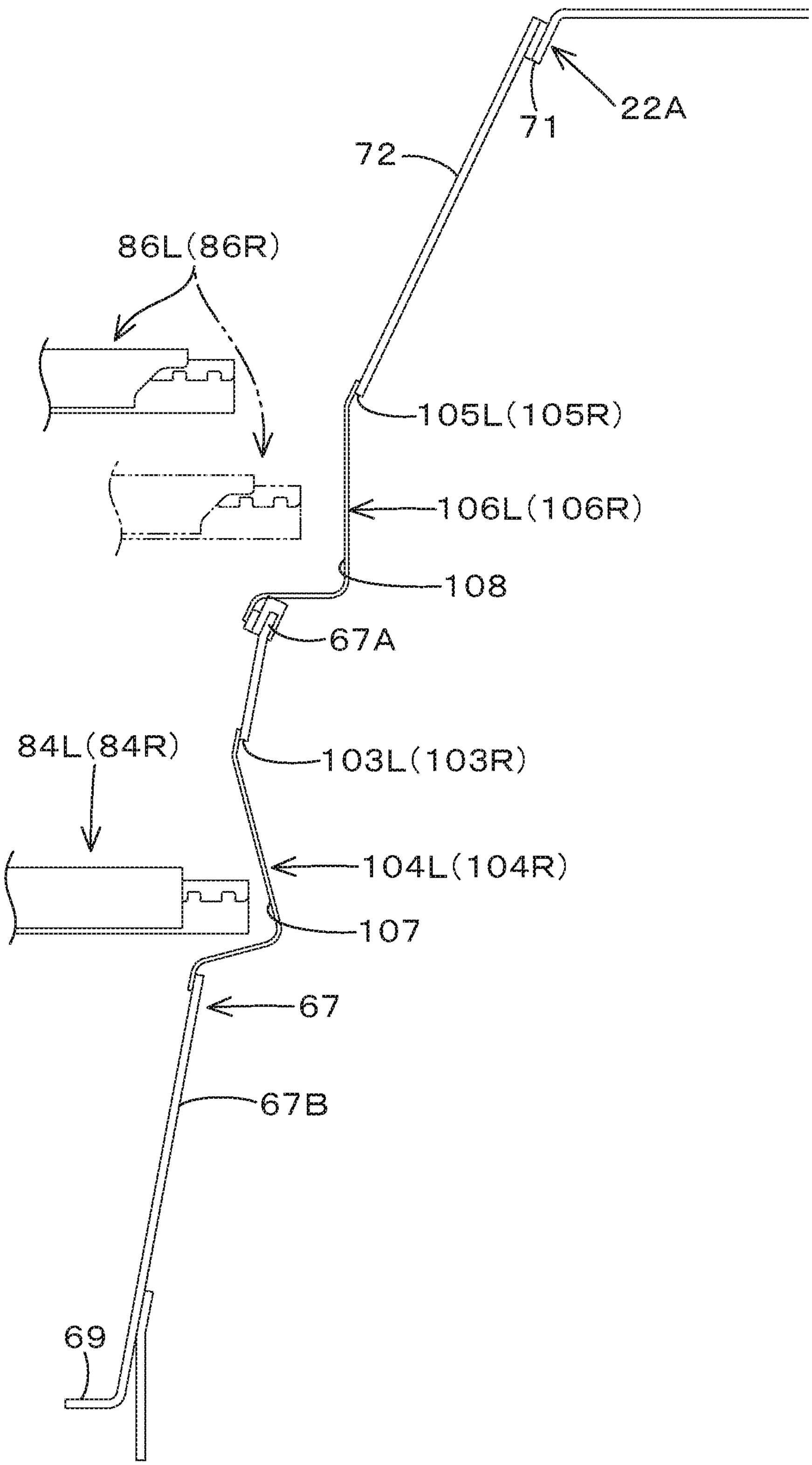
FIG. 23 is a side cross-section view of the shield wall member according to the embodiment.

As shown in FIG. 10 and FIG. 23, the shield wall member 22A includes a first insertion hole 103L arranged to the left and formed in a portion corresponding to the first slide rail 84L and includes a first insertion hole 103R arranged to the right and formed in a portion corresponding to the first slide rail 84R, in the lower portion (the second portion 67B of the shield wall body 67). The rear end side of the first slide rail 84L is inserted into the first insertion hole 103L, and the rear end side of the first slide rail 84R is inserted into the first insertion hole 103R. The first insertion hole 103L is closed by the first cover plate 104L arranged to the left, and the first insertion hole 103R is closed by the first cover plate 104R arranged to the right. The first cover plates 104L and 104R are recessed backward to avoid the interference with the first slide rails 84L and 84R. That is, the shield wall member 22A has a first recess portion 107 that is recessed backward to insert the rear end side of the first rail device (the first slide rails 84L and 84R).

As shown in FIG. 10 and FIG. 23, the shield wall member 22A includes a second insertion hole 105L arranged to the left formed in a portion corresponding to the second slide rail 86L and includes a second insertion hole 105R arranged to the right formed in a portion corresponding to the a second slide rail 86R, in the upper portion (blocking plate 72). The rear end side of the second slide rail 86L is inserted into the second insertion hole 105L, and the rear end side of the second slide rail 86R is inserted into the second insertion hole 105R (see an imaginary line in FIG. 23). The second insertion hole 105L is closed by the second cover plate 106L arranged to the left, and the second insertion hole 105R is closed by the second cover plate 106R arranged to the right. The second cover plates 106L and 106R are recessed backward to avoid the interference with the second slide rails 86L and 86R. That is, the shield wall member 22A has a second recess portion 108 that is recessed backward to insert the rear end side of the second rail device (the second slide rails 86L and 86R).

By providing the first recess portion 107 and the second recess portion 108 in the shield wall member 22A, the operator seat 6 and the movable body 85 can be brought close to the shield wall member 22A, and the front space of the operator seat 6 can be enlarged.

The shield wall member 22A is provided with the first insertion holes 103L and 103R and the second insertion holes 105L and 105R, and is provided with the first cover plates 104L and 104R closing the first insertion holes 103L and 103R and the second cover plates 106L and 106R closing the second insertion holes 105L and 105R. Thereby, the first recess portion 107 and the second recess portion 108 can be easily provided in the shield wall member 22A. In addition, the heat of engine E1 can be suppressed from transmitting to the operator seat 6 side (to the room of the cabin 5).

Since the operator seat 6 is supported by the suspension 88, the operator seat 6 sinks due to the operator's weight when the operator sits on the operator seat 6. Considering this, the second slide rails 86L and 86R are positioned on the upper portions of the second cover plates 106L and 106R (the second insertion holes 105L and 105R) when the operator is not seated on the operator seat 6, as shown in FIG. 23.

In addition, when the contacting member 99 is formed vertically long, it is possible to cope with the sinking of the operator seat 6 and the height adjustment of the operator seat 6.

When the stopper 98 is not in contact with the contacting member 99 after the movable body 85 is moved to the rear end of the moving range, the rearward movements of the movable body 85 and the operator seat 6 are restricted by the restriction member 93. When the stopper 98 is in contact with the contacting member 99 after the movable body 85 is moved to the rear end of the moving range, the rearward movements of the movable body 85 and the operator seat 6 are restricted by the stopper 98. In addition, when only the operator seat 6 is moved rearward, the backward movement of the operator seat 6 is restricted by the stopper 98. That is, the stopper 98 performs both of the position restriction when the movable body 85 is moved backward and the position restriction when only the operator seat 6 is moved backward.

Under the state where the movable body 85 is moved to the rear end side of the moving region and further the backward movement of the stopper 98 is restricted by the contacting member 99, the operator seat 6 has a margin for rearward adjustment with respect to the movable body 85. Thus, when the movable body 85 is moved forward from that state, the operator seat 6 can move backward. Then, by moving the operator seat 6 backward, the distance between the operator seat 6 and the operation levers 77L and 77R can be increased. In this manner, during the driving, the operator can take a comfortable posture (a posture in which the arm is appropriately extended without bending the elbow too much) that allows to easily operate the operation levers 77L and 77R.

In addition, when the operator gets on and off the working machine, the front-rear position of the operator seat 6 with respect to the movable body 85 is adjusted so that the stopper 98 comes into contact with the contacting member 99 under the state where the movable body 85 is moved to the rear end side of the moving region. In this manner, the operator seat 6 and the movable body 85 can be brought into a state of being close to the shield wall member 22A. That is, at the time of getting on and off the working machine, the operator seat 6 and the operation lever 77L can be slid to be close to the shield wall member 22A such that the operation lever 77L does not interfere with the operator.

In addition, after the movable body 85 is moved rearward and the stopper 98 comes into contact with the contacting member 99, the first slide rails 84L and 84R is locked so as not to move back and forth under the state where there is a gap between the stopper 98 and the contacting member 99. That is, the engaging member 92A is not engaged with the engaging portion 91A under the state where the stopper 98 is in contact with the contacting member 99, and the engaging member 92A is engaged with the engaging portion 91A when the movable body 85 is moved slightly forward from the state in which the stopper 98 is in contact with the contacting member 99, and then the first slide rails 84L and 84R are locked.

Since the operator seat 6 is supported by the suspension 88, the machine body 2 and the operator seat 6 are relatively moved up and down when an operator sits on the operator seat 6 or the vertical vibrations of the machine body 2 are generated. When the first slide rails 84L and 84R are locked under the state where the stopper 98 is in contact with the contacting member 99, the stopper 98 and the contacting member 99 are rubbed with each other. Thus, by providing a gap between the stopper 98 and the contacting member 99, it is possible to prevent the friction between the stopper 98 and the contacting member 99.

For the same reason as described above, the second slide rails 86L and 86R are locked so as not to move back and forth after the stopper 98 contacts to the contacting member 99 under the state where the gap is formed between the stopper 98 and the contacting member 99.

Figure 24:
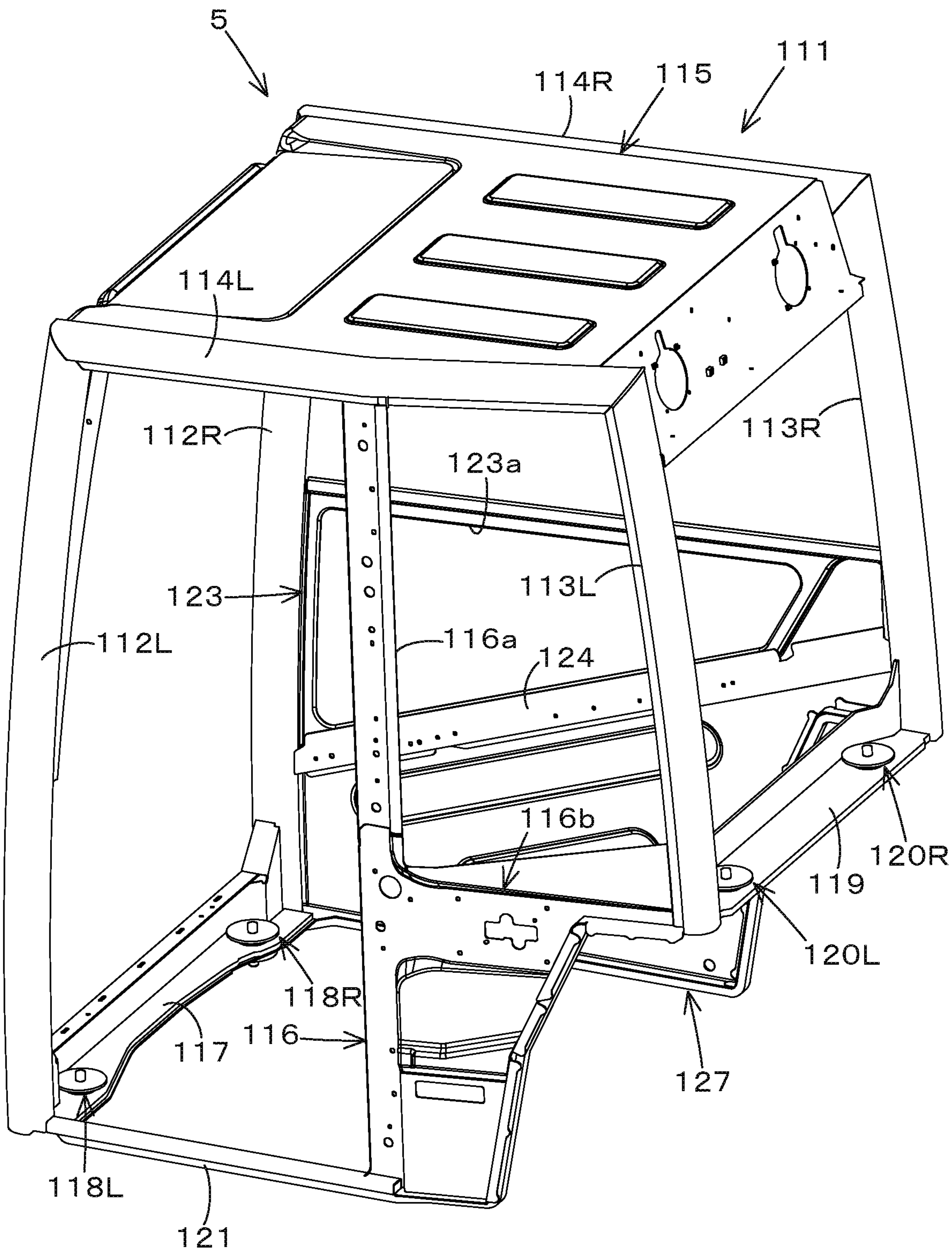
FIG. 24 is a perspective view of a cabin frame diagonally seen from the rear according to the embodiment.
Figure 25:
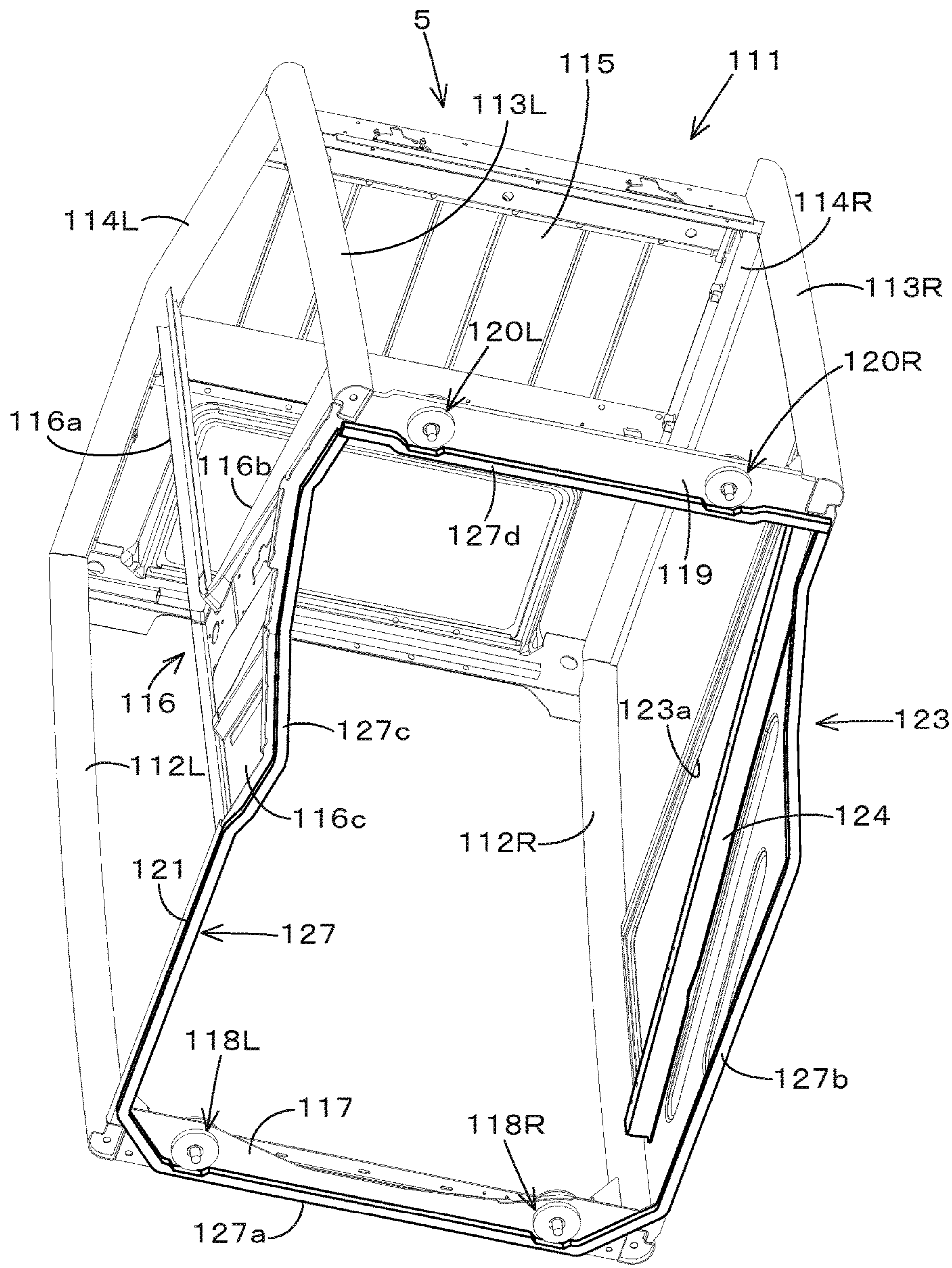
FIG. 25 is a perspective view of the cabin frame seen from below according to the embodiment.

FIG. 24 and FIG. 25, the cabin 5 has a cabin frame 111. The cabin frame III includes a front support column 112L arranged to the left, a front support column 112R arranged to the right, a rear column 113L arranged to the left, and a rear column 113R arranged to the right. The rear column 113L arranged to the left is positioned behind the front support column 112L arranged to the left. The rear column 113R arranged to the right is located behind the front support column 112R arranged to the right. The upper ends of the front columns 112L and 112R are substantially as high as the upper ends of the rear columns 113L and 113R, and the lower ends of the rear columns 113L and 113R are higher than the lower ends of the front struts 112L, 112R.

The upper portions of the front support column 112L and the rear column 113L are coupled by a upper frame member 114L arranged to the left, and the upper portions of the front support column 112R and the rear column 113R are coupled by a upper frame member 114R arranged to the right. A roof 115 is provided between the upper frame member 114L and the upper frame member 114R to cover the upper portion of the operator room (the room of the cabin 5).

A front panel that covers the front of the operator room and allows the operator in the room to get the front view from the cabin is provided between the front support column 112L and the front support column 112R. The lower ends of the front support column 112L and the front support column 112R are coupled by a front lower frame plate 117. The front lower frame plate 117 is positioned above the front portion of step 52 (see FIG. 26). A front mount device (including a front mount member 118L and a front mount member 118R) is provided at the front portion of the cabin 5. The front mount device is configured to support the cabin 5 on the upper surface of the step 52 in a vibration-proof manner. The front mount member 118L arranged to the right is attached to the left portion of the front lower frame plate 117, and the front mount member 118R arranged to the right is attached to the right portion of the front lower frame plate 117.

Figure 26:
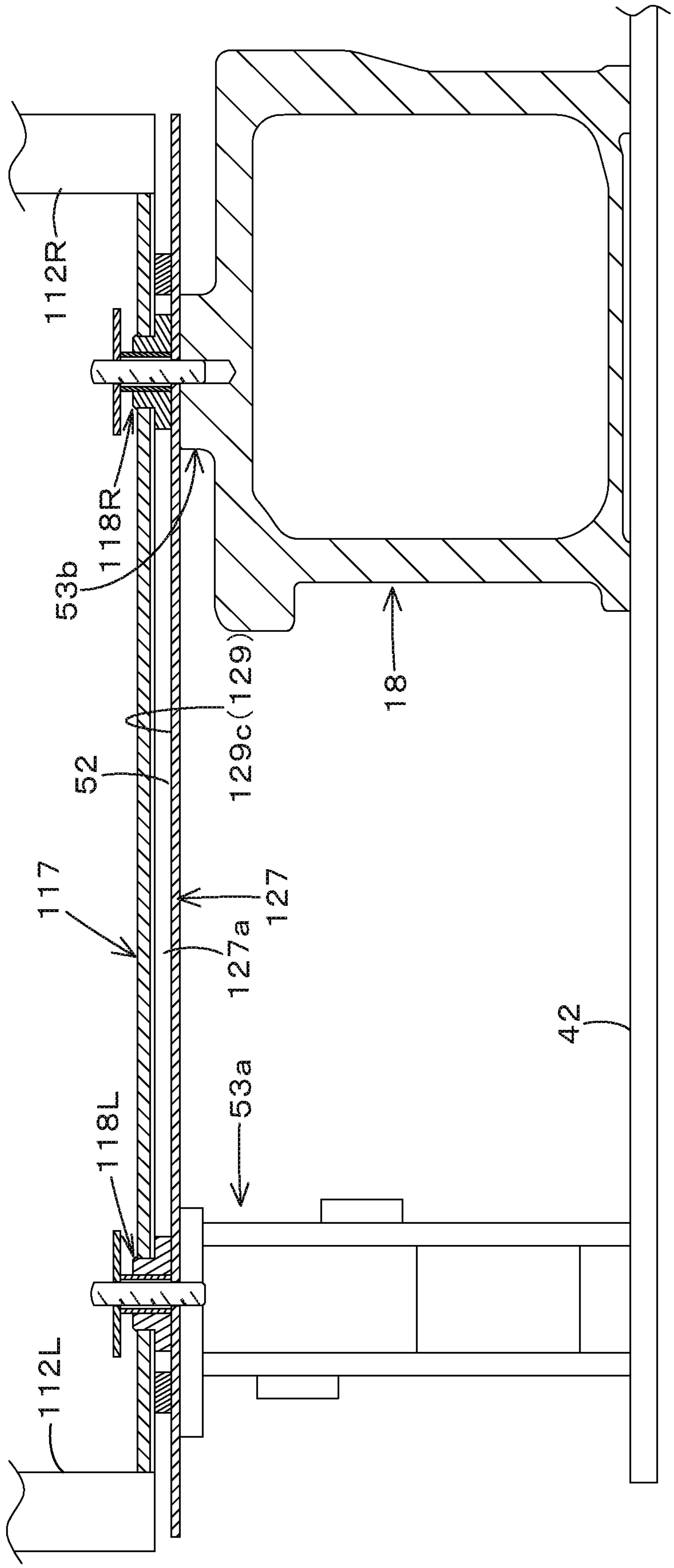
FIG. 26 is a back cross-section view of a front supporting portion of a cabin according to the embodiment.

As shown in FIG. 26, the front mount member 118L is placed on the upper surface of the step 52, and is attached to the step attachment portion 53*a* together with the step 52. The front mount member 118R is placed on the upper surface of the step 52, and is attached to the step attachment portion 53*b* together with the step 52.

A rear panel is provided between the rear column 113L and the rear column 113R, the rear panel covers the rear of the upper portion of the operator room, and allows the operator to see the rear of the cabin 5 from the room. As shown in FIG. 24 and FIG. 25, the lower end portions of the rear column 113L and the rear column 113R are coupled by a rear lower frame plate 119. The rear lower frame plate 119 is located above the upper plate 59 (see FIG. 27). A rear mount device (including the rear mount member 120L and the rear mount member 120R) is provided at the rear portion of the cabin 5, the rear mount device supports the cabin 5 on the upper surface of the upper plate 59 in an anti-vibration manner. A rear mount member 120L arranged to the left is attached to the left portion of the rear lower frame plate 119, and a rear mount member 120R arranged to the right is attached to the right portion of the rear lower frame plate 119.

Figure 27:
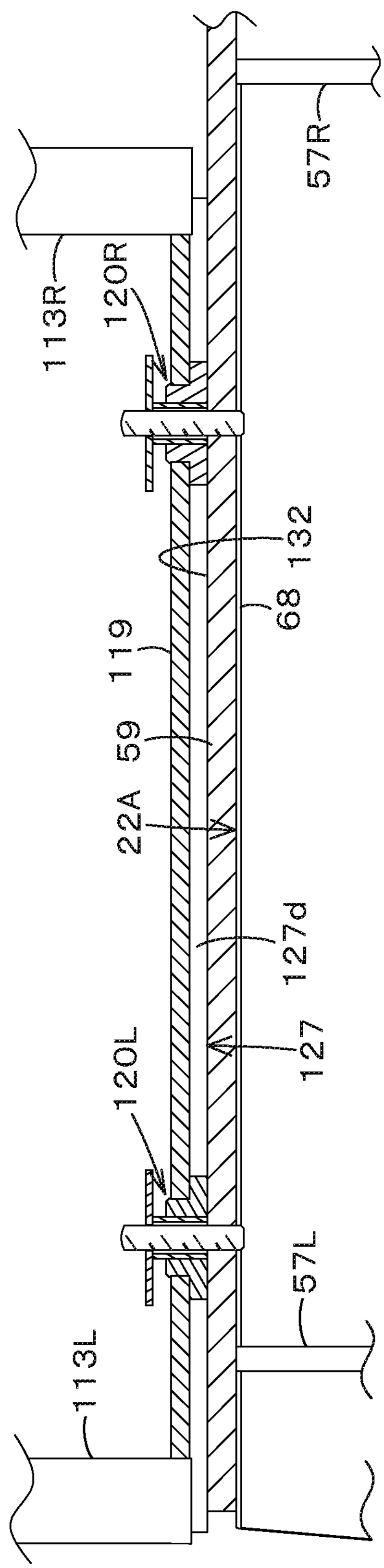
FIG. 27 is a back cross-section view of the front supporting portion of the cabin according to the embodiment.

As shown in FIG. 27, the rear mount member 120L is placed and mounted on the left portion of the upper surface of the upper plate 59, and the rear mount member 120R is placed and mounted on the right portion of the upper surface of the upper plate 59.

FIG. 24 and FIG. 25, the left side wall portion of the cabin 5 has a first side frame 116. The first side frame 116 is provided at the rear portion between the front support column 112L and the rear column 113L. The first side frame 116 includes an intermediate support column 116*a* arranged at a distance behind the front support column 112L, and includes a rear lower frame (an inner layer member) 116*b* extending rearward from the lower portion of the intermediate support column 116*a*. The lower end portions of the front support column 112L and the intermediate support column 116*a* are coupled by a lower frame 121. The lower frame 121 is located above the left portion of step 52 (see FIG. 28). A door 28 that covers the left side of the front portion of the operator room is provided between the front support column 112L and the intermediate support column 116*a* (see FIG. 1). The door 28 constitutes a part of the left side wall portion of the cabin 5. A side panel that covers the left side of the rear upper portion of the operator room and has transparency is provided between the intermediate support column 116*a* and the rear column 113L. The side panel constitutes a part of the left side wall portion of the cabin 5. The left side wall portion of the cabin 5 includes an interior material provided on the room side of the cabin 5.

Figure 28:
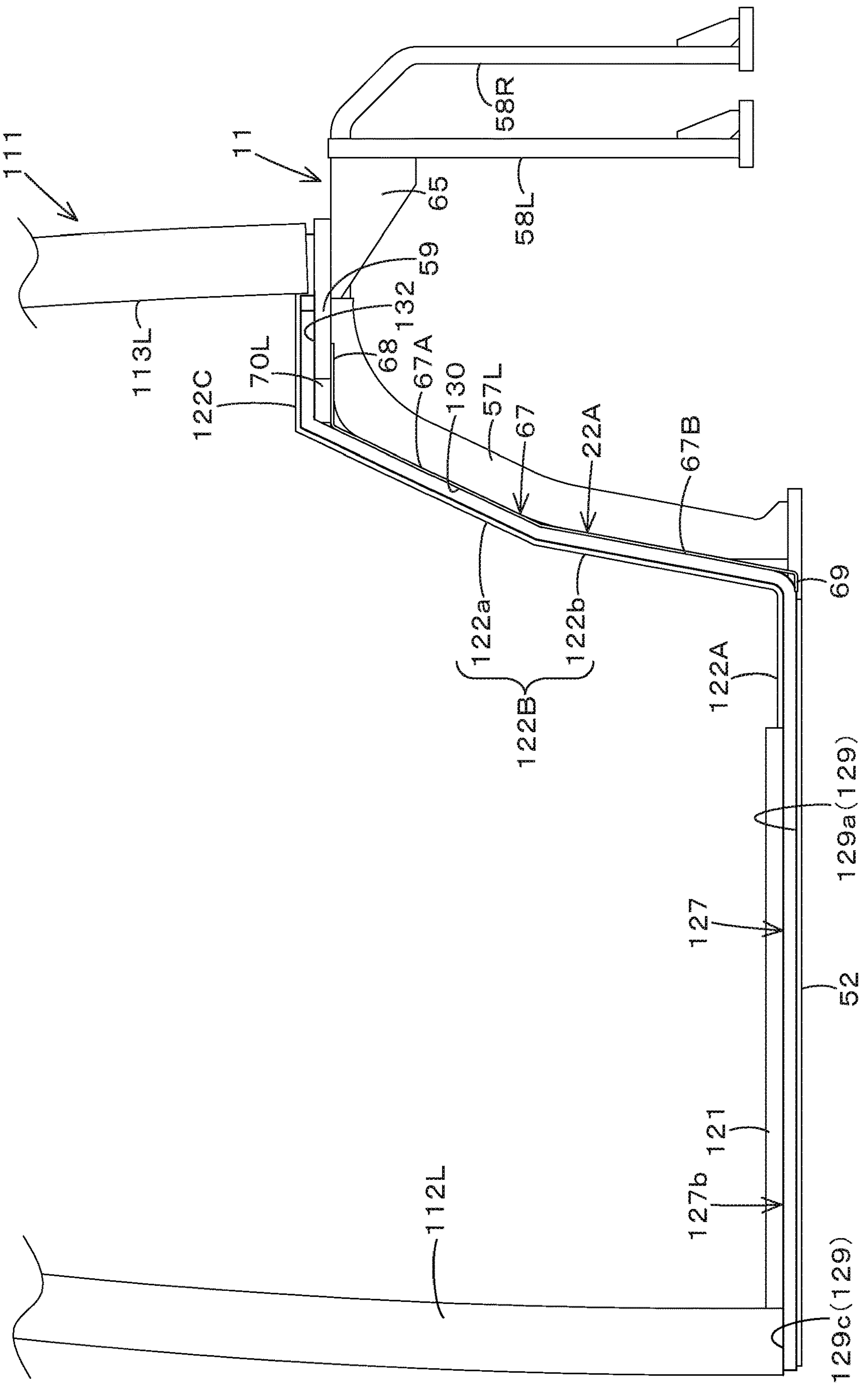
FIG. 28 is a side view of a left sealing structure of the cabin according to the embodiment.

As shown in FIG. 28, the rear lower frame 116*b* has a front lower wall 122A, a back wall 122B, and a rear lower wall 122C. The front lower wall 122A is located above the left portion of the step 52 and is provided extending backward from the lower frame 121. The back wall 122B is provided extending so as to extend upward from the rear end of the front lower wall 122A. The back wall 122B has a first portion 122*a* arranged to the upper side and has a second portion 122*b* arranged to the lower side. The second portion 122*b* extends from the rear end of the front lower wall 122A in an inclined direction that shifts upward as it goes rearward, and is located in front of the second portion 67B of the partition % all body 67. The first portion 122*a* extends from the upper end of the second portion 122*b* in an inclined direction that shifts upward as it goes rearward. The first portion 122*a* is formed to have an inclination angle that is gentler than the inclination angle of the second portion 122*b* with respect to the vertical direction. The first portion 122 a is located in front of the first portion 67A of the partition wall body 67. The rear lower wall 122C extends rearward from the upper end of the back wall 122B. The rear lower wall 122C is located above the upper plate 59.

As shown in FIG. 24 and FIG. 25, the right side wall portion of the cabin 5 includes a second side frame 123 and a lateral frame member 124. The second side frame 123 and the lateral frame member 124 are provided between the front support column 112R and the rear column 113R. The second side frame 123 is provided in the lower portion between the front support column 112R and the rear column 113R. In addition, the second side frame 123 is provided across the front support column 112R and the rear column 113R. An openable window is provided between the front support column 112R and the rear column 113R and above the second side frame 123 so that allows the operator to see the side of the cabin 5 from the room and can be opened and closed. The openable window constitutes a part of the right side wall portion of the cabin 5. An opening 123*a* is formed in the upper portion of the second side frame 123, and a window through which an operator can see the side of the cabin 5 from the room is provided to the opening 123*a*. This window constitutes a part of the right side wall portion of the cabin 5. The end portion of the traveling mechanism 10 arranged to the right can be visually recognized through the opening 123*a*. The right side wall portion of the cabin 5 includes an interior material and the like provided on the room side of the cabin 5.

The lateral frame member 124 is provided to a lower portion between the front support column 112R and the rear support column 113R, that is, provided in the middle portion of the second side frame 123 in the vertical direction (provided below the opening 123*a*). The lateral frame member 124 is arranged to be inclined shifting upward as it goes rearward, and couples the front support column 112R and the rear column 113R.

Figure 29:
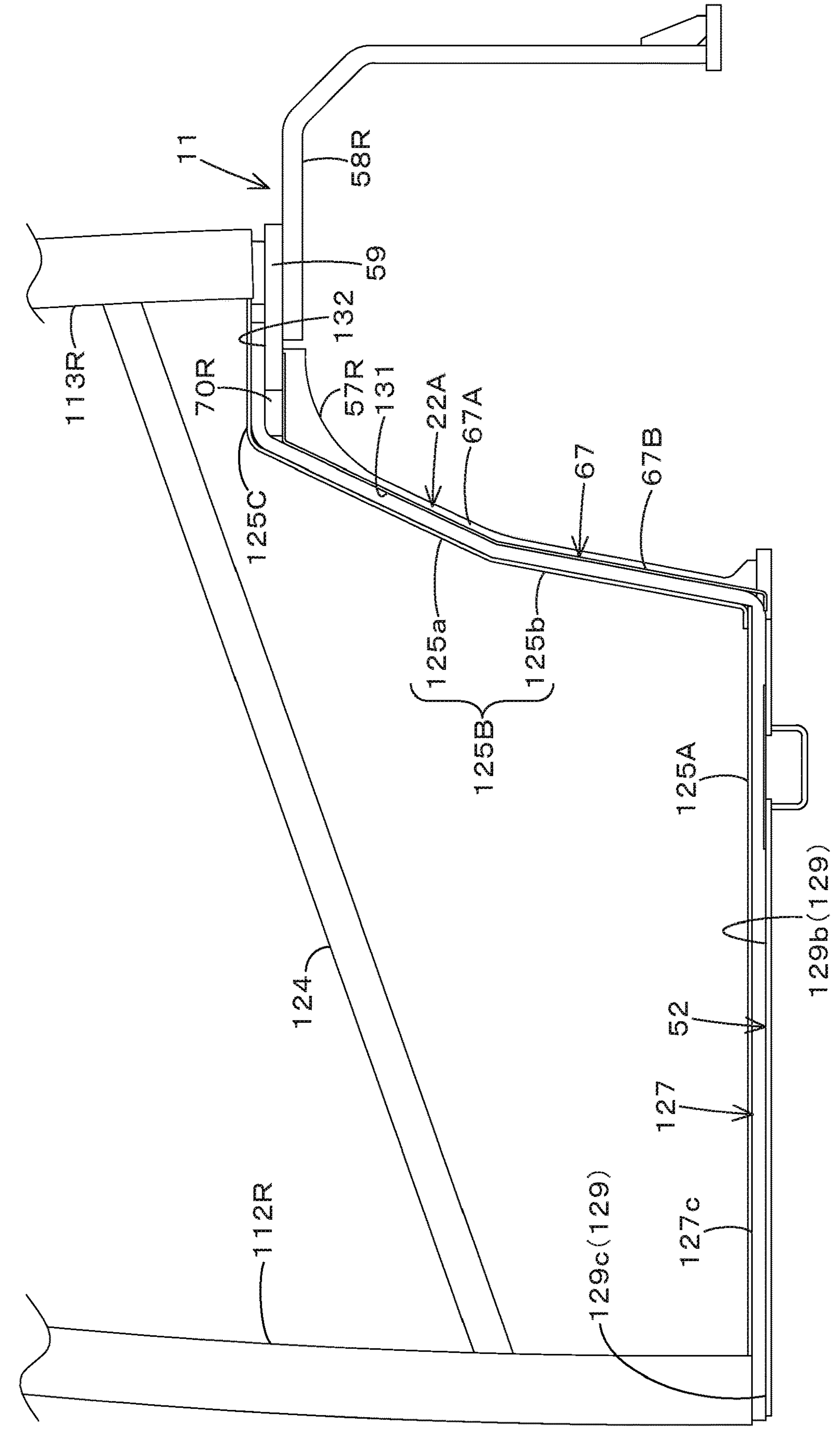
FIG. 29 is a side view of a right sealing structure of the cabin according to the embodiment.

As shown in FIG. 29, the second side frame 123 has a front lower wall 125A, a back wall 125B, and a rear lower wall 125C. The front lower wall 125A is provided extending rearward from the lower end of the front support column 112R, and is positioned above the right portion of the step 52. The back wall 125B is provided extending upward from the rear end of the front lower wall 125A. The back wall 125B has the first portion 125*a* provided upward and the second portion 125*b* provided downward. The second portion 125*b* is provided extending in an inclined direction that shifts upward from the rear end of the front lower wall 125A as it extends rearward, and is positioned in front of the second portion 67B of the partition wall body 67. The first portion 125*a* is extended to be inclined shifting upward as it goes rearward from the upper end of the second portion 125*b*. The first portion 125*a* is formed at an inclination angle that is gentler than the inclination angle of the second portion 125*b* in the vertical direction. The first portion 125*a* is located in front of the first portion 67A of the partition wall body 67. The rear lower wall 125C extends rearward from the upper end of the back wall 125B. The rear lower wall 125C is located above the upper plate 59.

Figure 30:
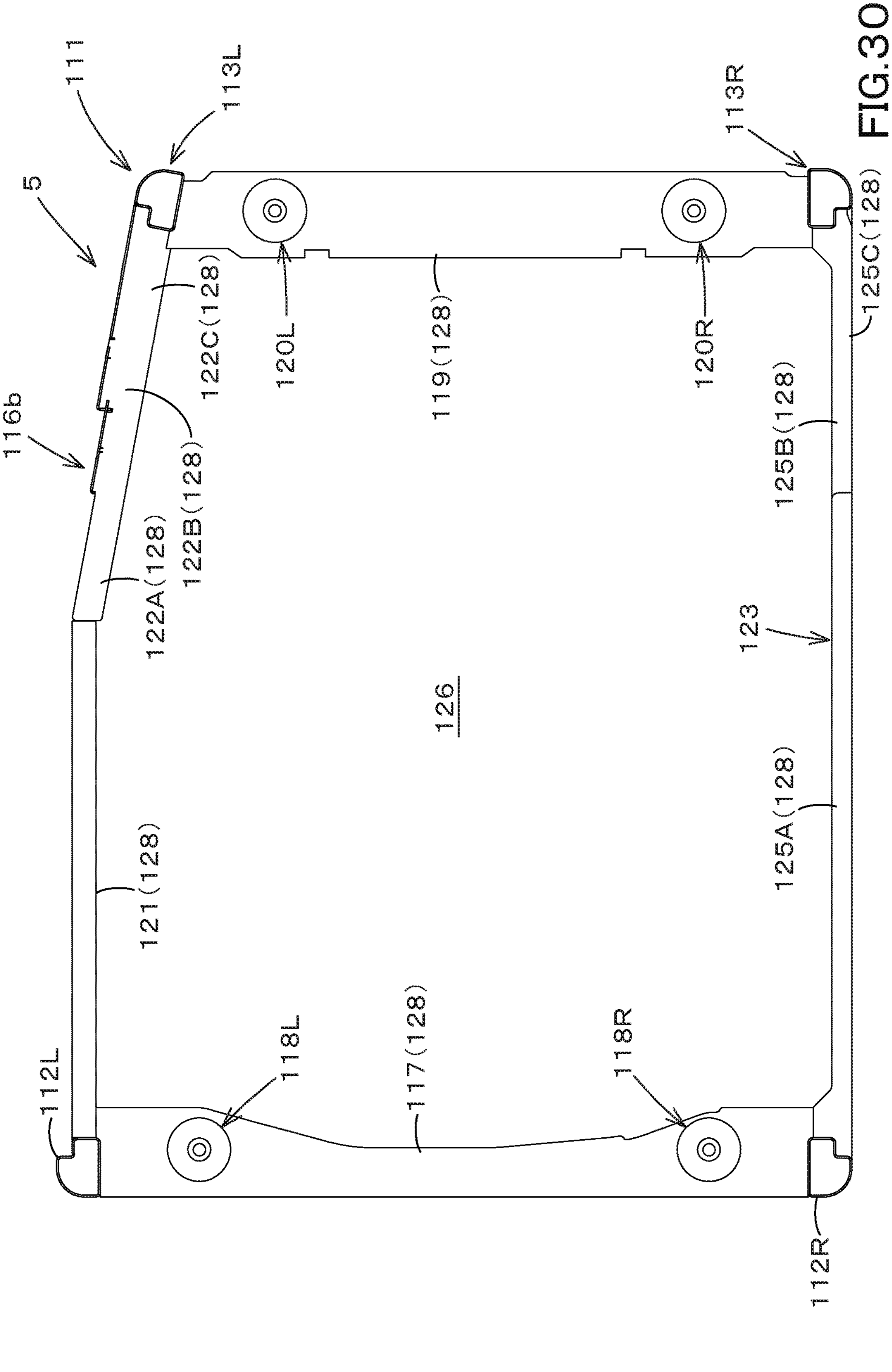
FIG. 30 is a bottom view of the cabin according to the embodiment.

FIG. 30 shows the bottom surface of the cabin 5. As shown in FIG. 30, the cabin 5 has, at the lower end, the opening portion 126 that opens downward and communicates with the cabin 5. The opening portion 126 is formed of the front lower frame plate 117, the rear lower frame plate 119, the lower frame 121, the front lower wall 122A of the rear lower frame 116*b*, the back wall 122B and the rear lower wall 122C, the front lower wall 125A of the second side frame 123, the back wall 125B, and the rear lower wall 125C.

Figure 31:
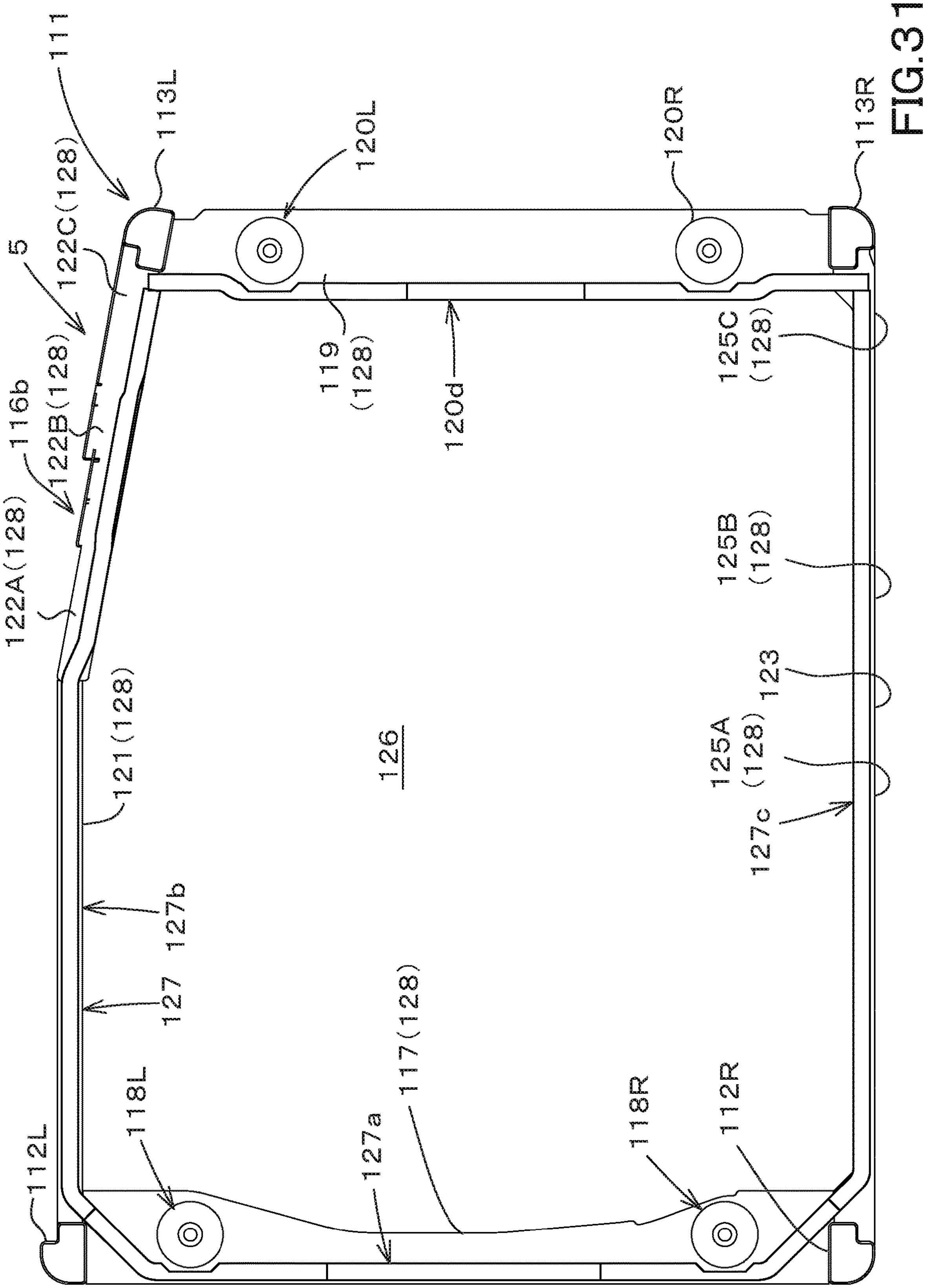
FIG. 31 is a bottom view of the cabin to which a seal is adhered according to the embodiment.

As shown in FIG. 31, a seal attachment surface 128 to which a sealing member 127 surrounding the opening portion 126 is attached by adhesion or the like is constituted of the lower surfaces of the front lower frame plate 117, the rear lower frame plate 119, and the lower frame 121, the lower surfaces of the front lower wall 122A and the rear lower wall 122C of the rear lower frame 116*b*, the lower surfaces of the front lower wall 125A and the rear lower wall 125C of the second side frame 123, and the back surfaces of the back wall 122B of the rear lower frame 116*b* and the rear wall 125B of the second side frame 123.

As shown in FIG. 31, the sealing member 127 is formed in a substantially rectangular shape, and includes a front portion 127*a*, a left portion 127*b*, a right portion 127*c*, and a rear portion 127*d*. The front portion 127*a* is attached to the front portion of the front lower frame plate 117, extending from the front support 112L to the front support 112R. Front mount members 118L and 118R are provided on the rear side of the front portion 127*a*. The left side portion 127*b* extends rearward from the left end portion of the front portion 127*a*, and is provided extending from the front support column 112L to the rear column 113L. The left side portion 127*b* is attached to the lower frame 121, the front lower wall 122A of the rear lower frame 116*b*, the back wall 122B, and the rear lower wall 122C.

The right portion 127*c* extends from the right end of the front portion 127*a* so as to extend rearward, and is provided from the front support column 112R to the rear column 113R. The right portion 127*c* is attached to the front lower wall 125A of the second side frame 123, the back wall 125B, and the rear lower wall 125C.

The rear portion 127*d* connects between the rear end portion of the left portion 127*b* and the rear end portion of the right portion 127*c*. The rear portion 127*d* is attached to the front portion of the rear lower frame plate 119, extending from the rear column 113L to the rear column 113R.

Figure 32:
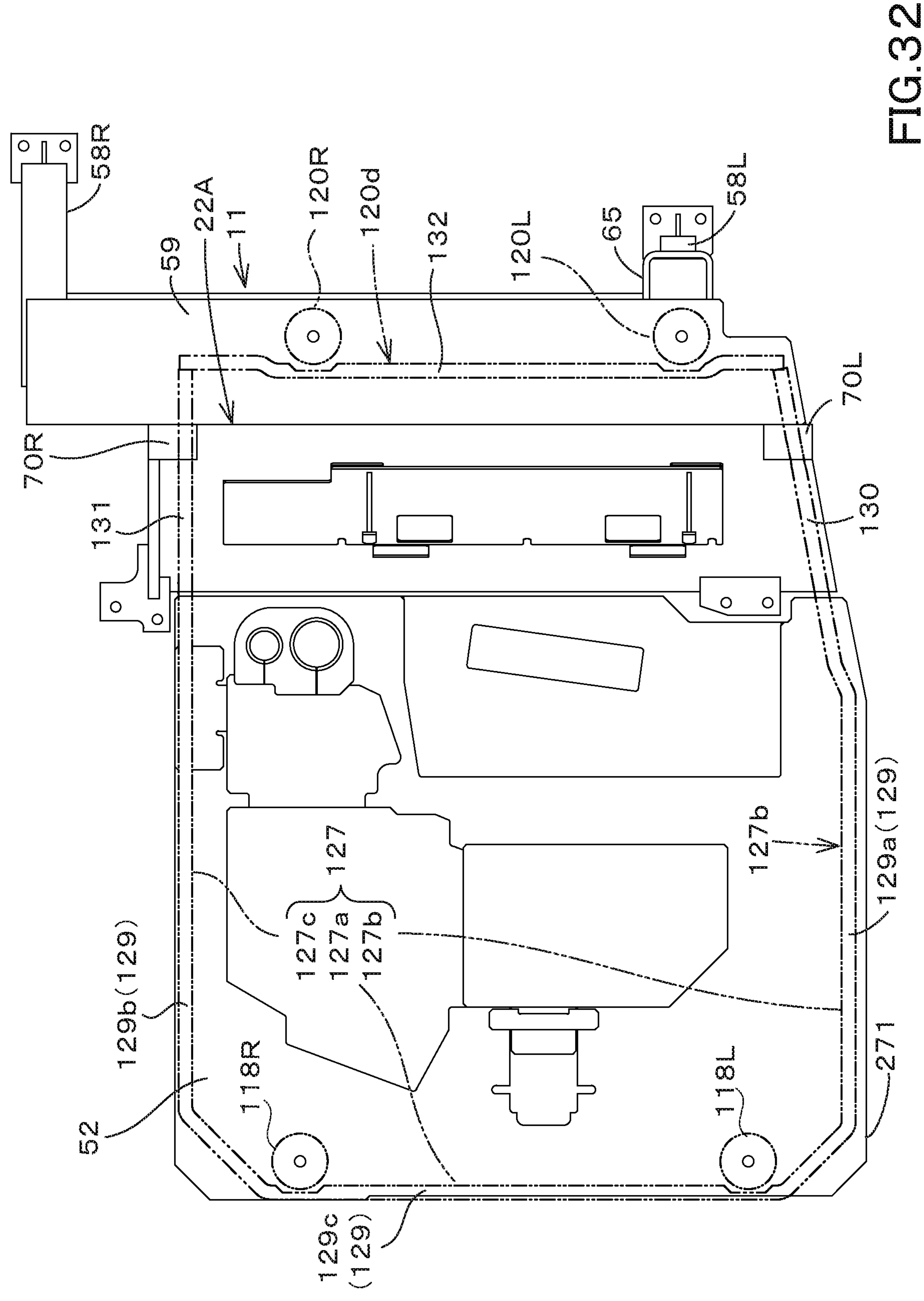
FIG. 32 is a planer view of a step, the shield wall member, and the support frame according to the embodiment.

As shown in FIG. 32, on the machine body 2 side, the seal-contact surface with which the sealing material 127 contacts (the first contact surface 129, the second contacting surface 130, the third contacting surface 131, the fourth contacting surface 132). The first contact surface 129 is provided on the upper surface of the step 52. The first contact surface 129 has the first sealing surface 129*a*, the second sealing surface 129*b*, and the third sealing surface 129*c*.

As shown in FIG. 28 and FIG. 32, the first sealing surface 129*a* is provided at the left portion of step 52 (at one side portion in the machine width direction K2), and the left portion 127*h* of the sealant 127 comes into contact with the first sealing surface 129*a*.

As shown in FIG. 29 and FIG. 32, the second sealing surface 129*b* is provided at the right portion of step 52 (at the other side portion in the machine width direction K2), and the right portion 127*c* of the sealing material 127 comes into contact with the second sealing surface 129*b*.

As shown in FIG. 26 and FIG. 32, the third sealing surface 129*c* is provided at the front portion of step 52, and connects between the front portion of the first sealing surface 129*a* and the front portion of the second sealing surface 129*b*. The front portion 127*a* of the sealing member 127 is in contact with the third sealing surface 129*c*. Thus, the front mounting members 118L and 118R are arranged behind the third sealing surface 129*c*.

As shown in FIG. 10, FIG. 28, and FIG. 32, the second contacting surface 130 is provided at the left portion of the front surface of the shield wall member 22A (at one side portion in the machine width direction K2). The left portion 127*b* of the sealing member 127 is in contact with the second contacting surface 130 and the first sealing surface 129*a*.

As shown in FIG. 29 and FIG. 32, the third contacting surface 131 is provided at the right portion of the front surface of the shield wall member 22A (at the other side in the machine width direction K2). The right portion 127*c* of the sealing member 127 is in contact with the third contacting surface 131 and the second sealing surface 129*b*.

As shown in FIG. 27 and FIG. 32, the fourth contacting surface 132 is provided on the upper surface of the upper plate 59. The fourth contacting surface 132 is in contact with the rear portion 127*d* of the sealing member 127, the rear end portion of the left portion 127*b*, and the rear end portion of the right portion 127*c*. That is, the sealing member 127 is in contact with the second contacting surface 130, the fourth contacting surface 132, and the third contacting surface 131.

As shown in FIG. 32, the rear end portion of the left portion 127*b* extends over the seal block 70L from the second contacting surface 130 (the shield wall member 22A) to the fourth contacting surface 132 (the upper plate 59). The rear end portion of the right portion 127*c* extends over the seal block 70R from the third contacting surface 131 (the shield wall member 22A) to the fourth contacting surface 132 (the upper plate 59). The rear mounting member 120 is arranged behind the fourth contacting surface 132.

As described above, the periphery of the opening portion 126 provided at the lower portion of the cabin 5 is sealed over the entire circumference. In this manner, the effect of preventing noise from entering the cabin 5 can be improved, and noise entering the ear can be reduced. In addition, the effect of preventing entry of dust or the like into the cabin 5 can be improved, and a comfortable operation space (an operation space) can be realized.

As shown in FIG. 1, an air conditioner main body 136 is provided below the operator seat 6 in the room of the cabin 5. The air conditioner main body 136 constitutes the main body of the air conditioner provided in the working machine 1. The air conditioner main body 136 includes a case, a blower housed in the case, an evaporator, and the like.

As shown in FIG. 2, the compressor G1 of the cooling system of the air conditioner is provided in the front portion on the right side of the prime mover E1. The radiator (condenser) G3 and the expansion valve G2 of the cooling system are arranged on the side of the radiator R1. The heating system of the air conditioner uses the heat of the prime mover E1.

Figure 37:
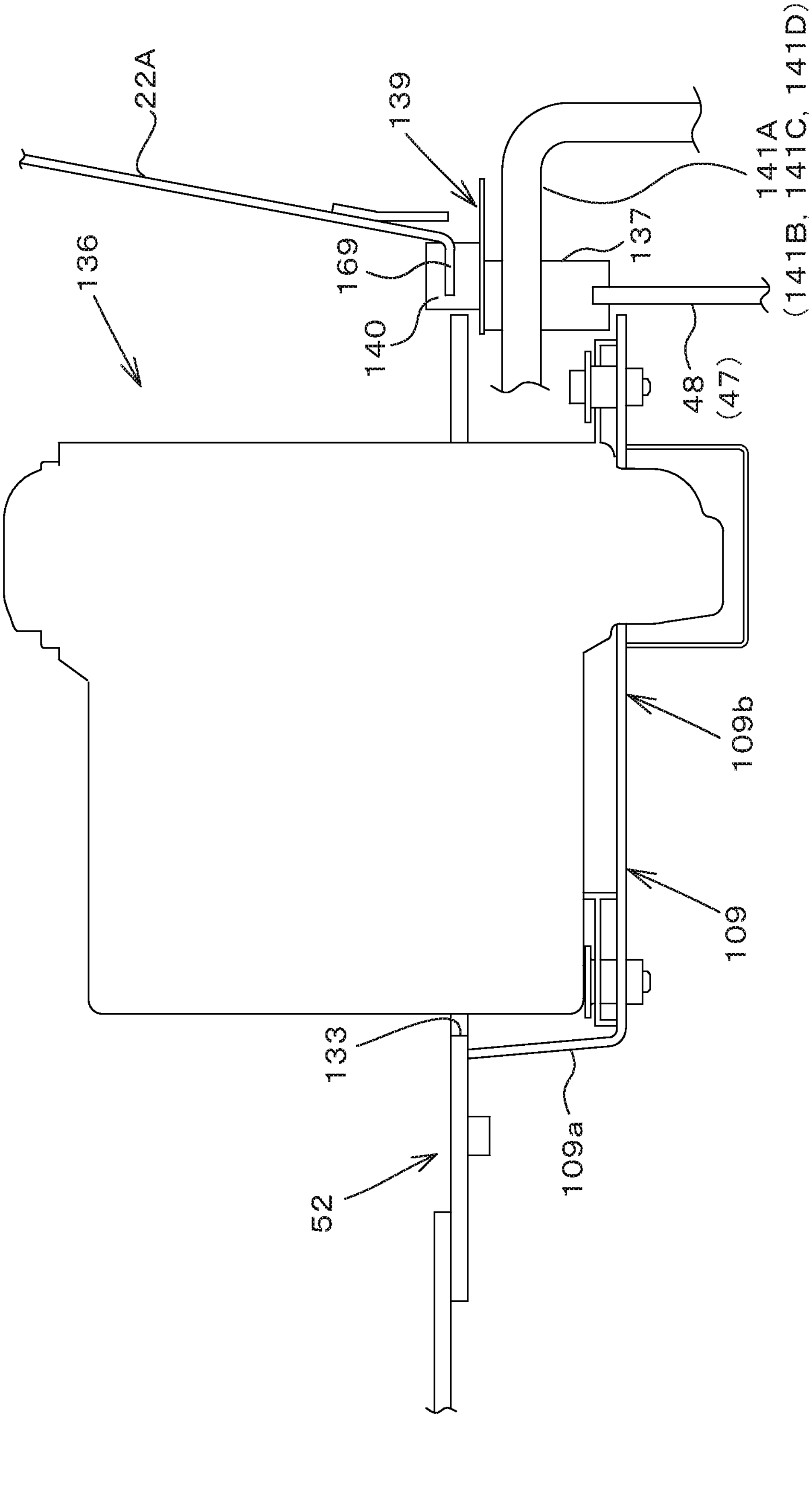
FIG. 37 is a side cross-section view of an arrangement portion of an air conditioner main body according to the embodiment.

As shown in FIG. 37, the air conditioner main body 136 is arranged at the rear portion of the step 52. A cut-out portion 133 is formed at the rear portion of step 52, and an attachment member 109 is provided below the cut-out portion 133 (see FIG. 7). The attachment member 109 has an attachment wall 109*b* arranged underneath the step 52 with a clearance and has an extending wall 109*a* extending from the front edge portion and both side edge portions of the attachment wall 109*a* toward the lower surface of the step 52 and is fixed to the lower surface of the step 52. The top and back of the attachment member 109 are opened. A lower portion of the air conditioner main body 136 is inserted through the cut-out portion 133. The lower portion of the air conditioner main body 136 is attached to the attachment wall 109*a*. Thus, the air conditioner main body 136 is attached to the step 52 by the attachment member 109. A grommet 137 is arranged behind the lower portion of the air conditioner main body 136, and the pipes (the first pipe 141A to the fourth pipe 141D) connected to the air conditioner main body 136 are inserted into the grommet 137.

As shown in FIG. 8, the grommet 137 is provided on the upper portion of the partition plate 47 (the main partition plate 48). In particular, the grommet 137 is located in the middle of the partition plate 47 in the machine width direction K2, and is provided between the shield wall member 22A and the partition plate 47 (the main partition plate 48).

Figure 33:
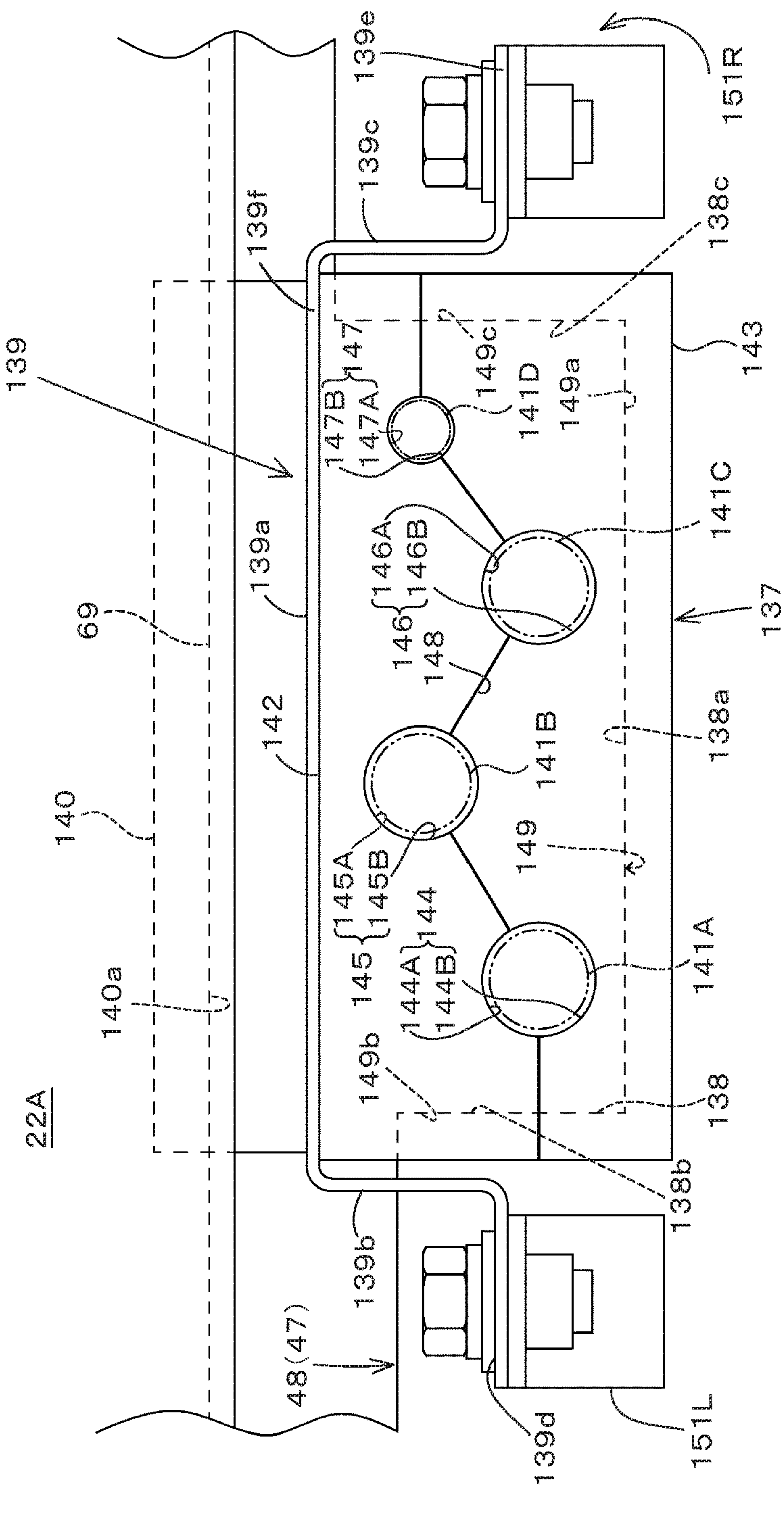
FIG. 33 is a back view of a grommet installation portion according to the embodiment.

As shown in FIG. 33, the pipes inserted through the grommet 137 include a first pipe 141A and a second pipe 141B for the heating, and include a third pipe 141C and a fourth pipe 141D for the cooling. One of the first pipe 141A and the second pipe 141B is a heat-medium supply line arranged from the prime mover E1 to the air conditioner main body 136, and the other one is a heat-medium return line arranged from the air conditioner main body 136 to the prime mover E1. One of the third pipe 141C and the fourth pipe 141D is a refrigerant supply line arranged from the compressor G1 to the air conditioner main body 136 through the radiator G3 and the expansion valve G2, and the other one is a refrigerant return line arranged from the air conditioner main body 136 to the compressor G1.

As shown in FIG. 9 and FIG. 33, the grommet 137 is inserted into the cut-out recess portion 138 provided in the main partition plate 48, and pressed by the seal body 140 provided in the lower extending portion 69 of the shield wall member 22A.

Figure 34:
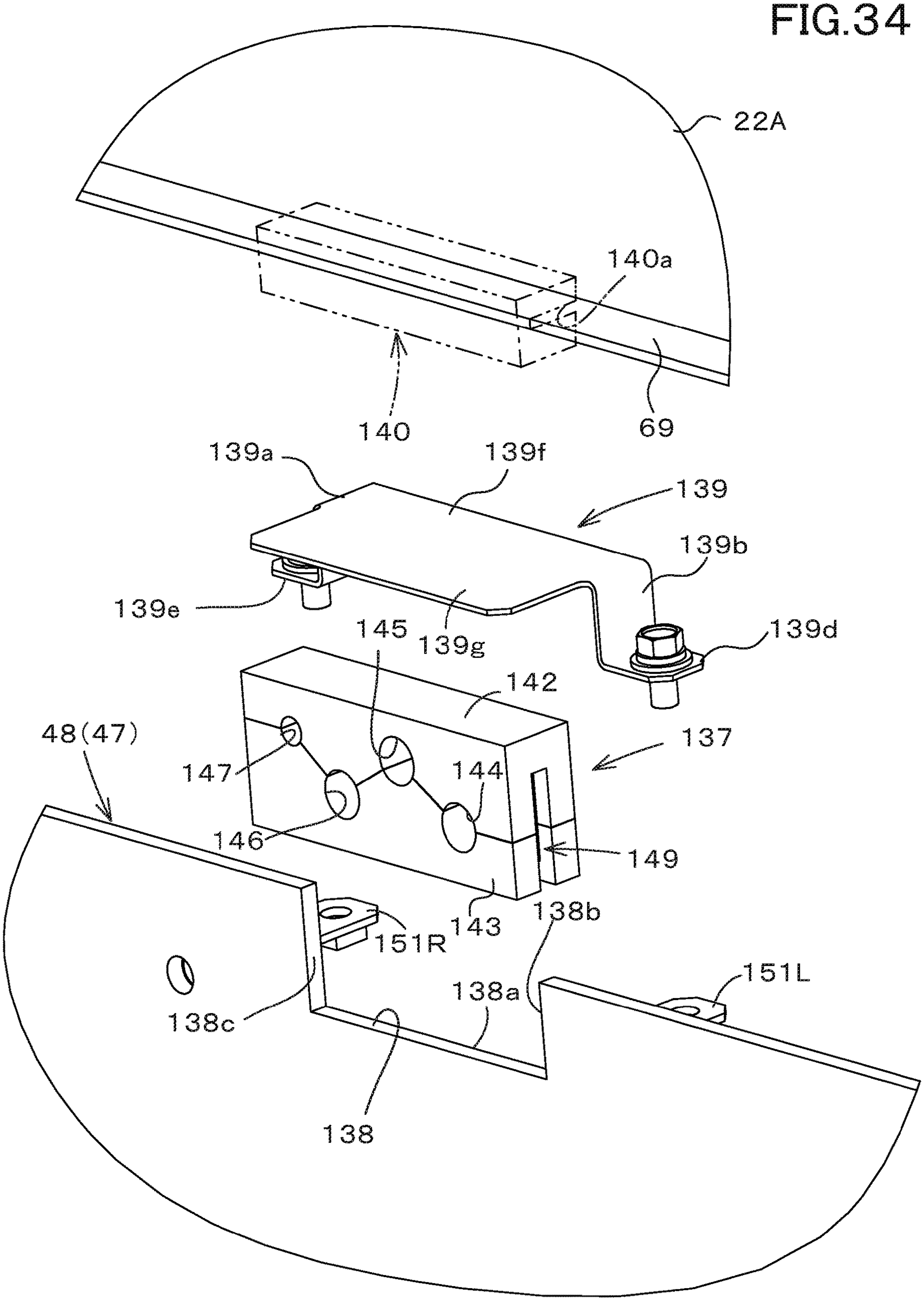
FIG. 34 is an exploded perspective view of the grommet installation portion according to the embodiment.

FIG. 33 and FIG. 34, the cut-out recess portion 138 is provided being recessed downward from the upper end. The cut-out recess portion 138 is has a rectangular shape and an opened top in front view, and is formed of the bottom edge portion 138*a* which is the edge of the lower end and of the first side edge portion 138*b* and the second side edge portion 138*c* facing each other in the machine width direction K2.

As shown in FIG. 33, the grommet 137 is formed to have a square block shape. The grommet 137 has a plurality of pipe insertion portions (the first pipe insertion portion 144, the second pipe insertion portion 145, the third pipe insertion portion 146, and the fourth pipe insertion portion 147) through which the pipes are arranged. The first pipe insertion portion 144 is a hole through which the first pipe 141A is arranged. The second pipe insertion portion 145 is a hole through which the second pipe 141B is arranged, and is adjacent to the first pipe insertion portion 144 in the machine width direction K2 and is formed above the first pipe insertion portion 144. The third pipe insertion portion 146 is a hole through which the third pipe 141C is arranged, and is adjacent to the second pipe insertion portion 145 in the machine width direction K2 and is formed below the second pipe insertion portion 145. The fourth pipe insertion portion 147 is a hole through which the fourth pipe 141D is arranged, and is adjacent to the third pipe insertion portion 146 in the machine width direction K2 and is formed above the third pipe insertion portion 146. In other words, the plurality of pipe insertion portions are arranged so that the pipe insertion portions adjacent in the machine width direction K2 are displaced in the vertical direction.

Figure 36:
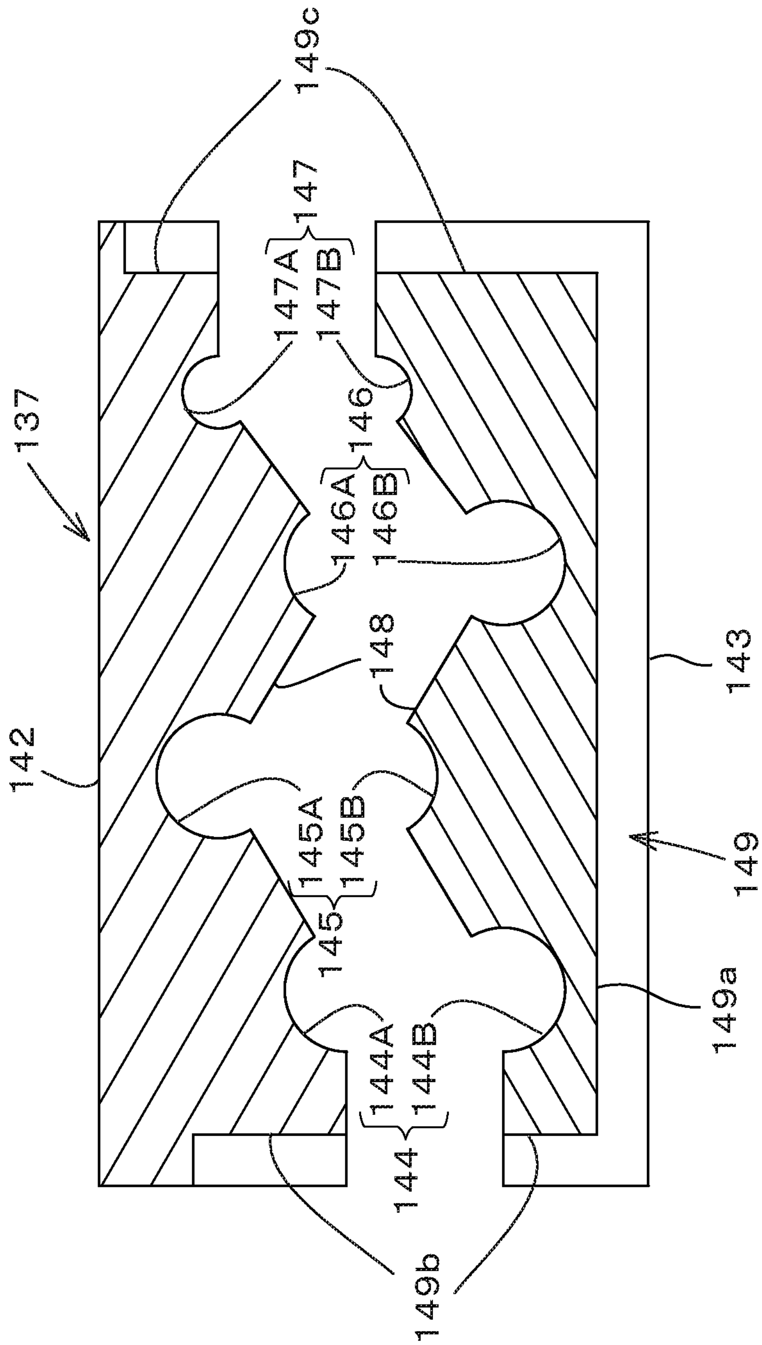
FIG. 36 is an exploded cross-section back view of a grommet according to the embodiment.

As shown in FIG. 33 and FIG. 36, the grommet 137 is divided into two portions, that is, a first member 142 arranged to the upper portion side and a second member 143 arranged to the lower portion side. The first pipe insertion portion 144 is constituted of a recess portion 144A formed in the first member 142 and a recess portion 144B formed in the second member 143. The second pipe insertion portion 145 is constituted of a recess portion 145A formed in the first member 142 and a recess portion 145B formed in the second member 143. The third pipe insertion portion 146 is constituted of a recess portion 146A formed in the first member 142 and a recess portion 146B formed in the second member 143. The fourth pipe insertion portion 147 is constituted of a recess portion 147A formed in the first member 142 and a recess portion 147B formed in the second member 143. That is, the grommet 137 is divided in the vertical direction by a split surface 148 that bisects the plurality of pipe insertion portions.

As shown in FIG. 33 and FIG. 36, the grommet 137 has a groove 149 into which the edge portion of the cut-out recess portion 138 is inserted. The groove 149 includes the first groove portion 149*a* formed on the lower surface of the grommet 137 in the machine width direction K2, the second groove portion 149*b* formed on one side surface of the grommet 137 in the vertical direction, and the third groove portion 149*c* formed on the other side of the grommet 137 in the vertical direction. The second groove portion 149*b* and the third groove portion 149*c* are formed from the lower end of the second member 143 to the middle portion of the first member 142. The bottom edge portion 138*a* is inserted into the first groove portion 149*a*, the first side edge portion 138*b* is inserted into the second groove portion 149*b*, and the second side edge portion 138*c* is inserted into the third groove portion 149*c*.

As shown in FIG. 34, the seal body 140 is formed to have a square block shape and has an engagement groove 140*a* into which the lower extending portion 69 is inserted.

Figure 35:
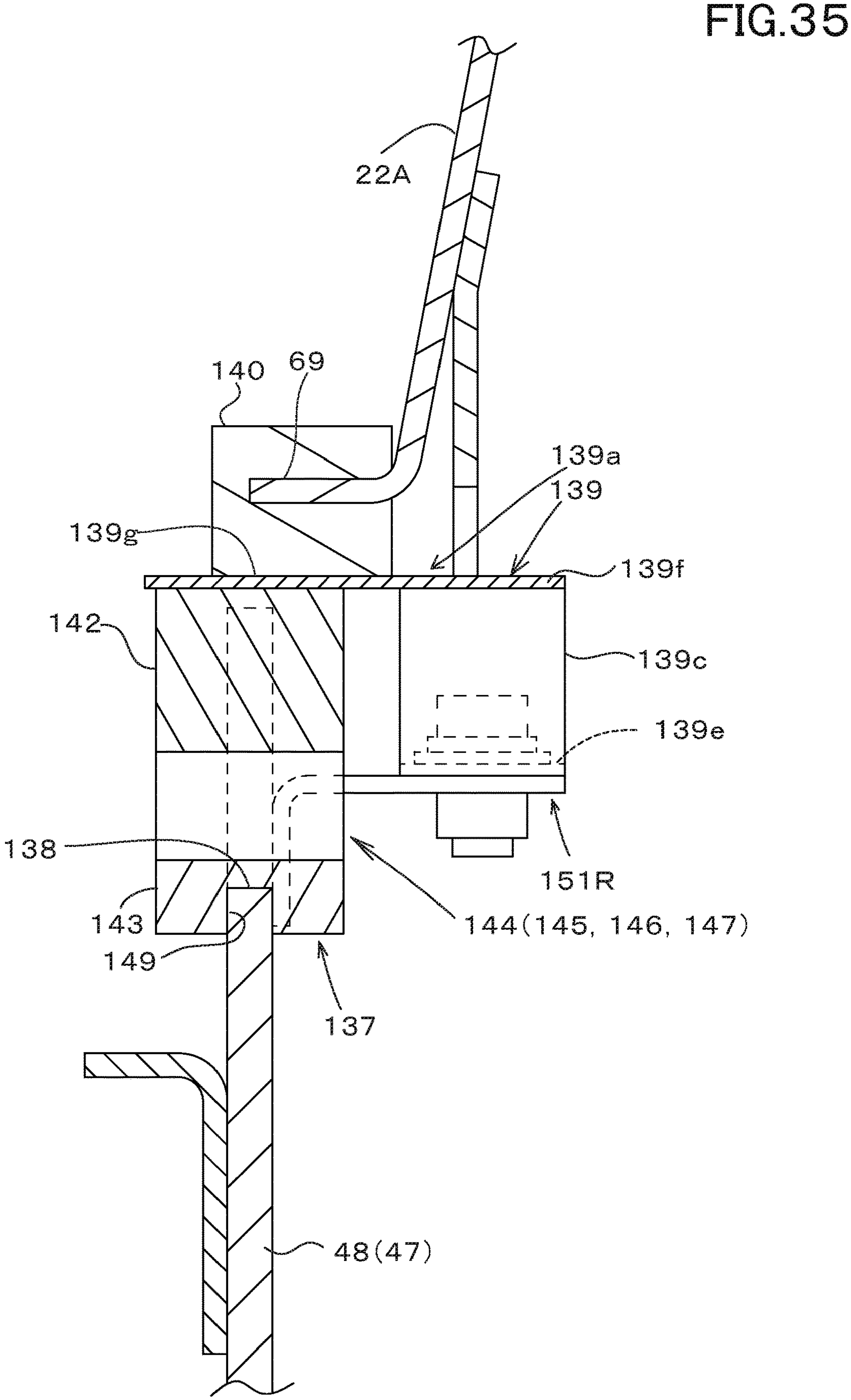
FIG. 35 is a side cross-section view of the grommet installation portion according to the embodiment.

As shown in FIG. 33 and FIG. 35, the grommet 137 is prevented from slipping off from the cut-out recess portion 138 by a retainer plate 139 attached to the main partition plate 48. The retainer plate 139 includes the upper wall 139*a*, the first extension piece 139*b*, the second extension piece 139*c*, the first attachment piece 139*d*, and the second attachment piece 139*e*.

The upper wall 139*a* includes the base plate portion 139*f* arranged behind the upper end portion of the grommet 137, and includes the pressing plate portion 139*g* that protrudes forward from the base plate portion 139*f* and presses the grommet 137. The seal body 140 abuts on the pressing plate portion 139*g*. The first extension piece 139*b* extends downward from the left end of the base plate portion 139*f*. The second extension piece 139*c* extends downward from the right end of the base plate portion 139*f*. The first attachment piece 139*d* extends leftward from the lower end of the first extension piece 139*b*. The second attachment piece 139*e* extends rightward from the lower end of the second extension piece 139*c*.

As shown in FIG. 33, the first stay 151L positioned below the first attachment piece 139*d* and the second stay 151R positioned below the second attachment piece 139*e* are fixed to the back surface of the main partition plate 48. The first attachment piece 139*d* is fixed by a bolt to the first stay 151L, and the second attachment piece 139*e* is fixed by a bolt to the second stay 151R.

Figure 38:
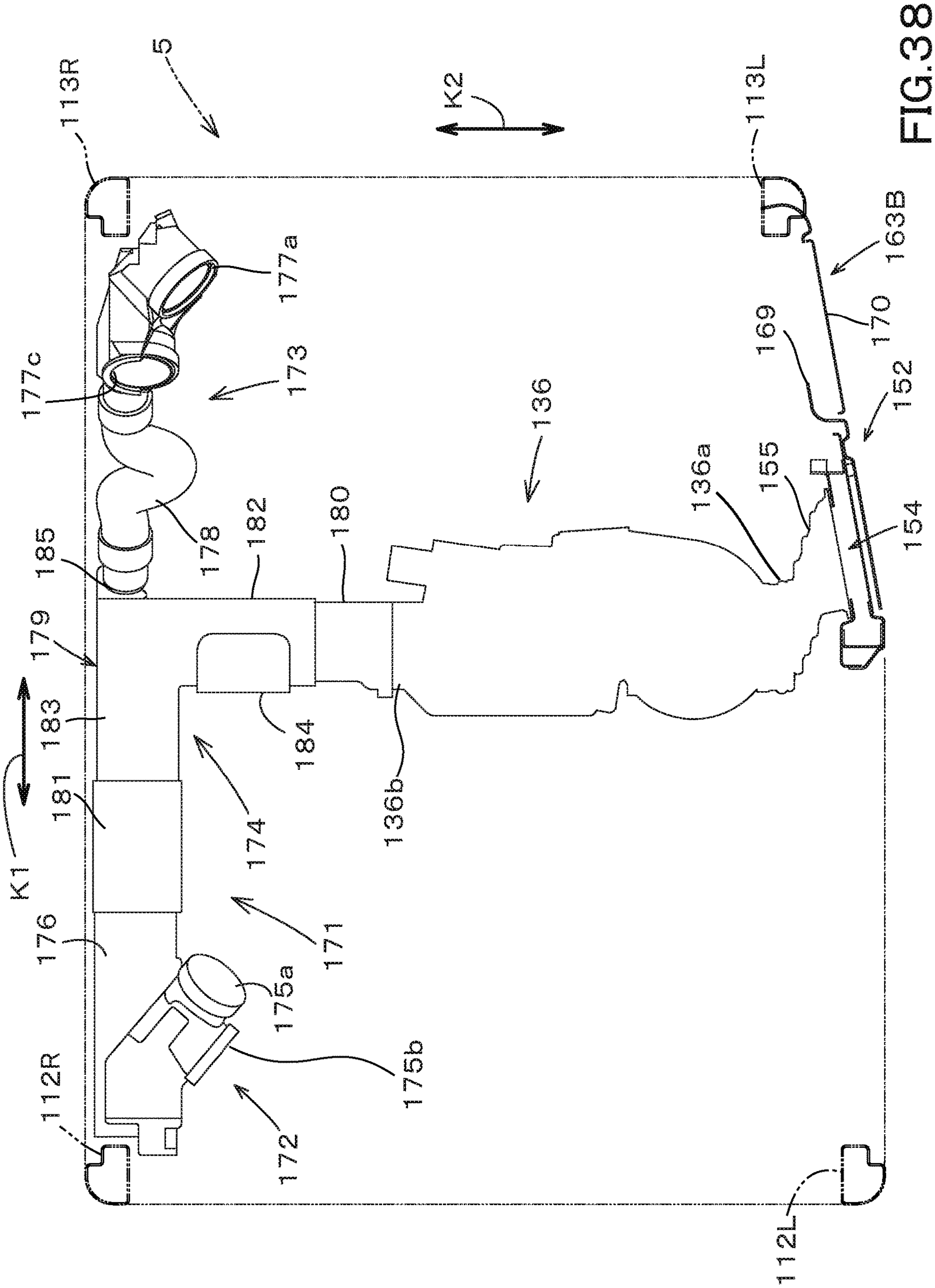
FIG. 38 is a planar view of an air-conditioner device arranged in the cabin according to the embodiment.

As shown in FIG. 38, the cabin 5 has an outside air inlet portion 152 that introduces the air outside the cabin 5 (the outside air) into the air conditioner main body 136. The outside air inlet portion 152 is provided on the side of the air conditioner main body 136 and at the rear portion of the left side surface of the cabin 5. The air conditioner main body 136 has an air intake portion 136*a* that takes in the outside air by the suction force of the blower, and the outside air inlet portion 152 is provided in the vicinity of the side of the air intake portion 136*a*. The air intake portion 136*a* is connected to the outside air inlet portion 152 via the outside air introduction duct 155. By arranging the air conditioner main body 136 in the vicinity of the side of the outside air inlet portion 152, the pressure loss caused when introducing the outside air is reduced, and it is possible to cope with introduction of a large volume of outside air.

As shown in FIG. 1, the outside air inlet portion 152 is provided in the lower portion of the rear portion of the cabin 5. The outside air inlet portion 152 has an inner layer member shown in FIG. 39. The inner layer member is constituted of a rear lower frame 116*b* of the first side frame 116 provided on the left side portion of the cabin 5 (see FIG. 24). Hereinafter, the rear lower frame 116*b* is referred to as the inner layer member.

Figure 39:
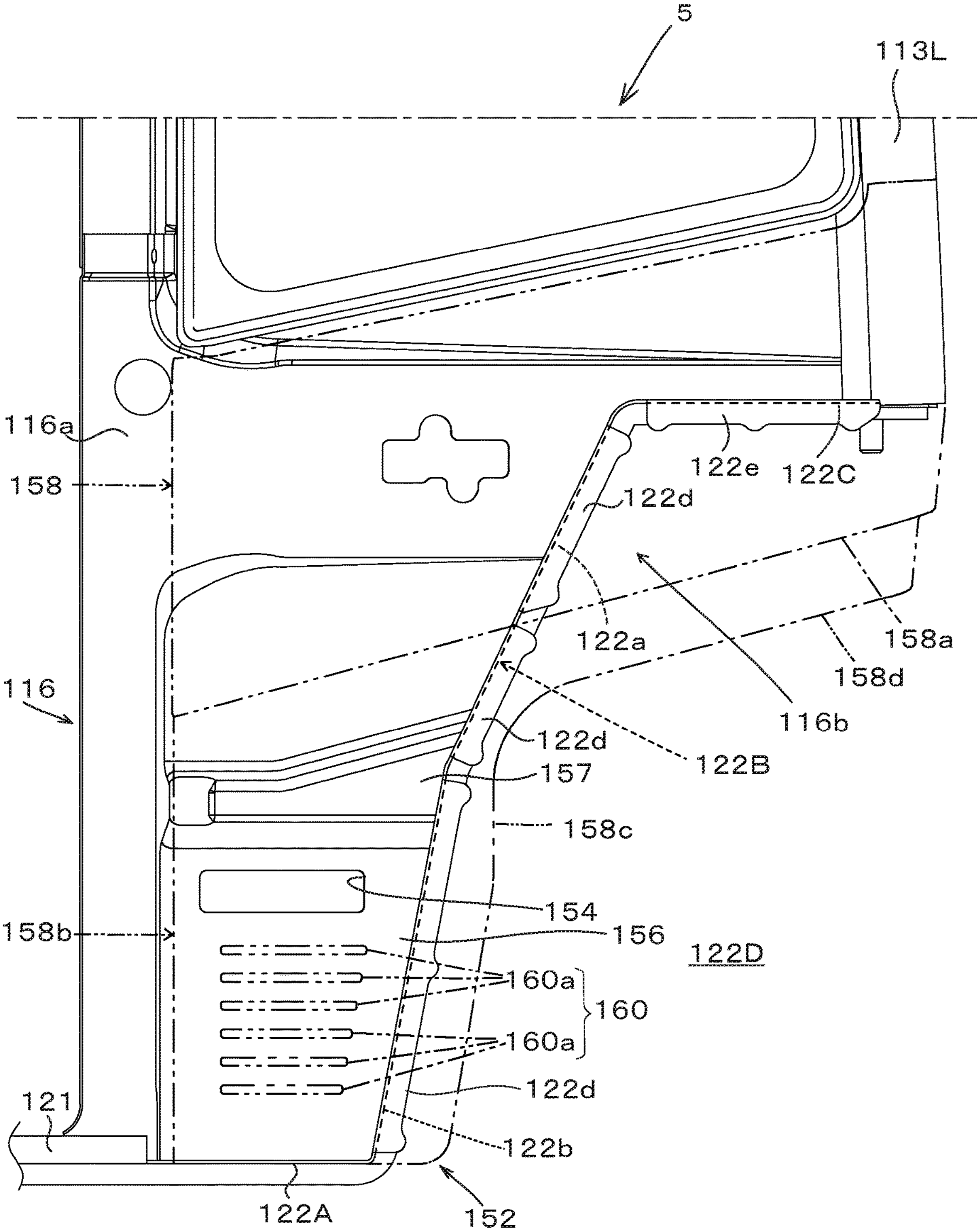
FIG. 39 is a side view of an inner-layer member according to the embodiment.

As shown in FIG. 39, the inner layer member 116*b* has the first outside air inlet port 154. An outside air introduction duct 155 is connected to the first outside air inlet port 154 (see FIG. 38). The inner layer member 116*b* has a plate portion 156 having a flat shape at the lower portion between the intermediate support column 116*a* and the back wall 122B. A first outside air inlet port 154 is formed on the upper portion of the plate portion 156. The first outside air inlet port 154 is formed of a laterally-elongated rectangular edge portion that is elongated in the front-rear direction and penetrates through the inner layer member 116*b*. The first outside air inlet port 154 communicates with the cabin 5. Above the plate portion 156, a protruding portion 157 that protrudes in the machine outward direction is provided extending from the intermediate support column 116*a* to the back wall 122B. The rear side of the plate portion 156 is an open portion 122D formed of the back wall 122B and the rear lower wall 122C. The open portion 122D is positioned behind the back wall 122B and below the rear lower wall 122C. A flange wall 122*d* is provided at the end portion of the back wall 122B on a side located the machine outward direction. A flange wall 122*e* is also provided at the end portion of the rear lower wall 122C on a side located the machine outward direction.

Figure 40:
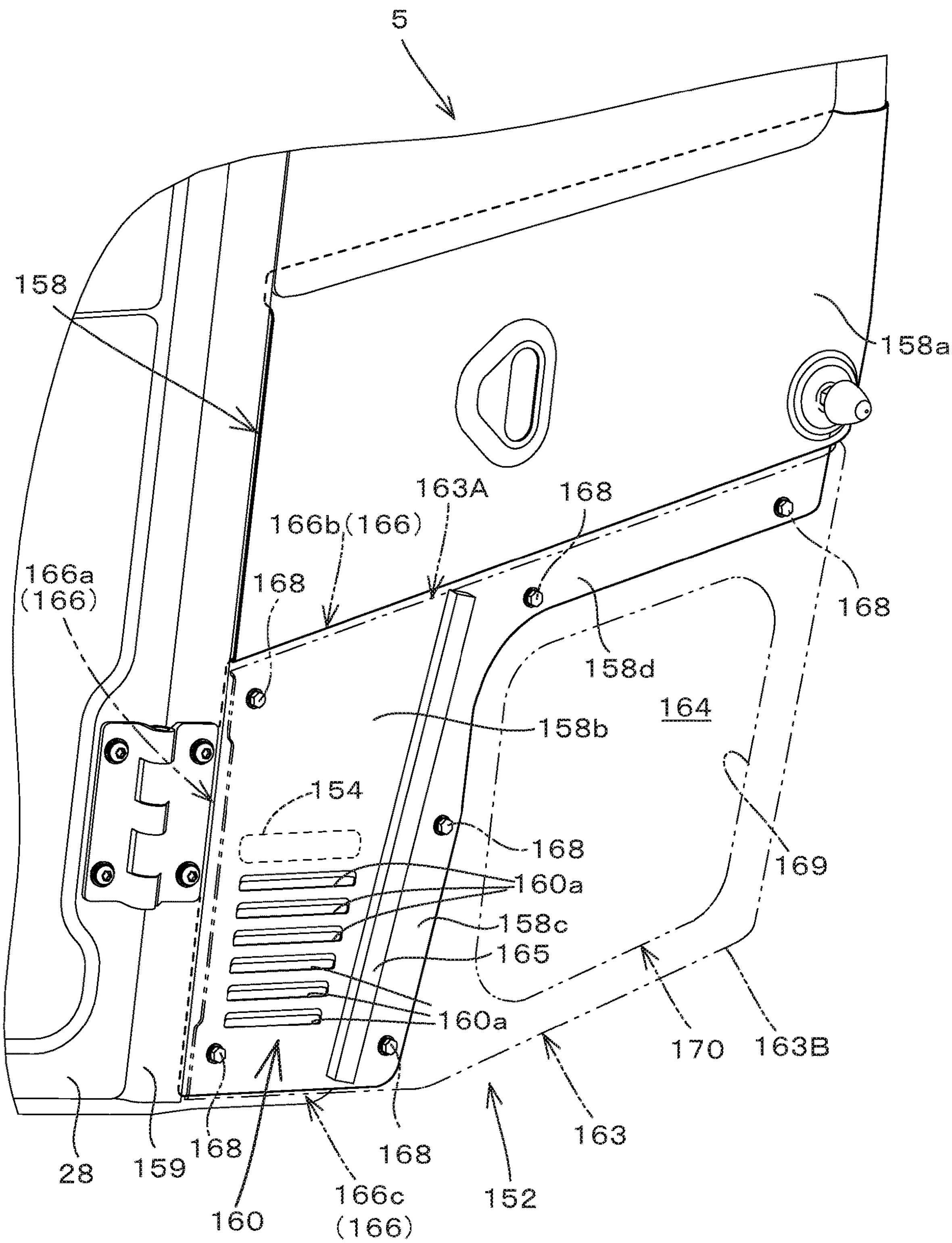
FIG. 40 is a side perspective view illustrating a middle-layer member according to the embodiment.

As shown in FIG. 39 and FIG. 40, the outside air inlet portion 152 includes a middle laser member 158 arranged to face the inner layer member 116*b* in the machine outward direction. The middle layer member 158 is fixed to the inner layer member 116*b* by the welding. The middle layer member 158 includes the upper wall portion 158*a*, the cover wall portion 158*b*, the first attachment wall portion 158*c*, and the second attachment wall portion 158*d*. The upper wall portion 158*a* covers the upper portion of the inner layer member 116*b* and the upper portion of the open portion 122D. The cover wall portion 158*b* covers the plate portion 156 and the protruding portion 157. The cover wall portion 158*b* covers the outside of the first outside air inlet port 154. That is, the middle layer member 158 covers the outside of the first outside air inlet port 154.

The first attachment wall portion 158*c* extends rearward from the rear end of the cover wall portion 158*b*. The second attachment wall portion 158*d* extends downward from the lower end of the upper wall portion 158*a*, and is connected to the first attachment wall portion 158*c*. The rear side of the cover wall portion 158*b* is an open portion 164 formed of the first attachment wall portion 158*c* and the second attachment wall portion 158*d*. The open portion 164 is positioned behind the first attachment wall portion 158*c* and below the second attachment wall portion 158*d*.

Figure 41:
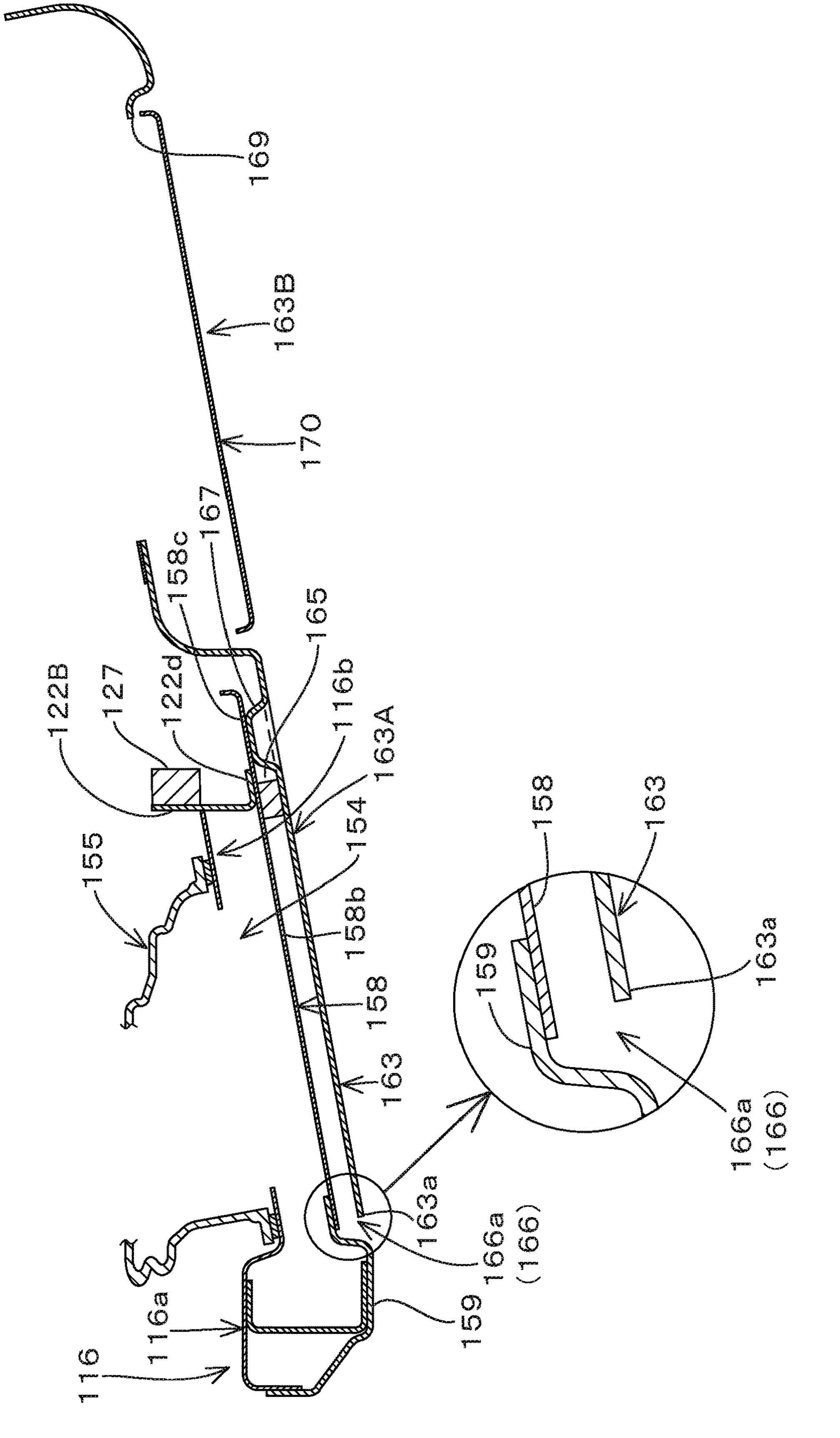
FIG. 41 is a cross-section view in X1-X1 line of FIG. 43 according to the embodiment.
Figure 42:
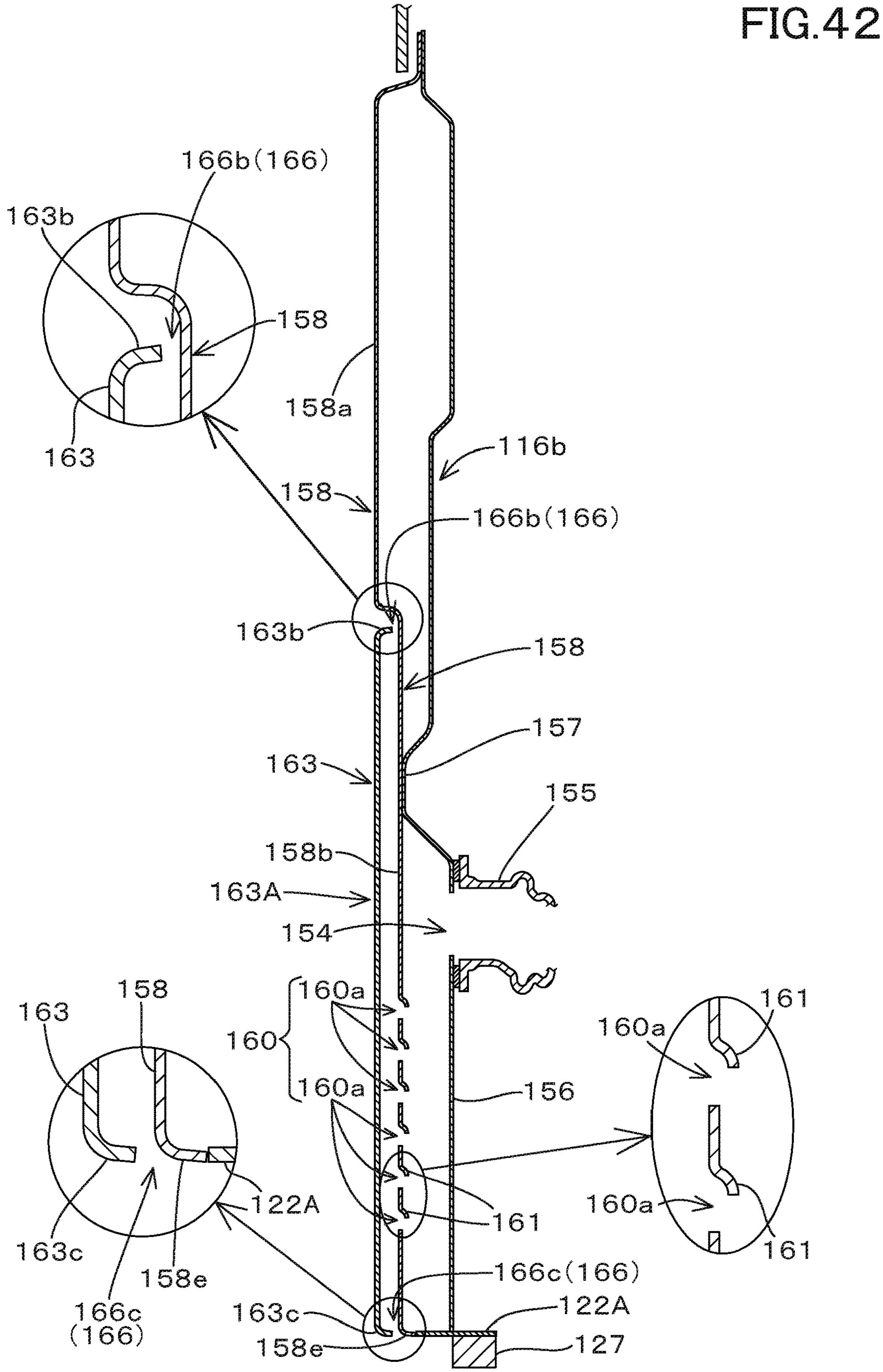
FIG. 42 is a cross-section view in X2-X2 line of FIG. 43 according to the embodiment.

As shown in FIG. 41 and FIG. 42, the middle layer member 158 is provided with a clearance from the plate portion 156 of the inner layer member 116*b* in the machine width direction K2. The protruding portion 157 is in contact with and welded to the middle layer member 158. The upper portion of the space between the plate portion 156 and the cover wall portion 158*b* facing the plate portion 156 is closed by the protruding portion 157. The lower end portion 158*e* of the middle layer member 158 is bent toward the inner layer member 116*b*, and is fixed by the welding to the front lower wall 122A of the inner layer member 116*b*. In this manner, the lower portion between the plate portion 156 and the cover wall portion 158*b* is closed by the lower end portion 158*e* and the front lower wall 122A. The first attachment portion 158*c* is attached by the welding to the flange wall 122*d*. In this manner, the rear portion between the plate portion 156 and the cover wall portion 158*b* is closed by the back wall 122B. The side of the intermediate support column 116*a* in the machine outward direction is covered with a support column cover 159. The support column cover 159 is fixed to the front end portion of the middle layer member 158.

As shown in FIG. 40 and FIG. 41, the space between the plate portion 156 and the middle layer member 158 communicates with a portion between the intermediate support column 116*a* and the support column cover 159.

Figure 44:
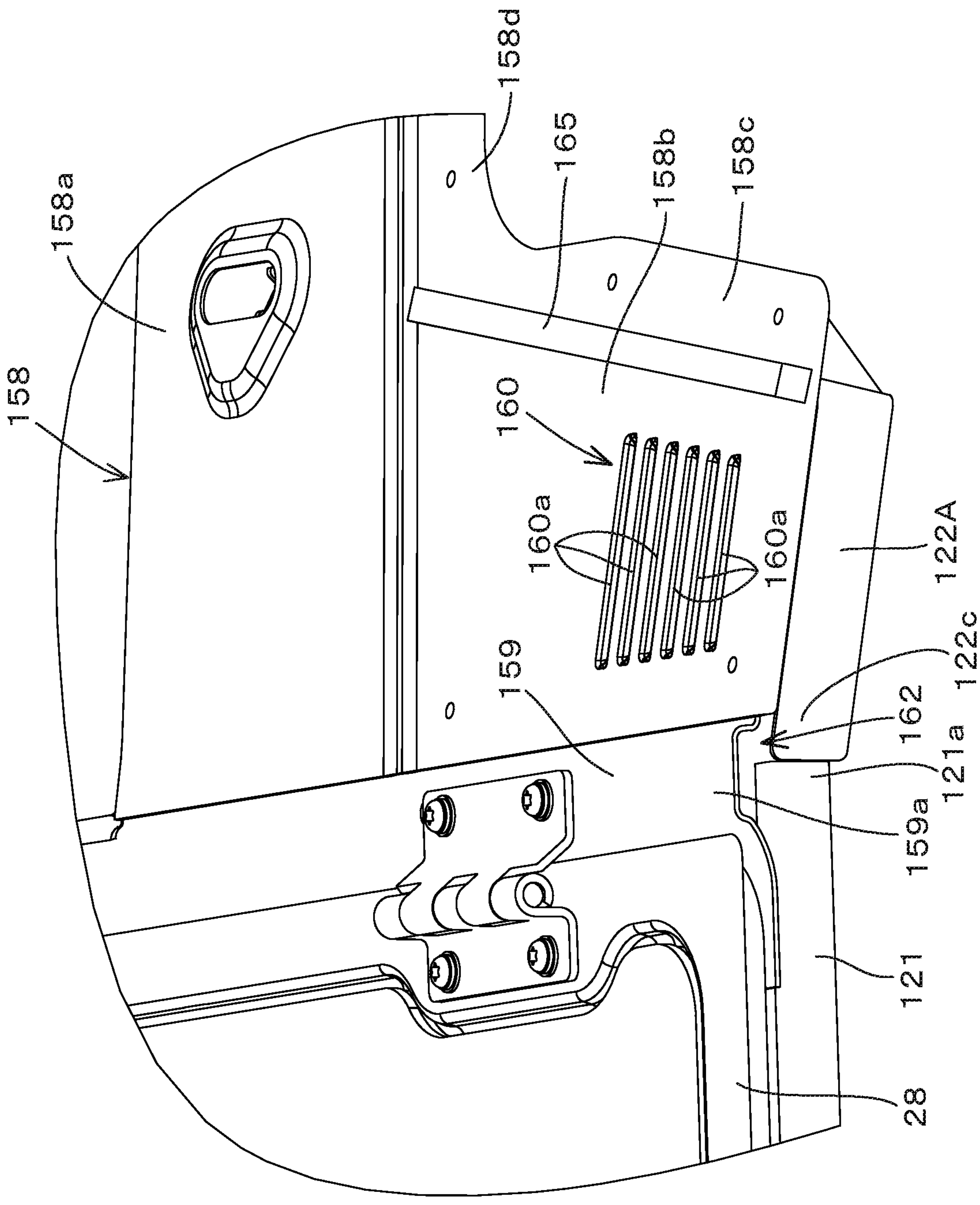
FIG. 44 is a perspective view of the middle-layer member seen from below according to the embodiment.

As shown in FIG. 44, a water drain gap 162 is formed at the lower end 159*a* of the support column cover 159. The water drain gap 162 is formed of the rear end portion 121*a* of the lower frame 121, the front end portion 122*c* of the front lower wall 122A, and the lower end portion 159*a* of the support column cover 159.

As shown in FIG. 39 and FIG. 40, the middle layer member 158 has a second outside air inlet port 160 that is displaced so as not to overlap the first outside air inlet port 154 in the horizontal direction. That is, the second outside air inlet port 160 is formed in a portion not opposed to the first outside air inlet port 154. In the present embodiment, the second outside air inlet port 160 is formed in the cover wall portion 158*b*, and is provided below the first outside air inlet port 154. That is, the first outside air inlet port 154 is displaced upward with respect to the second outside air inlet port 160.

The second outside air inlet port 160 is formed of a plurality of holes 160*a*. The plurality of holes 160*a* are formed of laterally-long holes (elongated holes) elongated in the front-rear direction K1, and are arranged in parallel in the vertical direction. As shown in FIG. 42, a flange-shaped portion 161 extending downward from the upper end of the holes 160*a* is provided on a side of the middle layer member 158 in the machine inward direction. That is, the middle layer member 158 includes the flange-shaped portion 161 at the upper edge portion of each of the elongated holes, the flange-shaped portion 161 is inclined toward the inner layer member 116*b* with respect to the vertical direction.

As shown in FIG. 40, a seal member 165 that is elongated in the vertical direction is provided on the rear portion of the outer surface of the cover wall portion 158*b* (in front of the first attachment wall portion 158*c*). The seal material 165 is provided from the lower end portion to the upper end portion of the cover all portion 158*b*.

Figure 43:
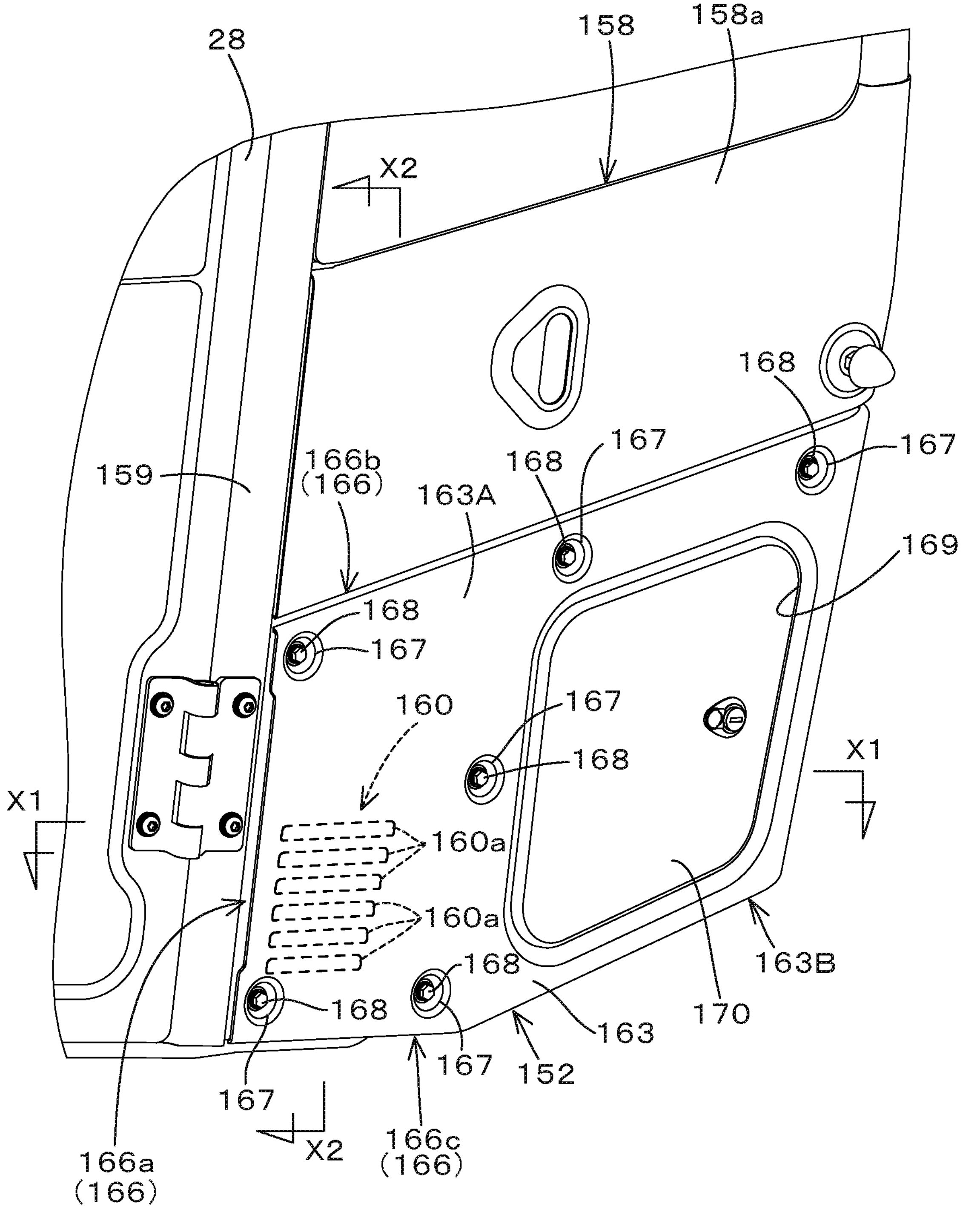
FIG. 43 is a side perspective view illustrating an outer-layer member according to the embodiment.

FIG. 40 and FIG. 43, the outside air inlet portion 152 has an outer layer member (an exterior member) 163 provided on a side of the middle layer member 158 in the machine inward side. The outer layer member 163 has a front portion 163A that covers the cover wall portion 158*b*, and has a rear portion 163B that covers the open portion 164. That is, the outer layer member 163 covers the outside of the second outside air inlet port 160.

As shown in FIG. 41 and FIG. 42, the outer layer member 163 is arranged to face the middle layer member 158 with a clearance therebetween. The outer layer member 163 is provided with a protruding portion 167 that protrudes in the machine inward direction, and is contacted to the middle layer member 158. The protruding portion 167 is attached to the middle layer member 158 with a bolt 168.

As shown in FIG. 41, FIG. 42, and FIG. 43, the outer layer member 163 forms a third outside air inlet port 166 that is displaced so as not to overlap the front portion 163A with respect to the second outside air inlet port 160 in the horizontal direction. That is, the third outside air inlet port 166 is formed in a portion that is not opposed to the second outside air inlet port 160. The third outside air inlet port 166 is a gap between the outer edge portion of the outer layer member 163 and the middle layer member 158. Accordingly, the outer layer member 163 forms a third outside air inlet port 166 that is displaced so as not to overlap the second outside air inlet port 160 in the horizontal direction. The third outside air inlet port 166 is a front gap 166*a*, an upper gap 166*b*, and a lower gap 166*c*. The front gap 166 *a* is a gap between the middle layer member 158 and the front edge 163*a* of the outer layer member 163. The upper gap 166*b* is a gap between the middle layer member 158 and the upper edge portion 163*b* of the outer layer member 163. The lower gap 166*c* is a gap between the middle layer member 158 and the lower edge 163*c* of the outer layer member 163.

As shown in FIG. 40 and FIG. 41, the inner surface of the rear portion of the front portion 163A (the middle portion of the outer layer member 163 in the front-rear direction) is in contact with the seal material 165. Thus, the seal member 165 closes the back of the second outside air inlet port 160 between the outer layer member 163 and the middle layer member 158, that is, closes between the upper edge portion 163*b* of the outer layer member 163 and the lower edge portion. In this manner, the seal material 165 prevents the second outside air inlet port 160 from sucking the air in the prime mover room E2 from the rear edge side of the outer layer member 163. The width of the front gap 166*a* is larger than the widths of the upper gap 166*b* and the lower gap 166*c*. In particular, the width of the front gap 166*a* is formed to be wider than the upper and lower portions at an intermediate portion (a portion that occupies most of the front gap 166*a*), and the intermediate portion is larger than the widths of the upper gap 166*b* and the lower gap 166*c*.

The opening areas of the first outside air inlet port 154, the second outside air inlet port 160, and the third outside air inlet port 166 are substantially equal. In this manner, the pressure loss of the air flowing from the third outside air inlet port 166 to the second outside air inlet port 160 can be reduced, and the pressure loss of the air flowing from the second outside air inlet port 160 to the first outside air inlet port 154 also can be reduced.

The outside air taken in from the third outside air inlet port 166 (the front gap 166*a*, the upper gap 166*b*, and the lower gap 166*c*) flows through the second outside air inlet port 160, the first outside air inlet port 154, and the outside air introduction duct 155, and then is introduced into the air conditioner main body 136. Since the water that has entered through the front gap 166*a* and the upper gap 166*b* does not directly hit the second outside air inlet port 160 at the time of car washing, rain, and the like, that provides a low possibility that the water enters from the second outside air inlet port 160. In addition, the water that has entered from the front gap 166*a* and the upper gap 166*b* is released from the lower gap 166*c* to the outside. Even when the water enters a portion between the plate portion 156 and the cover wall portion 158*b* (the middle layer member 158) from the second outside air inlet port 160, the first outside air inlet port 154 is displaced above with respect to the second outside air inlet port 160. Thus, the entering water does not easily enter the room of the cabin 5 through the first outside air inlet port 154. Even when the water enters a portion between the plate portion 156 and the middle layer member 158 from the second outside air inlet port 160, the entering water is dropped downward by the flange-shaped portion 161. The water that has dropped downward accumulates on the lower end 158*e* and the front lower wall 122A, and the accumulated water is discharged to the outside through the water drain gap 162.

As described above, the outside air inlet portion 152 has a three-layer structure including the inner layer member 153, the middle layer member 158, and the outer layer member 163, and the first outside air inlet port 154, the second outside air inlet port 160, and the third outside air introduction port 166 are displaced from each other (are arranged at positions not lined up in a straight line). Thus, the structure has an excellent effect of preventing the water from entering the air conditioner main body 136 from the outside. In addition, in the present embodiment, the outside air inlet portion 152 is arranged in the vicinity of the air intake portion 136*a* of the air conditioner main body 136 by providing the outside air inlet portion 152 on the side of the cabin 5 in the machine outward direction. In this manner, the length of the outside air introduction duct 155 that connects between the outside air inlet portion 152 and the air intake portion 136*a* can be shortened to reduce the pressure loss of the intake air, and thus the intake efficiency can be improved.

As shown in FIG. 40 and FIG. 43, the rear portion 163B of the outer layer member 163 includes an open portion 169 and an opening/closing lid 170 configured to open and close the open portion 169.

The air conditioner main body 136 includes a switching mechanism configured to switch the air conditioner main body 136 between a state in which the outside air is taken in and a state in which the air in the room of the cabin 5 (the inside air) is taken in. The inside air is taken from the rear of the operator seat 6.

As shown in FIG. 38, the air conditioner main body 136 has a blower portion 136*b* for outputting the mixed air. The blower portion 136*b* outputs the mixed air toward the right. The right side of the cabin 5A is provided with the duct device 171 that distributes the mixed air sent from the air conditioner main body 136 and outputs the mixed air to the room of the cabin 5. The duct device 171 includes a first air duct (blower duct) 172, a second air duct 173, and a connector duct 174.

Figure 45:
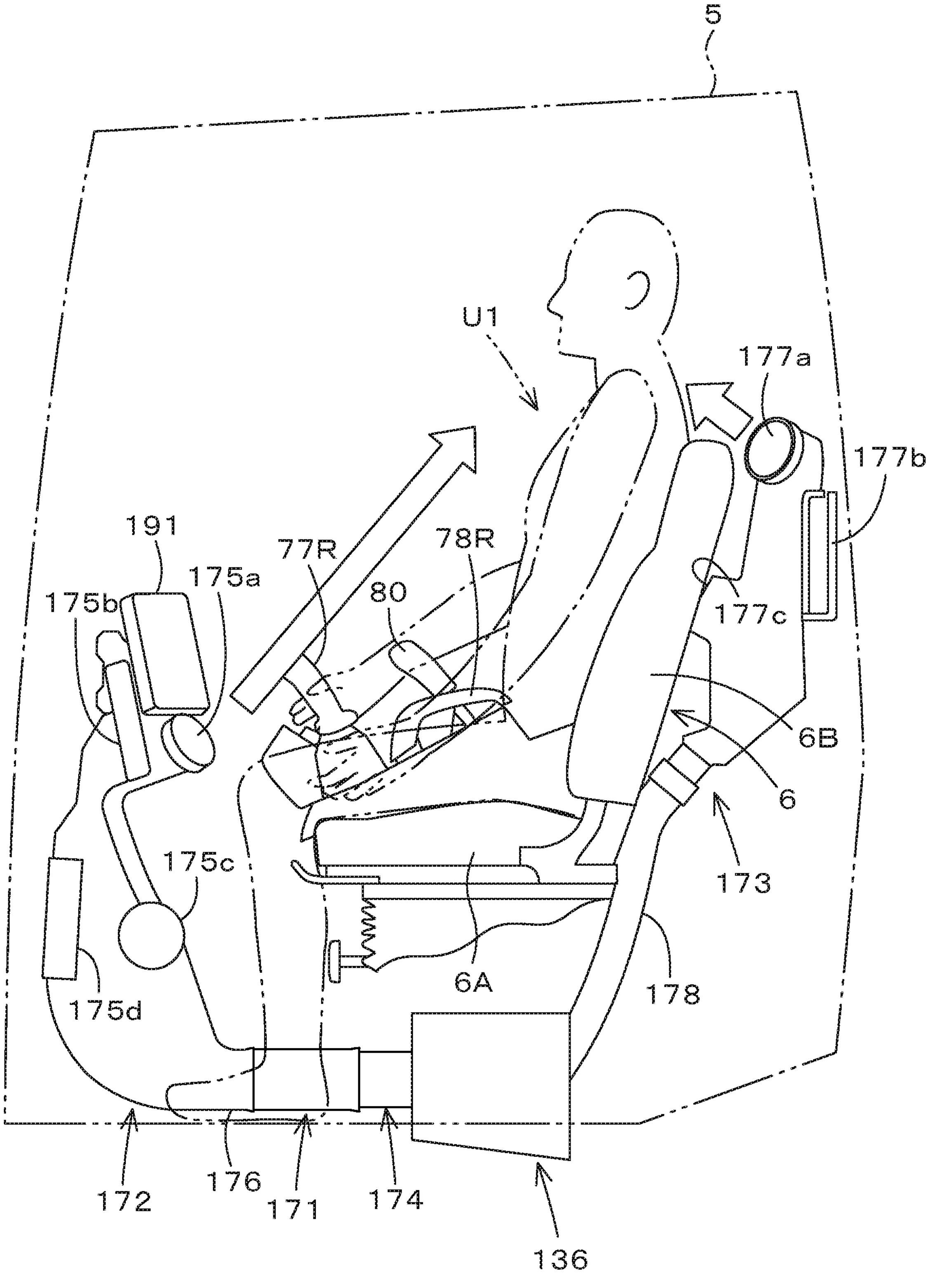
FIG. 45 is a side view of a room of the cabin according to the embodiment.
Figure 46:
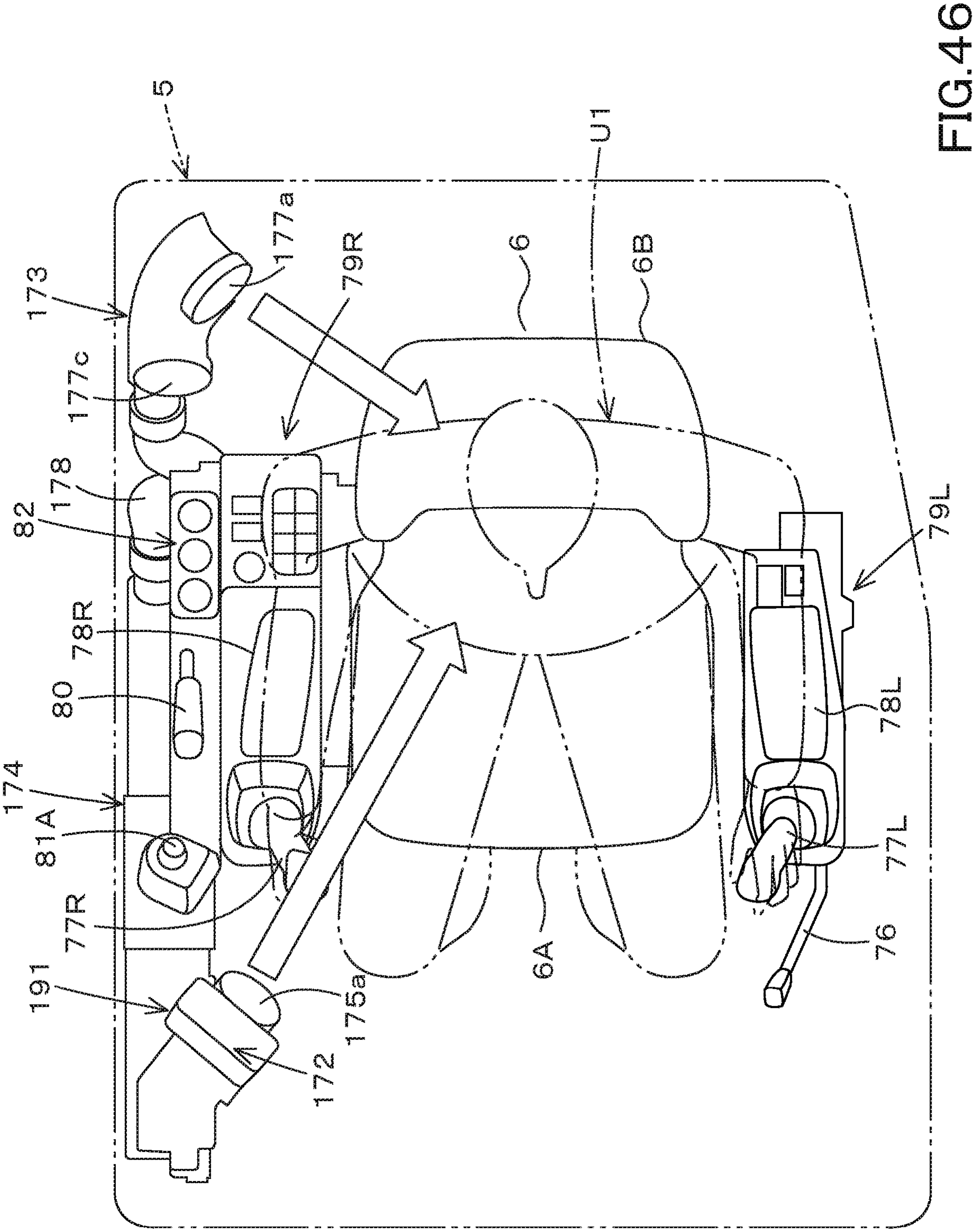
FIG. 46 is a planar view of the room of the cabin according to the embodiment.

As shown in FIG. 38, FIG. 45, and FIG. 46, the first air duct 172 is arranged in the right front portion of the room of the cabin 5. The first air duct 172 is arranged longitudinally on the front side of the front support column 112R arranged to the right. The first air duct 172 is attached to the cabin 5. The first air duct 172 has a first blowout portion (blower portion) that outputs the mixed air from the air conditioner main body 136 into the room of the cabin 5. The first blowout portion includes a plurality of blowout ports (the first blowout port 175*a* to the first blowout port 175*d*). The first blowout port 175*a* is provided in the upper portion of the first air duct 172, and blows off the mixed air toward the head (the face) of operator U1. The first blowout port 175*b* is provided on a front side of the first blowout port 175*a*, serves as a defroster, and blows out the mixed air toward the front panel provided on the front surface of the cabin 5. The first blowout port 175*c* is provided in the lower portion of the first air duct 172, and blows off the mixed air toward the foot of operator U1. The first blowout port 175*c* is used mainly as a blowout port for the heating. The first blowout port 175*d* is arranged in front of the first blowout port 175*c*, and blows out the mixed air from the lower portion of the first air duct 172 toward the left. The first air duct 172 has the intake port 176 which takes in the mixed air in the rear portion of the lower portion. The intake port 176 opens toward the rear, and the connector duct 174 is connected from the rear.

As shown in FIG. 38, FIG. 45, and FIG. 46, the second air duct 173 is arranged in the right rear portion of the cabin 5. The second air duct 173 is arranged longitudinally on the front side of the rear support column 113R. The second air duct 173 is attached to the cabin 5. The second air duct 173 has the second blowout portion (blower portion) which blows off the mixed air from the air-conditioner main body 136 into the room of the cabin 5. The second blowout portion includes a plurality of blowout ports (including the second blowout port 177*a* to the second blowout port 177*c*). The second blowout port 177*a* blows out the mixed air toward the head (neck) of the operator U1. The second blowout port 177*b* serves as a defroster, and blows out the mixed air toward the rear panel provided on the rear surface of the cabin 5. The second blowout port 177*c* is arranged at a side position of the backrest 6B, and blows out the mixed air forward. The second air duct 173 has a connector pipe 178 connected to the connector duct 174. The connector pipe 178 is constituted of a hose or the like.

As shown in FIG. 38, the connector duct 174 connects the air conditioner main body 136 with the first air duct 172 and the second air duct 173. The connector duct 174 guides the mixed air sent from the air conditioner main body 136 to the first air duct 172 and the second air duct 173.

FIG. 38, FIG. 47, FIG. 48, and FIG. 49, the connector duct 174 includes the first duct member 179, the second duct member 180, and the third duct member 181. The first duct member 179 has a first air guide portion 182 and a second air guide portion 183. The first air guide portion 182 is arranged to the right side of the blower portion 136*b*, and extends so as to extend in the machine width direction K2. The second air guide portion 183 is arranged behind the intake port 176, and extends so as to extend in the front-rear direction K1. Each of the first air guide portion 182 and the second air guide portion 183 is formed in a cylindrical shape, and is connected to the right end portion of the first air guide portion 182 and to the rear end portion of the second air guide portion 183 and thereby integrated.

Figure 47:
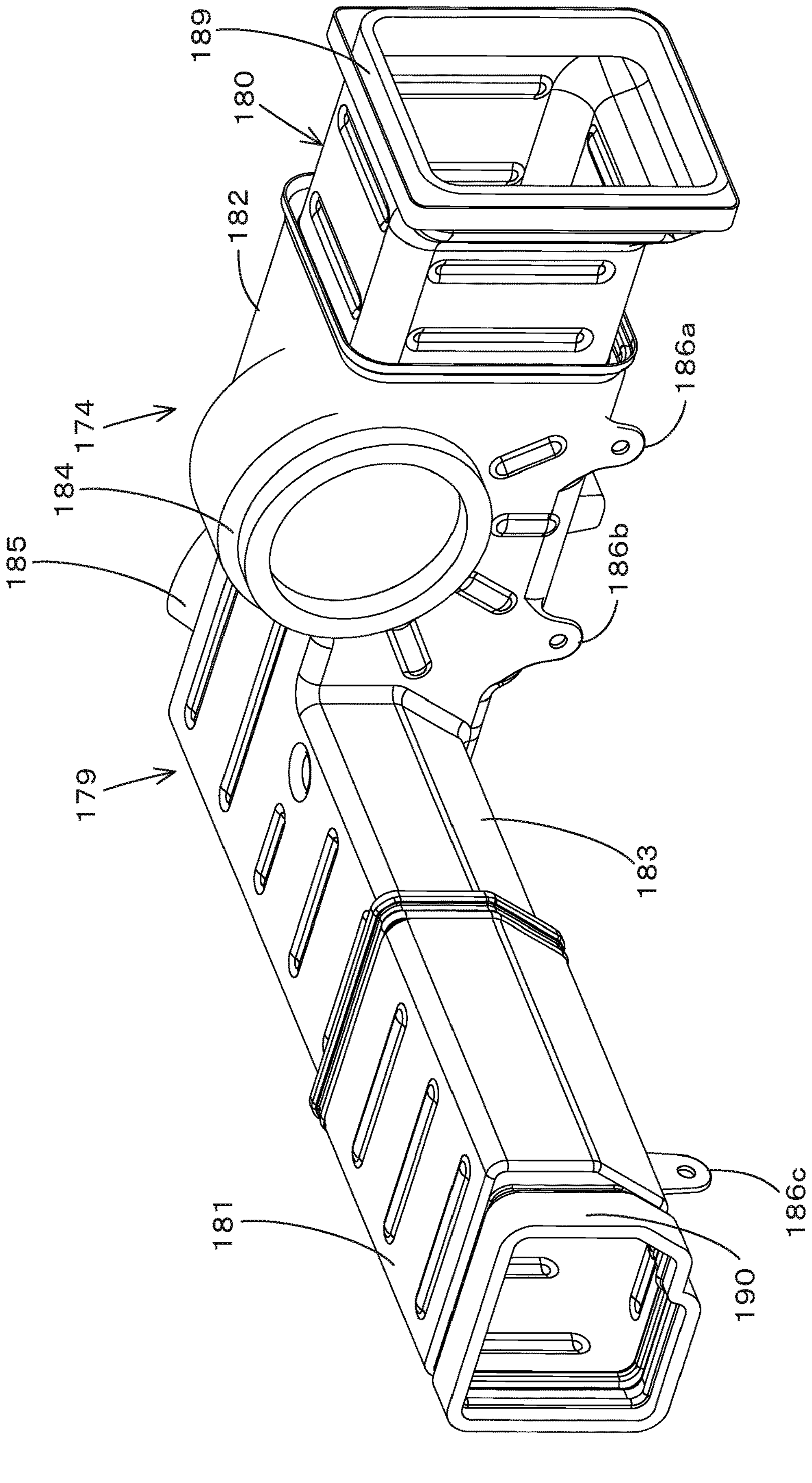
FIG. 47 is a perspective view of a connector duct according to the embodiment.
Figure 48:
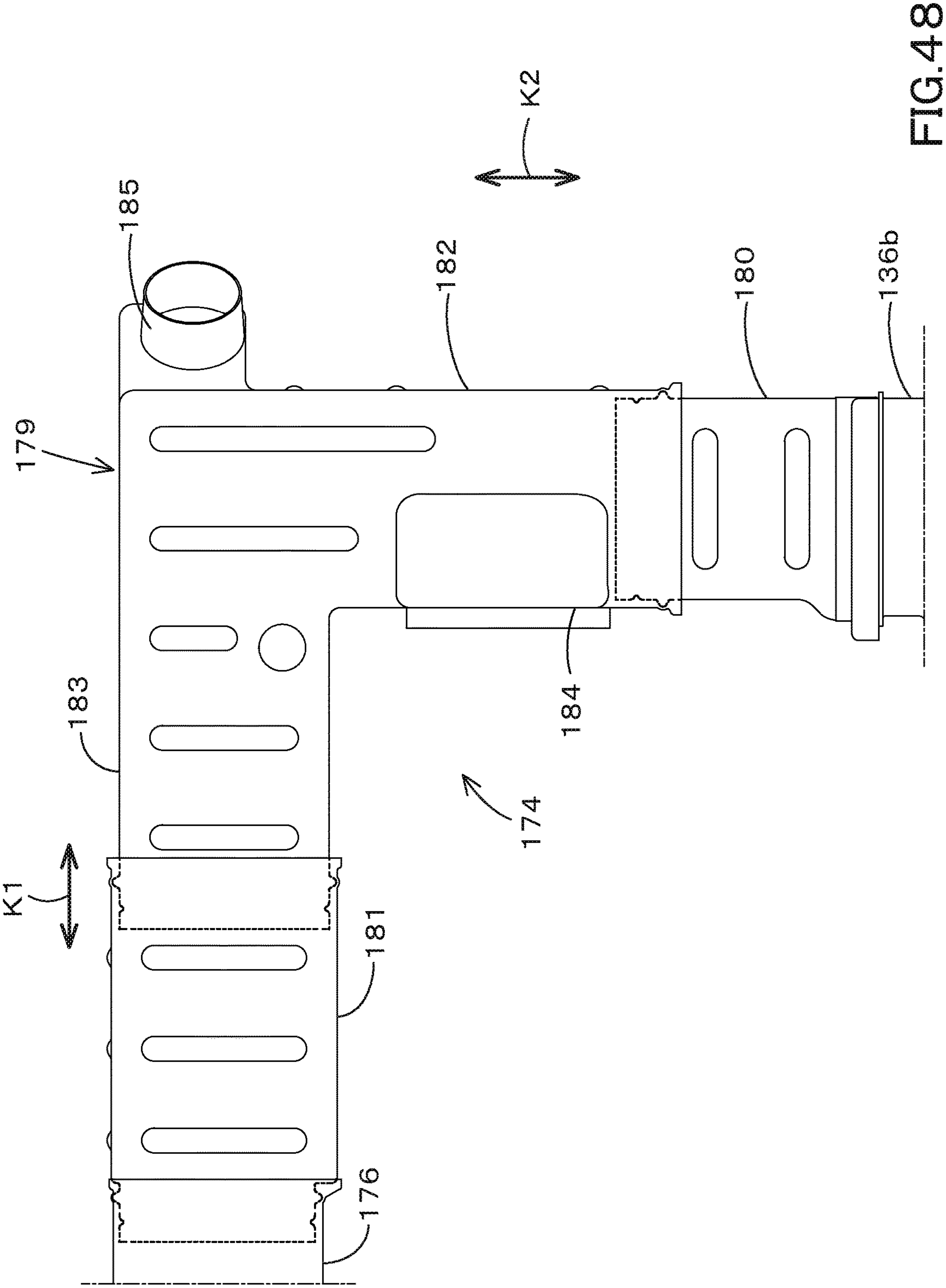
FIG. 48 is a planar view of the connector duct according to the embodiment.
Figure 49:
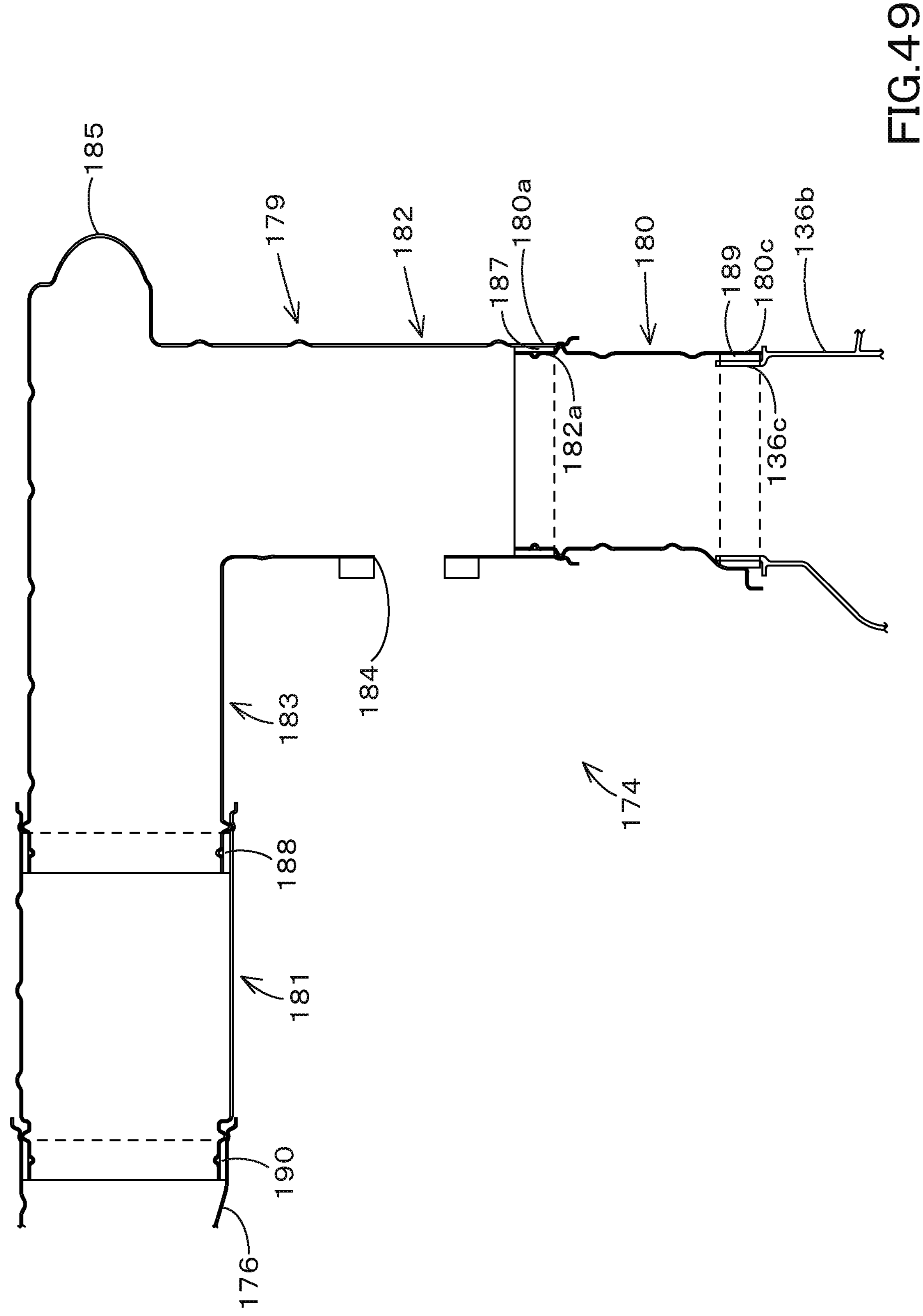
FIG. 49 is a planar cross-section view of the connector duct according to the embodiment.

As shown in FIG. 47, FIG. 48, and FIG. 49, a third blowout port 184 that blows the mixed air forward is provided at the front portion of the first air guide portion 182. The first duct member 179 has a duct connector portion 185 provided at the rear portion of the connection portion between the first air guide portion 182 and the second air guide portion 183. A connector pipe 178 is connected to the duct connector portion 185. At the lower portion of the front portion of the first air guide portion 182, attachment pieces 186*a* and 186*b* attached to the step 52 via attachment members are provided (see FIG. 47).

As shown in FIG. 48 and FIG. 49, the second duct member 180 is arranged between the first air guide portion 182 and the blower portion 136*b*, and is configured to guide, to the first air guide, the mixed air sent from the blower portion 136*b*. The left portion of the second duct member 180 is connected to the blower portion 136*b* (air-conditioner main body 136). The second duct member 180 is configured to be expanded and contracted in a forward direction and a backward direction with respect to the first duct member 179, and is supported by the first duct member 179. In particular, the second duct member 180 has one end formed in a cylindrical shape having a cross-sectional shape corresponding to the cross-sectional shape of the first air guide portion 182, and is fitted inside the first air guide portion 182. And, the other end side is formed in a cylindrical shape having a cross-sectional shape corresponding to the shape of the blower port 136*b*, and is fitted to the outside of the blower port 136*b*, by When the second duct member 180 is expanded and contracted, the second duct member 180 can be easily attached to and detached from the first air guide portion 182 and the blower portion 136*b*.

As shown in FIG. 48 and FIG. 49, the third duct member 181 is arranged between the first air guide portion 182 and the intake port 176, and is configured to guide, to the intake port 176, the mixed air sent from the first air guide portion 182 through the second air guide portion 183. The front portion of the third duct member 181 is connected to the intake port 176. The third duct member 181 is configured to be expanded and contracted in a forward direction and a backward direction with respect to the first air duct 172, and is supported by the first duct member 179. In particular, the third duct member 181 has one end formed in a cylindrical shape having a cross-sectional shape corresponding to the cross-sectional shape of the second air guide portion 183, and is fitted to the outside of the second air guide portion 183. And, the other end side is formed in a cylindrical shape having a cross-sectional shape corresponding to the cross-sectional shape of the intake port 176, and is fitted to the outside of the intake port 176. When the third duct member 181 is expanded and contracted, the third duct member 181 can be easily attached to and detached from the second air guide portion 183 and the intake port 176.

As shown in FIG. 47, an attachment piece 186*c* attached to the step 52 via an attachment member is provided at the lower portion of the front portion of the third duct member 181.

The cross-sectional shapes of the first air guide portion 182, the second air guide portion 183, the second duct member 180, and the third duct member 181 effectively utilize a limited installation space to increase the cross-sectional area. In order to reduce the pressure loss during the blowing and to distribute a large volume of wind, the cross-sectional shapes are preferable to employ a rectangle or a shape approximate to a rectangle. However, it may be a cylindrical shape with a circular cross section.

As shown in FIG. 49, a connection portion between the first air guide portion 182 and the second duct member 180 is provided with a first cushion material 187, and the connection portion between the second air guide portion 183 and the third duct member 181 is provided with a second cushion material 188. In addition, a third cushion material 189 is provided at a connection portion between the second duct member 180 and the blower portion 136*b*, and a fourth cushion material 190 is provided at a connection portion between the third duct member 181 and the intake port 176.

Figure 50:
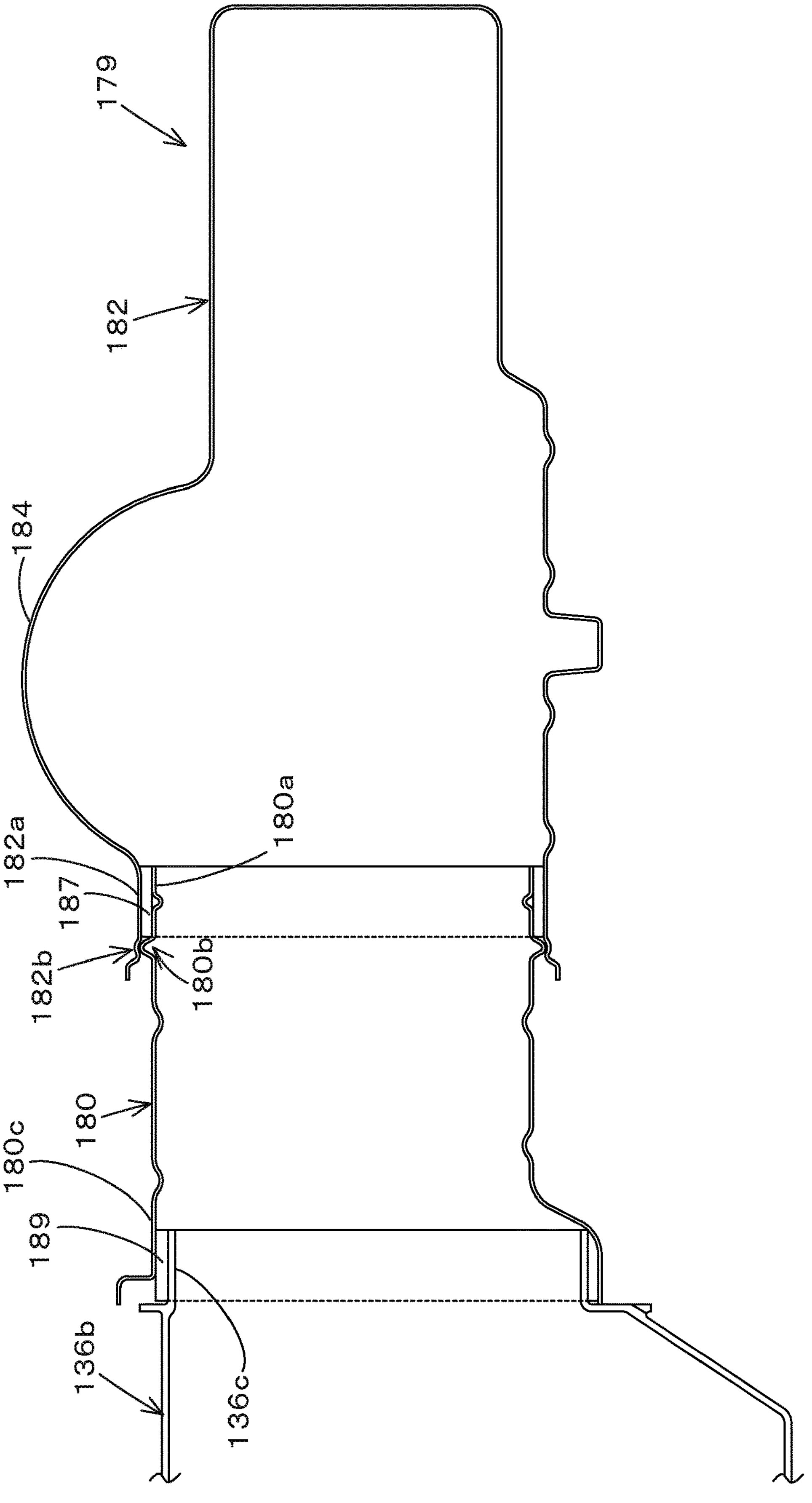
FIG. 50 is a back cross-section view of a first air-guiding portion and a second duct member according to the embodiment.
Figure 51:
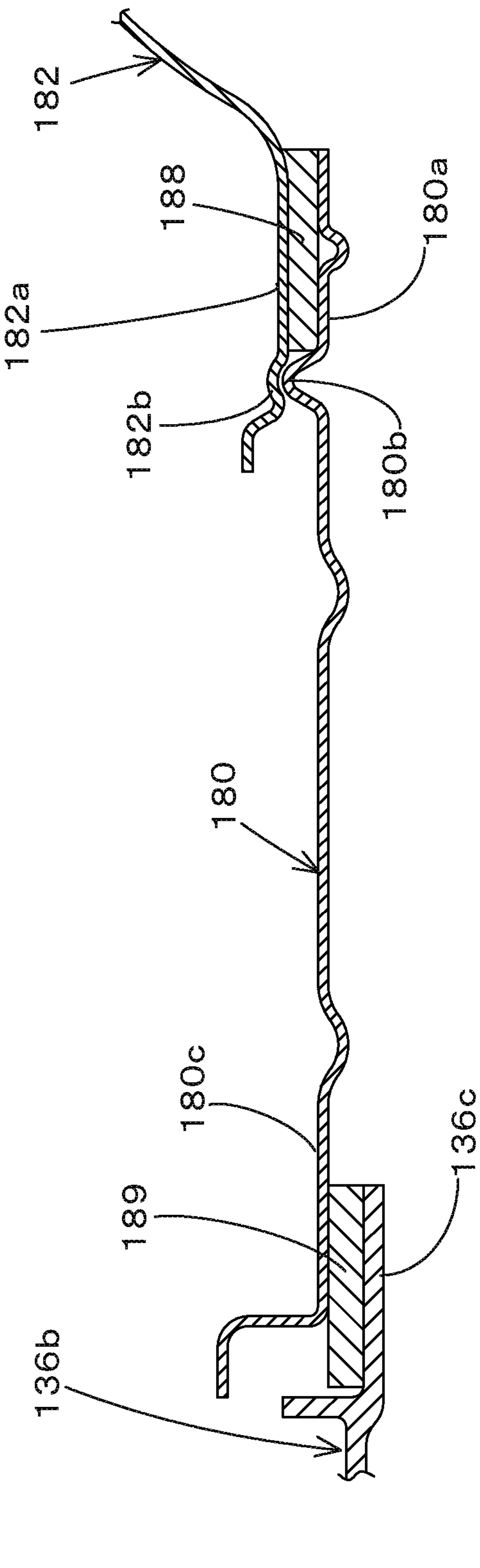
FIG. 51 is an enlarged cross-section view of a second duct member and a connector portion according to the embodiment.

As shown in FIG. 50 and FIG. 51, the first cushion material 187 is provided between the second duct member 180 and the first air guide portion 182. In particular, the first cushion material 187 is provided between the end connection port 180*a* of the second duct member 180 and the end connection port 182*a* of the first air guide portion 182, and circularly surrounds the end connection port 180*a* to be formed in an annular shape (see the third cushion material 189 shown in FIG. 47). For example, the first cushion material 187 is fixed to the end connection port 180*a*.

As shown in FIG. 50 and FIG. 51, the third cushion material 189 is provided between the second duct member 180 and the blower portion 136*b*. In particular, the third cushion material 189 is provided between the end connection port 180*c* of the second duct member 180 and the end connection port 136*c* of the blower port 136*b*, and is formed in an annular shape surrounding the end connection port 136*c* (see FIG. 47). The third cushion material 189 is fixed to the end connection port 136*c*, for example.

As shown in FIG. 50 and FIG. 51, the end connection port 180*a* is formed with a first protrusion 180*b* having an annular shape that protrudes outward from the second duct member 180 and is provided over the entire circumference. The end connection port 182*a* is provided with a first engagement portion 182*b* that restricts the movement of the second duct member 180 in the machine width direction K2 by engaging with the first protrusion 180*b*. The first engaging portion 182*b* is configured to be elastically deformed. By forcibly pushing the second duct member 180 into the first air guide portion 182, the first engaging portion 182*b* is pressed by the first protrusion 180*b* and elastically expanded outward, thereby allowing the second duct member 180 to move.

Figure 52:
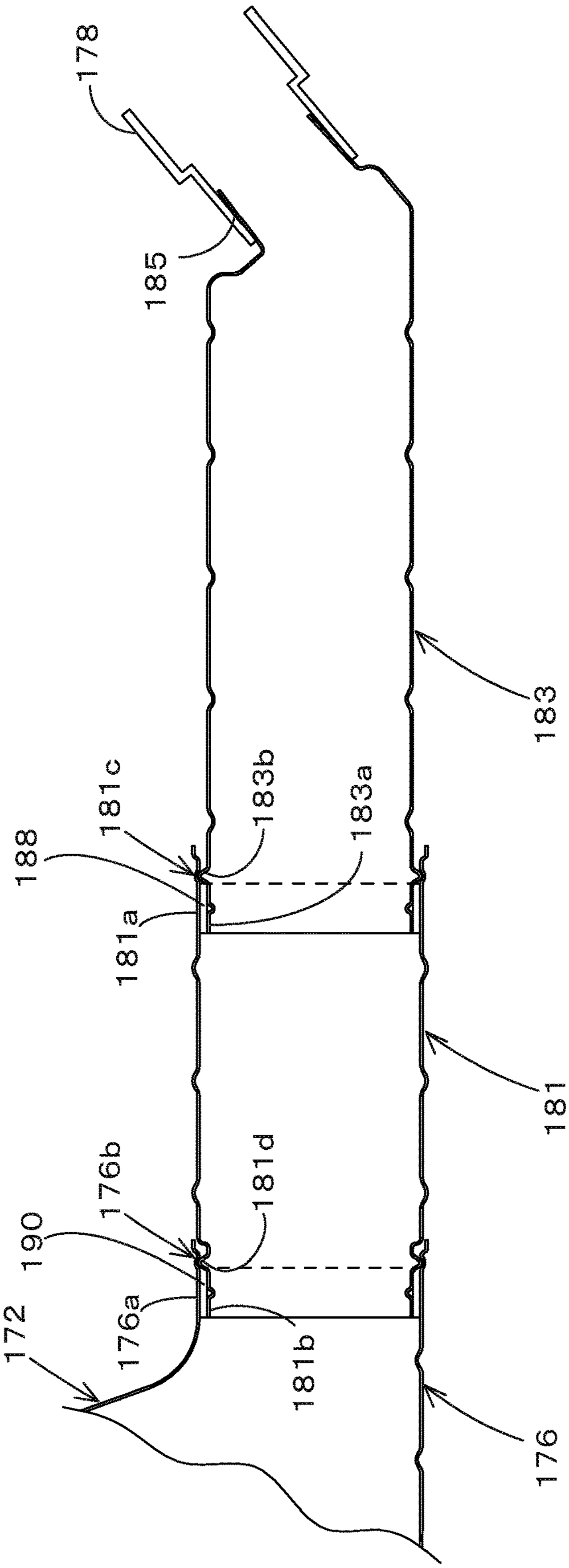
FIG. 52 is a side cross-section view of a second air-guiding portion and a third duct member according to the embodiment.
Figure 53:
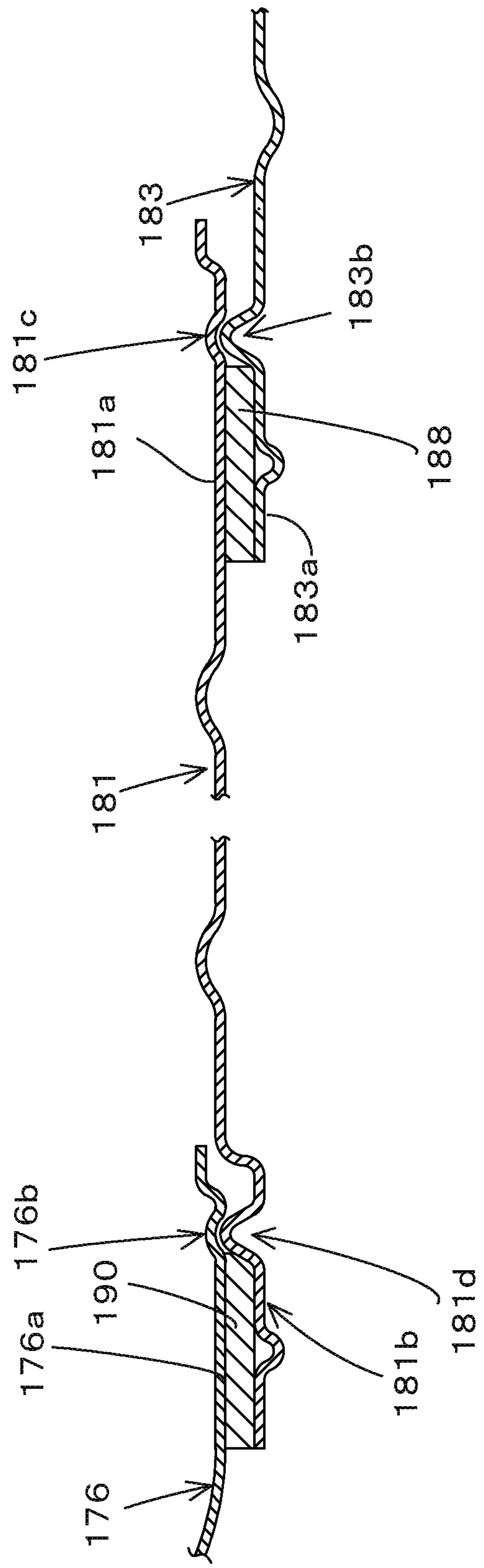
FIG. 53 is an enlarged cross-section view of the third duct member and a connector portion according to the embodiment.

As shown in FIG. 52 and FIG. 53, the second cushion material 188 is provided between the third duct member 181 and the second air guide portion 183. In particular, the third cushion material 188 is provided between the end connection port 181*a* of the third duct member 181 and the end connection port 183*a* of the second air guide portion 183, and circularly surrounds the end connection port 183*a* to be formed in an annular shape (see the fourth cushion material 190 shown in FIG. 47). The second cushion material 188 is fixed to the end connection port 183*a*, for example.

As shown in FIG. 52 and FIG. 53, the fourth cushion material 190 is provided between the third duct member 181 and the intake port 176. In particular, the fourth cushion material 190 is provided between the end connection port 181*b* of the third duct member 181 and the end connection port 176*a* of the intake port 176, and is formed in an annular shape surrounding the end connection port 181*b* (see FIG. 47). For example, the fourth cushion material 190 is fixed to the end connection port 176*a*.

As shown in FIG. 52 and FIG. 53, the end connection port 183*a* is formed with a second protrusion 183*b* having an annular shape that protrudes outward from the second air guide portion 183 and is provided over the entire circumference. The end connection port 181*a* is provided with a second engagement portion 181*c* that restricts the movement of the third duct member 181 in the front-rear direction K1 by engaging with the second protrusion 183*b*. The second engaging portion 181*c* is configured to be elastically deformed.

The end connection port 181*b* is provided with a third protrusion 181*d* having an annular shape that protrudes outward from the third duct member 181 and is provided over the entire circumference. The end connection port 176*a* is provided with a third engagement portion 176*b* that restricts the movement of the third duct member 181 in the front-rear direction K1 by engaging with the third protrusion 181*d*. The third engaging portion 176*b* is configured to be elastically deformed.

By forcibly moving the third duct member 181 rearward, the second engagement portion 181*c* is pressed by the second protrusion 183*b* to be elastically expanded, and the engaging portion 176*b* is pressed by the third protrusion 181*d* to be elastically expanded. In this manner, the movement of the third duct member 181 is allowed.

The air conditioner main body 136 and the connector duct 174 are fixed to the machine body 2, and the first air duct 172 is fixed to the cabin 5 that is supported by the machine body 2 in the vibration isolation manner, and the vibration phases of the machine body 2 and the cabin 5 are different. The first cushion material 187 to the fourth cushion material 190 absorb the vibration of the machine body 2, and prevent the first air duct 172 and the air conditioner main body 136 from being damaged due to the different vibration phases of the machine body 2 and the cabin 5. In addition, the first cushion material 187 to the fourth cushion material 190 have a function as a sealing material.

Figure 54:
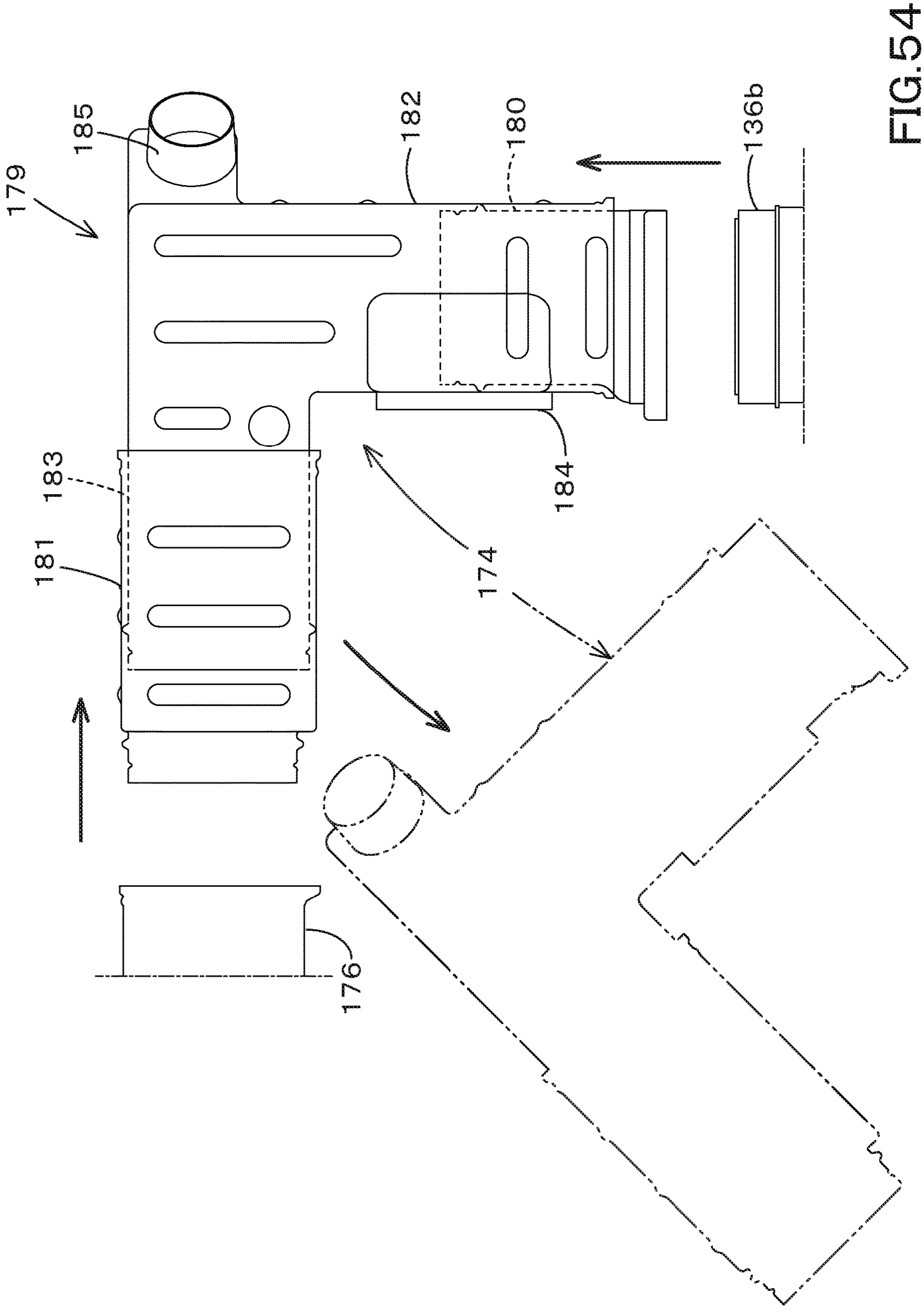
FIG. 54 is a planar view illustrating a state of the connector duct that is being attached and detached according to the embodiment.

At the time of maintenance or the like, as shown in FIG. 54, the connector pipe 178 is removed from the duct connector portion 185, the second duct member 180 is slid (contracted) to the right and inserted into the first air guide portion 182, the third duct member 181 is slid (contracted) rearward to be positioned outside the second air guide portion 183, and then the connector duct 174 is contracted. In this manner, the connector duct 174 can be easily removed from between the air blowout port 136*b* and the intake port 176.

In addition, in assembling the cabin 5 to the machine body 2, first, the connector duct 174 is temporarily contracted (the state shown in FIG. 54) and temporarily placed in an unobstructed place on the machine body 2 (the step 52). After the cabin 5 is assembled to the machine body 2, the connector duct 174 is arranged between the blower portion 136*b* and the intake port 176, the connector duct 174 is connected to the blower portion 136*b* and the intake port 176 in the procedure inverse to the above, and the second air duct 173 is connected to the connector duct 174. In this manner, the assembly can be performed efficiently.

Figure 55:
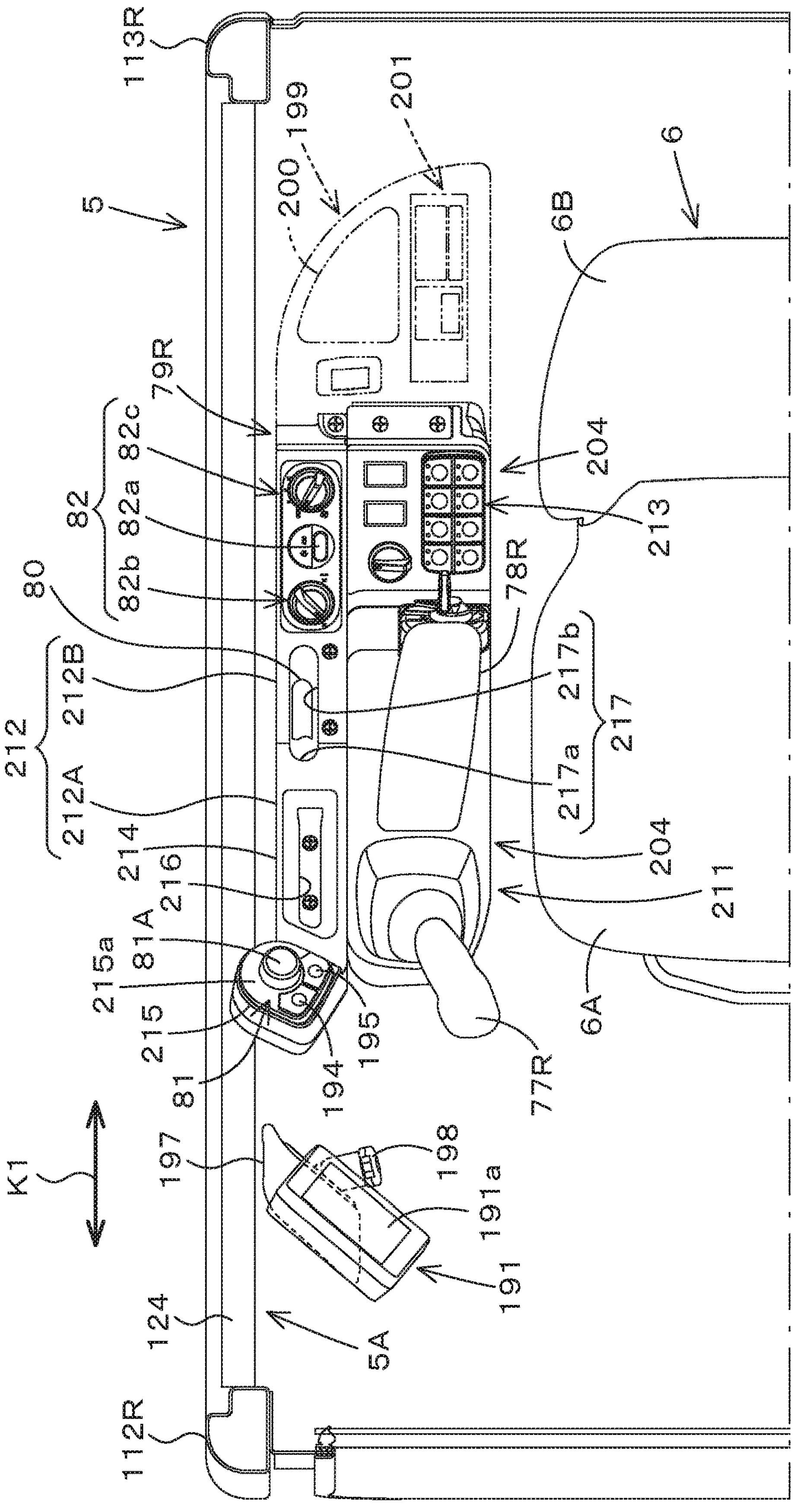
FIG. 55 is a planar view illustrating a right portion of the room of the cabin according to the embodiment.

As shown in FIG. 55, the console 79R arranged to the right is arranged between the operator seat 6 and the cabin 5 (the side wall 5A arranged to the right). A display device 191 to be operated by a jog dial 81A is provided in front of the console 79R. The display device 191 is arranged in front of the jog dial 81A. In addition, the display device 191 is provided diagonally forward (right diagonally forward) from the operator seat 6. In particular, the display device 191 is provided between the front support column 112R and the operator seat 6, which is a position that do not interfere with the watching of the working state of the working device 4. The display device 191 is arranged in front of the operation lever 77R. In particular, the display device 191 is arranged in front of and between the jog dial 81A and the operation lever 77R. In other words, the display device 191 is arranged in front of and between the operation lever 77R and the dozer lever 80.

Figure 56:
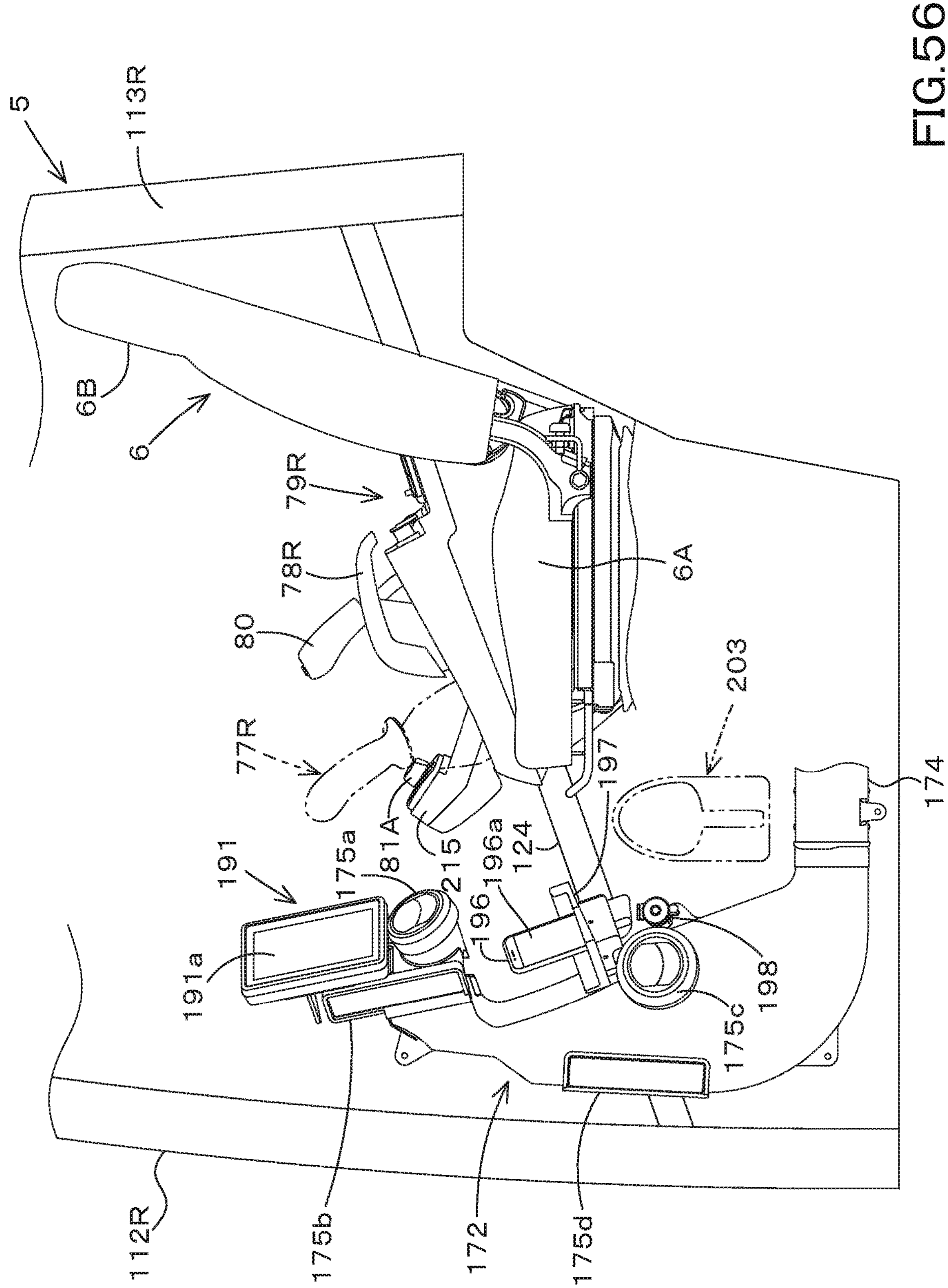
FIG. 56 is a side view illustrating the right portion of the room of the cabin according to the embodiment.
Figure 57:
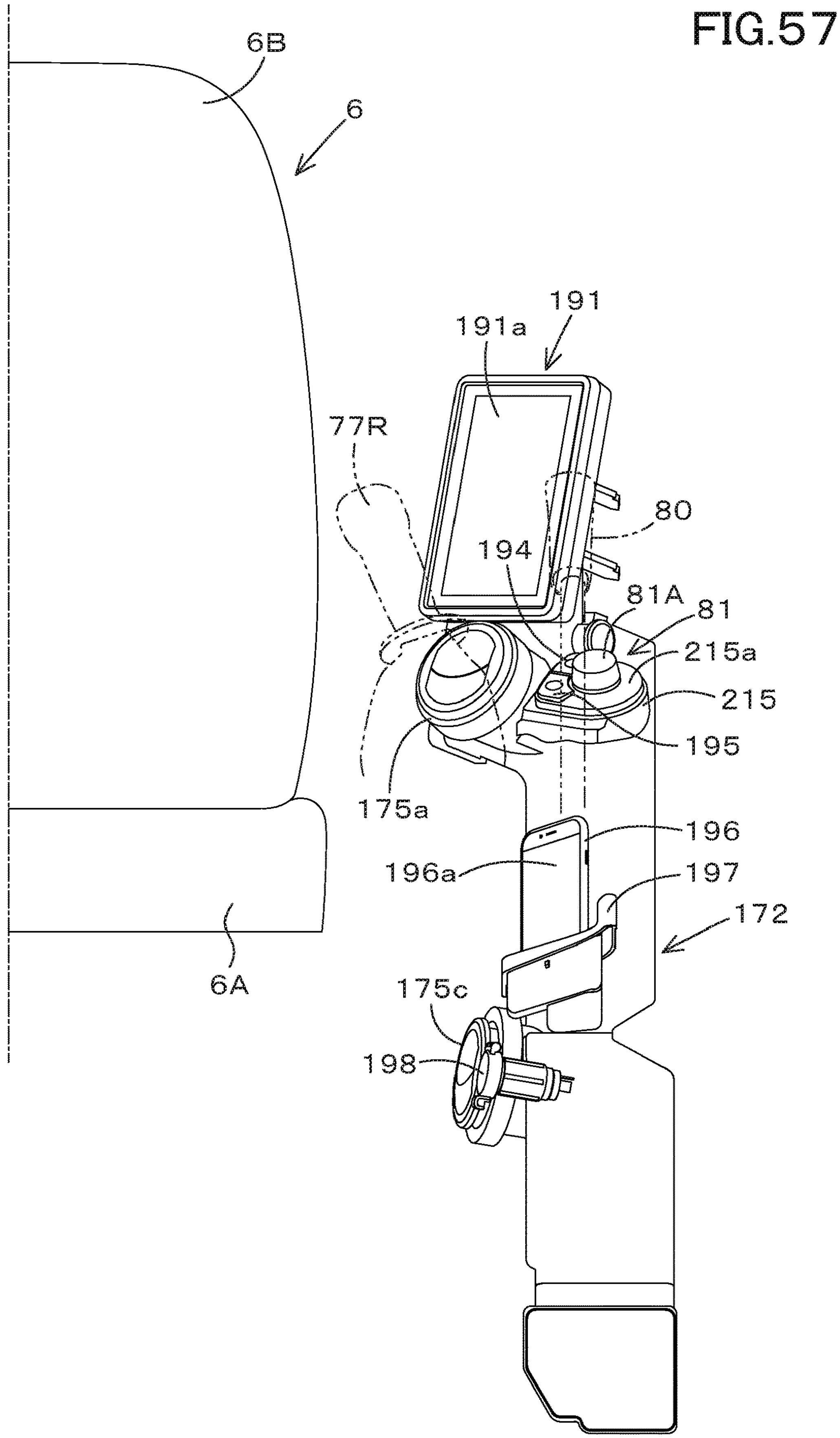
FIG. 57 is a back view illustrating the right portion of the room of the cabin according to the embodiment.

As shown in FIG. 56 and FIG. 57, the display device 191 has a part or all of the display screen arranged above the upper end portion of the operation lever 77R. In addition, the operator visually recognizes the display device 191 while looking down at the display device 191. In this manner, the operation lever 77R does not interfere with the operator who looks at the display device 191.

Figure 58:
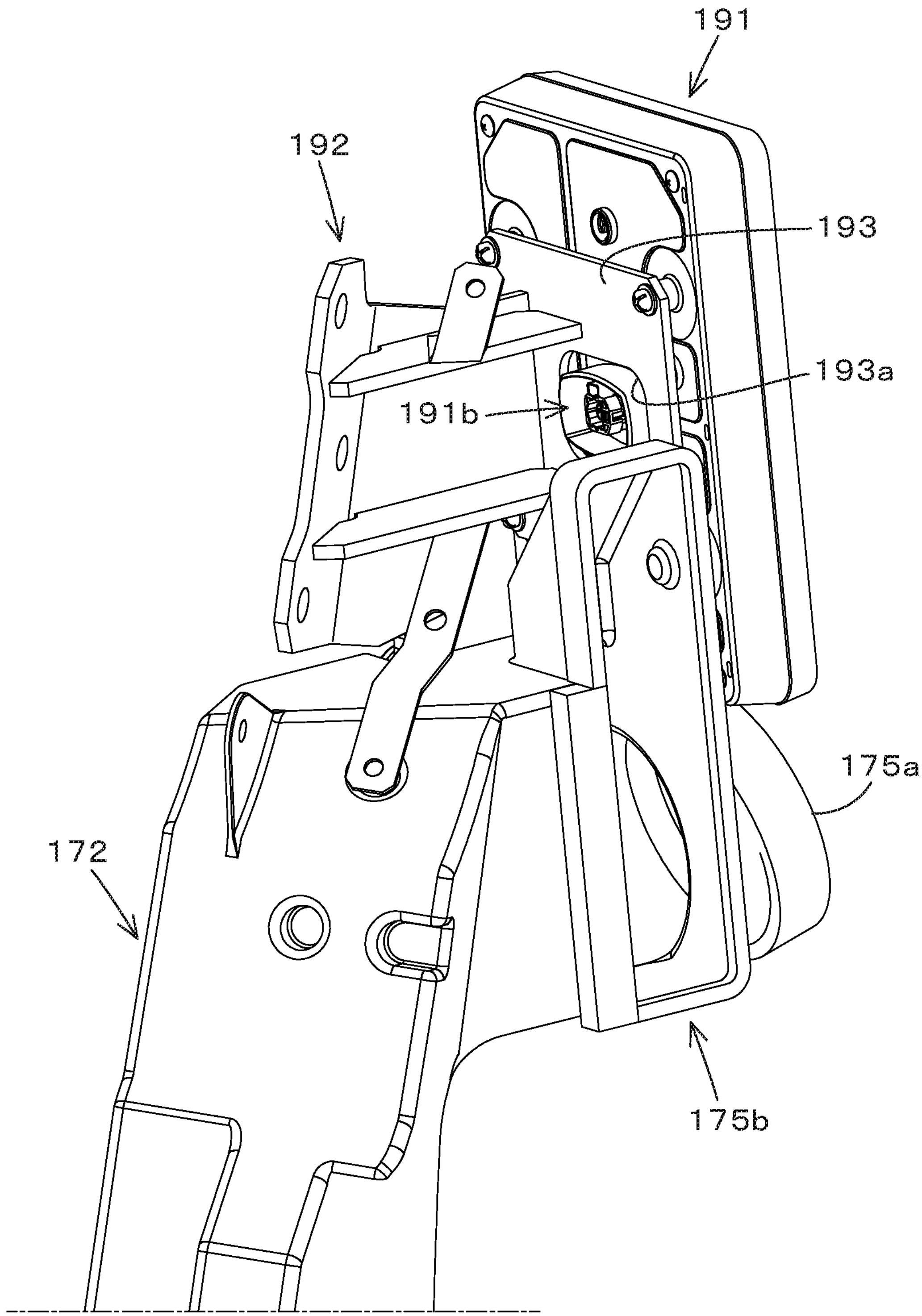
FIG. 58 is a perspective view illustrating attachment of a display device according to the embodiment.

As shown in FIG. 56, the display device 191 is provided on the upper portion of the first air duct 172. In particular, as shown in FIG. 58, an attachment bracket 192 is provided on the upper portion of the first air duct 172, and an attachment plate 193 for attaching the display device 191 is provided on the attachment bracket 192. The attachment plate 193 is formed with a through hole 193*a* through which the connection terminal 191*b* of the display device 191 is inserted. The attachment bracket 192 is a bracket that supports the first air duct 172 on the cabin 5. The first blowout port 175*a* is provided below the display device 191, and the first blowout port 175*b* is provided on the front side of the display device 191.

As shown in FIG. 55 to FIG. 57, the display device 191 includes a display portion (display surface) 191*a* that performs the displaying. The display portion 191*a* faces the backrest portion 6B and is provided facing slightly upward. In other words, the display portion 191*a* is arranged to be inclined with respect to the front-rear direction K1 and the vertical direction so that the normal direction of the display screen faces the face of the operator seated on the operator seat 6.

The display portion 191*a* displays, for example, basic information of the working machine 1, images around the working machine 1, information necessary for performing the various settings of the working machine 1, and the like. The basic information includes, for example, operating conditions, mode changings, various settings, warnings, remaining fuel, time (clock time), and the like. The image around the working machine 1 is, for example, an image of the side or back of the working machine 1. The information necessary for performing the various settings of the working machine 1 is information necessary for the machine settings such as the height control setting, the AI (auto idle) control setting, the arm restriction setting, and the like. The display items to be displayed on the display portion 191*a* described above are examples and are not limited thereto.

As shown in FIG. 55, one or a plurality of button operating portions to be pressed by the operator is provided in the vicinity (to the left side) of the jog dial 81A. In this embodiment, the plurality of button operating portions are provided. In particular, the button operating portion includes a first switch 194 and a second switch 195. The first switch 194 and the second switch 195 are arranged side by side in the front-rear direction (the vertical direction). Each of the jog dial 81A, the first switch 194, and the second switch 195 is the first operation tool 81 for operating the display items displayed on the display portion 191*a*. The jog dial 81A is configured to be rotated, and changes a candidate from among the plurality of selection items displayed on the display portion 191*a* by performing the rotation operation. In addition, the jog dial 81A is configured to be pressed, and the selection item is determined by being pressed. The first switch 194 returns the display portion 191*a* to the home screen (an initial screen) by being pressed. The second switch 195 cancels the selection item determined by the pressing operation. Note that the functions of the first switch 194 and the second switch 195 may be replaced each other.

As shown in FIG. 55, the jog dial 81A is arranged utilizing a vacant space formed in front of the dozer lever 80. The second operation tool 82 is arranged behind the dozer lever 80. In addition, the jog dial 81A is arranged on the front side of the armrest 78R, on the side (the right side) of the operation lever 77R and in the vicinity of the operation lever 77R. The dozer lever 80 is arranged on the rear side of the operation lever 77R and on the side (the right side) of the armrest 78R. A clearance through which an operator's hand can be inserted is provided between the operation lever 77R and the dozer lever 80. In addition, the jog dial (the first operation tool) 81 is arranged at a position where an operator sitting on the operator seat 6 can operate the operation lever 77R and the jog dial 81A while putting his arm (forearm) on the armrest 78R. The operator can reduce the burden of operation of the display device 191 by operating the jog dial 81A with the arm rested on the armrest 78R. In addition, the operator can easily move his hand from the operation lever 77R to the jog dial 81A, or from the jog dial 81A to the operation lever 77R, and thus the operability is improved.

As shown in FIG. 55 to FIG. 57, the jog dial 81A is arranged behind the display device 191 and below the display device 191. In addition, the display device 191 and the jog dial 81A are arranged in front of and on the side of the backrest portion 6B of the operator seat 6. The jog dial 81A is arranged at a position in the field of view of an operator who sits on the operator seat 6 and views the display device 191. In other words, the display device 191 and the jog dial 81A are provided at close position (a short range) where the operator seated on the operator seat 6 can visually recognize in the same field of view. In this manner, the operator can operate the jog dial 81A while looking at the display device 191, and can easily operate the display device 191 intuitively.

As shown in FIG. 55 to FIG. 57, a mobile terminal holding portion 197 configured to hold the mobile terminal 196 is provided below the display device 191. The mobile terminal holding portion 197 holds the mobile terminal 196 under the state where the operator seated on the operator seat 6 can visually recognize at least a part of the display surface 196*a* of the mobile terminal 196. In addition, the mobile terminal holding portion 197 holds the mobile terminal 196 under the state where the mobile terminal 196 is inclined with respect to the front-rear direction K1 so that the display surface 196*a* of the mobile terminal 196 faces the operator seated on the operator seat 6. The mobile terminal holding portion 197 is arranged in front of and on the side of the seat portion 6A of the operator seat 6.

The mobile terminal 196 is, for example, a smartphone.

The jog dial 81A is arranged between the display device 191 and the mobile terminal holding portion 197 in the height direction. In addition, the display device 191, the jog dial 81A, and the mobile terminal holding portion 197 are arranged so as to be lined up and don in the back view. As described above, the display device 191, the jog dial 81A, and the mobile terminal holding portion 197 are provided in a close range that can be visually recognized in the same view field of the operator seated on the operator seat 6. In this manner, the display device 191 and the mobile terminal 196 can be browsed simultaneously, or the line of sight can be easily moved between the display device 191 and the mobile terminal 196. The operator can easily recognize not only the display device 191 but also the mobile terminal 196 during the working. In addition, the operator can visually recognize the display device 191 and the mobile terminal 196 while operating the jog dial 81A. In this manner, for example, by linking the mobile terminal 196 to the display device 191 through the wireless communication, one of the two display contents that can be displayed on the display device 191 is displayed on the display portion 191*a*, and the other can be displayed on the mobile terminal 196. It is also possible to display two different display contents in a close range.

As shown in FIG. 56 and FIG. 57, a power socket 198 that can be used to charge the mobile terminal 196 is arranged near and below the mobile terminal holding portion 197 (adjacent to the lower side). As the result, the mobile terminal 196 can be connected to the power socket 198 through the charging cable while being held by the mobile terminal holding portion 197.

Figure 59:
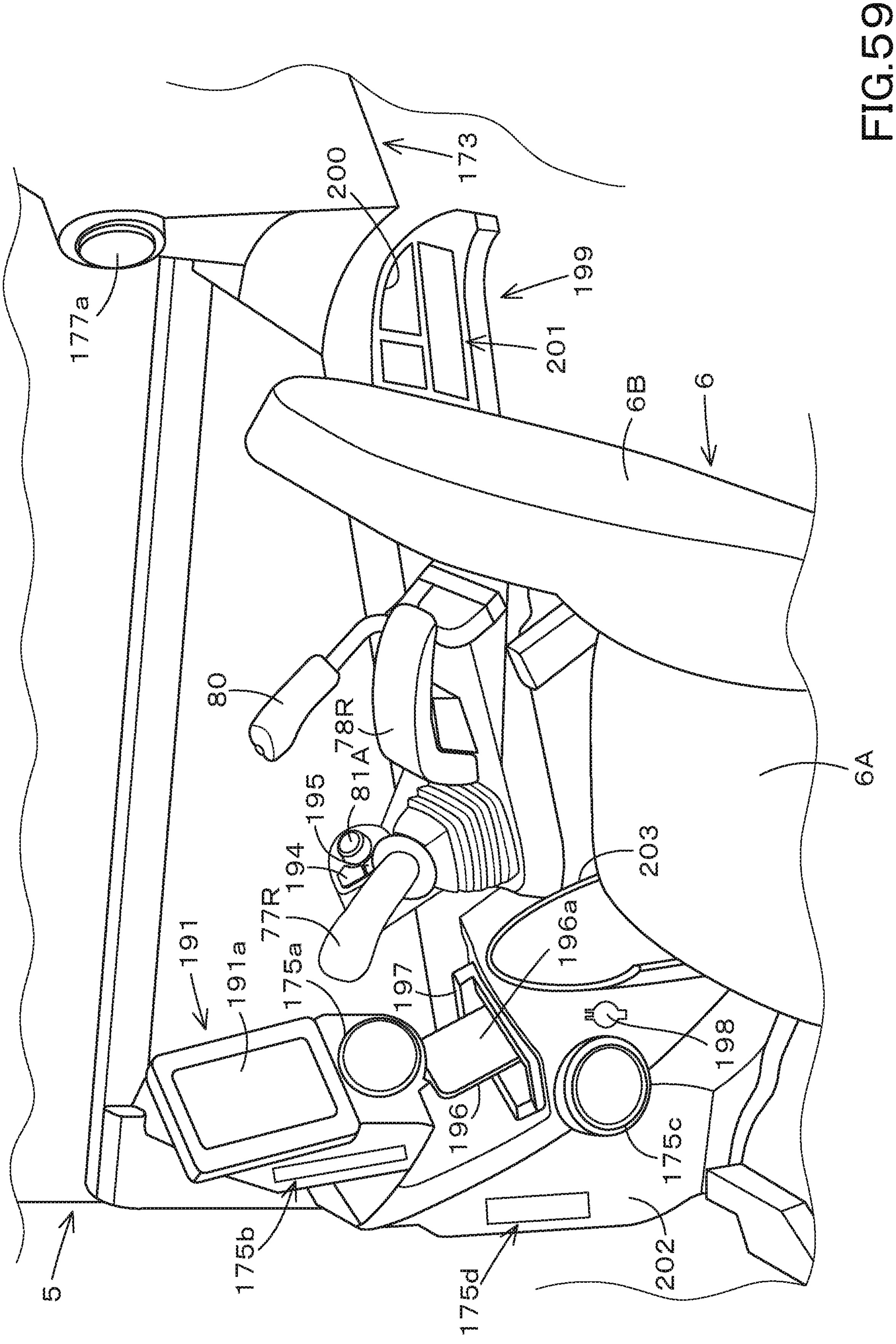
FIG. 59 is a perspective view illustrating the right portion of the room of the cabin according to the embodiment.
Figure 60:
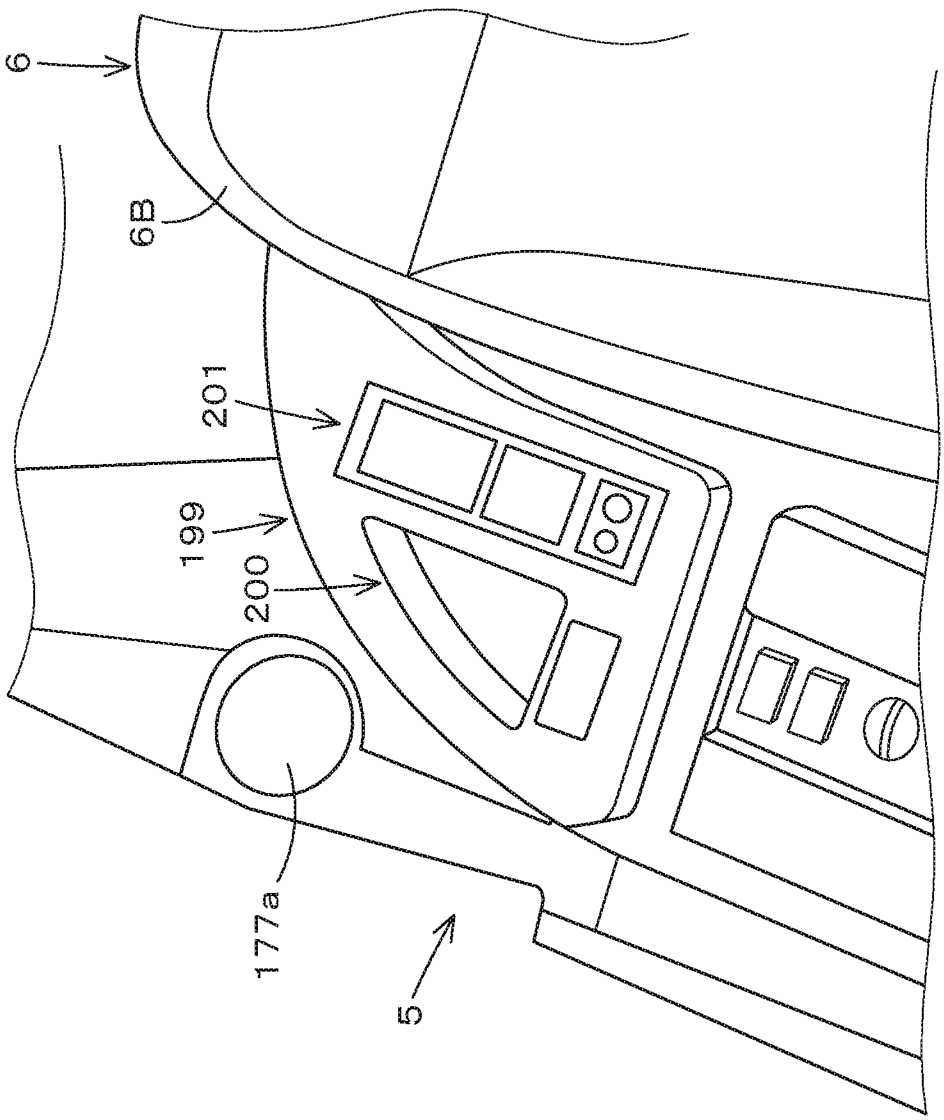
FIG. 60 is a perspective view illustrating a rear right portion of the room of the cabin according to the embodiment.

As shown in FIG. 59 and FIG. 60, the rear console 199 is provided on the side of the backrest portion 6B of the operator seat 6. The rear console 199 includes an accessory case 200 and an acoustic device 201 adjacent to the accessory case 200. The acoustic device 201 is, for example, a radio unit. By arranging the accessory case 200 and the acoustic device 201 adjacent to each other, the smartphone or portable audio placed in the accessory case 200 can be connected to the external input terminal of the acoustic device 201, and the speaker installed in the cabin 5 can be used. In this manner, the operator can listen to the music recorded on the smartphone or the portable audio.

The mobile terminal holding portion 197, the power socket 198, and the rear console 199 are provided effectively utilizing the narrow space in the cabin 5 without obstructing the external field view of the operator, the view of the display portion 191, and the view of the operating portion of the acoustic device 201 and without interfering the operability of other control devices (the operation lever 77R, the dozer lever 80, the jog dial 81A, various switches, and the like).

As shown in FIG. 59, the cabin 5 has an interior member 202 provided to the right on the room side. The interior member 202 is provided in the lower portion of the cabin 5, extending from the front portion to the rear portion, and covers the first air duct 172. The mobile terminal holding portion 197, the power socket 198, and the rear console 199 are attached to the interior member 202. The interior member 202 has a drink holder 203 configured to hold a beverage container.

As shown in FIG. 56, the drink holder 203 is arranged in the vicinity of the connection portion between the first air duct 172 and the connector duct 174. The mixed air flowing through the connector duct 174 and the first air duct 172 can cool the beverage container held in the drink holder 203 during the cooling, and can keep the beverage container warm during the heating.

As shown in FIG. 55, the console 79R has a console cover 204. The console cover 204 extends in the front-rear direction K1 along the side wall 5A (the side wall located to the tight) of the cabin 5. The console cover 204 includes a first cover 211 and a second cover 212. The first cover 211 is arranged on the side (the right side) of the operator seat 6. The first cover 211 is provided from the front portion of the operator seat 6 to the rear portion. The second cover 212 is arranged on the side of the first cover 211 and on the side opposite to the operator seat 6 side (the right side). In addition, the second cover 212 is arranged between the first cover 211 and the lateral frame member 124 (the side wall portion 5A located to the right of the cabin 5). The second cover 212 is provided from the front portion of the first cover 211 to the rear portion.

As shown in FIG. 55, the operation lever 77R is arranged at the front portion of the first cover 211. The armrest 78R is arranged in the middle portion of the first cover 211. Various types of operation switches 213 are provided at the rear portion of the first cover 211.

The second cover 212 is divided into a first divided body 212A and a second divided body 212B. That is, the console cover 204 includes the first divided body 212A and the second divided body 212B. The first divided body 212A is located in front of the second divided body 212B. The first divided body 212A is a jog dial attachment body to which the jog dial 81A is attached, and the jog dial attachment body has an upwardly inclined shape. The jog dial 81A is attached to the upper portion of the jog dial attachment body having the inclined shape. In this manner, the jog dial 81A can be easily operated with the arm placed on the armrest 78R.

Figure 61:
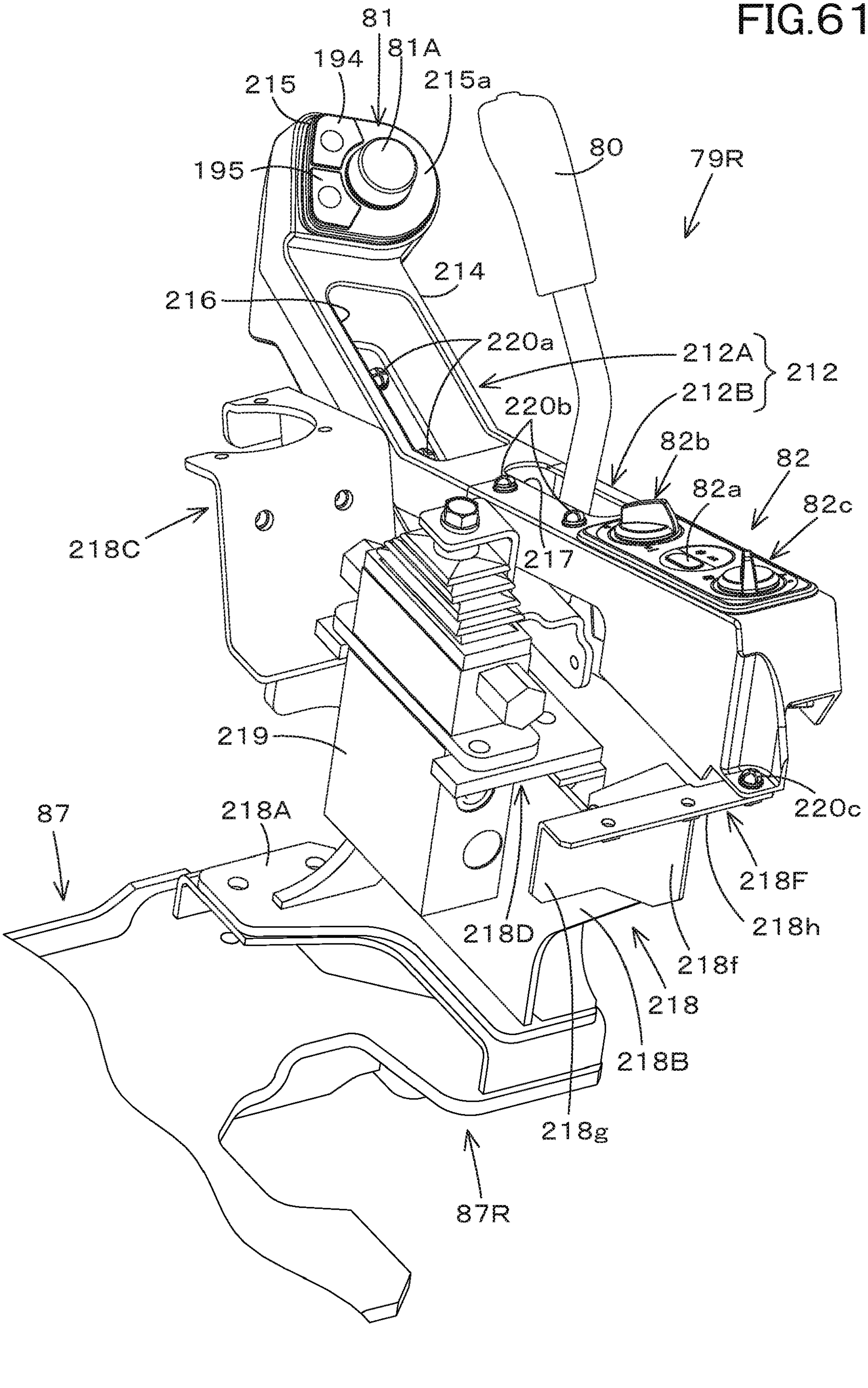
FIG. 61 is a perspective view illustrating a state where a second console is attached to a console supporting portion according to the embodiment.

As shown in FIG. 61, the first divided body 212A has a standing portion 214 and an attachment portion (a protruding portion) 215. The standing portion 214 stands in an inclined direction that shifts upward from the second divided body 212B as it goes to the front. The attachment portion 215 is provided at the front portion of the standing portion 214, and is located above the lateral frame member 124.

As shown in FIG. 55, the attachment portion (the protruding portion) 215 is provided at the front end portion of the console cover 204. The attachment portion 215 protrudes toward the side wall portion (the side wall portion arranged to the right) 5A of the cabin 5. That is, the console cover 204 has a protruding portion that protrudes toward the side wall 5A of the cabin 5. In addition, the attachment portion (the protruding portion) 215 is attached to the console support portion 218 described later under the state overlapped with at least a part of the portion arranged below the attachment portion 215 in the side wall portion 5A of the cabin 5 in plan view. In the present embodiment, for example, the attachment portion 215 is a part of the lateral frame member 124, and is overlapped with a portion located below the attachment portion 215 in plan view.

As shown in FIG. 55, FIG. 56, and FIG. 57, the attachment portion 215 is provided with an operation tool attachment surface 215*a* to which the jog dial 81A, the first switch 194, and the second switch 195 are attached. The operation tool attachment surface 215*a* is provided on the surface in the attachment portion 215, the surface being located on the side of the operator seated on the operator seat. In addition, the operation tool attachment surface 215*a* is inclined upward as it goes forward (as it extends forward). The operation tool attachment surface 215*a* is inclined backward as it goes toward the side wall (the right side wall) of the cabin 5. In other words, the operation tool attachment surface 215*a* is inclined to the side away from the operator seat 6 as it goes rearward. With the above configuration, the operability of the jog dial 81A, the first switch 194, and the second switch 195 can be improved.

As shown in FIG. 55, the standing portion 214 extends so as to extend in the front-rear direction K1, and is provided at a clearance from the lateral frame member 124 in plan view. The attachment portion 215 is inclined in a direction (rightward) away from the operation lever 77R, and is overlapped with the lateral frame member 124 in plan view. In this manner, the jog dial 81A, the first switch 194, and the second switch 195 can be appropriately separated from the operation lever 77R, and the jog dial 81A, the first switch

194, and the second switch 195 can be operated without being interfered by the operation lever 77R.

As shown in FIG. 61, the standing portion 214 has a recess portion 216 that is recessed from above to below.

Figure 62:
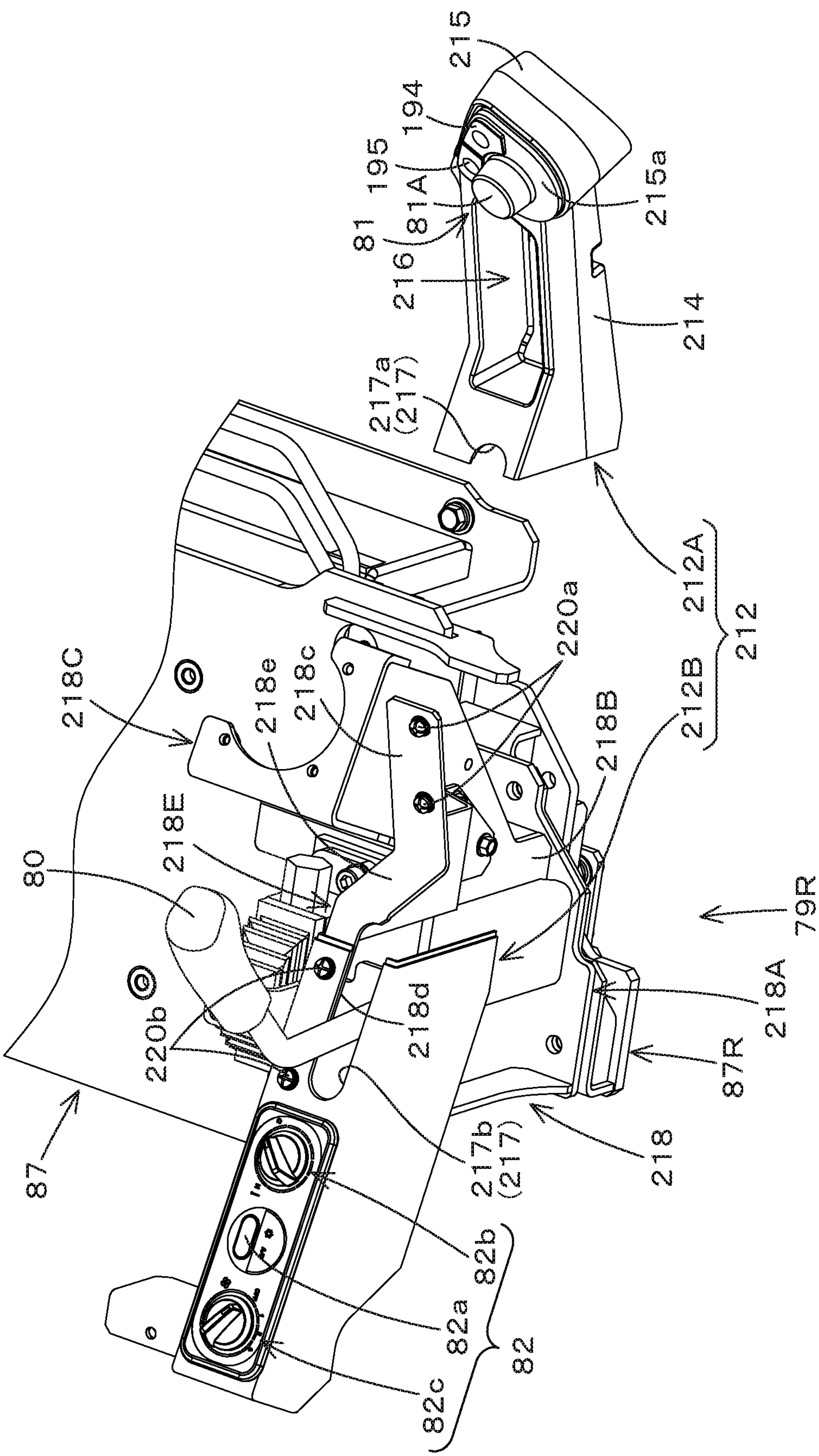
FIG. 62 is a perspective view illustrating a state of a first divided body that is divided according to the embodiment.

As shown in FIG. 55, the second divided body 212B protrudes rearward from the first divided body 212A, and is arranged so as to extend in the front-rear direction K1. The second divided body 212B is provided at a clearance from the lateral frame member 124 in plan view. A second operation tool 82 is provided at the rear portion of the second divided body 212B. A guide groove 217 through which the dozer lever 80 is inserted is provided in front of the second operation tool 82. The dozer lever 80 is provided on the console 79R so as to be swingable back and forth, and the guide groove 217 is formed long to the front and back to allow movement of the dozer lever 80 in the operation direction. As shown in FIG. 55 and FIG. 62, the guide groove 217 includes a first groove portion 217*a* formed in the first divided body 212A and includes a second groove portion 217*b* formed in the second divided body 212B. That is, the guide groove 217 is formed across the first divided body 212A and the second divided body 212B.

Figure 63:
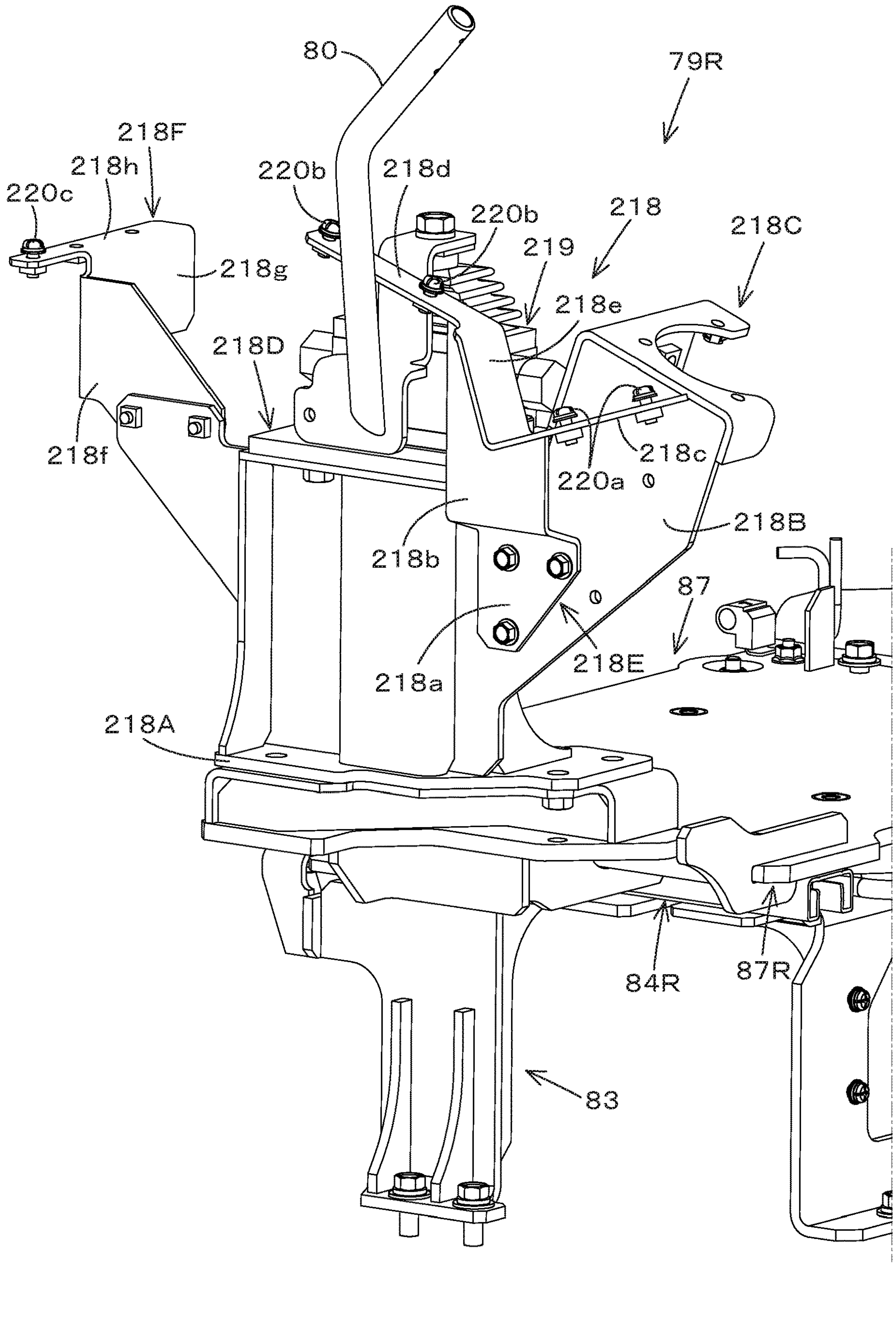
FIG. 63 is a perspective view of the console supporting portion according to the embodiment.

As shown in FIG. 61, FIG. 62, and FIG. 63, the console 79R has a console support portion 218 to which the console cover 204 is attached.

The console support portion 218 has a base plate 218A attached to the third attachment portion 87R of the slide frame 87. The console support portion 218 includes a vertical plate 218B that is erected on the base plate 218A.

The console support portion 218 has a first valve attachment portion 218C provided on the left side of the front portion of the vertical plate 218B. A pilot valve (not shown in the drawings) configured to be operated by the operation lever 77R and to control the boom cylinder C3 and the bucket cylinder C5 is attached to the first valve attachment portion 218C.

The console support portion 218 has a second valve attachment portion 218D provided at the upper portion of the middle portion of the vertical plate 218B in the longitudinal direction. A dozer control valve 219 for controlling the dozer cylinder, which is a valve to be operated by the dozer lever 80, is attached to the second valve attachment portion 218D. The dozer lever 80 is attached to the dozer control valve 219 so as to swing back and forth.

As shown in FIG. 63, the console support portion 218 has a front attachment frame 218E provided on the right side of the front portion of the vertical plate 218B. The front attachment frame 218E has a first wall portion 218*a* to a fifth wall portion 218*e*. The first wall 218*a* is fixed by a bolt to the right side surface of the vertical plate 218B. The second wall portion 218*b* extends upward from the first wall portion 218*a*. The third wall portion 218*c* protrudes in an inclined direction that shifts upward from the front upper portion of the second wall portion 218*b* as it extends forward. The fourth wall portion 218*d* is located at a higher position than the third wall portion 218*c*, and protrudes in an inclined direction in which the fourth wall portion 218*d* shifts upward from the rear upper portion of the second wall portion 218*b* as it extends rearward. The fifth wall portion 218*e* couples the rear end of the third wall portion 218*c* and the front end of the fourth wall portion 218*d*.

The third wall portion 218*c* is a wall portion to which the first divided body 212A is attached, and the bottom portion of the concave portion 216 is attached to the third wall portion 218*c* by a screw 220*a* (see FIG. 61 and FIG. 62). The fourth wall portion 218*d* is a wall portion to which the second divided body 212B is attached. The left wall portion of the front portion of the second divided body 212B (the left wall portion of the second groove portion 217*b*) is attached to the fourth wall portion 218*d* by a screw 220*b* (see FIG. 62).

The console support portion 218 includes a rear attachment frame 218F provided at the upper rear portion of the vertical plate 218B. The rear attachment frame 218F has a first wall portion 218*f* to a third wall portion 218*h*. The first wall portion 218*f* is fixed by a bolt to the upper portion of the rear portion of the vertical plate 218B. The second wall portion 218*g* extends leftward from the rear end of the first wall portion 218*f*. The third wall portion 218*h* extends rearward from the upper end of the second wall portion 218*g*. As shown in FIG. 61, the lower end of the left portion of the rear portion of the second divided body 212B is attached to the right portion of the third wall portion 218*h* by a screw 220*c*.

The first divided body 212A can be placed on the third wall portion 218*c* from above, and the screw 220*a* can be tightened from above. In addition, the second divided body 212B can be placed on the fourth wall portion 218*d* and the third wall portion 218*h* from above, and the screws 220*b* and 220*c* can be tightened from above.

As described above, the first divided body 212A and the second divided body 212B are separately attached to the console support portion 218, respectively. In addition, as described above, the first divided body 212A has a protruding portion, and is attached to the console support portion 218 under the state where the protruding portion is overlapped with at least a part of the side wall portion 5A of the cabin 5 in a plan view. In particular, the first divided body 212A is attached to the console support portion 218 separately from the second divided body 212B under a state where the attachment portion 215 is overlapped with the lateral frame member 124 in plan view.

The cabin 5 is suspended from above with the operator seat 6 and members around the operator seat 6 attached to the machine body 2 and then is attached to the machine body 2. Under the state where the cabin 5 is assembled to the machine body 2, the gap between the console 79R and the cabin 5 is narrow. Thus, when the cabin 5 is assembled with the console 79R attached to the operator seat 6, the console 79R may be damaged. In particular, under the state where the cabin 5 is assembled to the machine body 2 as in the present embodiment, the first divided body 212A (attachment portion 215) is overlapped with a part of the side wall portion 5A (the lateral frame member 124) of the cabin 5 in plan view. Thus, it is difficult to assemble the cabin 5 with the console 79R attached to the operator seat 6 side.

Thus, when the cabin 5 is assembled, the cabin 5 is assembled with the first divided body 212A removed from the console support portion 218. After the cabin 5 is assembled, the first divided body 212A is attached to the console support portion 218. In this manner, while preventing the side wall portion 5A of the cabin 5 and the first division body 212A from interfering each other, the cabin 5 can be assembled efficiently. In addition, since the guide groove 217 is formed across over the first divided body 212A and the second divided body 212B (since the guide groove 217 is divided), the dozer lever 80 already assembled to the operator seat 6 side can be easily inserted into the guide groove 217 with the grip attached, after the cabin 5 is assembled.

In addition, since the first divided body 212A and the second divided body 212B can be attached to the console support portion 218 from above, the first divided body 212A and the second divided body 212B can be easily attached in a narrow space between the first cover 211 and the cabin 5. Even during the maintenance, the first divided body 212A and the second divided body 212B can be removed upward, so that the maintenance can be easily performed.

As described above, the manufacturing process of the working machine 1 includes: a first step of suspending a portion including the side wall portion 5A of the cabin 5 from above and then accommodating the operator seat 6 and the console support portion 218 in the cabin 5; and a second step of attaching a portion including the protruding portion (the attachment portion 215) of the console cover 204 to the console support portion 218 after the first step.

As shown in FIG. 2, a side cover 21 is provided on the right side of the machine body 2. The side cover 21 is a cover body that covers the devices such as the battery BT1, the control valve V1, the operation fluid tank T2, the radiator R1, the oil cooler O1, and the control device 24. The side cover 21 is provided from the front portion of the machine body 2 to the rear portion, and covers the upper portion of the turn frame 41. The side cover 21 is arranged on the side (the right side) of the cabin 5 and the step 52. The right side of the prime mover room E2 internally communicates with the rear portion of the side cover 21. An opening for taking the air into the rear portion of the side cover 21 and the prime mover room E2 is formed on the right side surface of the rear portion of the side cover 21.

As shown in FIG. 2 and FIG. 7, the side cover 21 includes the first cover member 26 and the second cover member 27. As shown in FIG. 2, the battery BT1, the control valve V1, the operation fluid tank T2, the radiator R1, and the oil cooler O1 are accommodated in the first cover member 26.

As shown in FIG. 2, the second cover member 27 is arranged between the first cover member 26 and the cabin 5. The control device 24 is accommodated in the second cover member 27. Thus, the control device 24 is provided outside the cabin 5.

Figure 65:
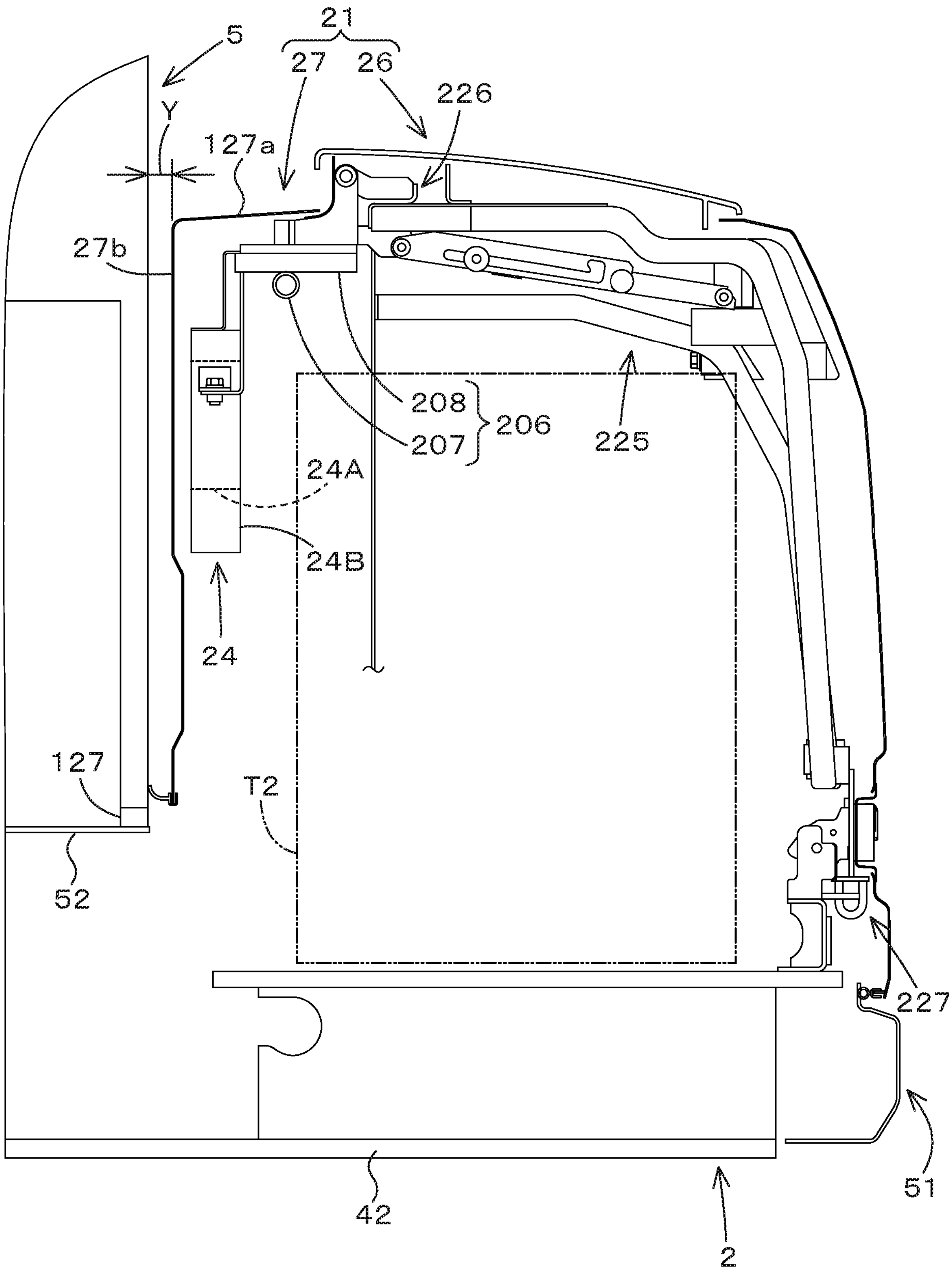
FIG. 65 is a back cross-section view of the side cover according to the embodiment.

As shown in FIG. 7 and FIG. 65, the second cover member 27 includes a circumferential wall portion 27*a* that covers from above the control device 24 to the front of the control device 24, and includes a side wall portion 27*b* that covers the side of the control device 24 on the cabin 5 side. As shown in FIG. 65, the second cover member 27 internally communicates with the first cover member 26.

By providing the control device 24 in the side cover 21, it is possible to prevent damage to the control device 24 itself, to the harness arranged to the control device 24, or to the bracket member that supports the control device 24.

The battery BT1 is a storage battery that supplies electric power to the electrical components equipped in the working machine 1. The control valve V1 is a valve unit in which the control valves that control the hydraulic actuators mounted on the working machine 1 are integrated. The operation fluid tank T2 is a tank that stores the operation fluid to be supplied to the hydraulic pump P1. The radiator R1 is a cooler configured to cool the coolant of the prime mover E1. The oil cooler O1 is a cooler configured to cool the operation fluid returning to the operation fluid tank T2. The battery BT1 is arranged at the front portion of the machine body 2, the radiator R1 and the oil cooler O1 are arranged at the rear portion of the machine body, and the control valve V1 and the operation fluid tank T2 are arranged between the battery BT1, the radiator R1, and the oil cooler O1. In addition, the radiator R1 and the oil cooler O1 are arranged to the right of the prime mover E1, and a cooling fan FI to be driven by the power of the prime mover E1 is provided between the radiator R1 and the prime mover E1. The cooling fan FI is a suction fan, and is configured to suck the air from the right side of the oil cooler O1 and outputs the air to the prime mover E1 side.

The control device 24 is arranged on the left side of the operation fluid tank T2. The control device 24 includes the first controller 24A and the second controller 24B. The first controller 24A and the second controller 24B are arranged side by side in the longitudinal direction. In the illustrated example, the first controller 24A is arranged in front of the second controller 24B. The first controller 24A and the second controller 24B are connected to be communicable with each other. The first controller 24A and the second controller 24B are constituted of a microcomputer including a CPU, an EEPROM, and the like.

The first controller 24A is an electronic control unit called a main ECU that controls the overall operation of the working machine 1, and is configured to control the electric devices equipped in the working machine 1. For example, the first controller 24A controls the flow rate of the operation fluid under the control of an electromagnetic valve provided in the hydraulic circuit, and performs the filter regeneration control of the exhaust gas purifier device D1.

The second controller 24B is an electronic control unit called a prime mover ECU (an engine ECU) that controls the prime mover E1. For example, the second controller 24B controls the rotation speed of the prime mover E1 by adjusting the fuel injection amount under the control of the operation of the supply pump and each of the injectors.

Figure 64:
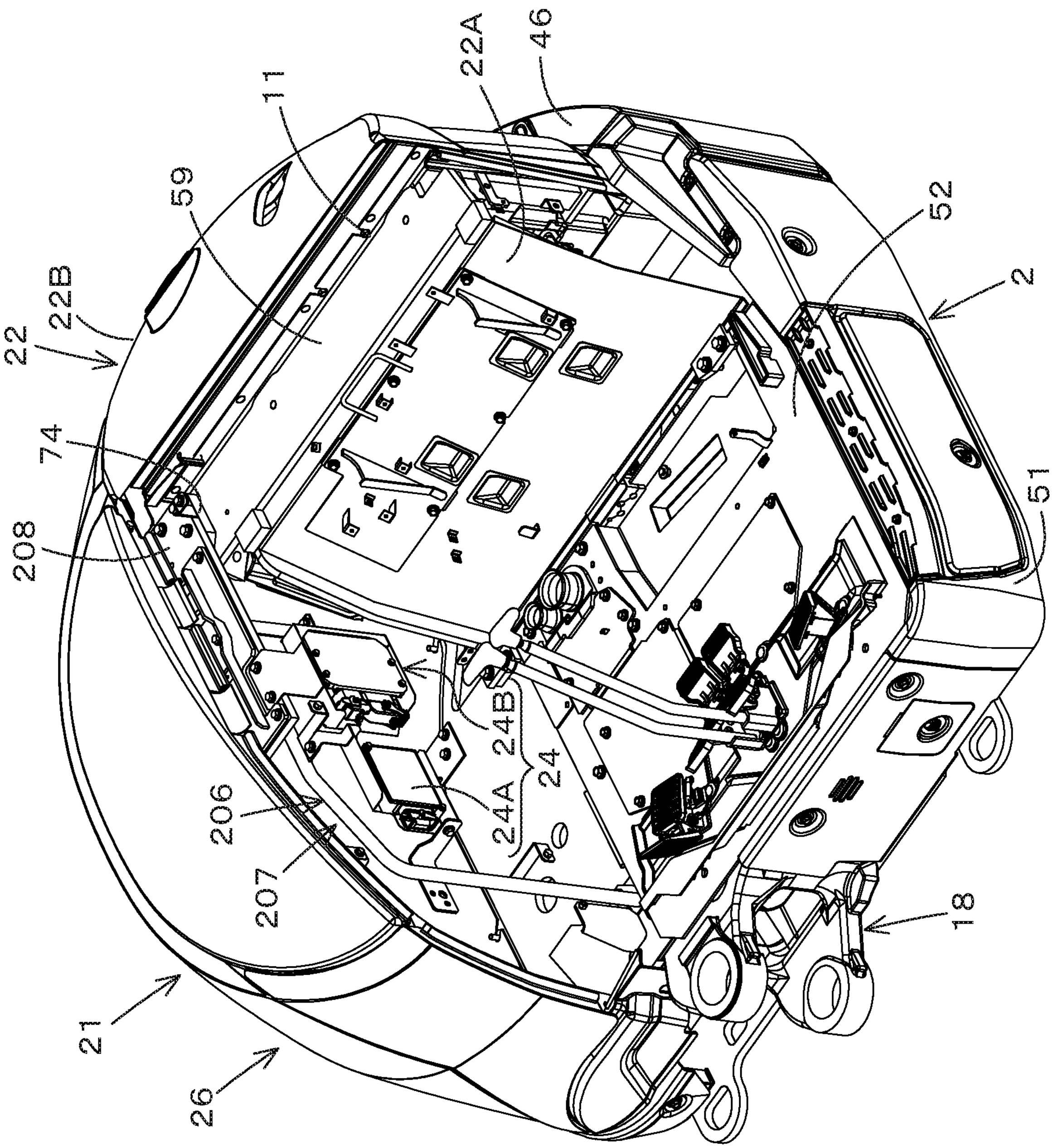
FIG. 64 is a perspective view of a state of a second cover that is detached according to the embodiment.

FIG. 64 is a view showing a state where the second cover member 27 is removed. As shown in FIG. 64, a frame member 206 attached to the machine body 2 is arranged in the second cover member 27. The frame member 206 includes a first frame constituent member 208 and a second frame constituent member 207.

Figure 66:
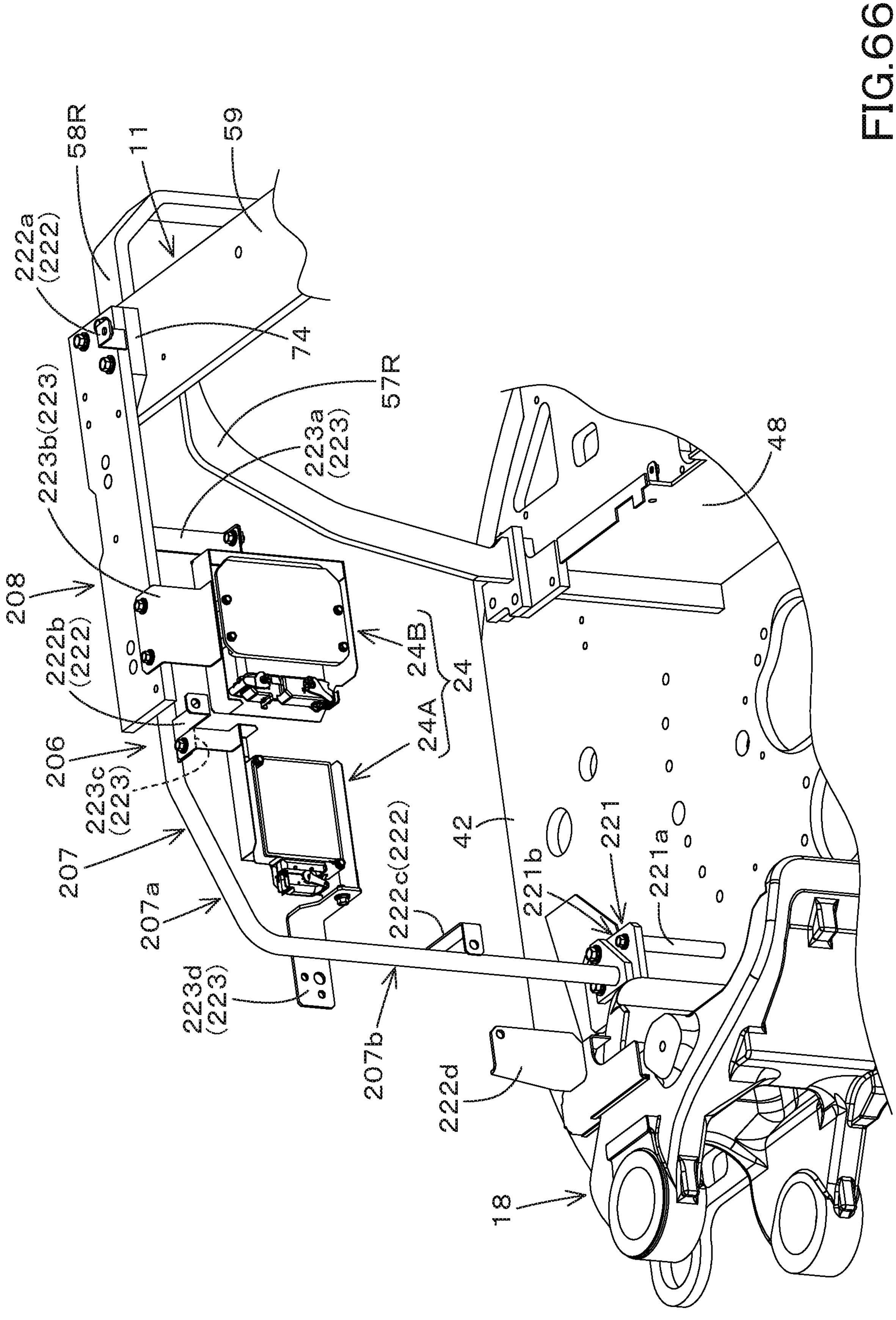
FIG. 66 is a perspective view of a frame member seen from the left according to the embodiment.
Figure 67:
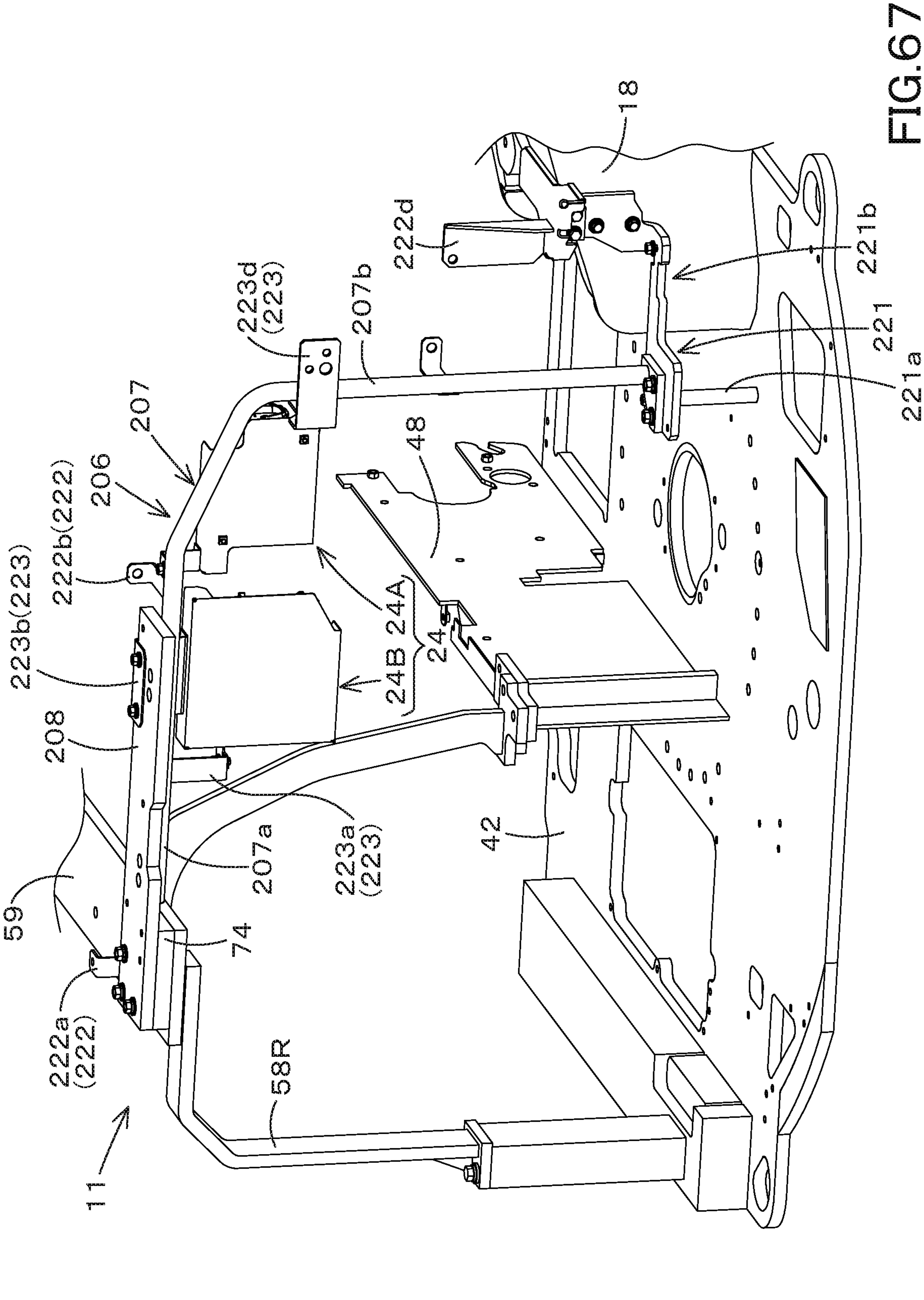
FIG. 67 is a perspective view of the frame member seen from the right according to the embodiment.

As shown in FIG. 66 and FIG. 67, the first frame constituent member 208 is formed of a thick plate material that is long in the front-rear direction K1, is attached to the upper portion of the support frame 11, and protrudes forward from the support frame 11. In particular, the first frame constituent member 208 is arranged so that the plate surface faces up and down. The rear portion is placed on the attachment plate 74 and is fixed by bolts, and protrudes forward from the attachment plate 74. As shown in FIG. 65, the first frame constituent member 208 is arranged on a side of the rear portion of the upper portion of the circumferential wall portion 27*a* and on the lower surface side.

The second frame constituent member 207 is formed of a bar material such as a pipe material, and has one end side fixed to the first frame constituent member 208 and has the other end side attached to the machine body 2. In particular, the second frame constituent member 207 includes a first frame portion 207*a* and a second frame portion 207*b*. The first frame portion 207*a* has a rear portion fixed to the lower surface of the first frame constituent member 208 and protrudes forward from the first frame constituent member 208. The front portion of the first frame portion 207*a* is inclined so as to shift downward as it goes forward. The front portion of the first frame portion 207*a* is arranged on a side of the front portion of the upper portion of the circumferential wall portion 27*a* and on a side of the lower surface. The second frame portion 207*b* extends downward from the front portion of the first frame portion 207*a*. The lower portion of the second frame portion 207*b* is attached to the machine body 2 by the bracket member 221. The bracket member 221 includes a support member 221*a* and a plate member 221*b*. The support column member 221*a* is erected on the turn base plate 42. The plate member 221*b* has a rear portion fixed to the upper end of the support column member 22a and has a front portion attached to the support bracket 18. The lower portion of the second frame portion 207b is attached to the rear portion of the plate member 221b.

As shown in FIG. 65, the control device 24 is provided being displaced laterally (leftward) with respect to the frame member 206.

As shown in FIG. 66 and FIG. 67, the frame member 206 has a cover attachment portion 222 for attaching the second cover 27, and has a device attachment portion 223 for attachment of the control device 24. The cover attachment portion 222 is constituted of a plurality of attachment pieces (the attachment pieces 222a to 222c). The attachment piece 222a is fixed to the left portion of the rear portion of the first frame constituent member 208. The attachment piece 222b is fixed to the middle portion of the first frame portion 207a. The attachment piece 222c is fixed to the middle portion of the second frame portion 207b. An attachment piece 222d to which the front portion of the second cover 27 is attached is provided on the upper portion of the right portion of the support bracket 18.

As shown in FIG. 7, the second cover 27 is attached by a plurality of bolts (the bolt 224a to the bolt 224c). The bolt 224a attaches the rear portion of the circumferential wall portion 27a to the attachment piece 222a. The bolt 224b is attached to the attachment piece 222b at a middle portion of the upper portion of the side wall portion 27b in the front-rear direction K1. The bolt 224c attaches the front portion of the side wall portion 27b to the attachment piece 222c. The bolt 224d attaches the front portion of the side wall portion 27b to the attachment piece 222d.

As shown in FIGS. 66 and 67, the device attachment portion 223 is constituted of a plurality of attachment pieces (the attachment piece 223a to the attachment piece 223d). The attachment piece 223a and the attachment piece 223b are fixed to the front portion of the first frame constituent member 208. The second controller 24B is attached to the attachment piece 223a and the attachment piece 223b. The attachment piece 223c is fixed to the middle portion of the first frame portion 207a. The attachment piece 223d is fixed to the upper portion of the second frame portion 207b. The first controller 24A is attached to the attachment piece 223c and the attachment piece 223d.

As shown in FIG. 65, a frame body 225 configured to support the first cover 26 is provided inside the first cover 26. The right portion of the upper portion of the frame 225 is connected to the first frame constituent member 208 by the hinge mechanism 226. The lower portion of the frame body 225 is locked to the machine body 2 by the locking mechanism 227. By releasing the locking mechanism 227, the first cover 26 can swing up and down by the hinge mechanism 226.

As shown in FIG. 65, a gap Y1 into which a tool or the like can enter is provided between the cabin 5 and the second cover 27. The second cover member 27 is detachable with the cabin 5 mounted. The second cover member 27 can be opened and closed by being removed from the frame member 206 and being attached to the frame member 206. By removing the second cover member 27, the control devices (the first controller 24A and the second controller 24B) can be easily confirmed visually, and can be easily detached from the frame member 206.

The frame member 206 is shared in the attachment of the side cover 21 and the attachment of the control device 24, and thereby the sharing of members can be achieved. In addition, for example, when the frame member is formed by bending a single band plate material, the weight increases. However, in this embodiment, the frame member 206 is formed of the first frame constituent member 208 and the second frame constituent member 207, and thereby the weight reduction is achieved. That is, the frame member 206 is formed of a first frame constituent member 208 made of a thick plate in a portion requiring the strength, and is formed of a second frame constituent member 207 made of a bar on the remaining portion. Thereby, the weight reduction of the frame member 206 can be achieved.

Figure 68:
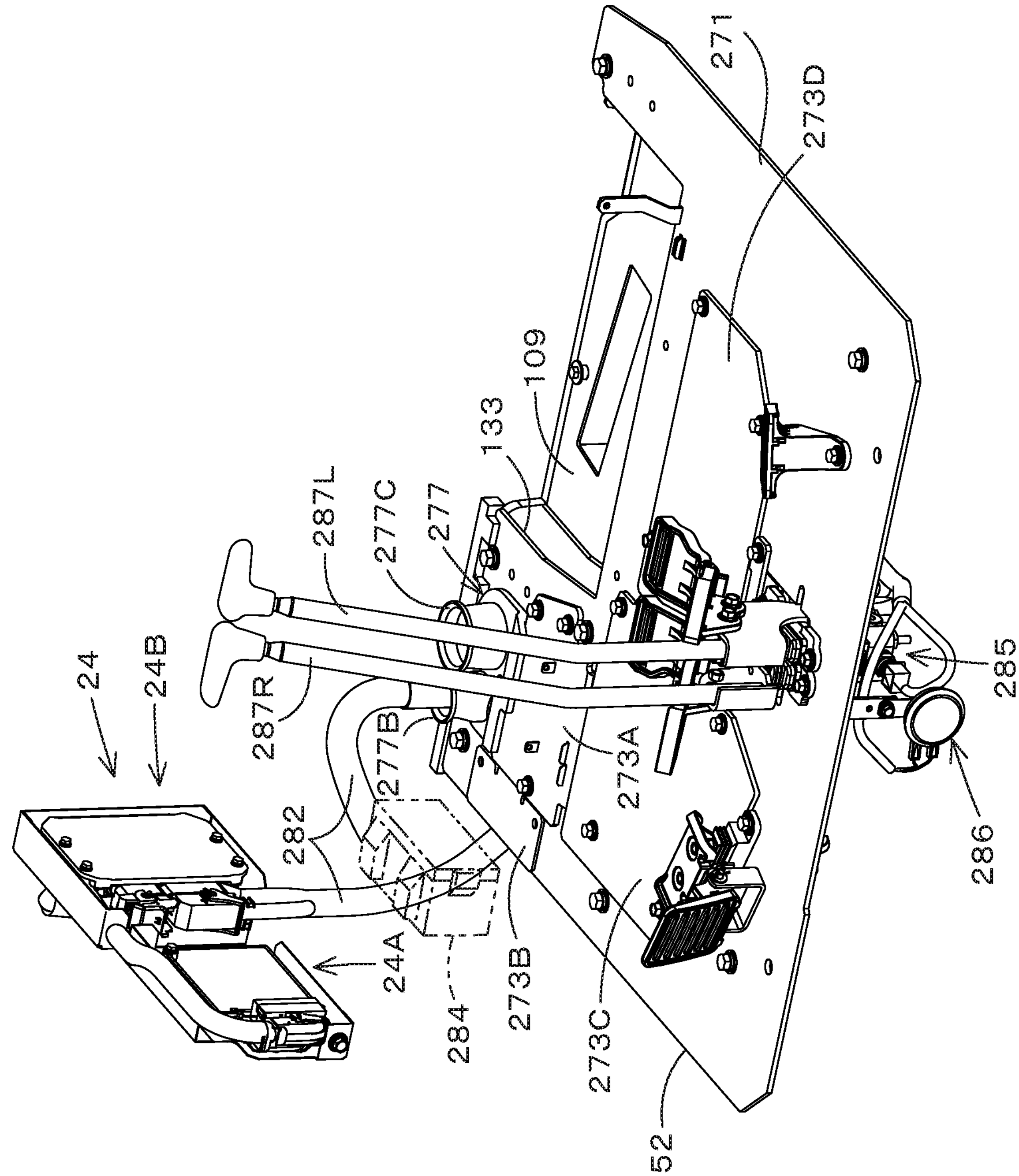
FIG. 68 is a perspective view of the step seen from above according to the embodiment.
Figure 70:
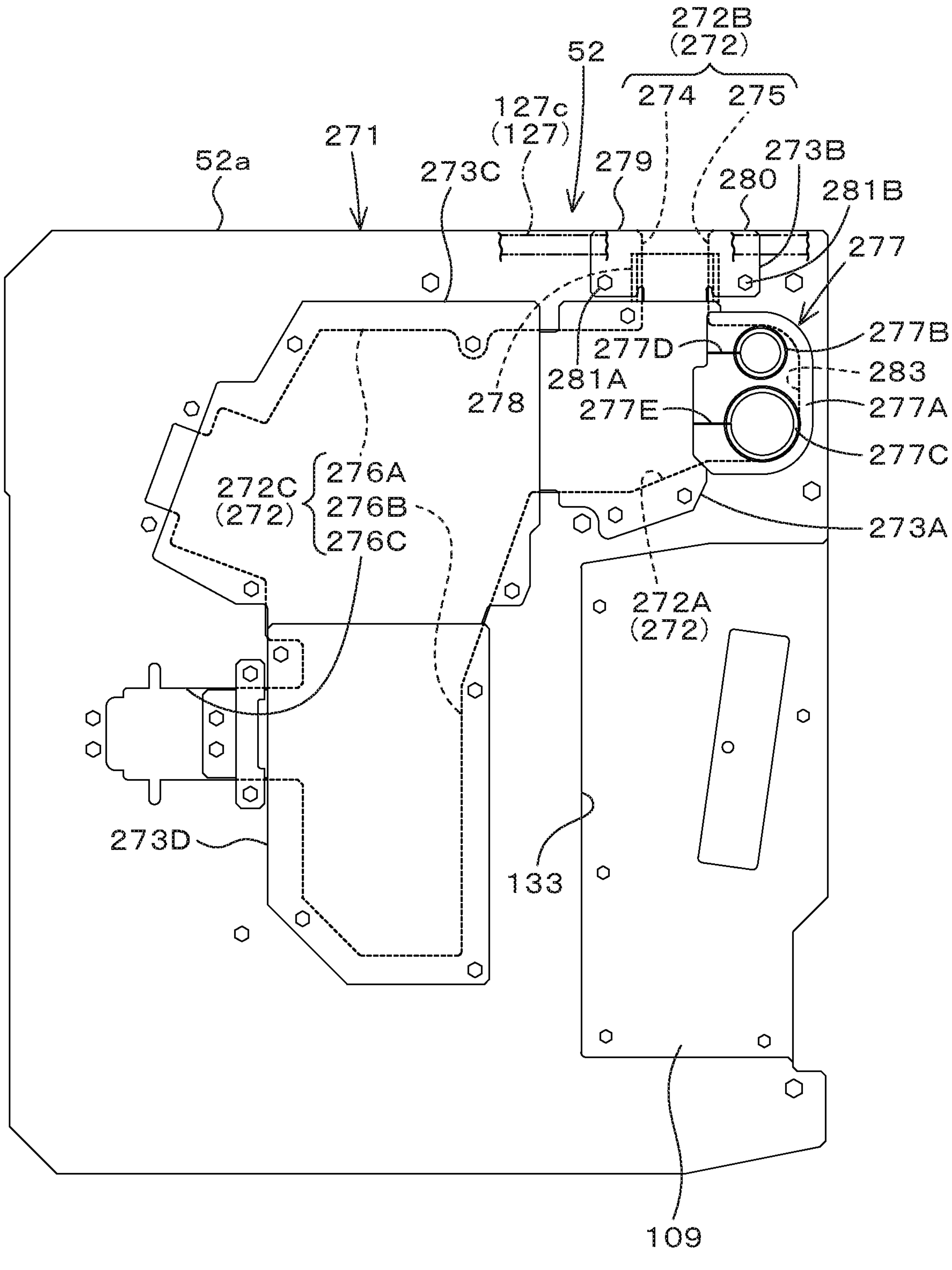
FIG. 70 is a planar view of the step according to the embodiment.

As shown in FIG. 68 and FIG. 70, the step 52 includes a main plate 271 and a cover plates (including the first plate 273A to the fourth plate 273D) removably attached to the main plate 271. The main plate 271 is formed of a single flat plate material. A first contact surface 129 is provided on the upper surface of the main plate 271 (see FIG. 32). In this manner, the improvement of the sealing performance between the step 52 and the cabin 5 (securing the adhesiveness of the sealing member 127) is achieved.

Figure 71:
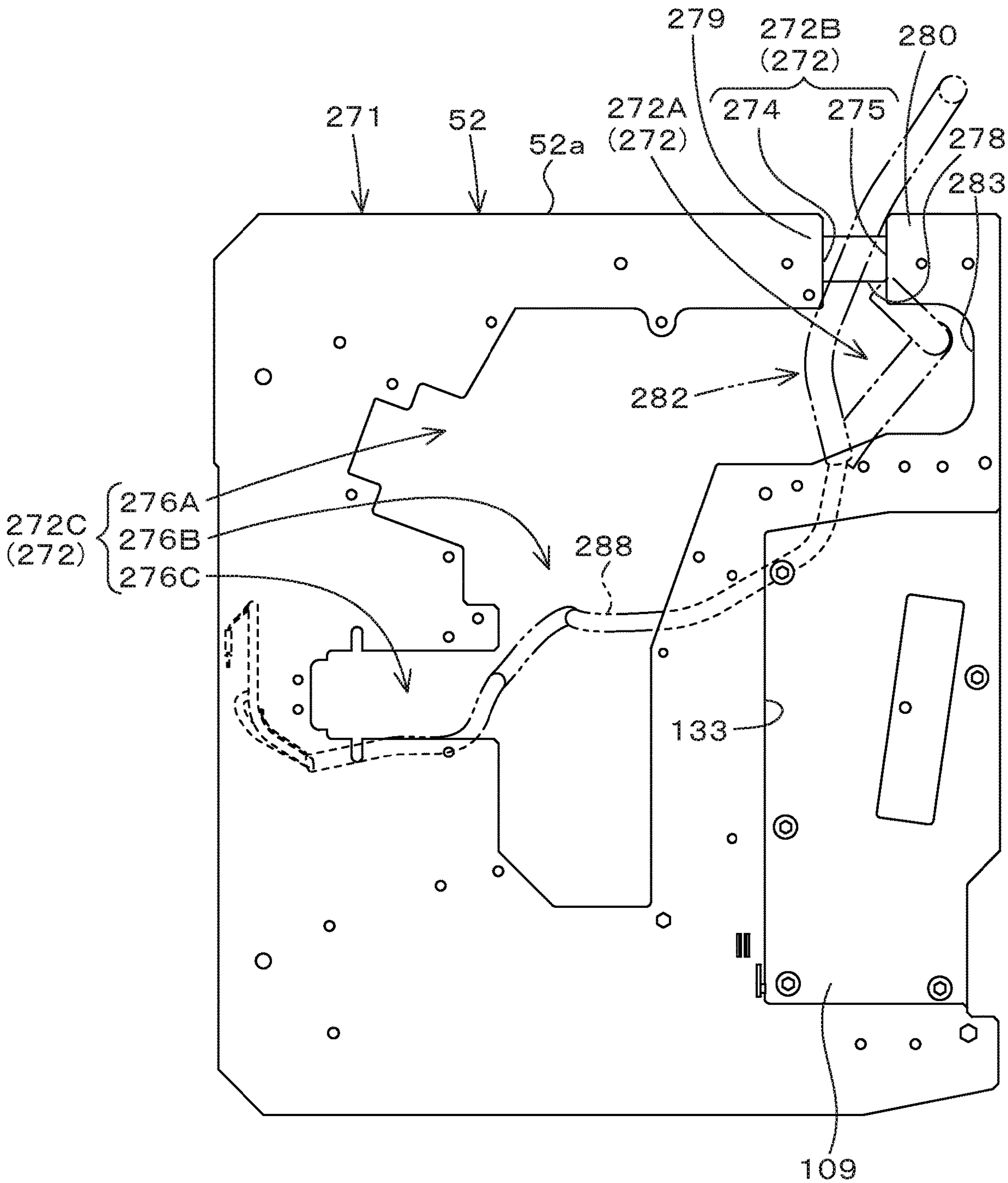
FIG. 71 is a planar view of the step under a state a cover plate is detached according to the embodiment.

As shown in FIG. 70 and FIG. 71, the main plate 271 has a cut-out portion 272 formed through the main plate 271 in the vertical direction. The cut-out portion 272 includes a first cut-out portion 272A, a second cut-out portion 272B, and a third cut-out portion 272C. The first cut-out portion 272A is provided at the rear portion of the right portion of the main plate 271.

The second cut-out portion 272B is formed across from the first cut-out portion 272A to the outer edge 52a arranged to the right of the main plate 271 (the edge portion on the side where the control device 24 is arranged). In particular, the second cut-out portion 272B is formed of a first edge portion 274 and a second edge portion 275 that have one end connected to the first cut-out portion 272A, have the other end connected to the outer edge portion 52a, and face each other at an interval. The second cut-out portion 272B is continuously formed with the front portion of the first cut-out portion 272A.

The third cut-out portion 272C includes the first portion 276A, the second portion 276B, and the third portion 276C formed in a continuous shape. The first portion 276A is continuously formed with the front portion of the first cut-out portion 272A, and extends forward from the first cut-out portion 272A. The second portion 276B extends leftward from the first portion 276A. The third portion 276C extends forward from a middle portion of the second portion 276B.

As shown in FIG. 70, the cover plate is a member that closes the cut-out portion 272. The first plate 273A closes the front portion of the first cut-out portion 272A. The rear portion of the first cut-out portion 272A is closed with a grommet 277. The grommet 277 is formed of an elastic material such as rubber, and includes a base wall portion 277A, and a first cylinder portion 277B and a second cylinder portion 277C extending upward from the base wall portion 277A (see FIG. 68). In the grommet 277, a slit 277D extending from the upper end of the first cylindrical portion 277B to the end portion of the base wall portion 277A is formed, and a slit 277E extending from the upper end of the second cylindrical portion 277C to the end portion of the base wall portion 277A is formed.

Figure 72:
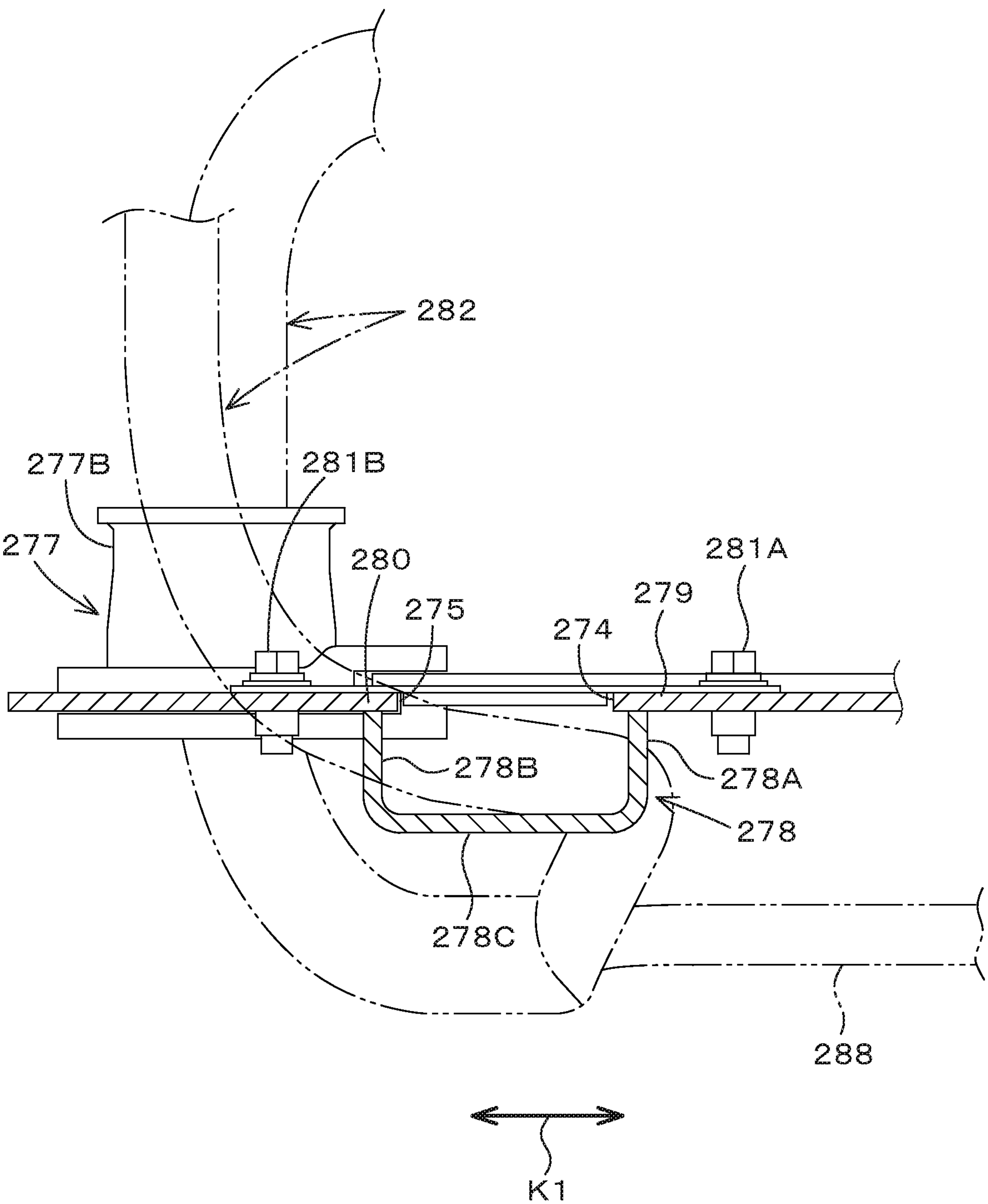
FIG. 72 is a side cross-section view of a rear right portion of the step according to the embodiment.

The second plate 273B closes the second cut-out portion 272B. In particular, as shown in FIG. 72, the second plate 273B couples, on the upper surface side of the step 52, the first portion 279 where the first edge portion 274 is formed to the second portion 280 where the second edge portion 275 is formed. In this manner, the sealing performance between the step 52 and the cabin 5 is secured. The second plate 273B is detachably fixed to the first portion 279 by a bolt 281A, and is detachably fixed to the second portion 280 by a bolt 281B. The bolt 281A and the bolt 281B are provided at positions separated from the right side portion 127*c* of the sealing member 127 (see FIG. 70).

The third plate 273C closes the first portion 276A. The fourth plate 273D closes the second portion 276B and the rear portion of the third portion 276C.

As shown in FIG. 72, the step 52 has a connecting member 278 that connects the first portion 279 and the second portion 280 on the lower surface side of the step 52. In particular, the connecting member 278 includes a first vertical wall 278A, a second vertical wall 278B, and a coupling wall 278C. The upper end of the first vertical wall 278A is fixed to the lower surface of the first portion 279 by the welding, and protrudes downward from the first portion 279. The second vertical wall 278B has an upper end welded and fixed to the lower surface of the second portion 280, and protrudes downward from the second portion 280. The first vertical wall 278A and the second vertical wall 278B face each other in the front-rear direction K1. The coupling wall 278C couples the lower ends of the first vertical wall 278A and the second vertical wall 278B.

Figure 69:
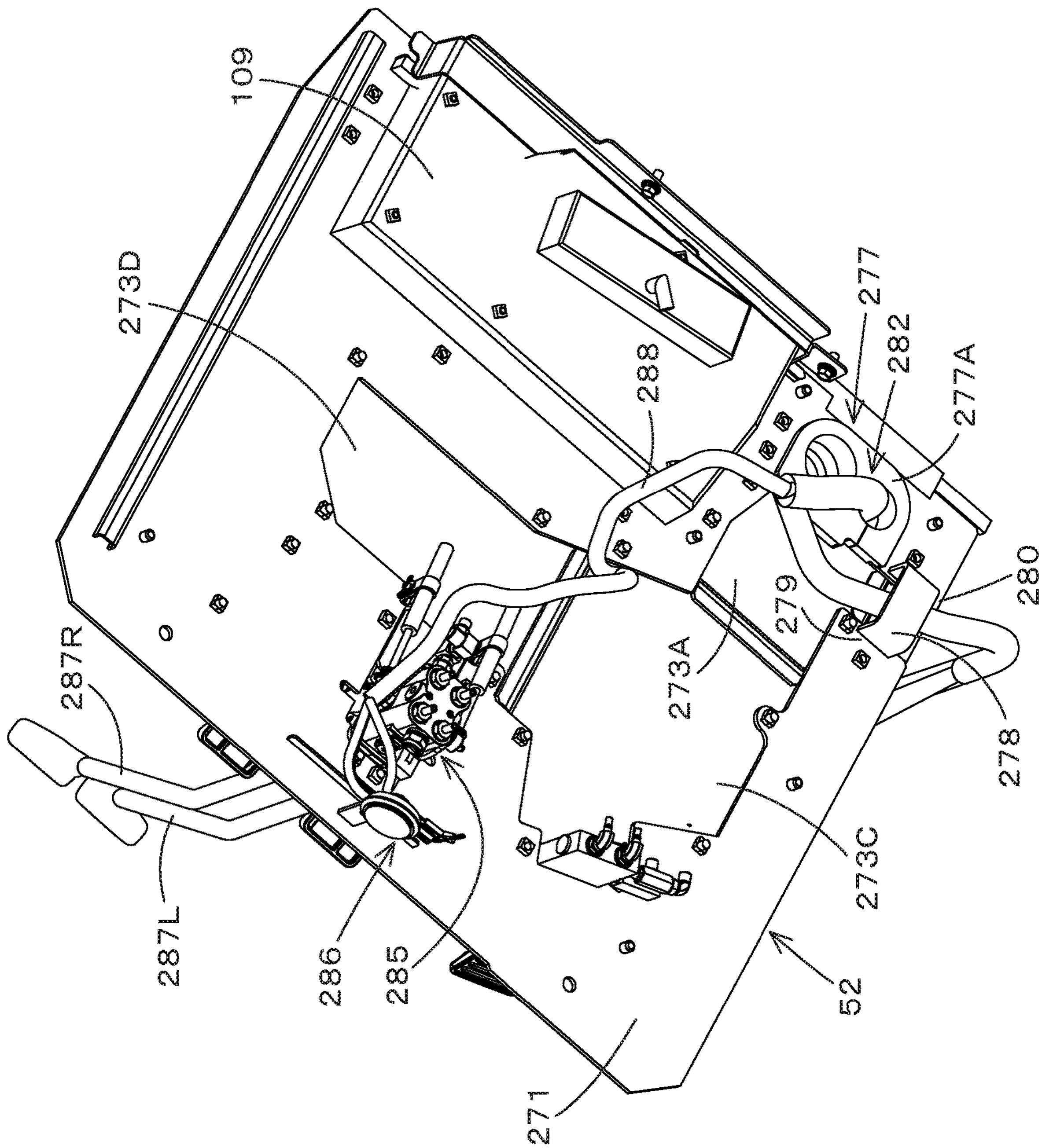
FIG. 69 is a perspective view of the step seen from below according to the embodiment.

As shown in FIG. 68, FIG. 69, and FIG. 71, a main harness (a harness) 282 is arranged from the room of the cabin 5 to the control device 24 through the lower surface side of the step 52. The main harness 282 is arranged from the lower surface of the step 52 to the room of the cabin 5 through the first cut-out portion 272A. In particular, the main harness 282 is arranged through the rear portion of the first cut-out portion 272A, and is inserted through the first cylinder portion 277B. The main harness 282 can be inserted into the first cylindrical portion 277B by elastically expanding the gap of the slit 277D. The rear portion of the first cut-out portion 272A is a harness insertion portion 283 through which the main harness 282 is inserted, and the first plate 273A closes the first cut-out portion 272A, leaving the harness insertion portion 283. As shown in FIG. 68, the main harness 282 is connected to a relay fuse box (electric components) 284 in the room of the cabin 5, for example. Although not shown in the drawings, a large number of harnesses are branched from the main harness 282 in the room of the cabin 5, and the branched harnesses are connected to the electrical components installed in the room of the cabin 5.

In addition, the main harness 282 is arranged to the side of the cabin 5 from the lower surface of the step 52 through the connecting member 278 and the second plate 273B, and is connected to the control device 24. Although not shown in the drawings, a large number of harnesses are branched from the main harness 282 outside the room of the cabin 5, and the branched harnesses are connected to the electrical components installed outside the room of the cabin 5.

A hydraulic hose is inserted through the second cylinder portion 277C. The hydraulic hose can be inserted through the second cylindrical portion 277C by elastically expanding the gap of the slit 277E.

As shown in FIG. 69, the electrical components such as a first electrical component 285 and a second electrical component 286 are provided at the front portion of the lower surface of step 52. The first electrical component 285 is, for example, an electromagnetic valve configured to be operated by the travel levers 287L and 287R to control the travel device 3. The second electrical component 286 is, for example, an alarm that emits a warning sound or the like.

A branched harness (a harness) 288 branched from the main harness 282 and arranged on the lower surface of step 52 is connected to the first electrical component 285 and the second electrical component 286.

The third cut-out portion 272C is formed from the first cut-out portion 272A to the side on which the first electrical component 285 and the second electrical component 286 are arranged.

The main harness 282 and the branched harness 288 can be lowered from above to the lower surface side of the step 52 by the cut-out portion 272. Thus, the main plate 271 has a cut-out portion 272 through which the harness can be inserted from above into the lower surface side of the step 52.

The main harness 282 is arranged before the cabin 5 is assembled to the machine body 2 under the state where the branched harness 288 and another harness branched from the main harness 282 are connected. The main harness 282 is arranged under the state where the first plate 273A to the fourth plate 273D and the grommet 277 are removed. By removing the first plate 273A to the fourth plate 273D, the main harness 282 can be arranged down from above to the lower surface side of the step 52 via the cut-out portion 272. In this manner, the main harness 282 can be easily arranged from the room of the cabin 5 to the control device 24 through the lower surface side of the step 52. At the same time, the branched harness 288 can be arranged on the lower surface side of the step 52. After arranging the main harness 282 and the branched harness 288, the first plate 273A to the fourth plate 273D are attached and the grommet 277 is attached, and then the cabin 5 is assembled to the machine body 2. Since the main harness 282 and the branched harness 288 can be arranged by being lowered from above to the lower surface side of the step 52 via the cut-out portion 272, the number of assembling steps can be reduced.

As shown in FIG. 4 and FIG. 5, the first rib 43L (a reinforcing rib 43) includes a front rib 232L and a rear rib 233L. The front rib 232L is a sheet metal rib (a rib formed of a sheet metal), and the rear rib 233L is a cast steel rib (a rib formed of a cast steel).

As shown in FIG. 5, the front rib 232L is erected on the turn base plate 42 and is arranged in a longitudinal direction (in the state where the plate thickness direction is made to coincide with the horizontal direction).

As shown in FIG. 4, the front rib 232L is provided so as to extend from the front portion of the turn base plate 42 to the front portion of the prime mover room E2. In particular, the front portion of the front rib 232L is fixed by the welding to the rear portion of the left portion of the support bracket 18. The rear portion of the front rib 232L extends through the partition plate 47 (the main partition plate 48), and is located at the front portion of the prime mover room E2. In addition, the front rib 232L is arranged so as to extend in an inclined direction that shifts leftward from the support bracket 18 as it goes rearward.

Figure 73:
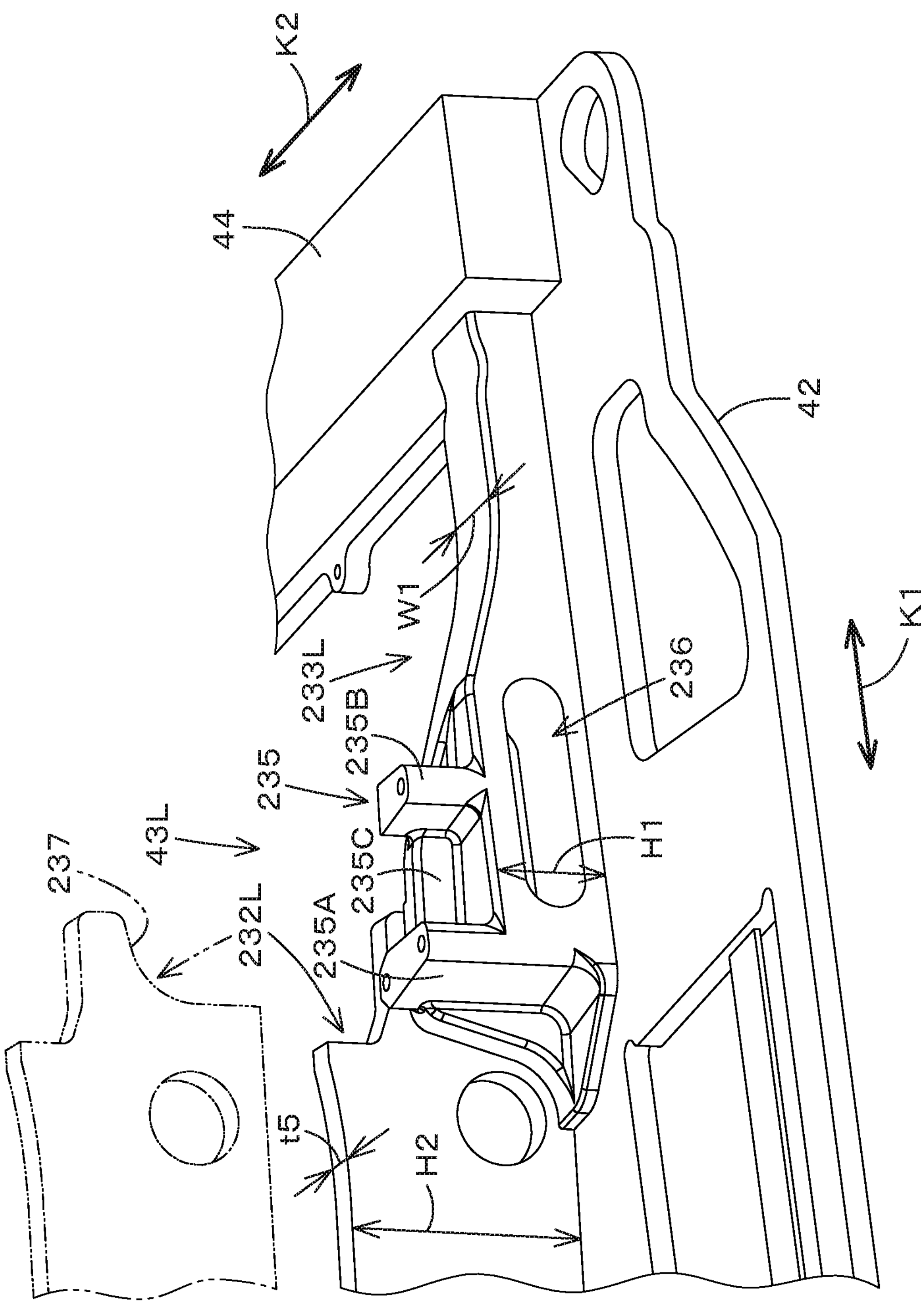
FIG. 73 is a perspective view of a rear portion of a first rib according to the embodiment.
Figure 74:
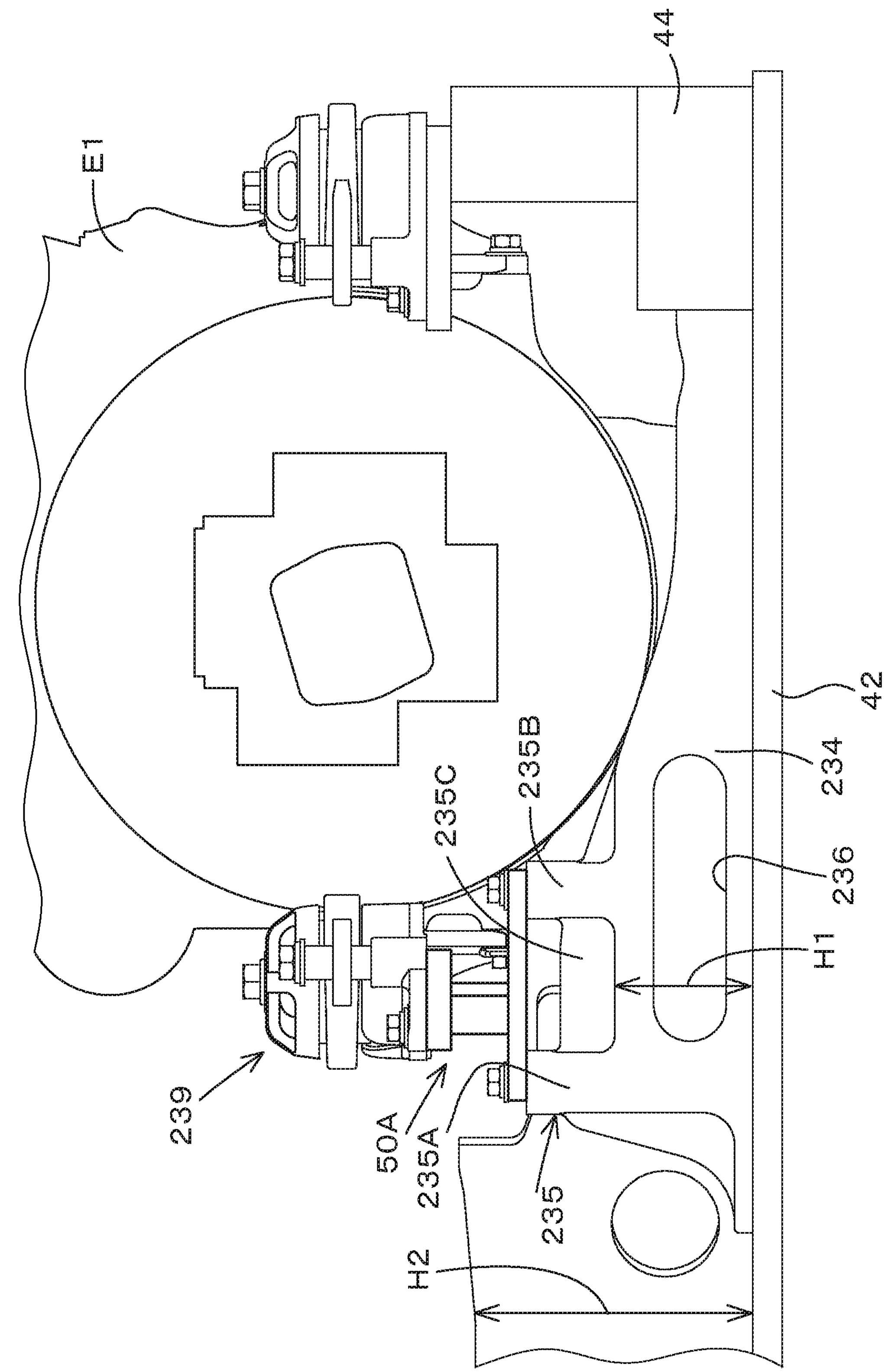
FIG. 74 is a side view of the rear portion of the first rib according to the embodiment.

As shown in FIG. 73 and FIG. 74, the rear rib 233L is arranged in the prime mover room E2. The rear rib 233L protrudes rearward from the left side surface of the rear portion of the front rib 232L, and the rear end is in contact with the first weight attachment portion 44. The front portion of the rear rib 233L is overlapped with the rear portion of the front rib 232L in a side view, and is fixed by the welding to the rear portion of the front rib 232L. The rear rib 233L includes a rib main body 234 and a prime mover support portion 235 that supports the prime mover E1.

As shown in FIG. 73 and FIG. 74, the rib main body 234 (the rear rib 233L) is formed such that the height of the front portion is higher than the rear portion and such that the height of the rear portion gradually decreases as it goes rearward. A pipe through hole (a through hole) 236 is formed in the front portion of the rib main body 234, the pipe through hole 236 penetrating in the machine width direction K2 and being long in the front-rear direction K1. The pipe through hole 236 is a hole through which the pipe is inserted. The pipe through hole 236 penetrates the rear rib 233L in the horizontal direction. For example, a delivery hose for connecting the hydraulic pump P1 and the control valve V1 is inserted into the pipe through hole 236. A cut-out portion 237 is formed at the rear portion of the front rib 232L, the cut-out portion 237 being cut out in correspondence with the pipe through hole 236.

As shown in FIG. 73, the prime mover support portion 235 is provided at the front portion of the rib main body 234. The prime mover support portion 235 includes the first support column portion 235A, the second support column portion 235B, and the coupling wall portion 235C. The first support column 235A and the second support column 235B protrude upward from the rib main body 234. The second support portion 235B is provided behind the first support portion 235A with a clearance. The coupling wall portion 235C connects the first support column 235A and the second support column 235B. The first support base 50A is fixed by a bolt to the first support column 235A and the second support column 235B. The prime mover E1 is supported on the first support base 50A by a prime mover mount 239 in an anti-vibration manner. The width W1 of the rib main body 234 (a rear rib 233L) is wider than the width (the plate thickness) t5 of the front rib 232L. The height H1 of the rib main body 234 is lower than the height 112 of the front rib 232L.

As shown in FIG. 4 and FIG. 5, the second rib 43R (the reinforcing rib 43) includes a front rib 232R and a rear rib 233R. The front rib 232R is a sheet metal rib (a rib formed of a sheet metal), and the rear rib 233R is a cast steel rib (a rib formed of a cast steel). As shown in FIG. 5, the front rib 232R is erected on the turn base plate 42 and is arranged in the longitudinal direction.

As shown in FIG. 4, the front rib 232R is provided extending from the front portion of the turn base plate 42 to the front portion of the prime mover room E2. In particular, the front portion of the front rib 232R is fixed by the welding to the rear portion of the right portion of the support bracket 18. The rear portion of the front rib 232R extends through the right side of the partition plate 47, and is located at the front portion of the prime mover room E2. In addition, the front rib 232R extends so as to extend in an inclined direction that shifts rightward from the support bracket 18 as it goes rearward.

Figure 75:
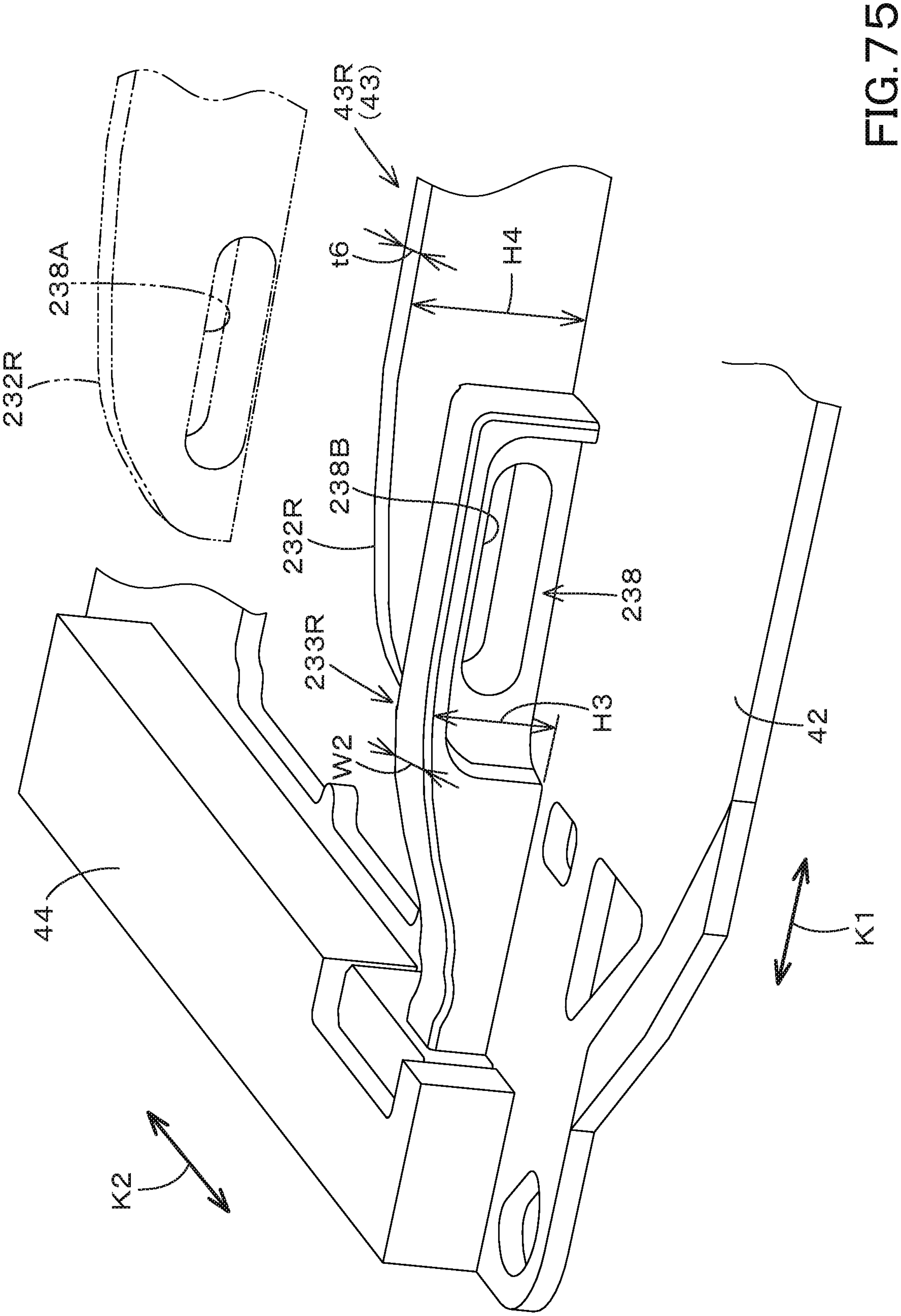
FIG. 75 is a perspective view of a rear portion of a second rib according to the embodiment.
Figure 76:
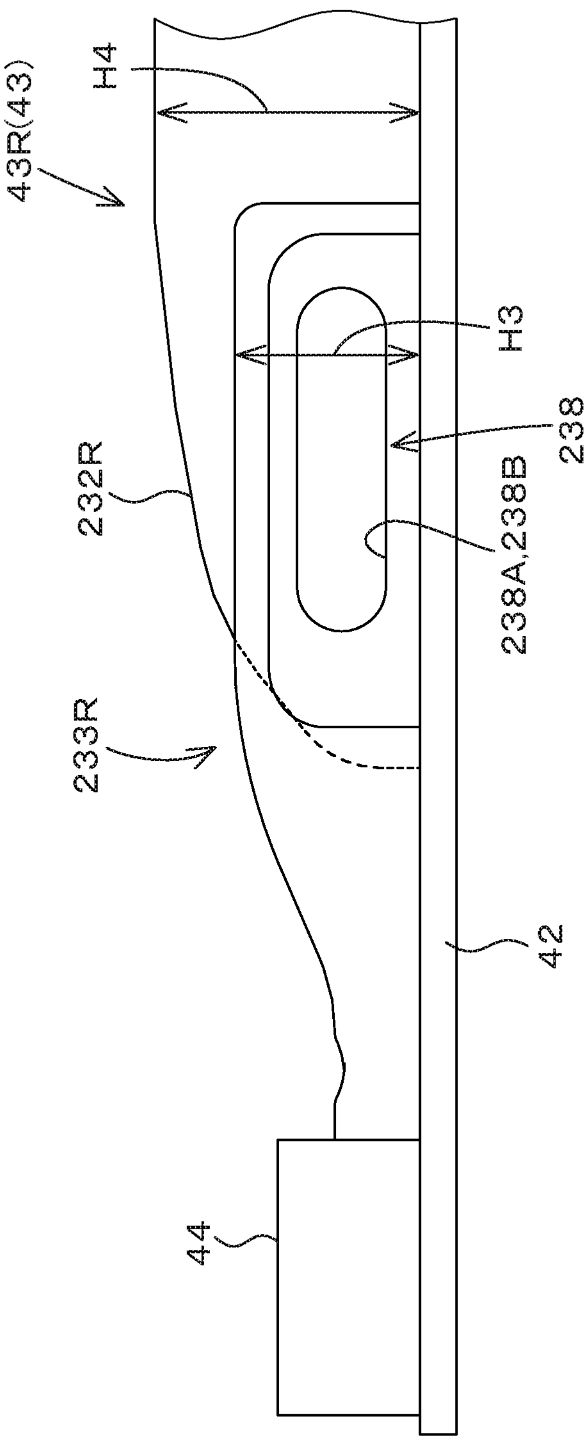
FIG. 76 is a side view of the rear portion of the second rib according to the embodiment.
Figure 77:
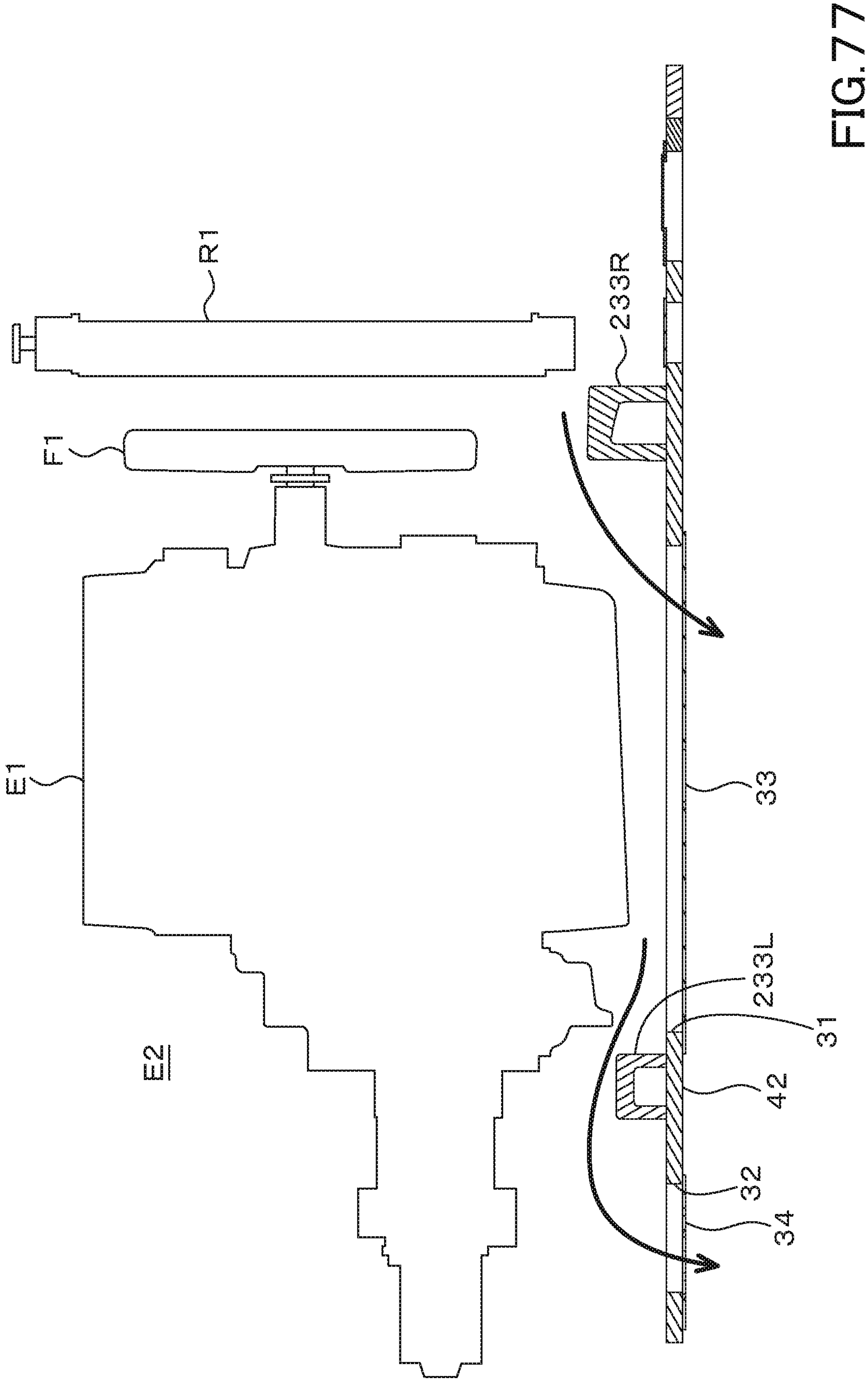
FIG. 77 is a back cross-section view of a prime mover room according to the embodiment.

As shown in FIG. 75 and FIG. 76, the rear rib 233R is arranged in the prime mover room E2. The rear rib 233R protrudes rearward from the right side surface of the rear portion of the front rib 232R, and the rear end is in contact with the first weight attachment portion 44. The front portion of the rear rib 233R is overlapped with the rear portion of the front rib 232R in a side view, and is fixed by the welding to the rear portion of the front rib 232R. A pipe through hole 238 is formed at a portion where the front rib 232R and the rear rib 233R are overlapped each other. In other words, the reinforcing rib 43 has the pipe through hole 238 through which the pipe is inserted, the pipe through hole 238 being formed in a portion where the front rib 232R and the rear rib 233R are overlapped each other. The pipe through hole 238 is a hole through which the pipe is inserted. For example, a delivery hose for connecting the hydraulic pump P1 and the control valve V1 is inserted into the pipe through hole 238. The pipe through hole 238 includes a first hole (a second through hole) 238A formed in the rear portion of the front rib 232R and includes a second hole (a through hole) 238B formed in the front portion of the rear rib 233R. The first hole 238A penetrates the front rib 232R in the horizontal direction, and the second hole 238B penetrates the rear rib 233L in the horizontal direction. The first hole 238A is communicated with the second hole 238B.

As shown in FIG. 73 and FIG. 74, the rear rib 233R is formed such that the height of the front portion is higher than the rear portion and such that the height of the rear portion gradually decreases as it goes rearward. The width W2 of the rear rib 233R is wider than the width (a plate thickness) t6 of the front rib 232R. The height H3 of the rib main body 234 is lower than the height H4 of the front rib 232R.

By forming the prime mover room E2 side of the reinforcing rib 43 with the cast steel, the reinforcement of the reinforcing rib 43 can be reduced, and the components can be simplified.

In addition, by forming a part of the reinforcing rib 43 in the prime mover room E2 with the cast steel, it is possible to secure the strength by increasing the width even if the height is lowered, and by reducing the height, the degree of freedom of the arrangement position of the prime mover E1 is increased with respect to the machine width direction K2 and the front-rear direction K1. In this manner, the prime mover E1 can be separated from the cooling device such as the radiator R1, and the cooling performance of the cooling device can be improved by separating the prime mover E1 from the cooling device.

As shown in FIG. 7, by reducing the height of the portion of the reinforcing rib 43 in the prime mover room E2, the flow of cooling air flowing in the lower portion of the prime mover room E2 can be improved, and the cooling performance of the prime mover E1 can be improved.

In addition, by forming the front ribs 232L and 232R with the sheet metal, the turn bearing 8 can be attached easily. That is, the outer race 8A of the turn bearing 8 is fixed by a bolt to the turn base plate 42, and a bolt insertion hole for inserting the bolt is formed in the turn base plate 42, but when the widths of the front ribs 232L and 232R are increased in the machine width direction K2, the front ribs 232L and 232R may be overlapped with the bolt insertion holes. By forming the front ribs 232L and 232R with the sheet metal, the widths of the front ribs 232L and 232R can be reduced, and the turn bearing 8 can be attached easily.

The joint portions between the front ribs 232L and 232R and the rear ribs 233L and 233R become unstable in strength. On the other hand, the strength of the joint portions between the front ribs 232L and 232R and the rear ribs 233L and 233R is ensured by making the front portions of the rear ribs 233L and 233R higher than the rear.

In the present embodiment, the reinforcing rib 43 includes the front ribs 232L and 232R formed of the sheet metal and includes the rear ribs 233L and 233R formed of the cast steel, but the front rib and the rear rib may be integrally formed with the cast steel. That is, at least the rear portion (the prime mover room E2 side) of the reinforcing rib 43 only needs to be formed of the cast steel.

In addition, one of the first rib 43L and the second rib 43R may be formed of a sheet metal rib and a cast steel rib, and the other rib may be integrally formed of the sheet metal or integrally formed of the cast steel. That is, it is only necessary that at least one of the first rib 43L and the second rib 43R has a cast steel rib on the prime mover room E2 side.

Figure 78:
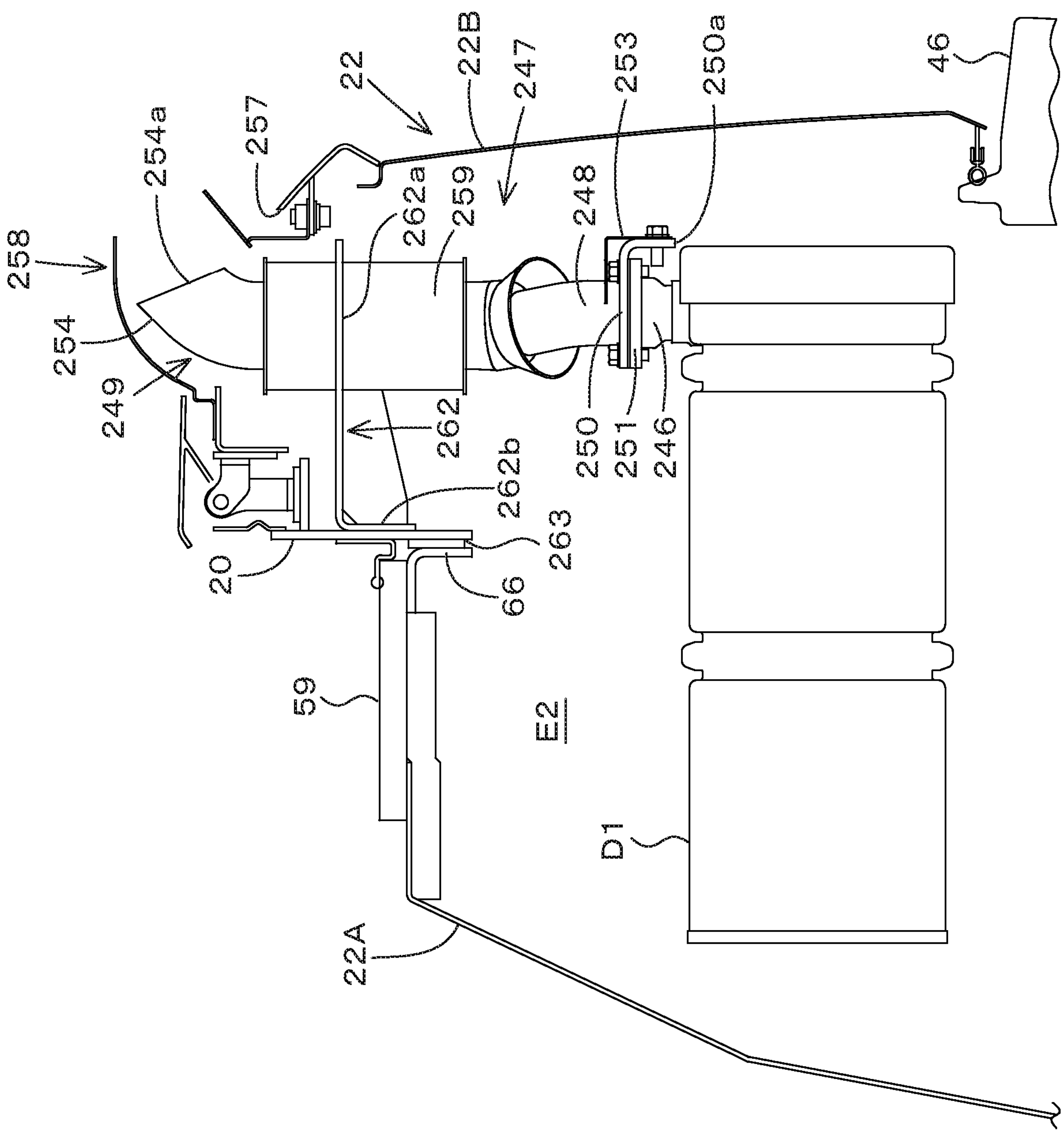
FIG. 78 is a side cross-section view of an upper portion of the prime mover room according to the embodiment.
Figure 79:
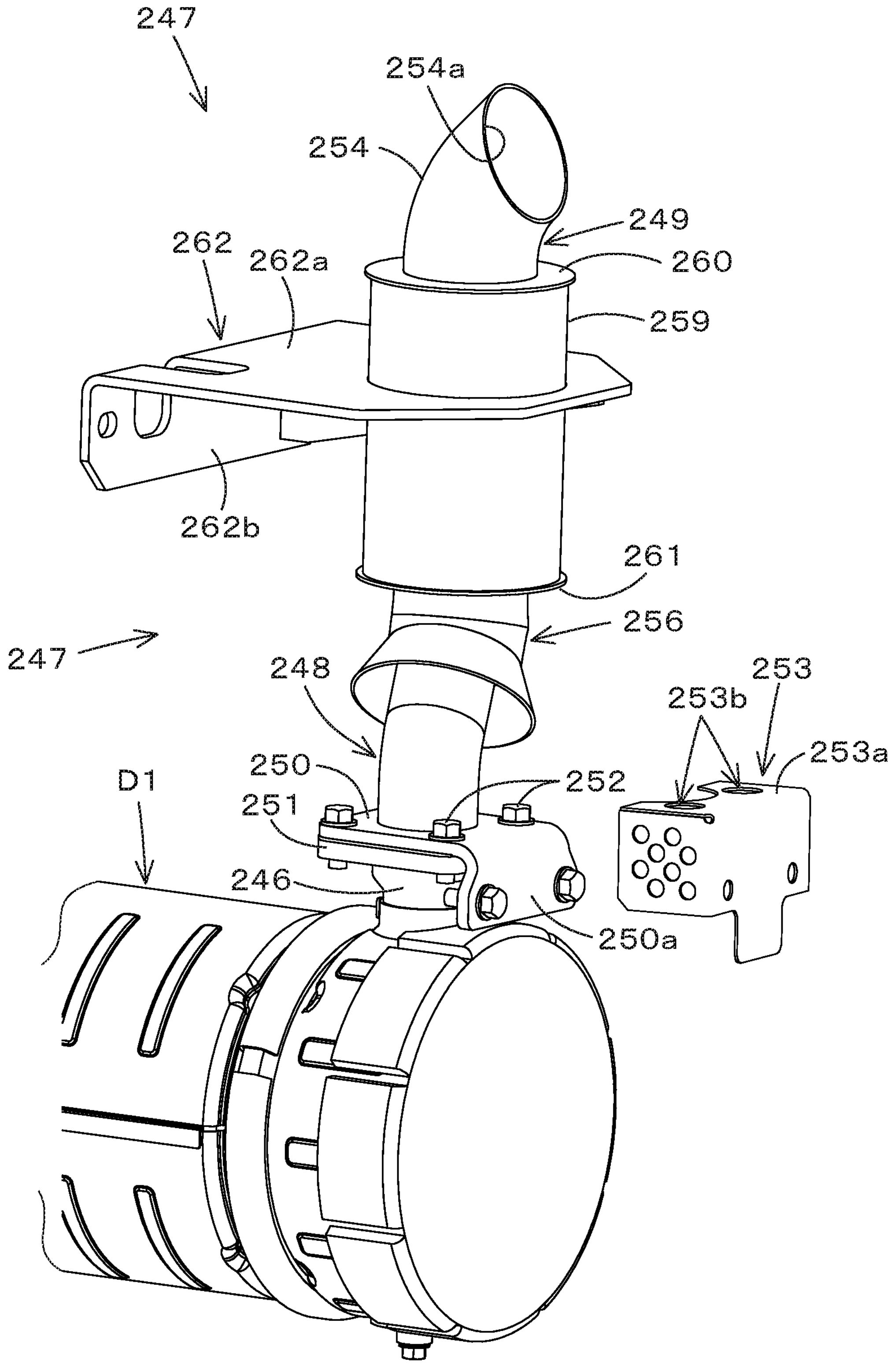
FIG. 79 is a perspective view of an exhaust device according to the embodiment.
Figure 80:
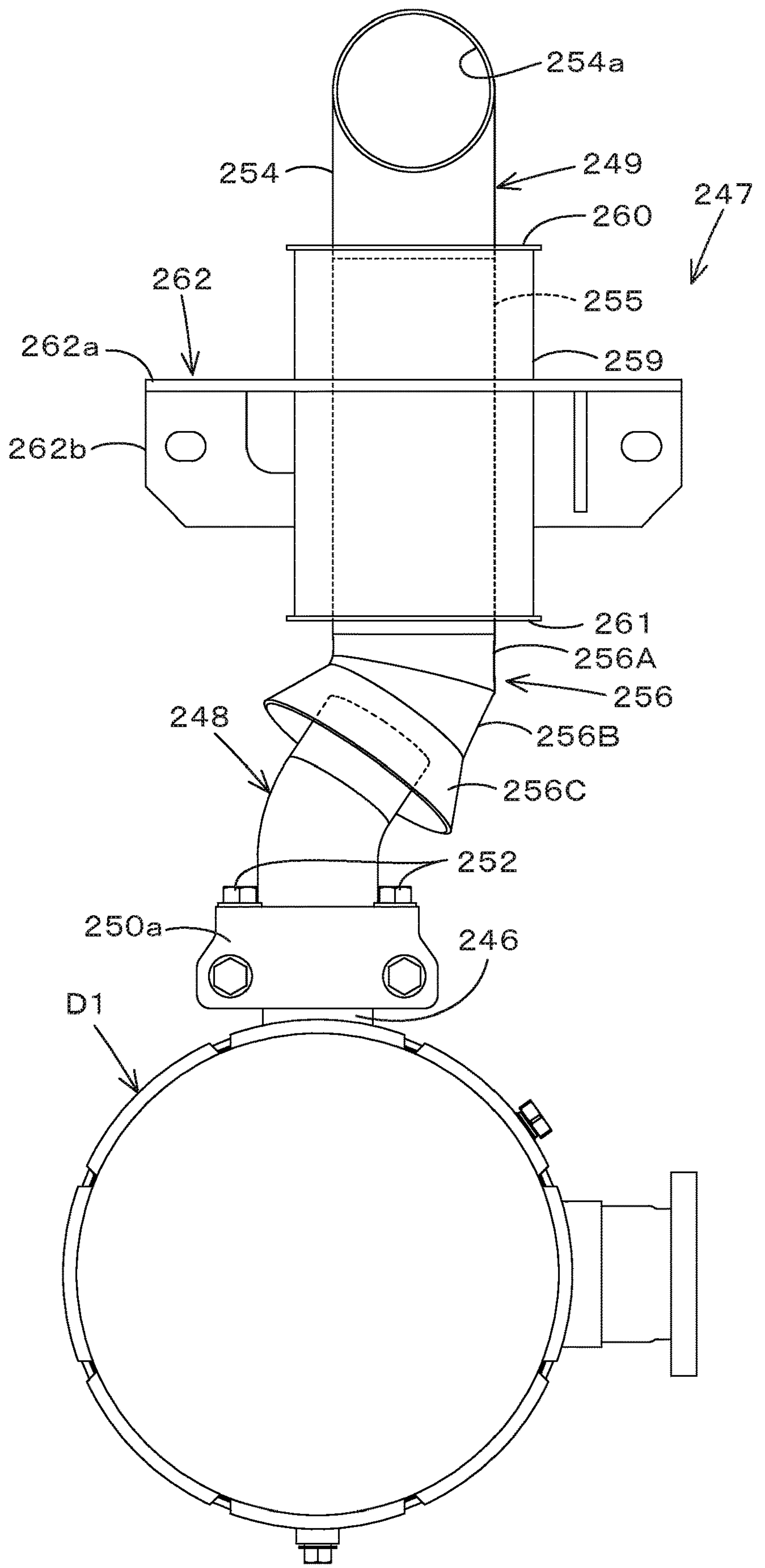
FIG. 80 is a back view of the exhaust device according to the embodiment.

As shown in FIG. 78, FIG. 79, and FIG. 80, the exhaust gas purifier device D1 has an exhaust portion 246 that exhausts the purified exhaust gas discharged from the prime mover E1, and an exhaust device 247 is attached to the exhaust portion 246. The exhaust gas that has passed through the exhaust gas purifier device D1 is exhausted to the atmosphere through the exhaust device 247. The exhaust device 247 includes an exhaust conduit 248 and an exhaust pipe 249. The exhaust conduit 248 guides, to the exhaust pipe 249, the exhaust gas discharged from the exhaust portion 246. An exhaust side of the exhaust conduit 248 is inserted to the exhaust pipe 249 with a clearance kept from the exhaust pipe 249, the clearance allowing the air to flow. The exhaust pipe 249 exhausts, to the atmosphere, the exhaust gas discharged from the exhaust conduit 248.

Figure 81:
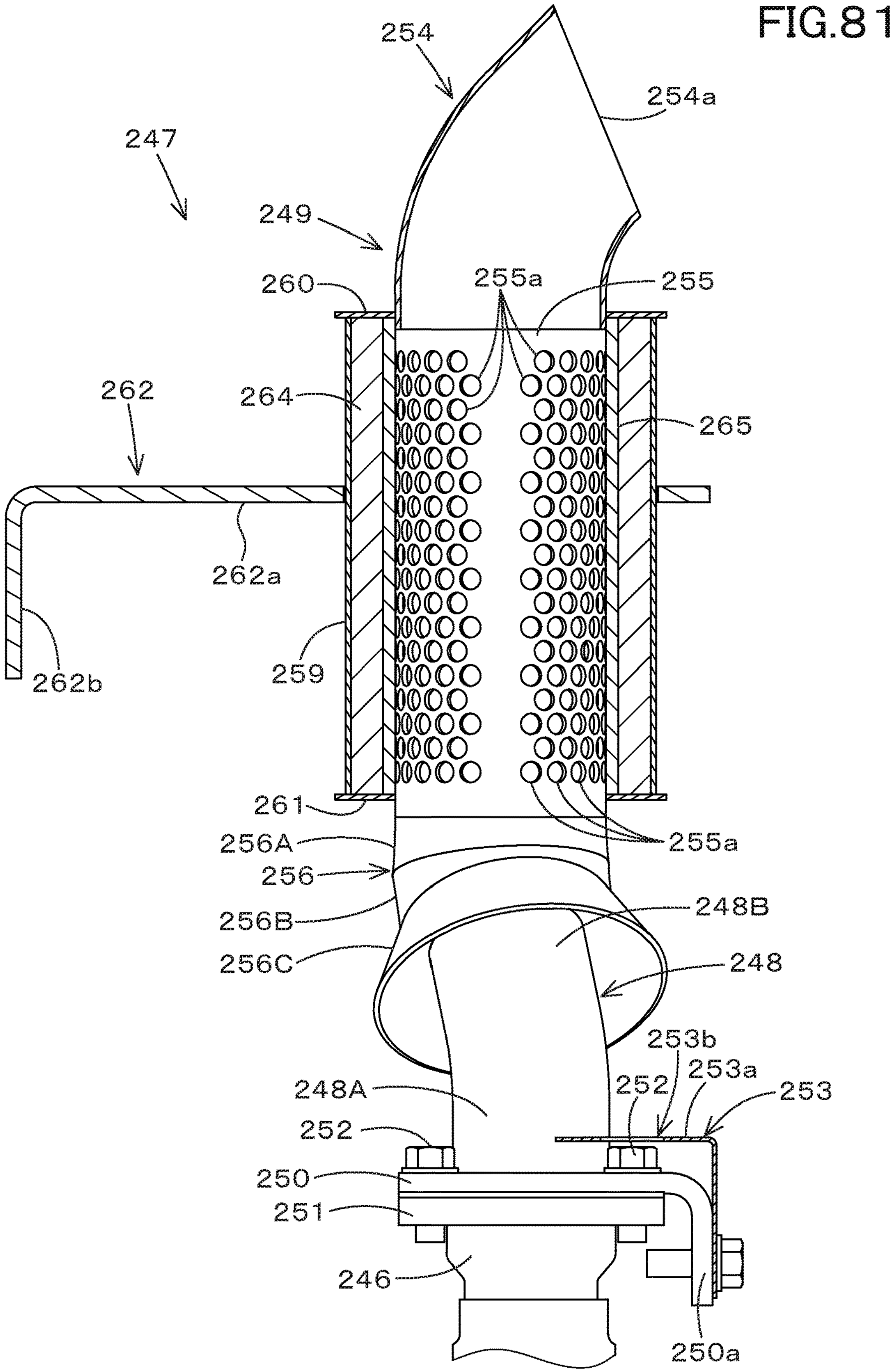
FIG. 81 is a side cross-section view illustrating a part of the exhaust device according to the embodiment.
Figure 82:
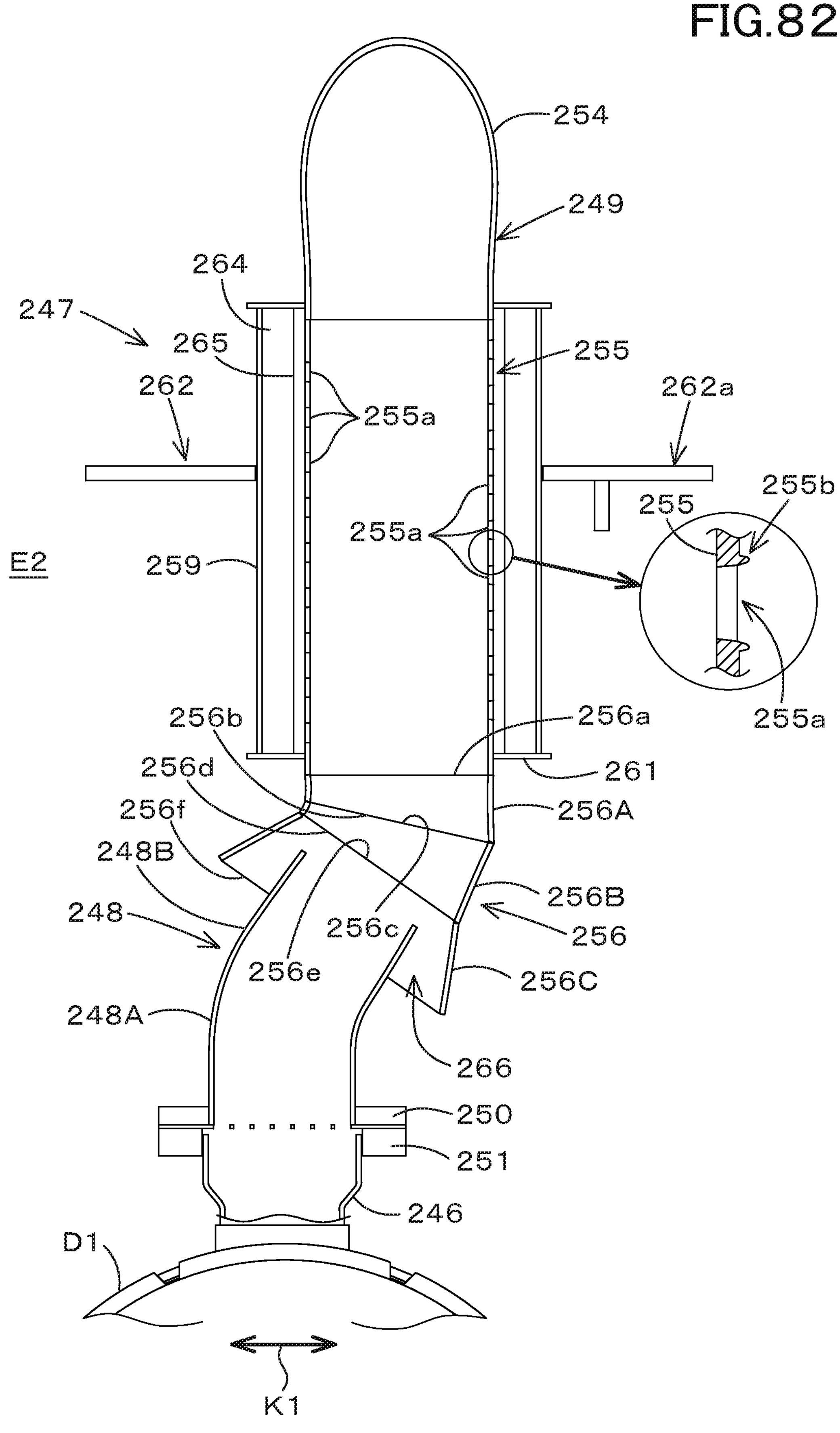
FIG. 82 is a back cross-section view of the exhaust device according to the embodiment.

As shown in FIG. 81 and FIG. 82, a joint flange 250 is fixed to the lower portion of the exhaust conduit 248. The joint flange 250 is fixed by the bolt 252 to the joint flange 251 fixed to the exhaust portion 246. In this manner, the exhaust conduit 248 is connected to the exhaust side of the exhaust gas purifier device D1. The exhaust conduit 248 is communicated with the exhaust portion 246 and the exhaust pipe 249, and guides, to the exhaust pipe 249, the exhaust gas discharged from the exhaust portion 246.

As shown in FIG. 82, the exhaust conduit 248 includes a first pipe portion 248A and a second pipe portion 248B. The joint flange 250 is fixed to the lower portion of the first pipe portion 248A. Thus, the first pipe portion 248A is connected to the exhaust side of the exhaust gas purifier device D1, and the exhaust gas is introduced from the exhaust portion 246 into the first pipe portion 248A. The first pipe portion 248A is provided so as to protrude (extend) upward from the exhaust portion 246. The first pipe portion 248A is displaced from the position below the exhaust pipe 249 in the horizontal direction. In the present embodiment, the first pipe portion 248A is displaced from the lower position of the exhaust pipe 249 in the machine width direction K2 (the left side).

As shown in FIG. 82, the second pipe portion 248B extends from the upper portion of the first pipe portion 248A in a direction inclined with respect to the vertical direction. In other words, the second pipe portion 248B is formed in an inclined shape that shifts toward the exhaust pipe 249 as it goes upward from the first pipe portion 248A. In the present embodiment, the second pipe portion 248B has an inclined shape that shifts to the right as it goes upward.

FIG. 79 and FIG. 81, the joint flange 250 has, at the rear portion, an attachment wall 250*a* extending downward. A cover member 253 that covers the exhaust portion 246 from the rear is attached to the attachment wall 250*a*. An insertion hole 253*b* is formed in the upper wall 253*a* of the cover member 253, the insertion hole 253*b* allows a tool engaged with the bolt 252 to be inserted thereto.

As shown in FIG. 81 and FIG. 82, the exhaust pipe 249 includes a tail pipe portion 254 arranged in the upper portion, a perforated pipe portion 255 arranged in the middle portion, and a skirt portion 256 arranged in the lower portion. The tail pipe portion 254 has, in the upper portion, an exhaust port 254*a* oriented in an inclined direction that shifts backward as it goes upward. The exhaust gas is discharged from the exhaust port 254*a* to the atmosphere.

As shown in FIG. 78, the tail tube portion 254 has an upper portion protruding from an opening 257 formed in the bonnet rear portion 22B to the outside of the bonnet 22. The tail pipe portion 254 is covered with a pipe cover 258 attached to the bonnet rear portion 22B. The pipe cover 258 has an opening that allows the exhaust port 254*a* to communicate with the outside.

As shown in FIG. 81 and FIG. 82, the perforated pipe portion 255 is a tube having a large number of small holes 255*a*. For example, the perforated pipe portion 255 is formed by processing a punching metal (a plate made by punching a metal plate or the like with a punching press die) into a cylindrical shape. The perforated pipe portion 255 is arranged below the tail tube portion 254 along the vertical direction, and is attached to the lower end of the tail tube portion 254 by the welding or the like. The perforated pipe portion 255 is communicated with the tail tube portion 254. In addition, the perforated pipe portion 255 is arranged at a position eccentric with respect to the axis of the first pipe portion 248A, extending in the vertical direction.

As shown in FIG. 82, the perforated pipe portion 255 is formed such that a returning portion (the burr) 255*b* formed when the small hole 255*a* is formed is located on the outer surface side. In this manner, the flow of the exhaust gas flowing through the perforated pipe portion 255 can be smooth, and the back pressure of the exhaust gas flowing through the perforated pipe portion 255 can be reduced.

As shown in FIG. 80 and FIG. 82, the skirt portion 256 is positioned below the perforated pipe portion 255, and is fixed to the lower end of the perforated pipe portion 255 by the welding. The skirt portion 256 has the first portion 256A, the second portion 256B, and the third portion 256C. The first portion 256A is joined to the lower end of the perforated pipe portion 255, the second portion 256B is joined to the lower end of the first portion 256A, and the third portion 256C is joined to the lower end of the second portion 256B. The first portion 256A and the second portion 256B are formed by straight pipes, and the third portion 256C is formed by a pipe that gradually increases in diameter from one end to the other end in the axial direction.

As shown in FIG. 82, the second pipe portion 248B is inserted into the lower portion (the third portion 256C) of the skirt portion 256, and the skirt portion 256 (a lower portion of the exhaust pipe 249) is bent toward the second pipe portion 248B. More specifically, the first portion 256A is formed in an inclined shape in which the upper end portion 256*a* is formed to be orthogonal to the axial direction and the lower end portion 256*b* is shifted to the left as it goes downward. The second portion 256B has an inclined shape in which the upper end portion 256*c* coincides with the lower end portion 256*b* of the first portion 256A, and has an inclined shape in which the lower end portion 256*d* shifts to the left as it goes downward and has a larger inclination angle than the upper end portion 256*c* with respect to the horizontal direction. The third portion 256C has an inclined shape in which the upper end portion 256*e* coincides with the lower end portion 256*d* of the second portion 256B and in which the lower end portion 256*f* is parallel to the upper end portion 256*e*.

A gap 266 is provided between the second pipe portion 248B and the lower portion (the third portion 256C) of the skirt portion 256, and this gap 266 gradually increases as it goes downward.

Since the exhaust conduit 248 is inserted in the exhaust pipe 249 with a gap through which the air can flow, the exhaust gas flowing from the exhaust conduit 248 to the exhaust pipe 249 (by the ejector effect) causes the air in the prime mover room E2 to flow into the exhaust pipe 249 through the gap 266, and thereby reduces the exhaust temperature of the exhaust gas.

As shown in FIG. 81 and FIG. 82, an outer sleeve 259 that covers the circumference of the perforated pipe portion 255 is provided on the outer circumference of the perforated pipe portion 255. The outer sleeve 259 is provided substantially concentrically with the perforated pipe portion 255, and a gap is formed between the outer tube 259 and the perforated pipe portion 255. The upper end of the gap is closed by the upper lid plate 260, and the lower end is closed by the lower lid plate 261. The upper lid plate 260 and the lower lid plate 261 are formed in a ring shape. The upper lid plate 260 is fitted and fixed to the outside of the lower portion of the tail tube portion 254. The lower lid plate 261 is fitted and fixed to the outside of the lower portion of the perforated pipe portion 255.

As show in FIG. 78, the perforated pipe portion 255 and the outer sleeve 259 are provided in the prime mover room E2. The outer sleeve 259 and the exhaust pipe 249 are supported by the cover plate 20 via the bracket 262. The bracket 262 is a support member that connects between the outer sleeve 259 and the machine body 2 side and supports the outer sleeve 259 and the exhaust pipe 249. The lower portion of the cover plate 20 is attached to the coupling plate 66 via a plate member 263. The bracket 262 has an upper wall 262*a* to which the outer sleeve 259 is fixed, and has an attachment wall 262*b* attached to the cover plate 20. The attachment wall 262*b* is attached to the cover plate 20 so that its position can be adjusted in the machine width direction K2.

As shown in FIG. 81 and FIG. 82, a noise insulator material 264 is filled between the perforated pipe portion 255 and the outer sleeve 259. The noise insulator material 264 is, for example, formed of glass wool. A shielding material 265 is provided between the noise insulator material 264 and the perforated pipe portion 255. The shielding material 265 is formed in a cylindrical shape that covers the outer surface of the perforated pipe portion 255. The shielding material 265 is formed of a material that blocks the noise insulator material 264 from entering the perforated pipe portion 255 through the small hole 255*a*. For example, the shielding material 265 is formed of stainless steel wool. By providing the shielding material 265, the noise insulator material 264 can be prevented from scattering from the exhaust pipe 249 to the outside. In addition, in this embodiment, by using the stainless steel as the shielding material 265, a noise deadening effect can be obtained in addition to the effect of preventing the noise insulator material 264 from scattering into the exhaust pipe 249. In this embodiment, the stainless steel wool and the glass wool are filled between the perforated pipe portion 255 and the outer sleeve 259. However, the present invention is not limited thereto, and for example, only stainless steel wool may be filled, and only glass wool may be filled. In addition to the glass wool and the stainless steel wool, or in place of one or both of the glass wool and the stainless steel wool, other noise insulator materials (for example, the silicon wool, the rock wool, the ceramic wool, and the like) may be filled.

The perforated pipe portion 255, the outer sleeve 259, and the noise insulator material 264 constitute a noise absorbing silencer. This silencer is capable of reducing the exhaust noise. In addition, the silencer is provided with the perforated pipe portion 255 in the middle portion of the exhaust pipe 249 and has a structure in which the noise insulator material 264 is filled between the perforated pipe portion 255 and the outer sleeve 259, thereby the exhaust noise can be reduced with a compact structure. In addition, since the silencer is compact, the silencer can be stored in the bonnet 22, and thus the appearance of the working machine 1 is not spoiled. In addition, since the length and outer diameter of the outer sleeve 259 can be freely adjusted, the degree of noise reduction can be adjusted by adjusting at least one of the length and outer diameter of the outer sleeve 259.

In addition, the first pipe portion 248A is displaced in the horizontal direction from the lower position of the exhaust pipe 249, and the second pipe portion 248B is formed in an inclined shape that shifts toward the exhaust pipe 249 as it goes upward. And, by bending the lower portion of the exhaust pipe 249 toward the second pipe portion 248B, the communicating portion between the exhaust conduit 248 and the exhaust pipe 249 can be formed compact in the vertical direction, and thereby the exhaust device 247 can be configured compactly.

As shown in FIG. 2, a fuel tank T1 configured to store the fuel for the prime mover E1 is mounted on the left front portion of the machine body 2. As shown in FIG. 4, the fuel tank T1 is arranged to the left of the first rib 43L and in front of the partition plate 47. The partition plate 47 partitions the arrangement side of the prime mover E1 and the fuel-supplying portion 291 (the prime mover room E2) and the arrangement side of the fuel tank T1.

Figure 83:
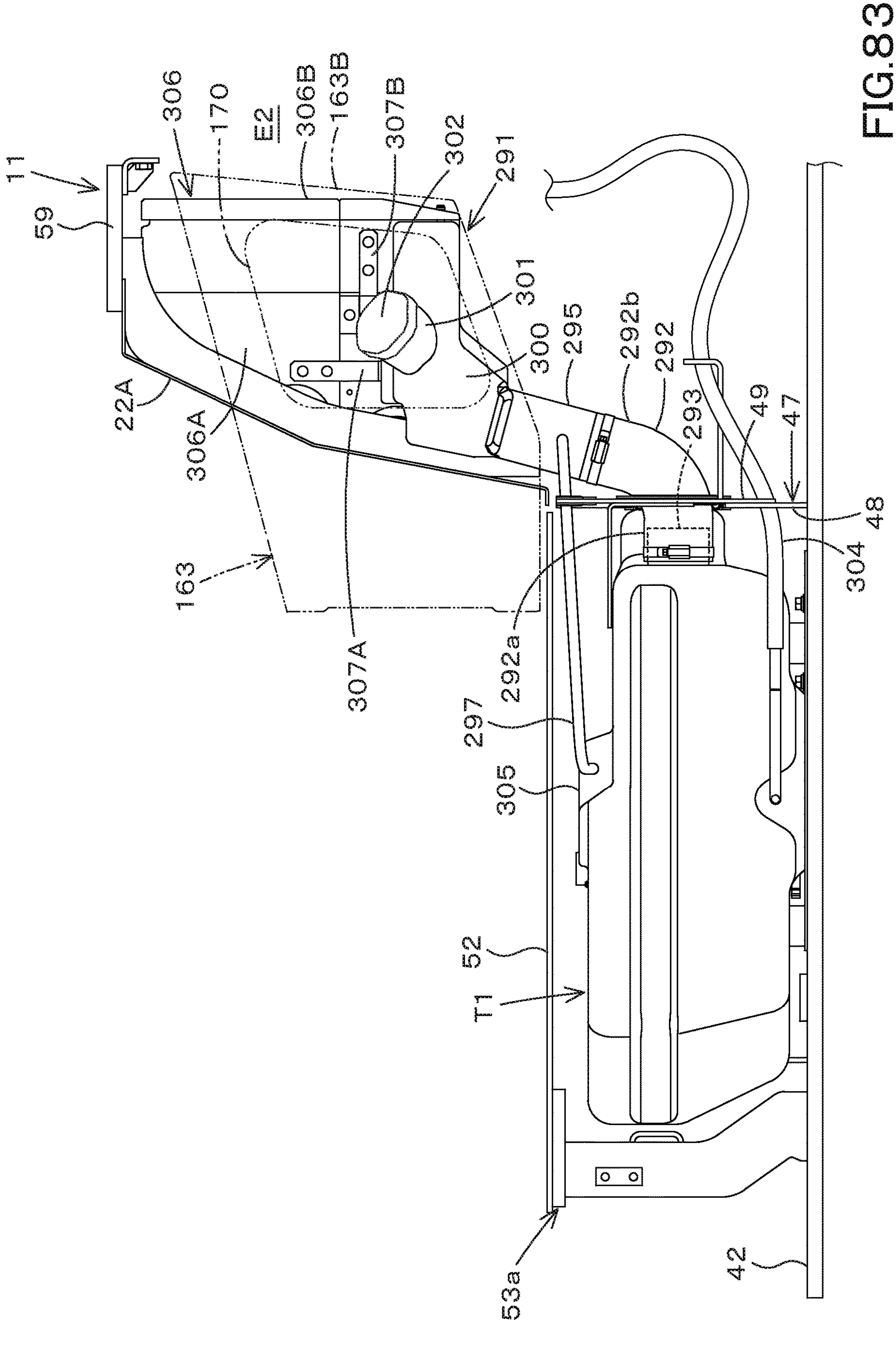
FIG. 83 is a side view of an arrangement portion of a fuel tank and a fuel-supplying portion according to the embodiment.

As shown in FIG. 83, the fuel tank T1 is arranged below the step 52, that is, in the machine body 2. The fuel tank T1 is placed on the turn base plate 42, the upward movement of the fuel tank T1 is restricted by the bracket, and the position of the fuel tank T1 is fixed by being pressed against the first rib 43L and the partition plate 47 by the band.

The fuel-supplying portion 291 is a member into which the fuel to be supplied to the fuel tank T1 is injected. As shown in FIG. 83, the fuel-supplying portion 291 is arranged behind the shield wall member 22A (in the prime mover room E2), and the fuel tank T1 and the fuel-supplying portion 291 are connected to a connector pipe 292 provided penetrating through the partition plate 47. One end side of the connector pipe 292 is connected to the side surface of the fuel tank T1. The side surface of the fuel tank T1 is a vertical wall surface between the upper surface and the lower surface, and includes a front surface, a left surface, a right surface, and a rear surface. By connecting the connector pipe 292 to the side surface of the fuel tank T1, the connector pipe 292 can be arranged at a low position, and the connector pipe 292 can be inserted through the partition plate 47. By inserting the connector pipe 292 through the partition plate 47, the partition structure between the arrangement side of the prime mover E1 and the fuel-supplying portion 291 and the arrangement side of the fuel tank T1 can be simplified.

Figure 85:
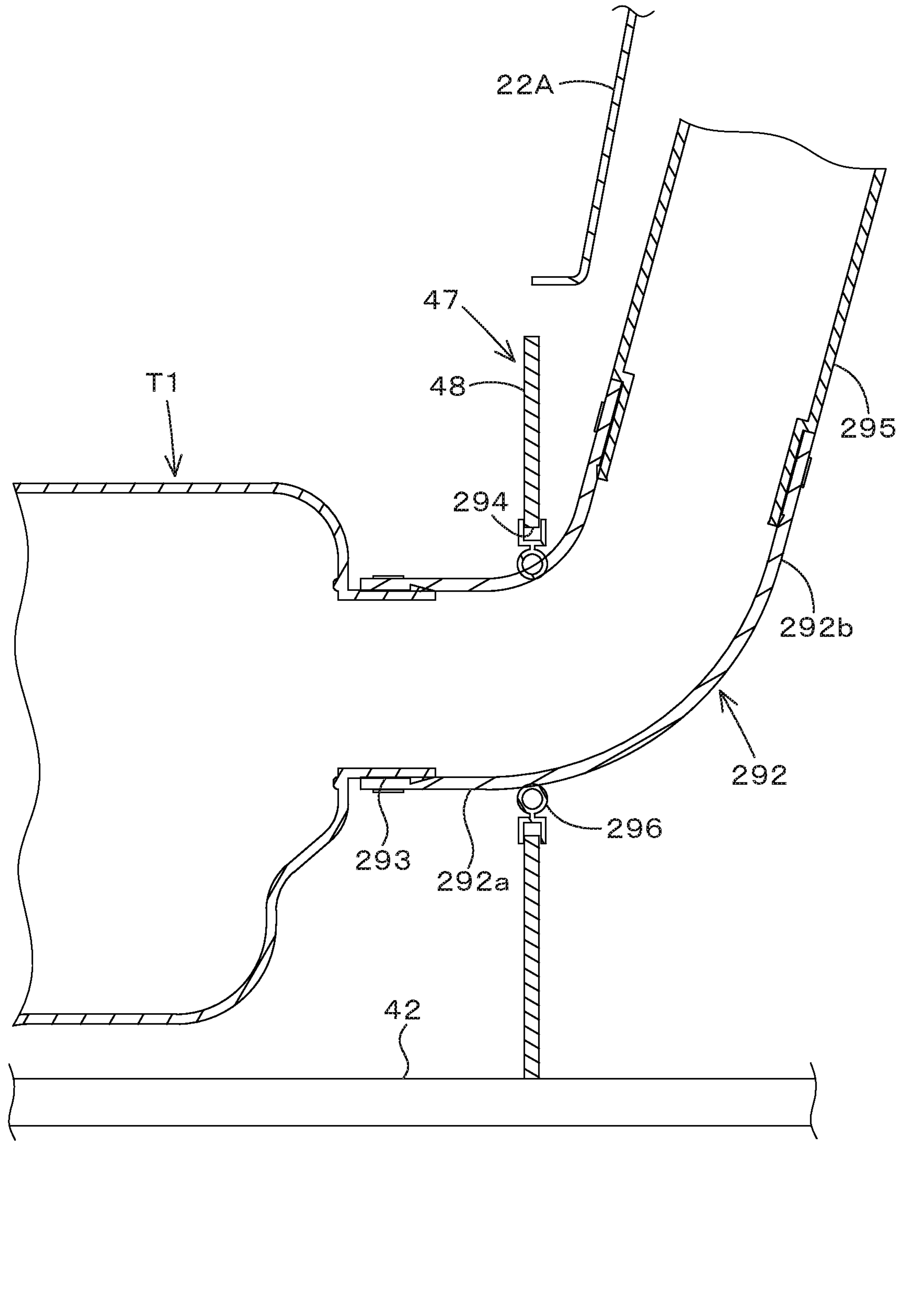
FIG. 85 is a side cross-section view of a coupling portion between the fuel tank and the fuel-supplying portion according to the embodiment.
Figure 86:
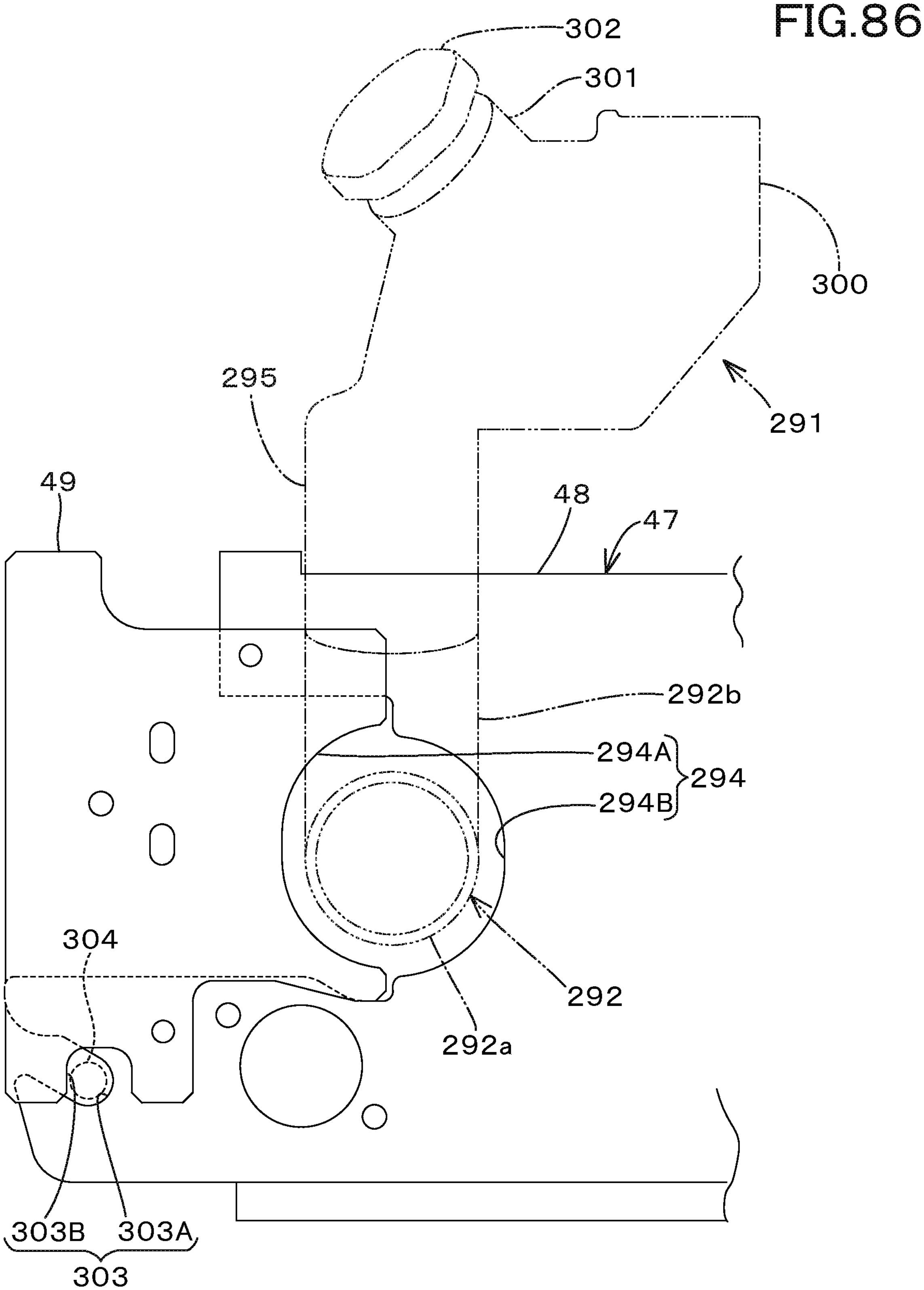
FIG. 86 is a back view of a portion where a through hole is formed according to the embodiment.

As shown in FIGS. 85 and 86, the partition plate 47 has a through hole 294 formed at a rear position of the fuel tank T1. The through hole 294 is a hole through which the connector pipe 292 is inserted. The fuel tank T1 has an inflow pipe portion 293 that allows the fuel to flow into on a rear surface corresponding to the through hole 294. The axial direction of the inflow pipe portion 293 is substantially parallel to the plate surface normal direction of the partition plate 47.

As shown in FIG. 83, the fuel-supplying portion 291 has, at the bottom, a supply pipe portion 295 that supplies the fuel at the bottom. The inflow pipe portion 293 and the supply pipe portion 295 are connected by the connector pipe 292.

As shown in FIG. 85, the connector pipe 292 has the first portion 292*a* and the second portion 292*b*. The first portion 292*a* is connected to the inflow pipe portion 293. The first portion 292*a* extends from the inflow pipe portion 293 toward the through hole 294, and passes through the through hole 294. The second portion 292*b* extends upward from the first portion 292*a*, and is connected to the supply pipe portion 295. A gap between the through hole 294 and the connector pipe 292 is sealed with the sealing material 296. Since the connector pipe 292 is only inserted orthogonally through the partition plate 47, the partition structure between the arrangement side of the prime mover E1 and the arrangement side of the fuel tank T1 can be simplified.

Figure 87:
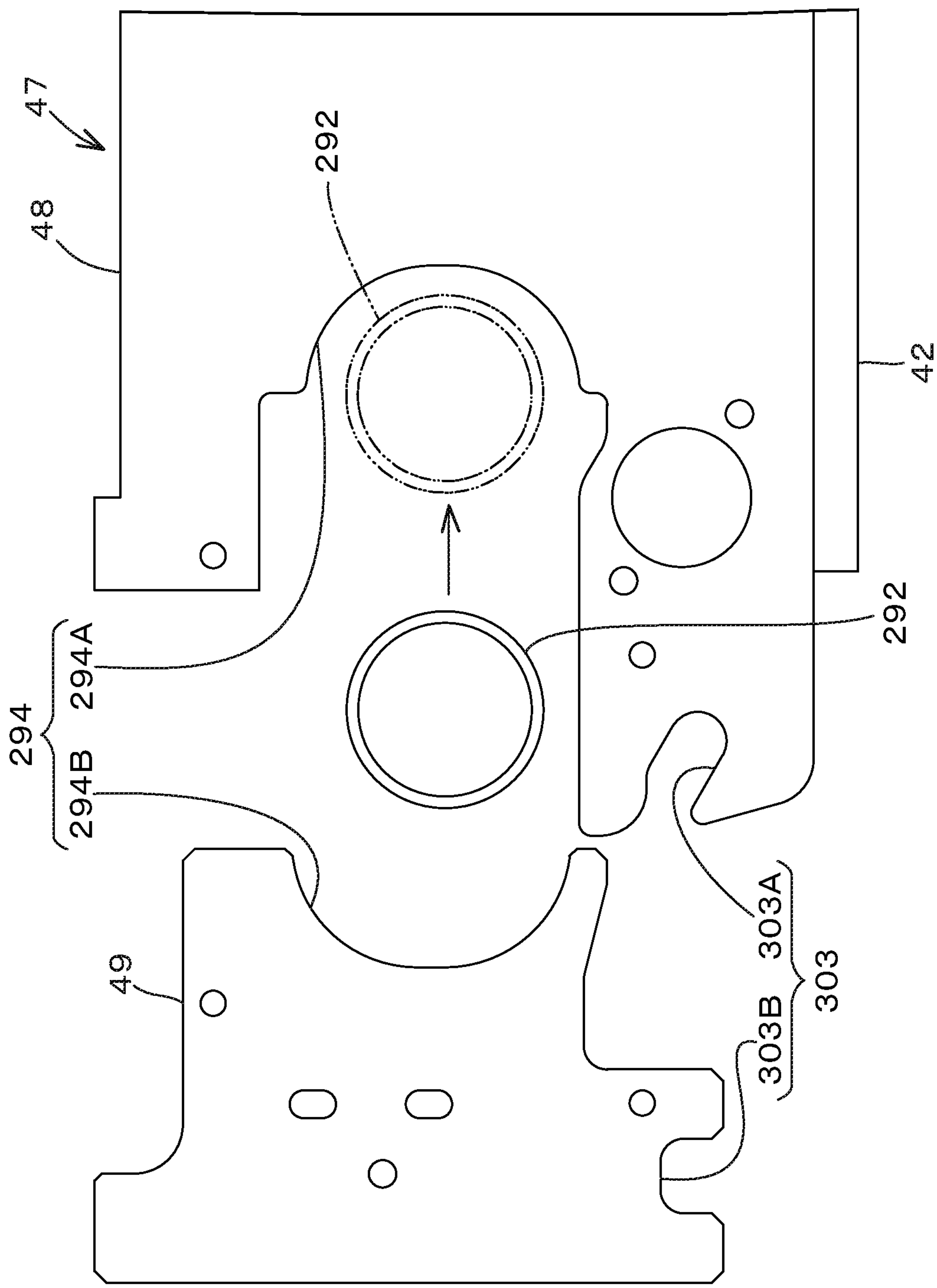
FIG. 87 is an exploded back view of the portion where the through hole is formed according to the embodiment.

As shown in FIG. 86 and FIG. 87, the main partition plate 48 has a first recess portion 294A into which a part of the connector pipe 292 (the first portion 292*a*) can be inserted in the radial direction. The sub partition plate 49 has a second recess portion 294B that forms a through hole 294 in cooperation with the first recess portion 294A. The connector pipe 292 is inserted into the first recess portion 294A with the sub partition plate 49 removed, and then the sub partition plate 49 is attached to the main partition plate 48 so that the connector pipe 292 can easily pass through the through hole 294. In this manner, the connector pipe 292 can be inserted into the through hole 294 under the state where the connector pipe 292 is connected to the fuel tank T1 and the fuel-supplying portion 291.

As shown in FIG. 86, the partition plate 47 has a hose through hole 303 through which the fuel hose 304 is passed. The fuel hose 304 is a hose that supplies the fuel to the prime mover E1. The hose through hole 303 is formed of the first recess 303A formed in the main partition plate 48 and the second recess 303B formed in the sub partition plate 49. A part of the fuel hose 304 can be inserted into the first recess 303A in the radial direction. In this manner, the fuel hose 304 can be inserted into the hose through hole 303 under the state where the fuel hose 304 is connected to the fuel tank T1.

The fuel is supplied from the fuel tank T1 to the prime mover E1 through the fuel hose 304, the water separator, the fuel pump, the fuel filter, and the like.

When the connector pipe 292 for allowing the fuel to flow into the fuel tank T1 is connected to the side surface of the fuel tank T1, the fuel tank T1 will not be fully charged unless the air above the inflow pipe portion 293 is released.

Thus, as shown in FIG. 83, the upper portion of the fuel tank T1 and the fuel supply portion 291 are connected by an air releasing pipe 297 for releasing the air from the fuel tank T1. At the time of refueling, the air in the fuel tank T1 is released by the air releasing pipe 297, so that the fuel can be put into the fuel tank T1 to above the inflow pipe portion 293.

Figure 84:
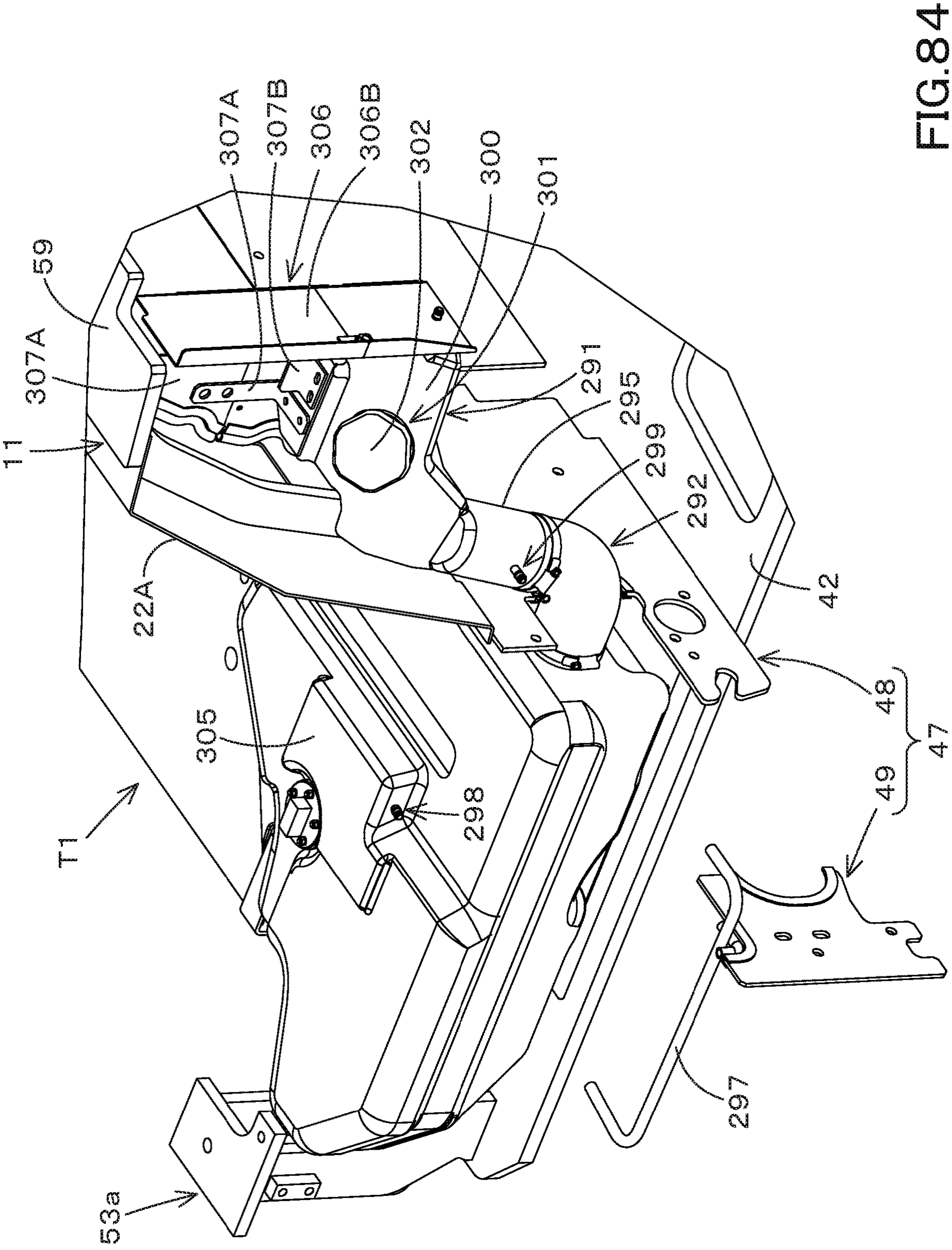
FIG. 84 is a perspective view of the arrangement portion of the fuel tank and the fuel-supplying portion according to the embodiment.

As shown in FIG. 84, the first connection portion 298 is provided at the upper portion of the fuel tank T1, the second connection portion 299 is provided at the lower portion of the supply pipe portion 295, and the first connection portion 298 and the second connection portion 299 are connected by the air releasing pipe 297. An air reservoir portion 305 is formed in the upper portion of the fuel tank T1, and the first connection portion 298 is attached to the side surface of the air reservoir portion 305 outside the machine body. The second connection portion 299 is provided at a position slightly higher than the first connection portion 298. Thus, the air releasing pipe 297 is provided in an inclined shape that shifts upward as it goes from the fuel tank T1 toward the fuel supply portion 291 (towards the rear). In this manner, the air can be released well even when the machine body 2 is tilted. In addition, the upward inclination angle of the air releasing pipe 297 with respect to the horizontal direction is not particularly limited as long as it is an angle at which the air in the fuel tank T1 can be appropriately released. In the present embodiment, the inclination angle is set to approximately 3° under the state the working machine 1 stays horizontally.

As shown in FIG. 83 and FIG. 84, the fuel-supplying portion 291 includes a sub tank 300 configured to store the fuel, and includes a fuel supply port 301 from which the fuel is injected into the sub tank 300. The providing of the sub tank 300 increases the fuel storage capacity. The supply pipe portion 295 extends downward from the sub tank 300. The fuel injected into the sub tank 300 flows from the supply pipe portion 295 into the fuel tank T1 through the connector pipe 292 and the inflow pipe portion 293.

As shown in FIG. 83, the sub tank 300 is located inward of the rear portion 163B of the outer layer member 163 in the machine inward direction. The fuel-supplying port 301 is closed by a fuel cap 302 and is configured to be opened and closed. The fuel-supplying port 301 is provided on the machine outward side of the sub tank 300. The fuel-supplying port 301 is located on the machine inward side of the opening/closing lid 170, and when the opening/closing lid 170 is opened, the fuel-supplying port 301 can be accessed.

Figure 88:
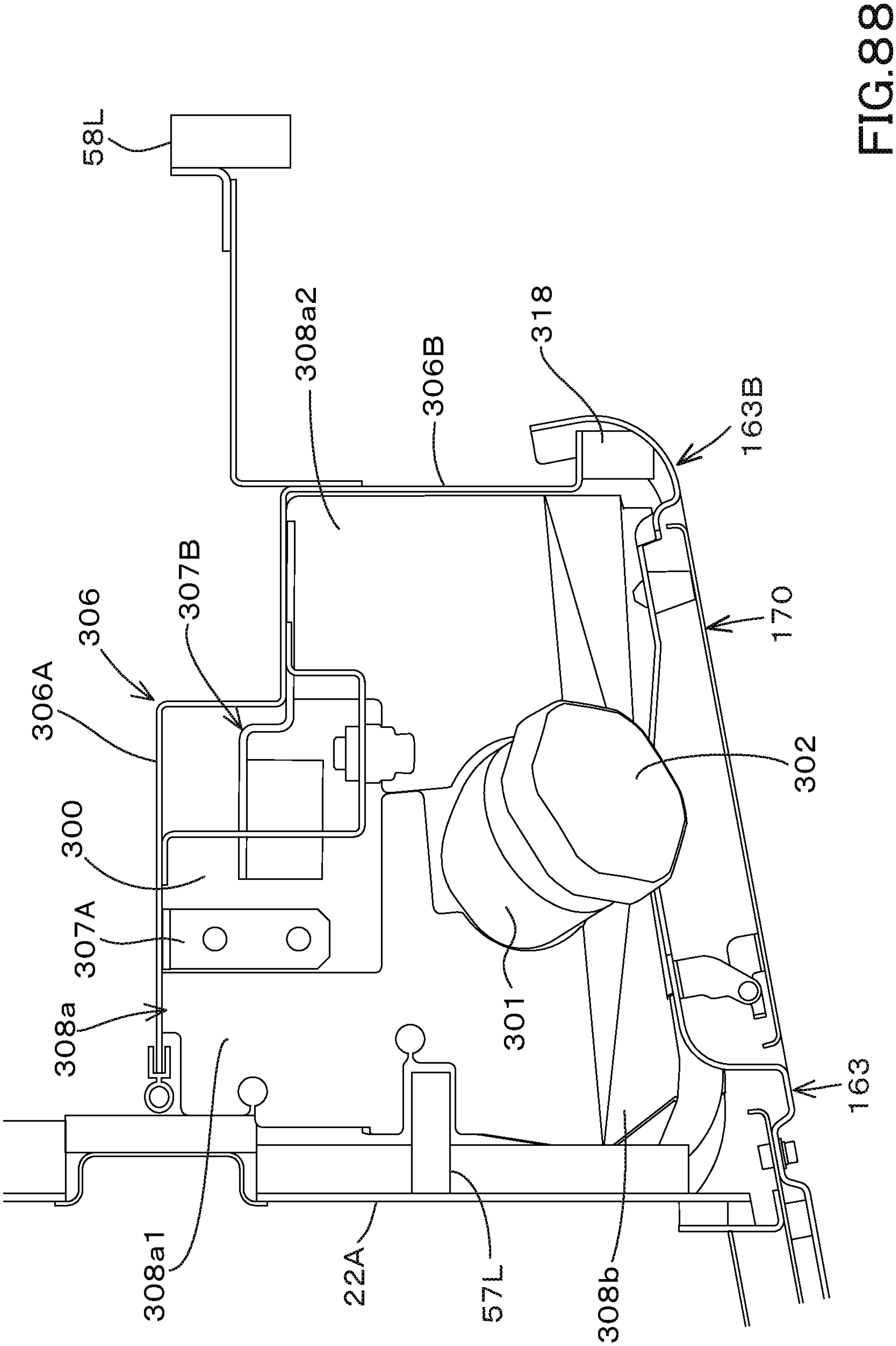
FIG. 88 is a planer cross-section view illustrating the arrangement portion of the fuel-supplying portion according to the embodiment.

As shown in FIG. 83 and FIG. 84, the sub tank 300 is supported by a cover plate 306 attached to the support frame 11. As shown in FIG. 88, the machine inward side of the sub tank 300 is covered with the side surface portion 306A of the cover plate 306. The rear side of the sub tank 300 is covered with a rear surface portion 306B of the cover plate 306. A space between the end portion of the rear surface portion 306B on the machine outward side and the inner surface of the rear portion 163B of the outer layer member 163 is sealed with the sealing material 318. The sub tank 300 is supported on the cover plate 306 by a bracket 307A and a bracket 307B attached to the cover plate 306.

Figure 89:
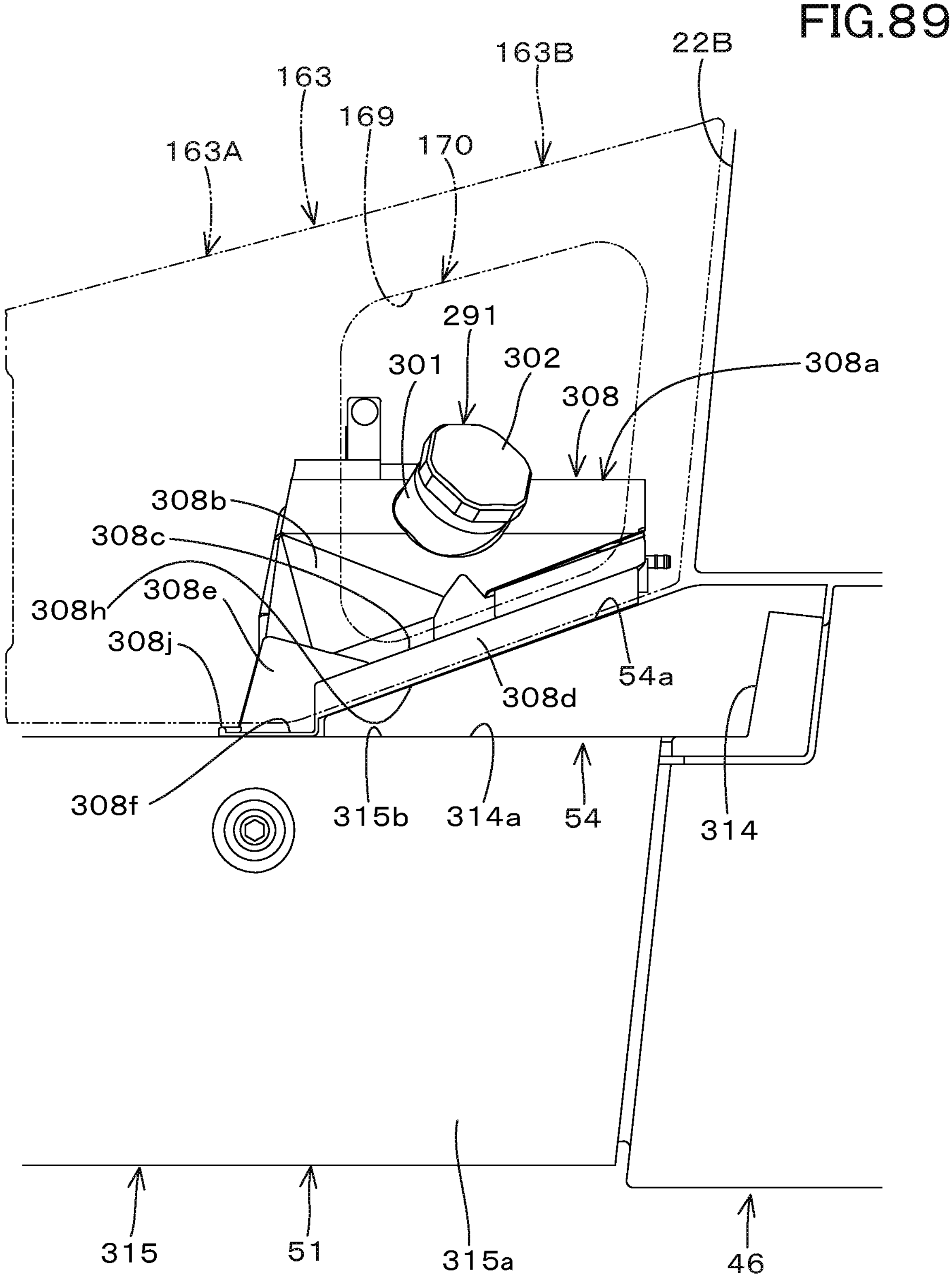
FIG. 89 is a side view illustrating the arrangement portion of the fuel-supplying portion according to the embodiment.
Figure 90:
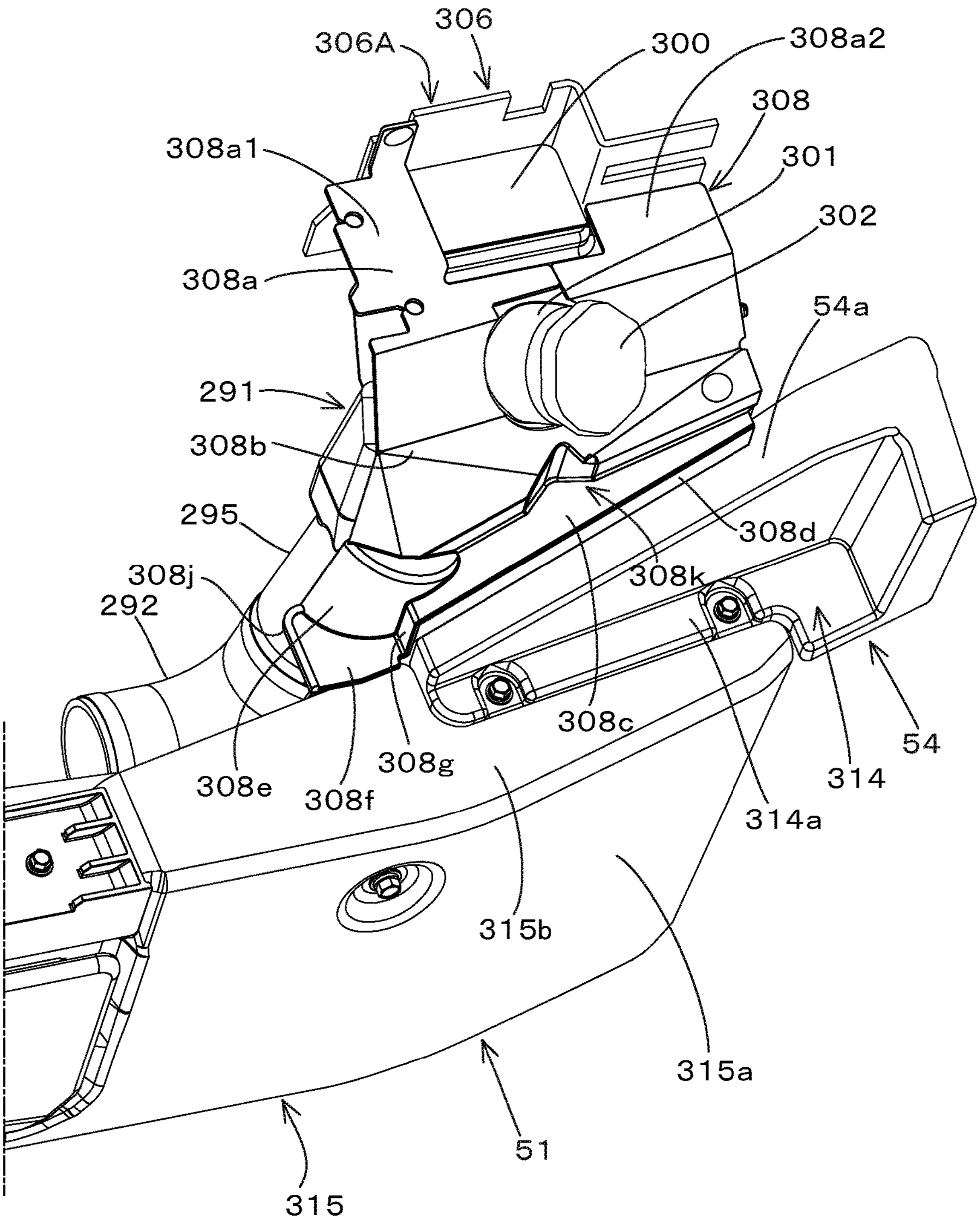
FIG. 90 is a perspective view illustrating a state where a sub tank is covered with a tank cover according to the embodiment.

As shown in FIG. 89 and FIG. 90, an assist cover 54 is provided below the rear portion 163B of the outer layer member 163, and a rear portion of the left side portion 315 of the turn cover 51 (referred to as a cover rear portion 315*a*) is provided below the front portion 163A of the outer layer member 163 and the assist cover 54. The assist cover 54 is provided with a recessed portion 314 that is recessed from the machine outward side toward the machine inward side. The bottom surface 314*a* of the recessed portion 314 and the upper surface 315*b* of the cover rear portion 315*a* are formed at substantially the same height. The door 28 is openable and closable by the rear side being supported by a hinge so as to be swingable about a vertical axis. When the door 28 is fully opened, the door 28 opens so that the front portion faces rearward and enters the recessed portion 314. The upper surface 54*a* of the assist cover 54 is formed to be an inclined surface that shifts downward as it goes forward.

As shown in FIG. 89 and FIG. 90, the fuel-supplying portion 291 is provided with a tank cover 308 that covers the sub tank 300 from above. The tank cover 308 is formed of an elastic material such as rubber.

Figure 91:
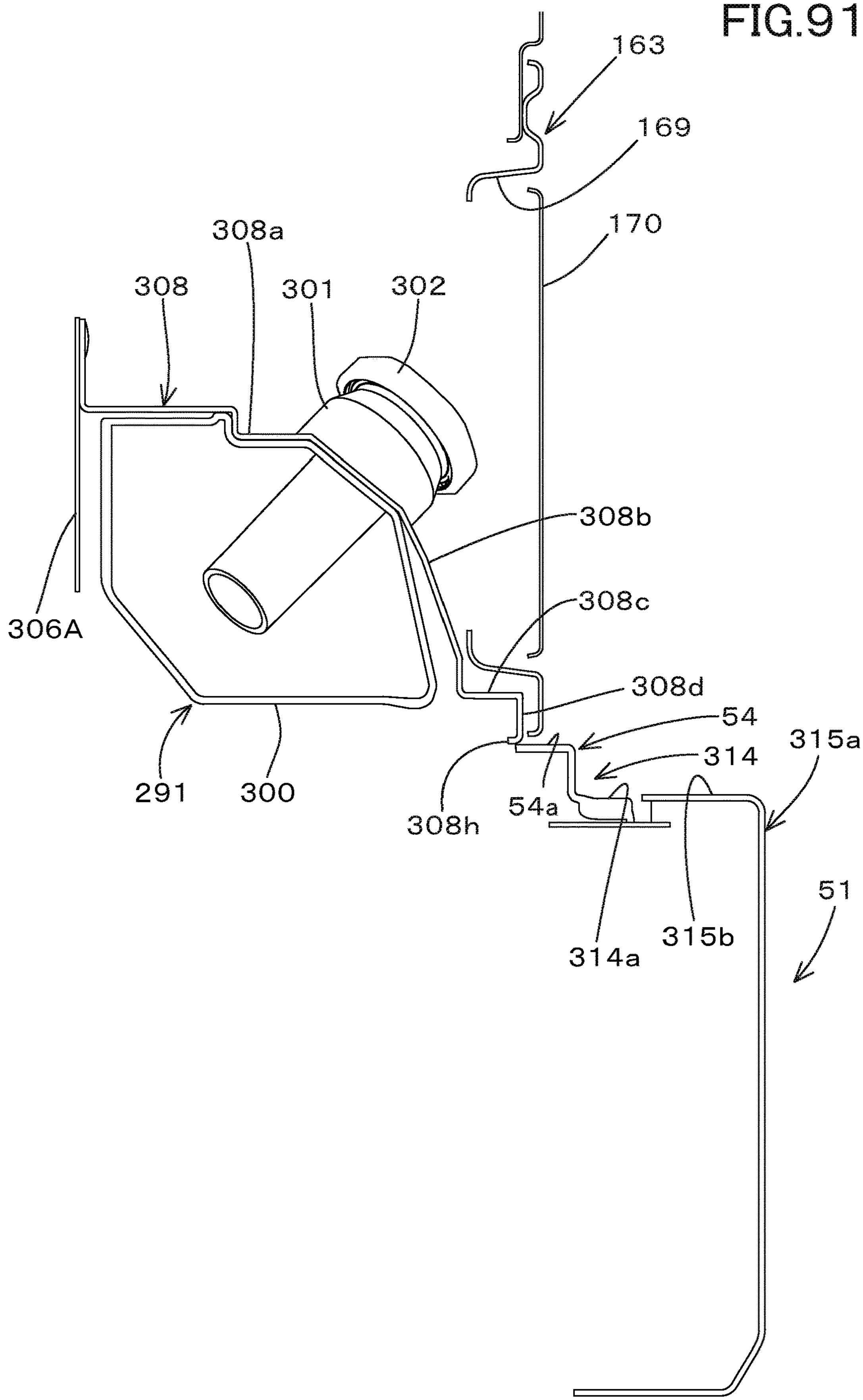
FIG. 91 is a front cross-section view of the sub tank and the tank cover according to the embodiment.

As shown in FIG. 90 and FIG. 91, the tank cover 308 has a first wall portion 308*a* to a seventh wall portion 308*g*. The first wall portion 308*a* covers the upper surface side of the sub tank 300. In addition, the first wall portion 308*a* is attached to the cover plate 306. The first wall portion 308*a* has a front portion 308*a*1 arranged on the front side, and has a rear portion 308*a*2 arranged on the rear side. A fuel-supplying port 301 protrudes upward from a clearance between the front portion 308*al* and the rear portion 308*a*2. In addition, the sub tank 300 is exposed between the front portion 308*a*1 and the rear portion 308*a*2, and the bracket 307A and the bracket 307B are attached to the exposed portion (see FIG. 88).

As shown in FIGS. 90 and 91, the second wall portion 308*b* extends downward from the end portion (the left end portion) of the first wall portion 308*a* on the machine outward side, and covers the left side surface of the sub tank 300. The second wall portion 308*b* has a recess portion 308*k* that is located below the fuel-supplying port opening 301 and is recessed from the machine outward side toward the machine inward side. The third wall portion 308*c* extends from the lower end of the second wall portion 308*b* in the machine outward side. The fourth wall portion 308*d* extends downward from the end portion (the left end portion) of the third wall portion 308*c* on the machine outward side. The third wall portion 308*c* and the fourth wall portion 308*d* are formed in an inclined shape that shifts downward along the upper surface 54*a* of the assist cover 54 as it goes forward. A seal portion 308*h* that comes into contact with the upper surface 54*a* of the assist cover 54 is provided at the lower end of the fourth wall portion 308*d*.

As shown in FIG. 90 and FIG. 91, the fifth wall portion 308*e* covers the machine outward side of the upper portion of the supply pipe portion 295. The fifth wall portion 308*e* is connected to the front lower end of the second wall portion 308*b* and to the front portion of the third wall portion 308*c*. The sixth wall portion 308*f* extends from the lower end of the fifth wall portion 308*e* in the machine outward direction, and the end portion on the machine outward side reaches the end portion on the machine inward side of the upper surface 315*b* of the cover rear portion 315*a*. A protruding ridge portion 308*j* is provided on the front edge portion of the sixth wall portion 308*f* from the front lower end of the fifth wall portion 308*e* to the left end of the sixth wall portion 308*f*. The seventh wall portion 308*g* connects between the front end of the third wall portion 308*c* and the rear end of the sixth wall portion 308*f*. The seventh wall portion 308*g* is connected to the fifth wall portion 308*e*.

The cover plate 306 and the tank cover 308 prevent the heat of the prime mover E1 (the hot air in the prime mover room E2) from being released to the outside from the opening portion 169 when the opening/closing lid 170 is opened. In addition, in the tank cover 308, the seal portion 308*h* prevents the heat of the prime mover E1 from leaking from the gap between the lower end of the outer layer member 163 and the upper surface 54*a* of the assist cover 54 (the gap between the exterior members constituting the exterior of the working machine 1). In this manner, when the door 28 is fully opened, the heat of the prime mover E1 leaking from the gap between the outer layer member 163 and the assist cover 54 is prevented from being transmitted to the operator seat 6 from the gap between the rear end of the boarding portion 29 and the door 28. In addition, the fuel dropping from the fuel-supplying port 301 passes through the recess portion 308*k* and falls to the third wall portion 308*c*. The fuel that has fallen on the third wall portion 308*c* travels forward on the third wall portion 308*c* and travels along the seventh wall portion 308*g* to the sixth wall portion 308*f*, and the end portion of the sixth wall portion 308*f* in the machine outward direction. The third wall portion 308*c*, the seventh wall portion 308*g*, and the sixth wall portion 308*f* form a guide path that guides the fuel dropped from the fuel-supplying port 301. In other words, the tank cover 308 has a guide path that guides the fuel dropped from the fuel-supplying port 301 to the outside of the machine direction 2.

The working machine 1 according to the present embodiment has the following effects.

The working machine 1 includes the prime mover E1, the fuel tank T1 for storing the fuel for the prime mover, the machine body 2 on which the prime mover E1 and the fuel tank T1 are mounted, the fuel-supplying portion 291 into which the fuel to be supplied to the fuel tank T1 is injected, and the connector pipe 292 that connects the side surface of the fuel tank T1 to the fuel supply portion 291. The machine body 2 has the partition plate 47 that is provided with the through-hole 294 through which the connector pipe 292 is inserted and that partitions the arrangement side of the prime mover E1 and the fuel supply portion 291 from the side of the fuel tank T1.

According to that configuration, the connector pipe 292 is connected to the side surface of the fuel tank T1. Thus, the connector pipe 292 can be inserted into the through hole 294 of the partition plate 47. In this manner, the partition structure between the arrangement side of prime mover E1 and the arrangement side of fuel tank T11 can be simplified.

The fuel tank T1 has the inflow pipe portion 293 through which the fuel flows into a side surface corresponding to the through hole 294, and the fuel supply portion 291 has the supply pipe portion 295 that supplies the fuel to the connector pipe. The connector pipe 292 has the first portion 292*a* extending from the inflow pipe portion 293 toward the through hole 294 and passing through the through hole 294, and has the second portion 292*b* extending upward from the first portion 292*a* and being connected to the supply pipe portion 295.

According to that configuration, the connection structure between the fuel tank T1 and the fuel-supplying portion 291 can be simplified.

In addition, the axial direction of the inflow pipe portion 293 is substantially parallel to the normal direction of the plate surface of the partition plate 47.

In this manner, the partition structure between the arrangement side of the prime mover E1 and the arrangement side of the fuel tank T1 can be further simplified.

In addition, the working machine has the air releasing pipe 297 that connects the upper portion of the fuel tank T1 to the fuel supply portion 291 or to the connector pipe 292 and releases the air in the fuel tank T1.

According to that configuration, even when the connector pipe 292 is connected to the side surface of the fuel tank T1, the fuel can be put into the fuel tank T1 to a filled position higher than the inflow pipe portion 293.

In addition, the air releasing pipe 297 is provided in the inclined shape that shifts upward as it goes from the fuel tank T1 toward the connection portion with the fuel supply portion 291 or with the connector pipe 292.

According to that configuration, the air in the fuel tank T1 can be released well even on sloping ground.

In addition, the partition plate 47 is fixed to the machine body 2 and has the main partition plate 48 having the first recess portion 294A into which a part of the connector pipe 292 can be inserted from the radial direction, and the sub-partition plate 49 attached to the main partition plate 48 and having the second recess portion 294B that forms the through hole 294 with the first partition 294A.

According to that configuration, the connector pipe 292 can be easily inserted through the through hole 294.

In addition, the fuel-supplying portion 291 includes the sub tank 300 that can store the fuel and includes the fuel supply port 301 from which the fuel is injected into the sub tank 300.

According to that configuration, it is possible to increase the storage capacity of the fuel.

In addition, the working machine includes the tank cover 308 that prevents the heat of the prime mover E1 from leaking from the gap between the exterior members constituting the exterior of the machine body 2 of the working machine, the tank cover 308 serving as the cover to cover the sub-tank 300.

According to that configuration, the heat of prime mover E1 can be prevented from leaking outside.

In addition, the tank cover 308 has a guide path for guiding the fuel dropping from the fuel-supplying port 301 to the outside of the machine body 2.

According to that configuration, the fuel dropping from the fuel-supplying port 301 can be discharged to the outside of the machine body 2.

In addition, the working machine 1 includes the cabin 5, the machine body 2 on which the cabin 5 is mounted, the first cover member 26 that is arranged to the side of the cabin 5 and accommodates devices, the cover body (the side cover 21) arranged between the first cover member 26 and the cabin 5 and having the second cover member 27 that can be opened and closed, and the control device 24 accommodated in the second cover member 27.

According to that configuration, the control device 24 can be accessed by opening the second cover member 27. In this manner, the maintenance of the control device 24 can be easily carried out.

The second cover member 27 is detachable under the state where the cabin 5 is mounted.

According to that configuration, maintenance of the control device 24 can be carried out without detaching the cabin 5 from the machine body 2.

In addition, the working machine includes the frame member 206 arranged in the second cover member 27 and attached to the machine body 2. The frame member 206 has the cover attachment portion 222 for attaching the second cover member 27, and has the device attachment portion 223 for attaching the control device 24.

According to that configuration, since the frame member 206 serves as both the attachment member of the second cover member 27 and the control device 24, the configuration can be simplified and the cost can be reduced.

In addition, the prime mover E1 mounted on the machine body 2, the bonnet 22 that covers the motor E1, and the support frame 11 that stands on the machine body 2 and supports the bonnet 22. The frame member 206 has the first frame constituent member 208 that is attached to the support frame 11 and supports the first cover member 26, and has the second frame constituent member 207 that has one end fixed to the first frame constituent member 208 and the other end attached to the machine body 2.

According to that configuration, the frame member 206 is divided into the first frame constituent member 208 that supports the first cover member 26 and the second frame constituent member 207 that supports the first frame constituent member 208, whereby the weight of the frame member 206 can be reduced.

In addition, the control device 24 includes the first controller 24A that controls the electric device equipped on the working machine, and includes the second controller 24B that controls the prime mover E1 and is arranged side by side with the first controller 24A in the front-rear direction.

According to that configuration, the first controller 24A and the second controller 24B can be housed compactly in the second cover member 27 sandwiched between the cabin 5 and the first cover member 26.

The working machine 1 includes the turn base plate 42 on which the prime mover E1 is mounted on the rear portion, and includes the reinforcing rib 43 that is provided on the turn base plate 42 and that extends from the front portion toward the rear portion, and the reinforcing rib 43 is formed of the cast steel at least the rear portion.

According to that configuration, the prime mover room E2 side of the reinforcing rib 43 can be formed in a shape having a wide lateral width and a low height. In this manner, even when the height of the reinforcing rib 43 is lowered, sufficient strength can be provided, and the lowering of the reinforcing rib 43 can increase the degree of freedom in arrangement of the prime mover E1. In addition, since the height can be reduced, the wind flowing under the prime mover E1 can easily flow, and the cooling performance can be improved.

In addition, the working machine includes the prime mover room E2 in which the prime mover E1 is mounted on the turn base plate 42. The reinforcing rib 43 includes the front ribs 232L and 232R formed of the sheet metal extending from the front portion of the turn base plate 42 to the front portion of the prime mover room E2 and includes the rear ribs 233L and 233R formed of the cast steel provided in the prime mover room E2 and protruding rearward from the rear portions of the front ribs 232L and 232R.

According to that configuration, the reinforcing rib 43 is divided into a portion of sheet metal and a portion of cast steel, and thereby the mold forming the portion of cast steel can be small, and the portion of cast steel in the reinforcing rib 43 can be formed in low cost.

In addition, the rear ribs 233L and 233R have the prime mover support portion 235 that supports the prime mover E1.

According to that configuration, it is possible to increase the degree of freedom in arrangement of the prime mover E1, and to reduce the cost due to the sharing of members.

In addition, the rear ribs 233L and 233R have the through holes (the pipe through hole 236 and the second hole 238B) penetrating the rear ribs 233L and 233R in the horizontal direction.

According to the configuration described above, the rear ribs 233L and 233R can be reduced in weight, and the manufacturing cost can be reduced. In addition, since the configuration where the wind flowing under the prime mover E1 can easily flow is provided, the cooling performance can be improved.

In addition, the front rib 232R and the rear rib 233R partially overlap in a side view, the front rib 232R penetrates the front rib 232R in the horizontal direction, and the through hole (the second hole 238B) to communicate with the second through hole (the first hole 238A) is provided.

According to the above configuration, the through hole (the second hole 238B) of the rear rib 233R is provided in the region where the rear rib 233R and the front rib 232R overlap each other, and thus the sufficient strength of the through hole (first hole 238A) can be secured.

In addition, the through holes (the pipe through hole 236, the second hole 238B) may be the pipe through hole 238 through which the pipe is inserted.

According to the configuration, the piping can be arranged easily.

In addition, the rear ribs 233L and 233R have the front portions overlapping with the front ribs 232L and 232R in a side view, and have the rear portions formed to have the height that decreases as it goes rearward.

According to the configuration, the stability of the strength of the connecting portion between the front rib and the rear rib can be ensured, and the height of the rear rib can be lowered to improve the degree of freedom of arrangement of the prime mover E1 and to improve the cooling performance.

The reinforcing rib 43 includes the first rib 43L provided on the left side of the turn base plate 42, and includes the second rib 43R provided on the right side of the turn base plate 42. And, at least one of the rear portions of the first rib 43L and the second rib 43R is formed of the cast steel.

According to the configuration, it is possible to improve the degree of freedom of arrangement of the prime mover E1 and to improve the cooling performance of the prime mover E1.

In addition, the working machine 1 includes the prime mover E1, the exhaust conduit 248 that guides the exhaust gas from the prime mover E1, the exhaust pipe 249 to which the exhaust conduit 248 in inserted with a gap through which the air can flow, the exhaust pipe 249 being configured to exhaust, to the atmosphere, the exhaust gas from the exhaust conduit 248 and the air introduced from the gap and including the exhaust pipe 249 including the perforated pipe portion 255 having a large number of small holes 255*a*, the outer sleeve 259 covering the circumference of the perforated pipe portion 255, and the noise insulator material 264 filled between the perforated pipe portion 255 and the outer sleeve 259.

According to the configuration, the exhaust noise can be reduced with a compact configuration. In addition, the length and outer diameter of the outer sleeve 259 may be appropriately adjusted according to the degree of the required noise reduction effect.

In addition, the perforated pipe portion 255 is formed of a punching metal, and the burrs 255*b* of many small holes 255*a* are arranged on the outer surface side.

According to the configuration, the pressure loss of the exhaust flow flowing through the perforated pipe portion 255 can be reduced, thereby increasing the exhaust efficiency and reducing the exhaust noise.

In addition, the shielding material 265 is provided between the noise insulator material 264 and the perforated pipe portion 255 to block the noise insulator material 264 from intruding the perforated pipe portion 255 through a large number of small holes 255*a*.

According to that configuration, the noise insulator material 264 can be prevented from scattering from the exhaust pipe 249.

In addition, the noise insulator material 264 may be formed of the glass wool, and the shielding material 249 may be formed of the stainless steel wool wound around the outer circumferential surface of the perforated pipe portion 255.

According to the above configuration, the stainless steel wool serving as the shielding material 249 can prevent the glass wool serving as the noise insulator material 264 from scattering from the exhaust pipe 249, and the noise absorbing effect can be improved by the stainless steel wool.

In addition, the working machine includes the bonnet 22 that constitutes the prime mover room E2 in which the prime mover E1 is accommodated, and includes the exhaust gas purifier device D1 that purifies the exhaust gas discharged from the prime mover E1. And, the exhaust conduit 248 is connected to the exhaust side of the exhaust gas purifier device D1, and the perforated pipe portion 255 and the outer sleeve 259 are provided in the prime mover room E2.

According to the configuration, the silencer constituted of the perforated pipe portion 255, the outer sleeve 259, and the noise insulator material 264 is housed in the prime mover room E2, thereby further improving the silencer effect and preventing the appearance of the working machine 1 from being damaged by the silencer.

In addition, the exhaust conduit 248 includes the first pipe portion 248A connected to the exhaust side of the exhaust gas purifier device D1 and extending upward, and includes second pipe portion 248B extending from the upper portion of the first pipe portion 248A in a direction inclined with respect to the vertical direction. And, the perforated pipe portion 255 is arranged extending vertically at a position eccentric with respect to the axial center of the first pipe portion 248A, and the lower portion of the exhaust pipe 249 is bent toward the second pipe portion 248B.

According to the configuration, the communication portion between the exhaust conduit 248 and the exhaust pipe 249 can be made into a compact configuration.

In addition, the exhaust pipe 249 has the skirt portion 256 to which the second pipe portion 248B is inserted and has a gap from the second pipe portion 248B increasing as it goes downward.

According to the configuration, the air can be sufficiently taken into the exhaust pipe 249 by the exhaust flow flowing from the exhaust conduit 248 to the exhaust pipe 249.

In addition, the working machine includes the support member (the bracket 262) that connects between the outer sleeve 259 and the machine body 2 of the working machine 1 and supports the outer sleeve 259 and the exhaust pipe 249.

In this manner, it is possible to prevent the damage of member and the noise generation caused by the vibrations of the exhaust pipe 249 and the outer sleeve 259. In addition, the working machine 1 includes the machine body 2, the prime mover E1 mounted on the machine body 2, the shield wall member 22A that separates the prime mover room E2 that accommodates the prime mover E1 from the upper front portion of the prime mover room E2, the partition plate 47 that is arranged below the shield wall member 22A and partitions the lower front portion of the prime mover room E2, the grommet 137 through which the piping is inserted, the grommet 137 being provided at the upper portion of the partition plate 47, and the sealing body 140 provided in the shield wall member 22A and that configured to push the grommet 137 to the partition plate 47 side.

According to the configuration, the grommet 137 through which the piping is inserted is provided on the upper portion of the partition plate 47, and the grommet 137 is pressed by the seal body 140 provided on the shield wall member 22A. Thus, the pipes to be arranged between the inside of the prime mover room and the outside can be assembled easily. In addition, since the space between the inside of the prime mover room E2 and the outside can be reliably sealed by the grommet 137 and the seal body 140, the noise transmitted from the inside of the prime mover room E2 to the outside can be appropriately reduced.

In addition, the working machine includes the cabin 5 provided on the side opposite to the prime mover room E2 side with respect to the shield wall member 22A, and includes the air conditioner main body 136 provided in the cabin 5. And, the pipes connected to the air conditioner main body 136 are connected to the grommet 137.

According to the above configuration, the piping of the air conditioner main body 136 can be easily assembled. In addition, noise transmitted from the prime mover room E2 to the cabin 5 can be appropriately reduced.

In addition, the partition plate 47 has the cut-out recess portion 138 into which the grommet 137 is inserted, the cut-out recess portion 138 being recessed downward from the upper end and.

According to the configuration, the upper surface of the grommet 137 can be aligned with the upper end of the partition plate 47, and the sealing performance between the shield wall member 22A and the partition plate 47 can be improved.

The working machine includes the retainer plate 139 that is attached to the partition plate 47 and prevents the grommet 137 from being removed from the cut-out recess portion 138. The retainer plate 139 has the pressing plate portion 139*g* that has a lower surface coming into contact with the grommet 137 and has an upper surface coming into contact with the seal body 140.

According to the configuration, it is possible to improve the sealing performance between the shield wall member 22A and the partition plate 47.

In addition, the grommet 137 has the plurality of pipe insertion portions (the first pipe insertion portion 144 to the fourth pipe insertion portion 147) through which the pipes pass. The plurality of pipe insertion portions are arranged such that the adjacent pipe insertion portions are displaced in the vertical direction.

According to the configuration, the width of the grommet 137 can be formed compactly.

In addition, the grommet 137 is divided up and down by the split surface 148 which divides the plurality of pipe insertion portions in two portions.

According to the configuration, the piping can be easily inserted through the grommet 137.

The working machine 1 includes the machine body 2, the prime mover E1 mounted on the machine body 2, the operator seat 6 arranged in front of the prime mover E1, the bonnet 22 that forms the prime mover room E2 that houses the prime mover E1, the support frame 11 that stands on the machine body 2 and supports the bonnet 22, and the shield wall plate (the shield wall member 22A) that separates the prime mover room E2 from the region closer to the operator seat 6 than the prime mover room E2. The support frame 11 includes the first front leg 57L and the second front leg 57R, and the first front leg 57L which are formed of a plate material and are arranged with a space in the machine width direction K2 and with the thickness direction aligned with the machine width direction K2, and includes at least one of rear legs 58L and 58R arranged behind the first front leg 57L and the second front leg 57R. And, the shield wall plate is formed of a metal plate fixed over the first front leg 57L and the second front leg 57R.

According to the configuration, by fixing the partition plate made of a metal plate over the first front leg 57L and the second front leg 57R, the shield wall plate serves as one of the strength members, and the strength in the machine width direction K2 required for the support frame 11 can be reduced. In addition, the strength of the support frame 11 in the front-rear direction can be improved by matching the plate thickness directions of the first front leg 57L and the second front leg 57R with the machine width direction K2. In this manner, while improving the strength with respect to the machine width direction and the front-rear direction of the support frame 11, the weight reduction of the support frame 11 can be achieved.

In addition, the plate thicknesses of the first front leg 57L and the second front leg 57R are thinner than the plate thicknesses of the rear legs 58L and 58R.

By making the thickness directions of the first front leg 57L and the second front leg 57R coincide with the machine width direction K2, the strength of the support frame 11 in the front-rear direction can be increased, so the plate thicknesses of the first front leg 57L and the second front leg 57R can be reduced. By reducing the thicknesses of the first front leg 57L and the second front leg 57R, the support frame 11 can be reduced in weight.

In addition, at least one of the first front leg 57L and the second front leg 57R is fixed in contact with the back surface of the partition plate.

According to the above configuration, since the front legs can be brought into contact with the back surface of the partition plate with high accuracy, both of these members can serve appropriately as the strength members.

In addition, the front face of the first front leg 57L is fixed in contact with the back face of the partition plate, and the side of the second front leg 57R is fixed in contact with the end of the partition plate in the machine width direction K2.

According to the configuration, the second front leg 57R can be arranged forward relative to the first front leg 57L, and the flow of cooling air flowing through the rear portion of the second front leg 57R can be improved.

In addition, the operator seat 6 is supported by the machine body 2 so as to be movable back and forth, and the shield wall plate has the contacting member 99 that contacts to the stopper 98 provided on the operator seat 6 side to restrict the movement of the operator seat 6.

According to the configuration, the operator seat 6 can be prevented from coming into contact with the shield wall plate, and the configuration can be simplified by using the partition plate as an attachment member for the contacting member 99.

In addition, the partition plate has the inspection opening 71 for accessing the prime mover room E2, and includes the closing plate 72 that closes the inspection opening 71. The closing plate 72 has the handle member 73.

According to the configuration, the closing plate 72 can be easily handled.

In addition, the working machine 1 includes the machine body 2, the cabin 5 mounted on the machine body 2 and having the seal attachment surface 128 forming, at a lower end side of the cabin 5, the opening portion 126 opened downward and communicated with the room of the cabin 5, the seal member 127 having an annular shape provided so as to surround the opening portion 126 and attached to the seal attachment surface 128, and the seal contact surfaces (the first contact surface 129 to the fourth contacting surface 132) with which the sealing member 127 is in contact, the seal contact surfaces being provided on the side of the machine body 2.

According to the configuration, it is possible to prevent the dust from entering the cabin 5 and to prevent the noise from entering the cabin 5.

In addition, the machine body 2 includes the step 52 for forming the floor surface of the cabin 5, and the step 52 includes the main plate 271 having a flat shape and having the first contact surface 129 constituting the seal contact surface on the upper surface. According to the configuration, the sealing performance between the cabin 5 and the step 52 can be improved.

In addition, the cabin 5 has, at the front portion of the cabin 5, the front mounting device (the front mount member 118L arranged to the left and the front mount member 118R arranged to the right) supported by the step 52, and the first contacting surface 129 has the first sealing surface 129*a* provided on one side portion of the step 52 in the machine width direction K2, the second sealing surface 129*b* provided on the other side portion in the machine width direction K2, and the third sealing surface 129*c* connecting the front portions of the first sealing surface 129*a* and the second sealing surface 129*b*. The front mounting device is arranged behind the third sealing surface 129*c*.

According to the configuration, the sealing member 127 can be continuously formed, and the sealing performance can be improved.

In addition, the working machine includes the prime mover E1 mounted on the machine body 2, and includes the shield wall member 22A that separates the prime mover room E2 that houses the prime mover E1 from the room of the cabin 5. And, the shield wall member 22A includes the second contacting surface 130 provided on one side in the machine width direction K2, and includes the third contacting surface 130 provided on the other side in the machine width direction K2. The sealing material 127 contacts from the first sealing surface 129*a* to the second contacting surface 130, and contacts from the second sealing surface 129*b* to the third contacting surface 131.

According to the configuration, the sealing member 127 can be continuously formed, and the sealing performance can be improved.

In addition, the working machine includes the support frame 11 that is provided upright on the machine body 2 and supports the shield wall member 22A. The support frame 11 includes the upper plate 59 that supports the rear portion of the cabin 5. The upper plate 59 includes the fourth contacting surface 132 to which the sealing member 127 contacts. The sealing material 127 contacts from the second contacting surface 130 to the third contacting surface 131 through the fourth contacting surface 132.

According to the configuration, the sealing member 127 can be continuously formed, and the sealing performance can be improved.

The cabin 5 has, at the rear portion of the cabin 5, the rear mounting devices (the rear mounting member 120L arranged to the left, and the rear mounting member 120R arranged to the right) supported by the upper plate 59, and the rear mounting device is arranged behind the fourth contacting surface 132.

According to the configuration, it is possible to prevent the noise and heat of the prime mover from entering the room of the cabin 5 from the attachment portions of the rear mounting devices 120L and 120R through the inside of the sealing member 127.

The working device 1 includes the cabin 5, the operator seat 6 arranged in the cabin 5, and the console 79R arranged between the side wall portion 5A of the cabin 5 and the operator seat 6. The console 79R includes the console cover 204 having the protruding portion (the attachment portion 215) protruding toward the side wall portion 5A side of the cabin 5, and includes the console support portion 218 to which the console cover 204 is attached. The protruding portion is attached to the console support portion 218 in the state where the protruding portion overlaps, in plan view, with at least a part of the portion located below the protruding portion of the side wall portion 5A of the cabin 5.

According to the configuration, when the console cover 204 including the protruding portion is removed, in assembling the cabin, from the console support portion 218, the cabin 5 can be suspended from above and assembled to the machine body even in the working machine having a protruding portion that overlaps a part of the side wall portion 5A of the cabin 5. In addition, when the console cover 204 including the protruding portion is attached to the console support portion 218 after the cabin 5 is assembled, the cabin 5 can be assembled without damaging the protruding portion. In this manner, the operation efficiency can be improved in the assembly of the cabin 5.

In addition, the protruding portion is provided with the first operating tool 81 that is operated by an operator.

According to the configuration, it is possible to prevent the first operation tool 81 from being damaged in the assembly of the cabin 5.

In addition, the operation tool attachment surface 215*a* to which the first operation tool 81 is attached is provided to the protruding portion on the side of operator seated on the operator seat 6, and the operation tool attachment surface 215*a* is inclined upward as it goes forward, and is inclined backward as it goes to the side wall portion 5A side of the cabin 5.

According to the configuration, the operability of the first operating tool 81 can be improved.

In addition, the working machine includes the operation lever 77R arranged between the console 79R and the operator seat 6, and includes the armrest 78R arranged behind the operation lever 77R, and the first operation tool 81 is arranged on the side of and in the vicinity of the operation lever 77R.

According to the configuration, the first operation tool 81 can be operated with the arm rested on the armrest 78R, and thus the burden on the operator's operation can be reduced. In addition, it is easy to move the hand between the operation lever 77R and the jog dial 81A, and thus the operability is improved.

In addition, the first operation tool 81 is arranged at a position where the operator sitting on the operator seat 6 can operate the operation lever 77R and the first operation tool 81 with the arm rested on the armrest 78R.

According to the configuration, the operator can move the hand between the operation lever 77R and the jog dial 81A in the state where the arm is placed on the armrest 78R. In this manner, the burden of an operator's operation can be reduced.

In addition, the working machine includes the display device 191 provided in front of the first operation tool 81, and the first operation tool includes the jog dial 81A for operating the display device 191.

According to the configuration, the operator can perform the operation with the jog dial 81A while looking at the display device 191, thereby providing the good operability. In addition, the console cover 204 has the first divided body 212A and the second divided body 212B that are separately attached to the console support portion 218. The first divided body 212A has a protruding portion, and is attached to the console support portion 218 in the state where the protruding portion is overlapped with at least a part of the side wall portion 5A of the cabin 5 in a plan view.

According to the configuration, the cabin 5 is assembled with at least the first divided body 212A removed, and the first divided body 212A is attached to the console support portion 218 after the cabin 5 is assembled, thereby preventing damage to the protruding portion.

In addition, the console 79R is provided with a lever (the dozer lever 80) provided so as to be swingable in the front-rear direction, and the console cover 204 has the guide groove 217 through which the lever is inserted and which allows the lever to be swung in the front-rear direction K1. The guide groove 217 is formed over between the first divided body 212A and the second divided body 212B.

According to the configuration, the first divided body 212A and the second divided body 212B can be attached to the console support portion 218 with the lever provided on the console.

In addition, the console cover 204 extends in the front-rear direction K1 along the side wall portion 5A of the cabin 5, and a protruding portion is provided at the front end portion of the console cover 204.

According to the configuration, the console 79R can be housed in a narrow space between the operator seat 6 and the cabin 5.

In addition, the manufacturing method of the working machine includes the first step for suspending a portion including the side wall portion 5A of the cabin 5 from above to accommodate the operator seat 6 and the console support portion 218 in the cabin 5, and the second step for attaching, to the console support 218, a portion of the console cover 204 including the protruding portion after the first step.

According to the configuration, the cabin 5 can be assembled efficiently without damaging the protruding portion.

In addition, the working machine 1 includes the operator seat 6, the display device 191 provided obliquely in front of the operator seat 6, and the mobile terminal holding portion 197 that is provided below the display device 191 and holds the mobile terminal 196.

According to the configuration, the operator can easily check not only the display device 191 but also the mobile terminal 196 during the operation. In this manner, the configuration for comfort around the operator seat 6 can be improved.

In addition, the mobile terminal holding portion 197 holds the mobile terminal 196 in the state where an operator sitting on the operator seat 6 can visually recognize at least a part of the display surface 196*a* of the mobile terminal 196.

According to the configuration, the operator can visually recognize the display surface 196*a* of the mobile terminal 196.

In addition, the display device 191 is arranged to be inclined with respect to the front-rear direction K1 so that the display surface 191*a* of the display device 191 faces the operator seated on the operator seat 6, and the mobile terminal holding portion 197 holds the mobile terminal 196 in the state where the display surface 196*a* of the terminal 196 is inclined with respect to the front-rear direction K1 so as to face the operator seated on the operator seat 6.

According to the configuration, the operator can easily visually recognize the display surface 191*a* of the display device 191 and the display surface 196*a* of the mobile terminal 196.

In addition, the power socket 198 that can be used for charging the mobile terminal 196 is provided in the vicinity of the mobile terminal holding portion 197.

According to the configuration, the mobile terminal 196 can be charged while being held by the mobile terminal holding portion 197.

In addition, the working machine includes the armrest 78R arranged on the side of the operator seat 6, the operation lever 77R arranged in front of the armrest 78R, and the jog dial 81A arranged on the side of the operation lever 77R and configured to operate the display device 191.

According to the configuration, the operator can operate the jog dial 81A with the arm placed on the armrest 78R.

In addition, the jog dial 81A is arranged at a position where the operator sitting on the operator seat 6 can operate the operation lever 77R and the jog dial 81A with his arm placed on the armrest 78R.

According to the configuration, the operator can move his hand between the operation lever 77R and the jog dial 81A in the state where his arm is placed on the armrest 78R, and thereby the good operability is provided.

In addition, the working machine includes the blower duct 172 having a blowout portion for blowing out mixed air, and the display device 191 is attached to the blower duct 172.

According to the configuration, since the display device 191 is mounted using the air duct 172, the configuration can be simplified.

In addition, the working machine has the interior member 202 which covers the air duct 172, and the interior member 202 has the drink holder 203 holding a beverage container.

According to the configuration, the beverage container held in the drink holder 203 can be kept cold or warm by the mixed air flowing in the air duct 172.

In addition, the working device 1 includes the operator seat 6, the armrest 78R arranged on the side of the operator seat 6, the operation lever 77R arranged in front of the armrest 78R, and the jog dial 81A arranged on the side of the operation lever 77R.

According to the configuration, the operator can operate the jog dial 81A with the arm placed on the armrest 78R, and can easily move the hand between the operation lever 77R and the jog dial 81A. In this manner, the burden of an operator's operation can be reduced.

The jog dial 81A is arranged at a position where an operator sitting on the operator seat 6 can operate the operation lever 77R and the jog dial 81A while placing his arm on the armrest 78R.

According to the configuration, the operator can move the hand between the operation lever 77R and the jog dial 81A in the state where the arm is placed on the armrest 78R, and thereby the good operability is provided.

In addition, the working machine includes the console 79R provided with the jog dial 81A, and the operation tool attachment surface 215*a*, which is a surface of the console 79R to which the jog dial 81A is attached, is inclined upward as it goes toward the front.

According to the configuration, the jog dial 81A can be easily operated with the hand raised, and the operability of the jog dial 81A can be improved.

In addition, the operation tool attachment surface 215*a* is inclined to the side separating away from the operator seat 6 as it goes rearward.

According to the configuration, the operability of the jog dial 81A can be improved.

In addition, one or a plurality of button operating portions (the first switch 194 and the second switch 195) on which the operator performs a pressing operation are provided in the vicinity of the jog dial 81A.

According to the configuration, the button operating portion can be pressed together with the jog dial 81A.

In addition, the working machine includes the display device 191 arranged in front of the jog dial 81A, and the jog dial 81A is an operation tool for operating the display device 191.

According to the configuration, the operator can operate the display device 191 with the jog dial 81A while looking at the display device 191.

In addition, the jog dial 81A is arranged at a position in the field of view of an operator who sits on the operator seat 6 and browses the display device 191.

According to the configuration, since the display device 191 and the jog dial 81A for operating the display device 191 are close to each other in the same field of view, it is easy for the operator to operate intuitively.

In addition, the working machine 1 includes the air conditioner main body 136, the first air duct 172 having the first air outlet (the first blowout port 175*a* to the first blowout port 175*d*) for blowing the mixed air from the air conditioner main body 136, and the connector duct 174 that connects the air conditioner main body 136 and the first air duct 172. And, the connector duct 174 includes a plurality of duct members (the first duct member 179, the second duct member 180, and the third duct member 181) coupled in a direction extending along the wind guide path. At least one of the plurality of duct members can be attached to and detached from the other duct member, the air conditioner main body 136, or the first air duct 172 by expanding or contracting in the direction along the air guide path.

According to the configuration, it is possible to easily assemble and remove the connector duct 174 by expanding and contracting the duct member constituting the connector duct 174.

In addition, the connector duct 174 includes the first duct member 179, and includes the second duct member 180 that connects the air conditioner main body 136 and the first duct member 179. The second duct member 180 can be expanded and contracted in the direction to advance and retract with respect to the first duct member 179.

According to the configuration, the assembly to the second duct member 180 and the removal from the second duct member 180 can be performed easily by expanding and contracting the second duct member 180.

In addition, the first duct member 179 has the first air guide portion 182 to which the second duct member 180 is connected, and the air conditioner main body 136 has the blower portion 136*b* to which the second duct member 180 is connected. The connection portion between blower portion 136*b* and the second duct member 180 is provided with the third cushion material 189, and the connection portion between the second duct member 180 and the first air guide portion 182 is provided with the first cushion material 187.

According to the above configuration, the third cushion material 189 and the first cushion material 187 are capable of absorbing the vibration of the working machine and preventing the air conditioner main body 136, the first air duct 172, and the connector duct 174 from being damaged due to the vibrations.

In addition, the blower portion 136*b* is inserted inside one end side of the second duct member 180, and the other end side of the second duct member 180 is inserted inside the first air guide portion 182.

According to the above configuration, the resistance in flow path can be reduced, and the mixed air can flow smooth from the second duct member 180 to the third duct member 181 through the first duct member 179.

In addition, the connector duct 174 includes the first duct member 179, and includes the third duct member 181 that connects the first duct member 179 and the first air duct 172, and the third duct member 181 can be expanded and contracted in the direction to advance and retract with respect to the first duct member 179.

According to the configuration, the assembly to and the removal from the third duct member 181 can be easily performed by expanding and contracting the third duct member 181.

In addition, the first duct member 179 has the second air guide portion 183 to which the third duct member 181 is connected, and the first air duct 172 has the intake port 176 to which the third duct member 181 is connected. The second cushion material 188 is provided at the connection portion between the second air guide portion 183 and the third duct member 181, and the fourth cushion material 190 is provided at the connection portion between the third duct member 181 and the intake port 176.

According to the above configuration, the second cushion material 188 and the fourth cushion material 188 are capable of absorbing the vibrations of the working machine and preventing the air conditioner main body 136, the first air duct 172, and the connector duct 174 from being damaged due to the vibrations.

In addition, the second air guide portion 183 is inserted inside the third duct member 181, and the other end side of the third duct member 181 is inserted inside the intake port 176.

According to the configuration, the resistance in flow path can be reduced and the mixed air can flow smooth from the second duct member 179 to the first air duct 172 through the third duct member 181.

In addition, the working machine includes the second air duct 173 having the second air outlet portions (the second air blowout port 177*a* to the second air blowout port 177*c*) for blowing out the mixed air from the air conditioner main body 136, and the first duct member 179 has the duct connector portion 185 to which the second air duct 173 is connected.

According to the above configuration, the first duct member 179 is provided with the duct connector portion 185 to which the second air duct 173 is connected, so that the second duct member 180 and the third duct member 181 are capable of sliding smooth with respect to the first duct member 179.

In addition, the working machine includes the machine body 2, the cabin 5 mounted on the machine body 2, and the step 52 that is attached to the machine body 2 and forms the floor portion of the cabin 5. The air conditioner main body 136 is attached to the step 52, and the first air duct 172 is attached to the cabin 5.

According to the configuration, the air conditioner main body 136 attached to the machine body 2 side and the first air duct 172 and the second air duct 173 attached to the cabin 5 side can be easily connected by the connector duct 174.

In addition, the working machine 1 includes the cabin 5, the step 52 for forming the floor surface of the cabin 5, and the harness (the main harness 282) formed of bundled electric wiring, and the step 52 has the main plate 271 that forms the floor surface, and has the cut-out portion 272 penetrating the main plate 271 in the vertical direction. The first cut-out portion 272 includes the first cut-out portion 272A through which the harness passes from the lower surface of the main plate 271 to the room of the cabin 5, and includes the second cut-out portion 272B formed from the first cut-out portion 272A to the outer edge portion 52*a* of the main plate 271. The second cut-out portion 272B has one end connected to the first cut-out portion 272A, has the other end connected to the outer edge portion 52*a*, and is formed of the first edge portion 274 and the second edge portion 275 facing each other with a space therebetween. The step 52 includes the second plate 273B that is detachably fixed to the first portion 279 of the main plate 271 in which the first edge portion 274 is formed and to the second portion 280 in which the second edge portion 275 is formed, and closes the second cut-out portion 272B. The harness is arranged from the room of the cabin 5 to the outside of the cabin 5 through the first cut-out portion 272A and a region below the second plate 273B of the second cut-out portion 272B.

According to the configuration, since the second cutout 272B can be closed with the second plate 273B after the harness is arranged from the upper surface side of the step 52 via the cutout portion 272, the harness can be easily assembled.

In addition, the working machine has the connecting member 278 including the first vertical wall 278A connected to the first portion 279, the second vertical all 278B connected to the second portion 280, and the coupling wall 278C connecting the first vertical wall 278B and the second vertical wall 278B. The harness is arranged through a space surrounded by the second plate 273B, the first vertical wall 278A, the coupling all 278C, and the second vertical wall 278B.

According to the configuration, the connecting member 278 is capable of supporting the harness and of compensating for a decrease in strength due to the formation of the second cut-out portion 272B.

In addition, the side wall portion of the cabin 5 is mounted on the main plate 271 and the second plate 273B via the sealing member 127.

According to the above configuration, it is possible to improve the sealing performance of the cabin 5, and to prevent the dust from entering the room of the cabin 5 and to prevent the noise from entering the cabin 5.

In addition, the working machine includes the first plate 273A which covers the first cut-out portion 272A, leaving the harness insertion portion 283 which allows the harness to be inserted.

According to the configuration, the harness can be easily arranged from the lower surface side of the step 52 to the room of the cabin side through the harness insertion portion 283.

In addition, the working machine includes the electrical components (the first electrical component 285 and the second electrical component 286) arranged on the lower surface side of the step 52, and the cut-out portion 272 has the third cut-out portion 272C formed continuously from the first cut-out portion 272A to the electrical component side.

According to the configuration, it is possible to easily arrange the harness to the electrical components located on the lower surface side of the step 52.

In addition, the working machine 1 includes the air conditioner main body 136 and the cabin 5 having the outside air inlet portion 152 that introduces the outside air into the air conditioner main body 136, and the outside air inlet portion 152 includes the inner layer member 153 having the first outside air inlet port 154 communicated with the air conditioner main body 136, the middle layer member 158 that is arranged opposite to the outer side of the inner layer member 153 and covers the outside of the first outside air inlet port 154 and that has the second outside air inlet port 160 arranged at a portion not lacing the first outside air inlet port 154, and the outer layer member 163 that is arranged opposite to the outer side of the middle layer member 158 and covers the outside of the second outside air inlet port 160 and that forms the third outside air inlet port 166 provided at a portion not facing the second outside air inlet port 160.

According to the configuration, the effect of preventing the water from entering the air conditioner main body 136 can be improved. In this manner, even when the air-conditioner main body 136 and the outside air inlet portion 152 are arranged close to each other, it is possible to appropriately prevent the water from entering from the outside.

In addition, the third outside air inlet port 166, the second outside air inlet port 160, and the first outside air inlet port 154 are arranged at positions that do not align in a straight line.

In this manner, the effect of preventing the water from entering the air conditioner main body 136 can be further improved.

In addition, the third outside air inlet port 166 is a gap between the outer edge portion of the outer layer member 163 and the middle layer member 158.

According to the configuration, it is possible to prevent the water from entering a clearance between the outer layer member 163 and the middle layer member 158.

In addition, the third outside air inlet port 166 includes the lower gap 166*c* that is a gap between the lower edge portion of the outer layer member 163 and the middle layer member 158.

According to the configuration, the water that has entered a gap between the outer layer member 163 and the middle layer member 158 can be removed from the lower gap 166*c*.

In addition, the third outside air inlet port 166 includes the upper gap 166*b* that is a gap between the upper edge portion of the outer layer member 163 and the middle layer member 158, and includes the front gap 166*a* that is a gap between the front edge portion of the outer layer member 163 and the middle layer member 158. The width of the front gap 166*a* is larger than the widths of the upper gap 166*b* and the lower gap 166*c*.

According to the configuration, it is possible to make it hard for the water to enter a gap between the outer layer member 163 and the middle layer member 158 while securing the introducing amount of the outside air.

In addition, the second outside air inlet port 160 is formed of a plurality of long holes 160*a* arranged in parallel in the vertical direction, and the middle layer member 158 includes the flange-shaped portion 161 inclined to the inner layer member 153 side with respect to the perpendicular direction, at the upper edge portion of each long hole 160*a*.

According to the configuration, since the water droplet which goes from the third external air introduction port 166 to the first external air introduction port 154 side can be blocked by the flange-shaped portion 161, the water-proof effect of the air-conditioner main body 136 can further be improved.

In addition, the opening areas of the first outside air inlet port 154, the second outside air inlet port 160, and the third outside air inlet port 166 are substantially equal.

According to the configuration, the pressure loss of the air flowing through the first outside air inlet port 154, the second outside air inlet port 160, and the third outside air inlet port 166 can be reduced.

In addition, the first outside air inlet port 154 is arranged above the second outside air inlet port 160.

According to the configuration, it is possible to prevent the water from being transmitted from the second outside air inlet port 160 to the first outside air inlet port 154.

In addition, the air conditioner main body 136 is arranged in the vicinity of the side of the outside air inlet portion 152, and is communicated with the first outside air inlet port 154 via the outside air introduction duct 155.

According to the configuration, it is possible to cope with the expansion of the living space in the cabin and the increasing in the air flow of the air conditioner (the larger air flow). In addition, the working machine 1 includes the machine body 2, the support base 50 attached to the machine body 2, the movable body 85 supported by the support base 50 so as to change the position in the front-rear direction, the operation levers 77L and 77R provided on the movable body 85, the operator seat 6 supported by the movable body 85 so as to change the position in the front-rear direction, at least one stopper 98 provided on the operator seat 6, and at least one contacting member 99 to be contacted to the stopper 98 to restrict the rearward movement of the operator seat 6.

According to the configuration, the position of the movable body 85 and the operator seat 6 in the rearward direction can be regulated by the stopper 98 and the contacting member 99. In this manner, for example, even when the movable body 85 is moved to the rear end position in the state where the distance between the operation lever provided on the movable body 85 and the operator seat 6 is widened in the front-rear direction, the operator seat 6 can be prevented from interfering with the rear wall surface.

In addition, the operator seat 6 has a margin for the position adjustment behind the movable body 85 in the state where the movable body 85 is moved to the rear end side in the moving region and the rearward movement of the stopper 98 is restricted by the contacting member.

According to the configuration, the operator seat 6 and the movable body 85 are moved rearward so that the operation lever provided on the movable body 85 can be positioned rearward so as not to obstruct the getting on and off of the operator. In addition, by moving the movable body 85 to the front side, the operator seat 6 can be moved rearward, and by moving the operator seat 6 rearward, the distance between the operation lever and the operator seat 6 can be increased in the front-rear direction. In this manner, the operator can take a comfortable posture in which the operator can easily operate the operation lever during the driving.

In addition, the working machine includes the first rail devices (the first slide rail 84L arranged to the left and the first slide rail 84R arranged to the right) that supports the movable body 85 on the support base 50 so that the front-rear position of the movable body 85 can be adjusted, and includes the second rail devices (the second slide rail 86L arranged to the left and the second slide rail 86R arranged to the right) that supports the operator seat 6 on the movable body 85 so that the front-rear position of the operator seat 6 can be adjusted. The first rail device is locked so as not to move back and forth with a gap formed between the stopper 98 and the contacting member 99 after the movable body 85 is moved backward and the stopper 98 contacts to the contacting member 99, and the second rail device is locked so as not to move back and forth with a gap formed between the stopper 98 and the contacting member 99 after the stopper 98 contacts to the contacting member 99.

According to the configuration, for example, it is possible to prevent the stopper 98 and the contacting member 99 from rubbing against each other in the relative movement of the machine body 2 and the operator seat 6 caused by the vibrations or the like in the vertical direction.

In addition, the stopper 98 can adjust the position in the front-rear direction.

According to the configuration, the relative position between the stopper 98 and the contacting member 99 can be adjusted, the relative position being under the state where the stopper 98 is in contact with the contacting member 99.

In addition, the working machine includes the suspension 88 that supports the operator seat 6, and the contacting member 99 is formed in a vertically-long shape.

According to the configuration, even when the operator seat 6 is lowered due to the function of the suspension 88, the stopper 98 can be brought into contact with the contacting member 99.

In addition, the working machine includes the prime mover E1 provided behind the operator seat 6, and includes the partition plate (the shield wall member 22A) that partitions the prime mover room E2 that accommodates the prime mover E1 and the operator seat 6 side, and the contacting member 99 is attached to the shield wall plate.

According to the configuration, the configuration can be simplified by employing the shield wall plate as an attachment member for the contacting member 99.

In addition, the working machine includes the first rail device that supports the movable body 85 on the support base 50 so that the front-rear position can be adjusted, and the second rail device that supports the operator seat 6 on the movable body 85 so that the front-rear position can be adjusted. The shield wall plate has the first recess portion 107 to which the rear end side of the first rail device is inserted, and has the second recess portion 108 to which the rear end side of the second rail device is inserted.

According to the configuration, the operator seat 6 and the movable body 85 can be brought close to the shield wall plate, and the front space of the operator seat 6 can be widened.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modified examples within and equivalent to a scope of the claims.

What is claimed is:

1. A working machine comprising:

a traveling device;

a swivel base provided on the traveling device to be turnable about a vertical axis;

a working device supported on the swivel base;

an operator seat provided on the swivel base;

an armrest arranged on one side of the operator seat;

an operation lever arranged in front of the armrest and configured such that an operator grips and operates the operation lever with a hand to cause the swivel base to turn or operate the working device;

a display device provided in front of the operation lever;

a jog dial to operate the display device;

a dozer device provided on a front portion of the traveling device; and a dozer lever located on an opposite side of the armrest from the operator seat and configured to be swung in a front-rear direction to operate the dozer device, wherein the jog dial is located at a position near a lower portion of the operation lever, on an opposite side of the operation lever from the operator seat, and diagonally forward of the lower portion of the operation lever such that the jog dial overlaps the dozer lever as viewed from rear, and the dozer lever is located such that a base portion thereof is located at a position rearward of a front end of the armrest and forward of a rear end of the armrest.

2. The working machine according to claim 1,

Wherein the jog dial is arranged on a position allowing the operator seated on the operator seat to operate the operation lever and the jog dial with an arm placed on the armrest.

3. The working machine according to claim 1, further comprising a console on which the jog dial is arranged, the console having an operating-tool attachment surface on which the jog dial is arranged, wherein the operating-tool attachment surface inclines upward extending forward.

4. The working machine according to claim 3, wherein the operating-tool attachment surface gradually inclines toward a side separating from the operator seat as extending backward.

5. The working machine according to claim 1, further comprising at least one button-operating portion arranged around the jog dial and configured to be pressed by the operator.

6. The working machine according to claim 1, wherein the display device is arranged in front of the jog dial.

7. The working machine according to claim 1, wherein the jog dial is arranged in a field of view of the operator who is seated on the operator seat and watches the display device.

8. The working machine according to claim 1, wherein an operating tool to operate an air conditioner is provided at a position rearward of the dozer lever and rearward of a rear end of the armrest.

9. A working machine comprising:
a machine body;
a cabin mounted on the machine body;
an operator seat arranged in the cabin;
an operation lever and an armrest provided on one side of the operator seat and a console arranged between the operator seat and a side wall portion of the cabin, the console including:
a console cover having a protruding portion protruding toward the side wall portion of the cabin; and
a console supporting portion to which the console cover is attached, wherein
the console cover
is provided on the one side of the operator seat, and
includes a first cover on which the operation lever and the armrest are provided and a second cover provided on an opposite side of the first cover from the operator seat,
the second cover includes a first divided portion detachably attached to the console supporting portion,
the first divided portion includes the protruding portion which is attached to the console supporting portion and is overlapped with at least a part of a portion of the side wall portion of the cabin that is located lower than the protruding portion in a planar view,
the cabin
surrounds the operator seat,
includes a roof which covers an upper portion of a room of the cabin,
has an opening portion in a lower end thereof, the opening portion being in communication with the room of the cabin, and
is configured such that the cabin is attached to the machine body by lowering the cabin from above to the machine body with the operator seat, the console excluding the first divided portion, the operation lever, and the armrest attached to the machine body and with the first divided portion detached, and
the first divided portion is configured to be attached to the console supporting portion after the cabin is attached to the machine body.

10. The working machine according to claim 9, wherein the protruding portion is provided with a first operating tool to be operated by an operator.

11. The working machine according to claim 10, wherein the protruding portion has an operating-tool attachment surface having a surface to which the first operating tool is attached and facing the operator seated on the operator seat,
and wherein the operating-tool attachment surface inclines upward as extending forward and inclines backward as extending toward the side wall portion of the cabin.

12. The working machine according to claim 10, wherein:
the operation lever is arranged between the console and the operator seat;
the armrest is arranged behind the operation lever; and
the first operating tool is arranged on one side of the operation lever near the operation lever.

13. The working machine according to claim 12, wherein the first operating tool is arranged on a position allowing the operator seated on the operator seat to operate the operation lever and the first operating tool with an arm placed on the armrest.

14. The working machine according to claim 10, further comprising
a display device arranged in front of the first operating tool,
wherein the first operating tool includes a jog dial configured to operate the display device.

15. The working machine according to claim 9, wherein the console cover includes:
the first divided portion attached to the console supporting portion; and
a second divided portion attached to the console supporting portion separately from the first divided portion,
and wherein the first divided portion is attached to the console supporting portion from above.

16. The working machine according to claim 15, further comprising
a lever arranged on the console and configured to be swung in a front-rear direction,
wherein the console cover includes
a guide groove through which the lever is inserted, the guide groove allowing the lever to be swung in the front-rear direction,
and wherein the guide groove is formed on both the first divided portion and the second divided portion.

17. The working machine according to claim 9, wherein the console cover extends in a front-rear direction along the side wall portion of the cabin,
and wherein the protruding portion is arranged on a front end portion of the console cover.

18. A manufacturing method of the working machine according to claim 9, further comprising:
A first step for lowering the cabin including the side wall portion from above and housing the operator seat, the console supporting portion with the first divided portion detached, the operation lever, and the armrest in the cabin; and
a second step for attaching the first divided portion including the protruding portion to the console supporting portion after the first step.

* * * * *